Aug. 8, 1961 J. E. DAYGER ET AL 2,995,297

CARD TO TAPE CONVERTER

Filed June 1, 1956 66 Sheets-Sheet 1

INVENTORS
JONAS E. DAYGER
RAYMOND J. SALANI, JR.
PAUL V. BABEL

BY Andrew Taras
AGENT

CARD TO TAPE CONVERTER

Aug. 8, 1961 J. E. DAYGER ET AL 2,995,297

CARD TO TAPE CONVERTER

Filed June 1, 1956 66 Sheets-Sheet 11

CARD TO TAPE CONVERTER

Aug. 8, 1961 J. E. DAYGER ET AL 2,995,297

CARD TO TAPE CONVERTER

Filed June 1, 1956 66 Sheets-Sheet 14

Aug. 8, 1961 J. E. DAYGER ET AL 2,995,297

CARD TO TAPE CONVERTER

Filed June 1, 1956 66 Sheets-Sheet 18

Aug. 8, 1961 J. E. DAYGER ET AL 2,995,297

CARD TO TAPE CONVERTER

Filed June 1, 1956 66 Sheets-Sheet 19

Aug. 8, 1961 J. E. DAYGER ET AL 2,995,297

CARD TO TAPE CONVERTER

Filed June 1, 1956 66 Sheets-Sheet 20

Aug. 8, 1961 J. E. DAYGER ET AL 2,995,297

CARD TO TAPE CONVERTER

Filed June 1, 1956 66 Sheets-Sheet 21

CARD TO TAPE CONVERTER

CARD TO TAPE CONVERTER

CARD TO TAPE CONVERTER

CARD TO TAPE CONVERTER

Filed June 1, 1956 66 Sheets-Sheet 30

Aug. 8, 1961 J. E. DAYGER ET AL 2,995,297

CARD TO TAPE CONVERTER

Filed June 1, 1956 66 Sheets-Sheet 31

CARD TO TAPE CONVERTER

Aug. 8, 1961 J. E. DAYGER ET AL 2,995,297

CARD TO TAPE CONVERTER

Filed June 1, 1956 66 Sheets-Sheet 36

Aug. 8, 1961 J. E. DAYGER ET AL 2,995,297

CARD TO TAPE CONVERTER

Filed June 1, 1956 66 Sheets-Sheet 37

Aug. 8, 1961 J. E. DAYGER ET AL 2,995,297

CARD TO TAPE CONVERTER

Filed June 1, 1956 66 Sheets-Sheet 39

Aug. 8, 1961 J. E. DAYGER ET AL 2,995,297

CARD TO TAPE CONVERTER

Filed June 1, 1956 66 Sheets-Sheet 43

Aug. 8, 1961 J. E. DAYGER ET AL 2,995,297

CARD TO TAPE CONVERTER

Filed June 1, 1956 66 Sheets-Sheet 45

Aug. 8, 1961 J. E. DAYGER ET AL 2,995,297
CARD TO TAPE CONVERTER
Filed June 1, 1956 66 Sheets-Sheet 47

| | | | | |
|---|---|---|---|---|
| CAPACITORS | C | 2000 | MMFD | 200 VOLT |
| RESISTORS | $R_1$ | 4700 | OHMS | 1/2 WATT |
| RESISTORS | $R_2$ | 180000 | OHMS | 1/2 WATT |
| RESISTORS | $R_3$ | 47000 | OHMS | 1/2 WATT |

Aug. 8, 1961 J. E. DAYGER ET AL 2,995,297

CARD TO TAPE CONVERTER

Filed June 1, 1956 66 Sheets-Sheet 51

Aug. 8, 1961 J. E. DAYGER ET AL 2,995,297

CARD TO TAPE CONVERTER

Filed June 1, 1956 66 Sheets-Sheet 54

Aug. 8, 1961 J. E. DAYGER ET AL 2,995,297

CARD TO TAPE CONVERTER

Filed June 1, 1956 66 Sheets-Sheet 58

Aug. 8, 1961 J. E. DAYGER ET AL 2,995,297

CARD TO TAPE CONVERTER

Filed June 1, 1956 66 Sheets-Sheet 66

United States Patent Office 2,995,297

Patented Aug. 8, 1961

2,995,297

CARD TO TAPE CONVERTER

Jonas E. Dayger, Binghamton, Raymond J. Salani, Jr., Endicott, and Paul V. Babel, Vestal, N.Y., assignors to International Business Machines Corporation, New York, N.Y., a corporation of New York Filed June 1, 1956, Ser. No. 588,888
11 Claims. (Cl. 235—61.7)

The invention relates to data converting and recording systems, more specifically the invention is concerned with a high speed system for converting numerical coded data, recorded on record cards, to binary coded data and recording the same on magnetic tape.

The high speed system comprises essentially a card reader, a synchronizer and a magnetic tape unit. The card reader is a modified statistical machine which is capable of effecting selecting, accumulating and checking operations.

The invention is adaptable to a variety of accounting procedures wherein large volumes of data are required to be converted, or transcribed, from one medium to another medium at high speed.

The invention is especially suited to check reconciliation procedures wherein millions of record checks are to be processed on a daily basis.

An object of the invention is the provision of a data converting and recording system which is faster than any known data converting and recording system.

Another object is the provision of a novel checking system in a high speed data converting and recording system for enabling the latter to produce only accurate recordings of data.

Yet another object resides in the flexibility of an error classifying system for segregating source records in error from those not in error and to avoid the recording of the latter errors without interruptions in the operations of the data converting and recording system.

Still another object resides in the provision of novel controls for operating at high speed a tape recorder and to instruct the latter to record only the proven converted data on the tape.

A further object resides in the provision of novel serializing and batch identification printing means in a card to tape converter and recorder for facilitating the location of record card checks processed therethrough.

A still further object provides a high speed classification of the record card checks by the provision of a pocket progression control which avoids stopping of the machine as the card pockets are filled.

An object is to provide in a high speed data converting and recording system the provision of record selection and record identification means to facilitate the location of any record check data either on tape or on the record checks.

Another object is the provision in a high speed data converting and recording system of register printing means, accumulator means, and counting means whereby a printed register record may be obtained of totals pertaining to the correct and incorrect card checks with respect to number and amount and to provide the recording on magnetic tape of the correct totals. This provides a magnetic tape record of accurate detail and total information with appropriate cross-identification for card check data and corresponding magnetic tape data. There is provided a cross-check of printed data with magnetically recorded data whereby check reconciliation is performed with flexibility, accuracy and at high speed.

Another object resides in the provision of a novel checking scheme for insuring the validity of the serial number printing and batch printing means to provide for the accurate identification of each card check passed through the machine.

Still another object resides in the provision of novel program controls for moving the tape forwardly while recording, backwardly while checking and either spacing forwardly in the event the record is without error or writing a new record over the previously written record in the event of an error, thus enabling accurate recording of converted data to be effected at high speed.

Yet another object resides in the provision of novel checking means associated with a card reader for accurately identifying each record card processed through the reader thereby facilitating the location with respect to subsequent filing operations.

A still further object resides in the provision of novel electronic controls for controlling the movements of the tape in such a manner that defective tape areas are passed over without interruption in the transcribing operation.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1 is an arrangement of the card reader, the synchronizer and the tape unit illustrating generally the conversion of card check data to tape data.

FIGS. 2*a* through 2*t* constitute the wiring diagram of the card reader.

FIG. 3 is a block diagram showing the arrangement of FIGS. 3*a* through 3*r* which constitute the wiring diagram of the synchronizer.

FIG. 4 is a diagrammatic drawing showing in part the principle features of the statistical machine shown and described in detail in the Patent No. 2,615,569, issued to C. D. Lake et al., and some of the features forming a part of the card reader.

Figure 13A:
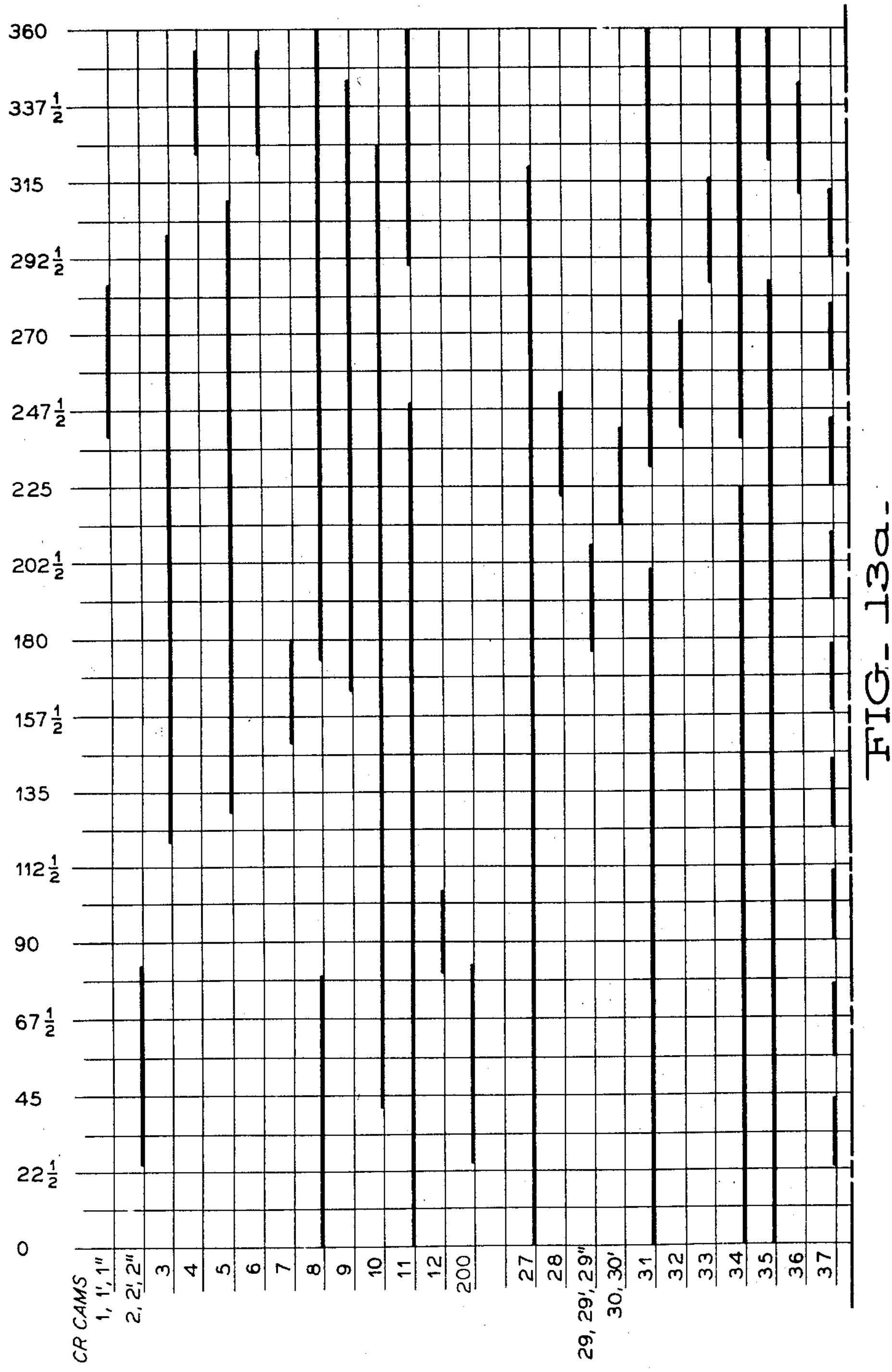
Figure 13B:
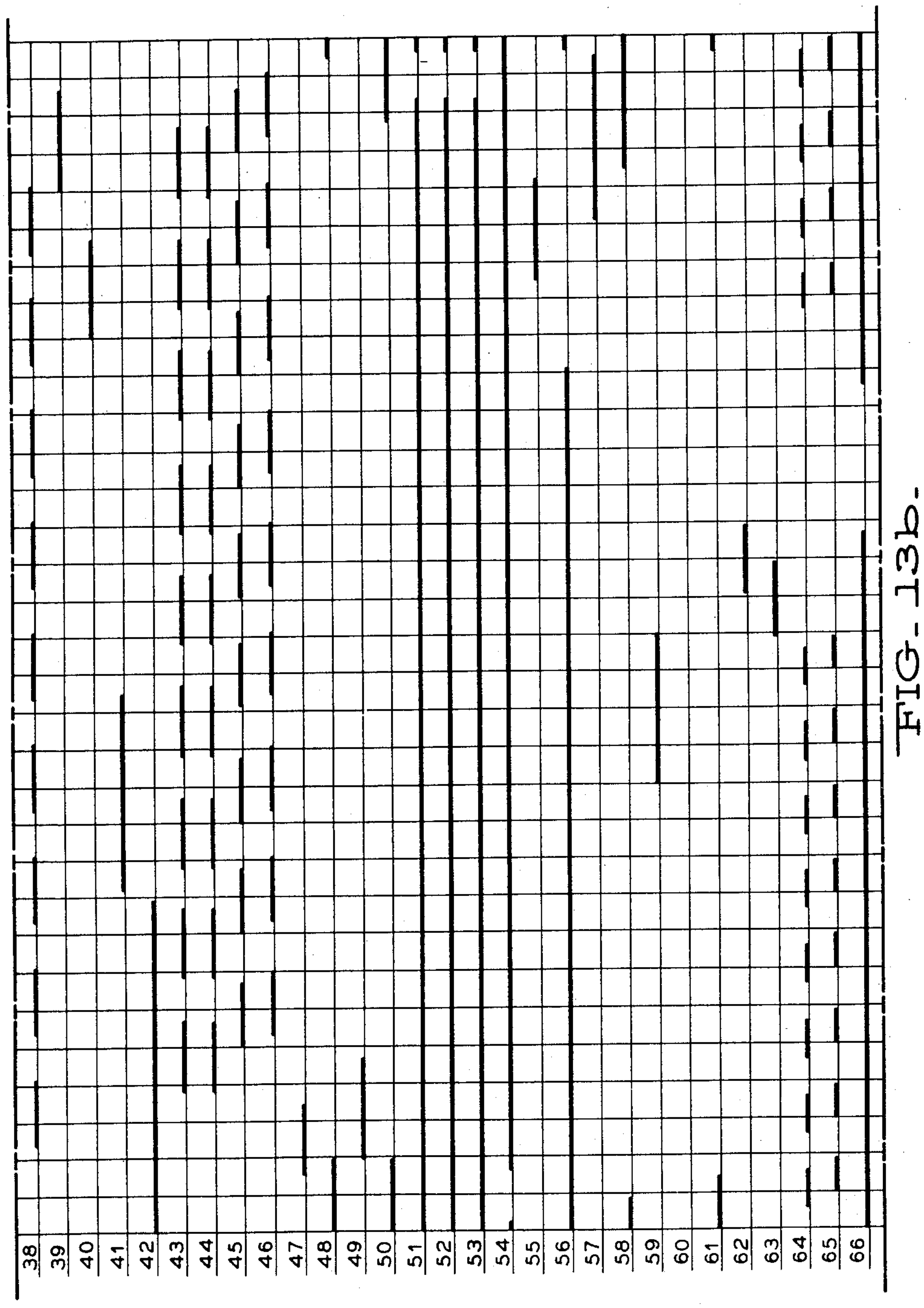
Figure 13C:
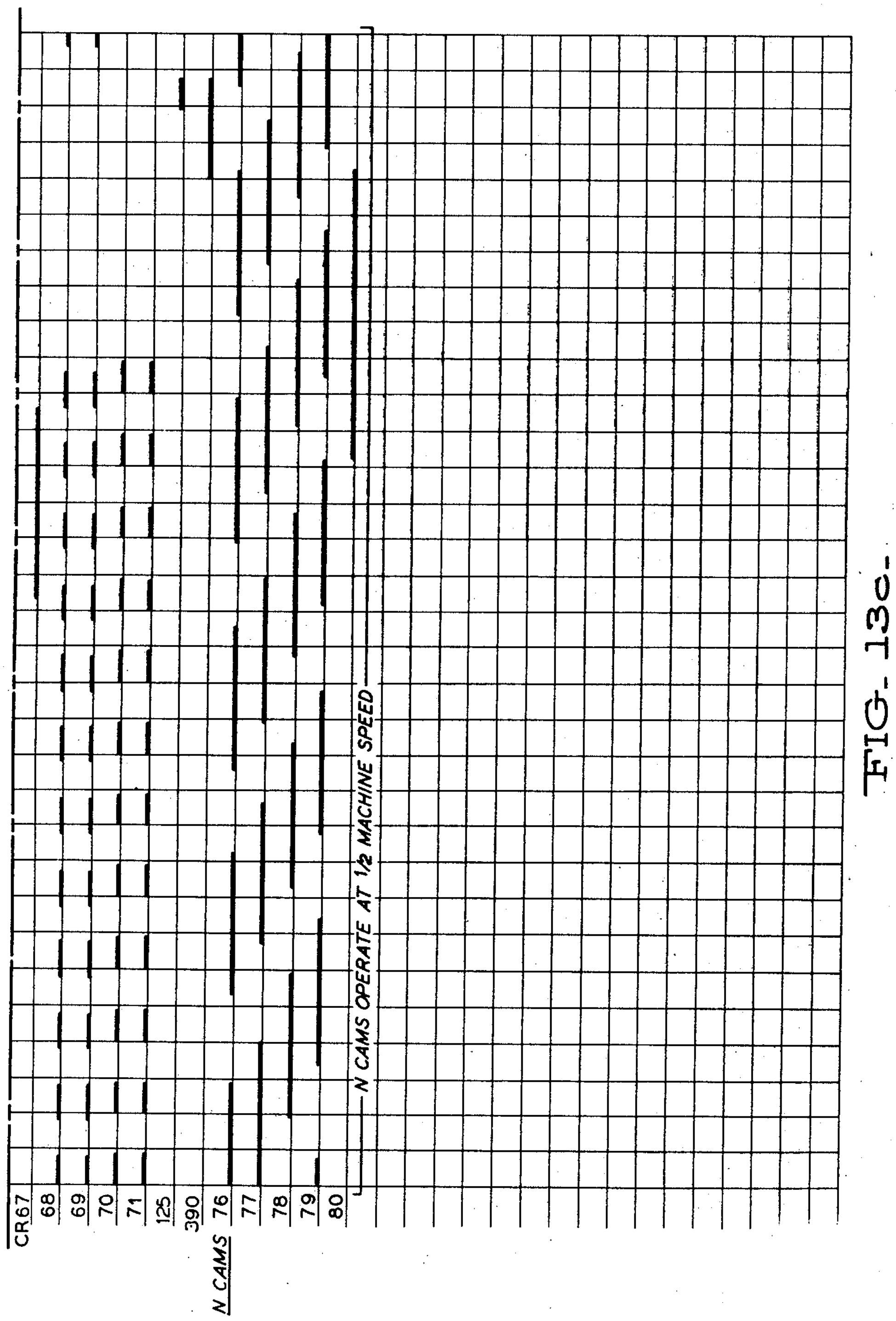

FIGS. 13*a* through 13*c* constitute an electrical timing chart for the CR cams and N cams of the card reader.

Figure 14A:
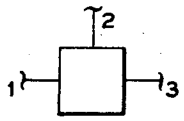
Figure 14:
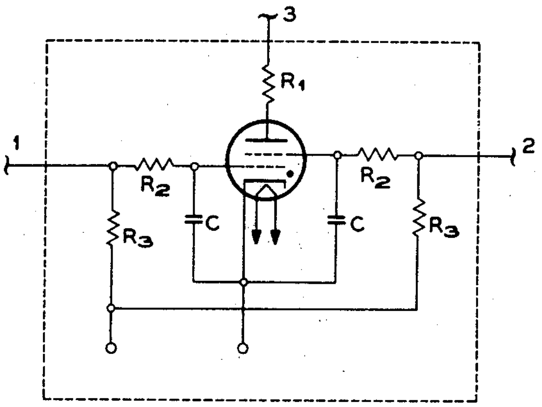

FIG. 14 is a circuit diagram of a gas tube employed in the buffer unit.

FIG. 14*a* is a block representation of FIG. 14.

Figure 15:
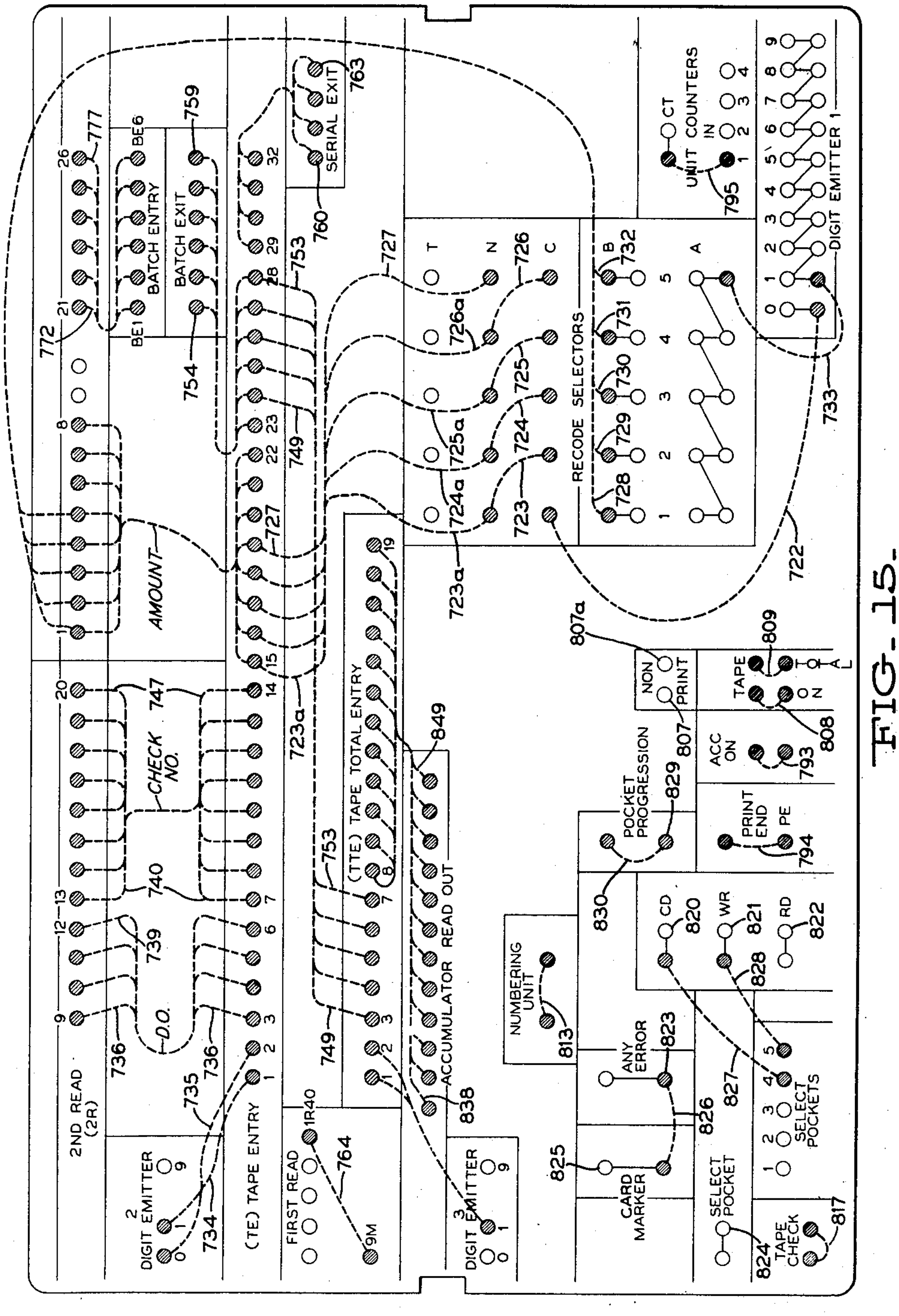

FIG. 15 is an abbreviated drawing of the control panel showing the principle plug sockets and the manner in which they are plugged, as an example of data conversion from card checks to tape.

Figure 16:
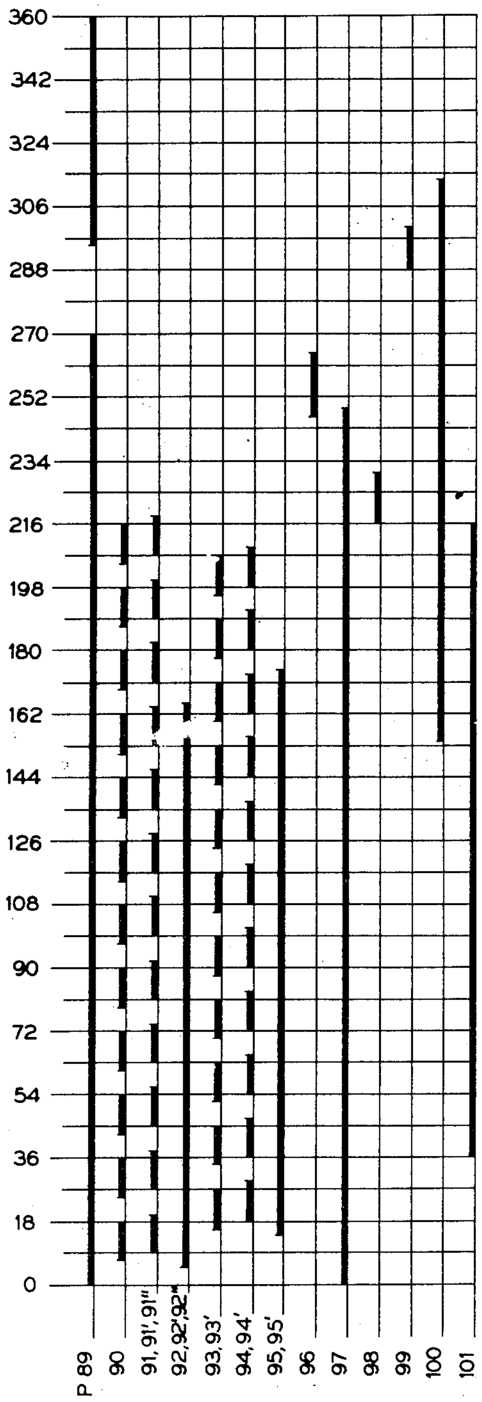

FIG. 16 is an electrical timing chart of the print (P) cams of the card reader.

Figure 17:
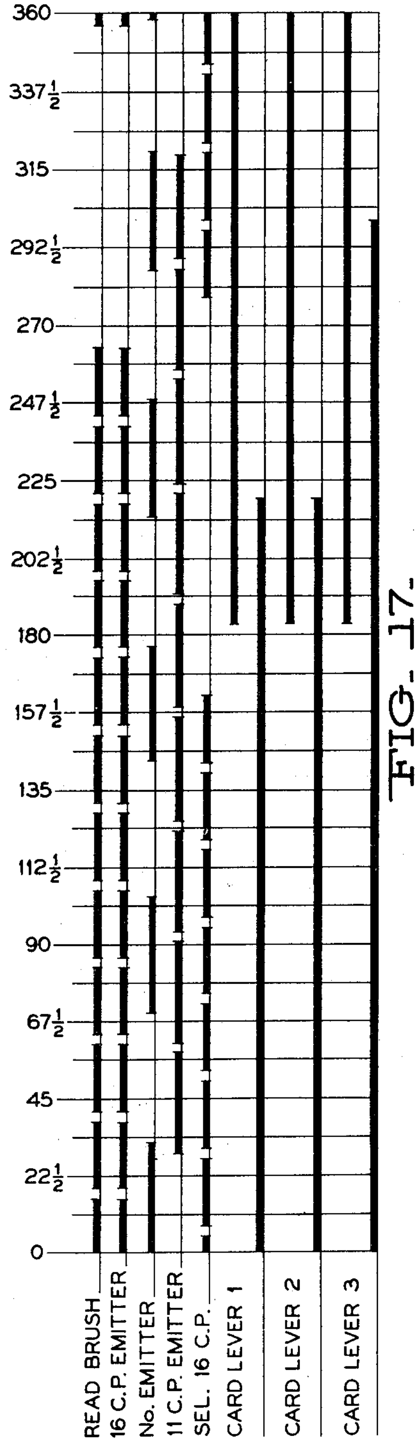

FIG. 17 is an electrical timing chart for the emitters and card levers of the card reader.

Figures 4, 18:
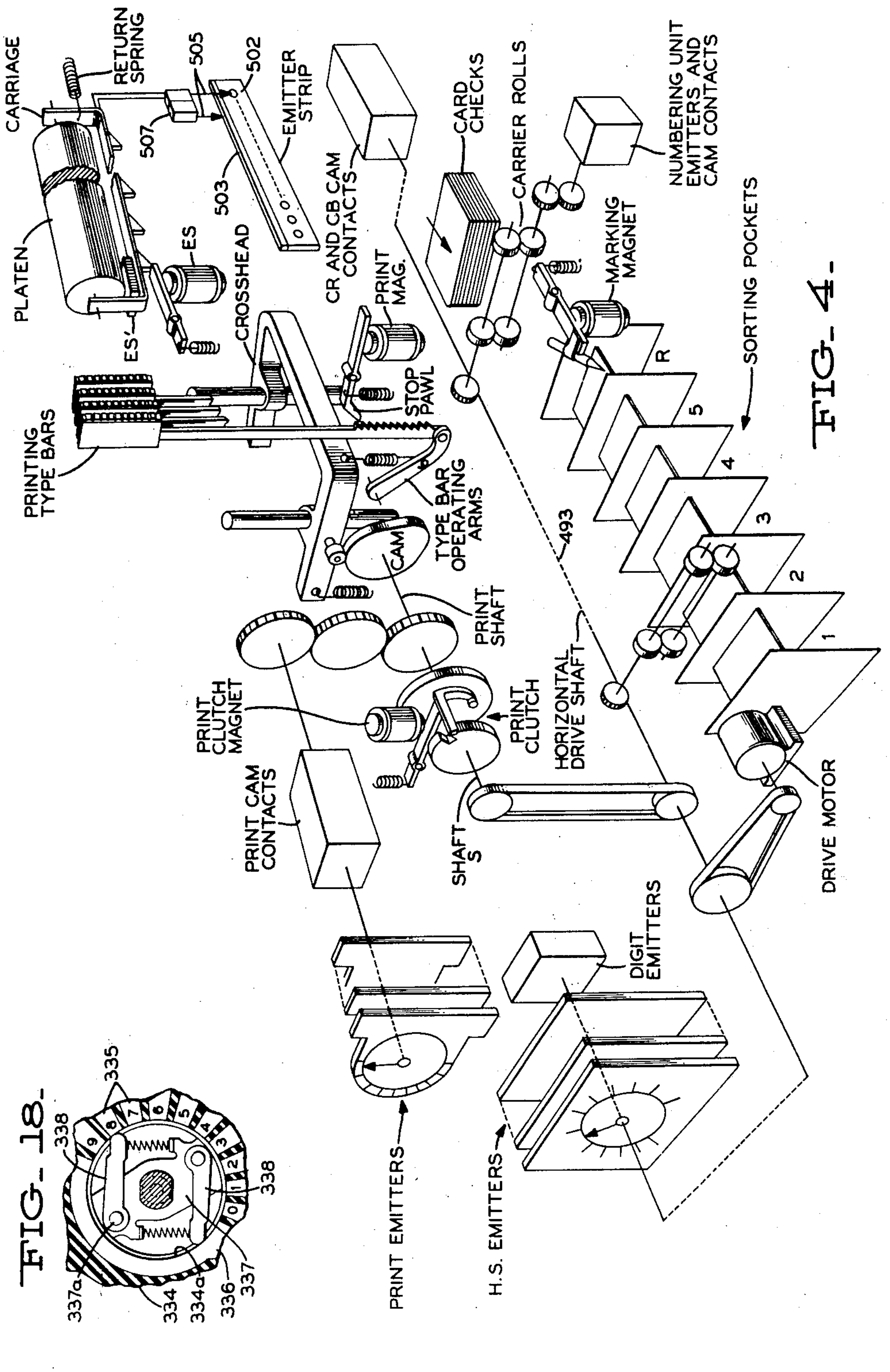

FIG. 18 is a fragmentary view of the accumulator readout mechanism.

Figure 19:
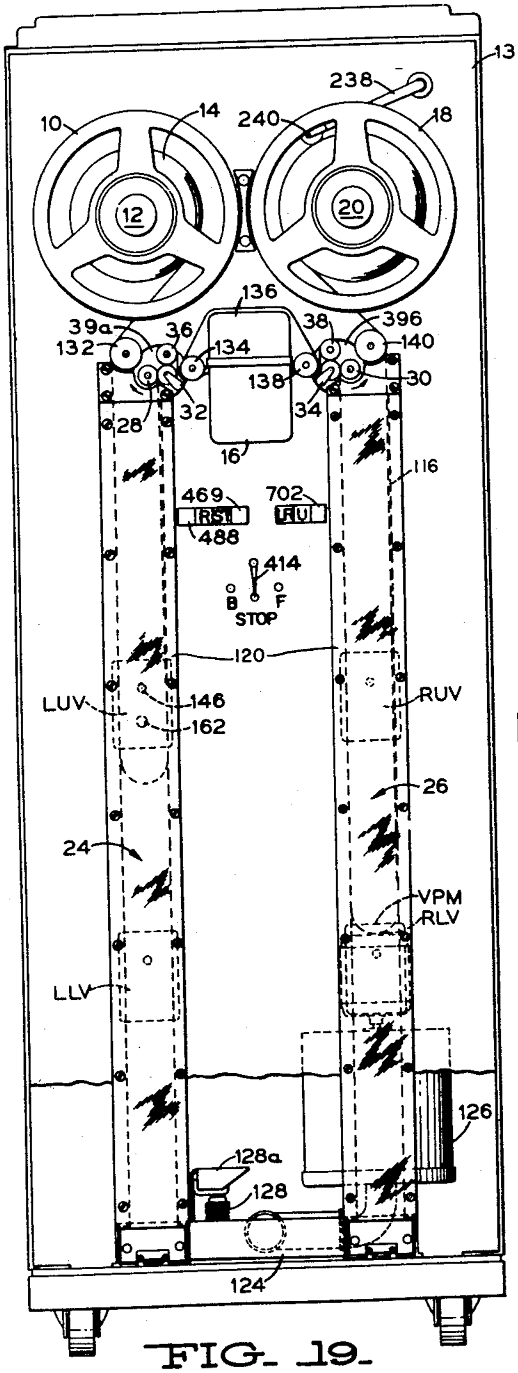

FIG. 19 is a front elevational view of the tape unit.

Figure 20:
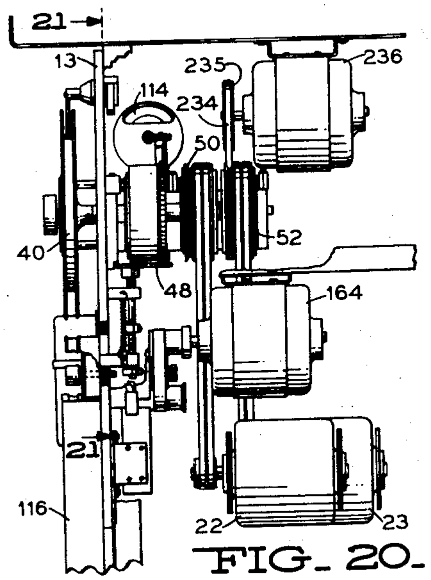

FIG. 20 is a side elevational view showing in part the tape driving mechanism.

Figure 21:
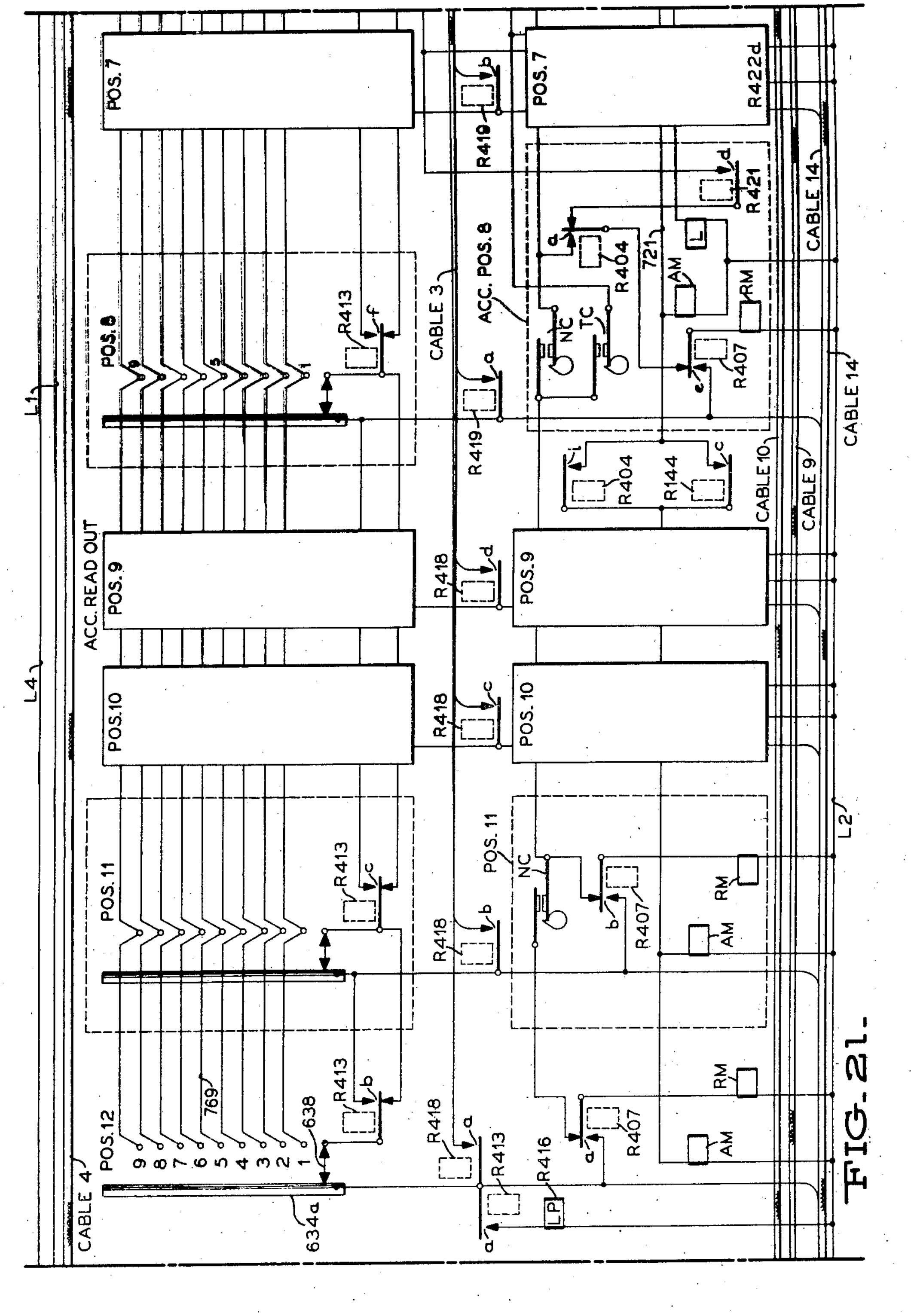

FIG. 21 is a view on the line 21—21 of FIG. 20.

Figures 22, 23:
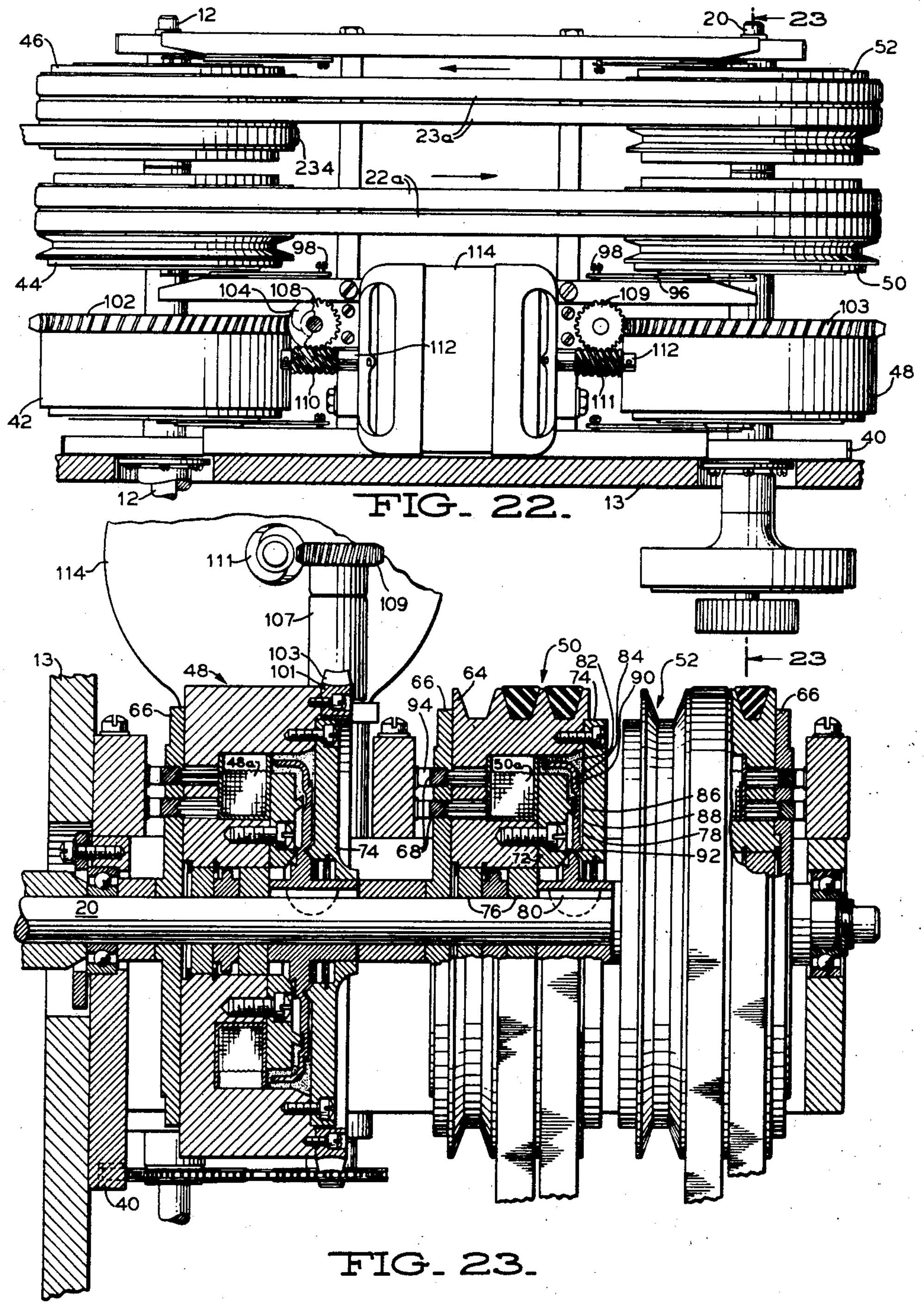

FIG. 22 is a plan view of the tape reel drive mechanism and related clutches and brakes.

FIG. 23 is a view taken along the line 23—23 of FIG. 22.

Figure 24:
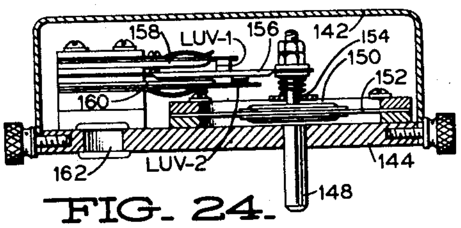

FIG. 24 is a cross-sectional view of a vacuum controlled switch.

Figure 25:
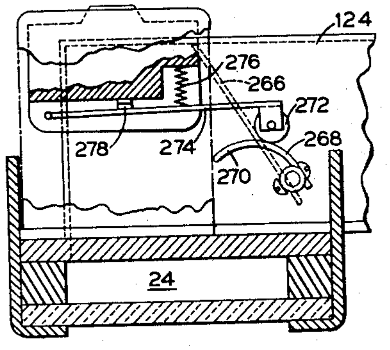
Figure 21:
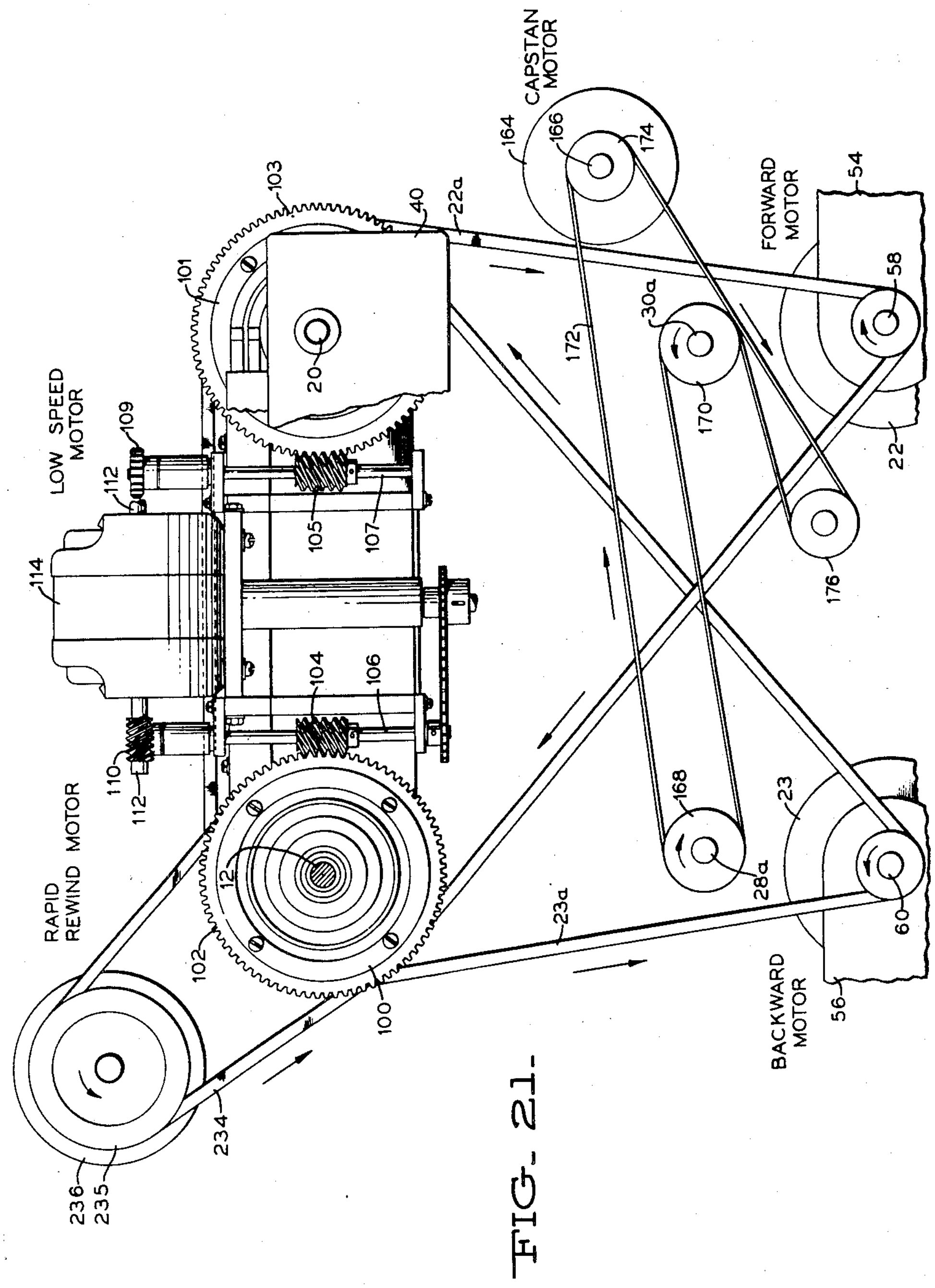

FIG. 25 is a plan view of a flapper valve.

Figure 26:
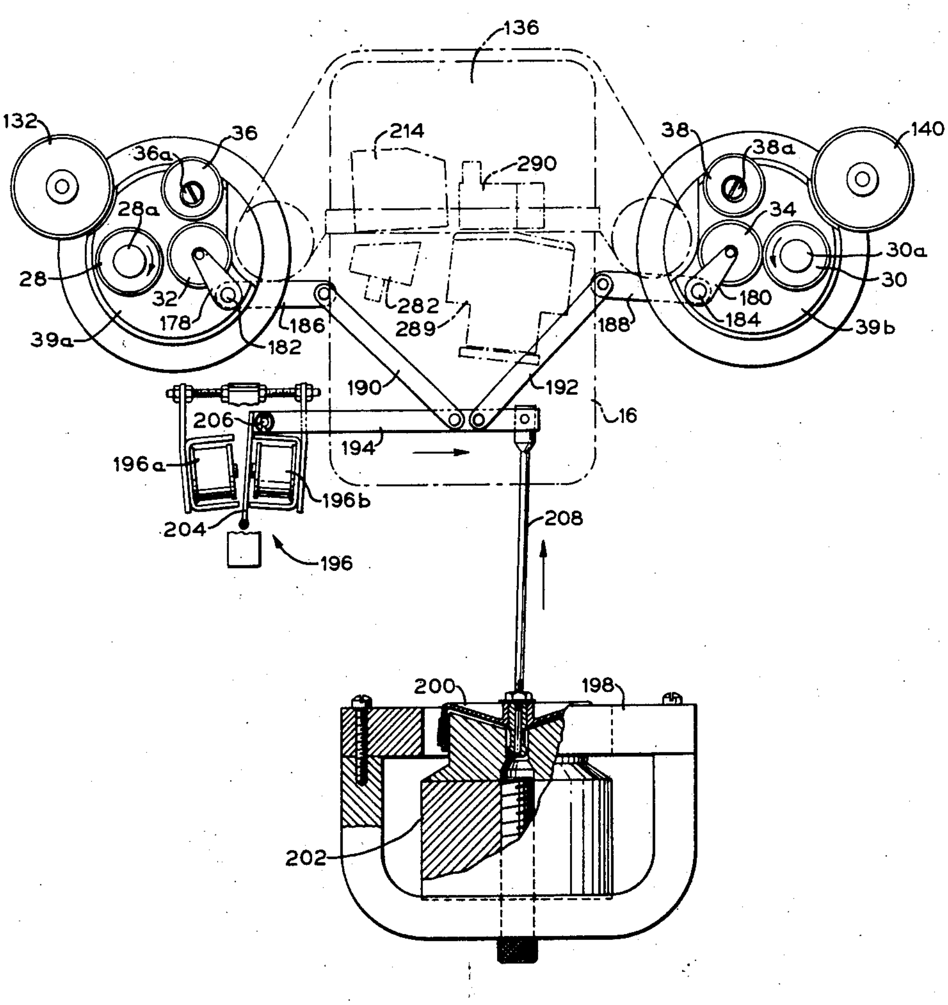
Figure 29:
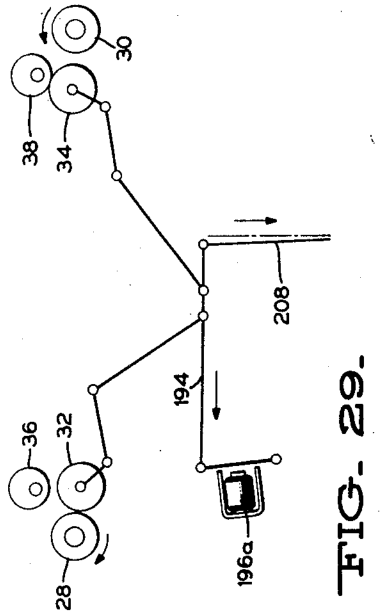
Figure 30:
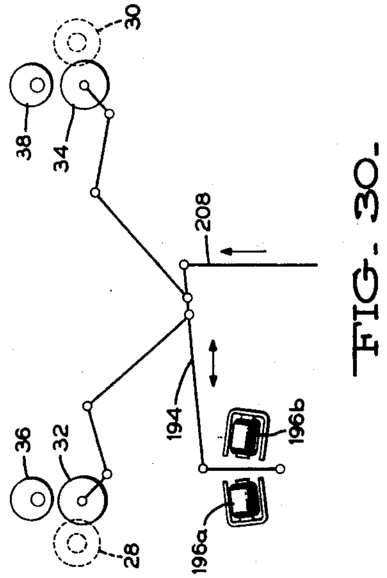

FIG. 26 illustrates tape feeding control instrumentalities with the various parts biased in position to effect a forward movement of the tape.

Figure 27:
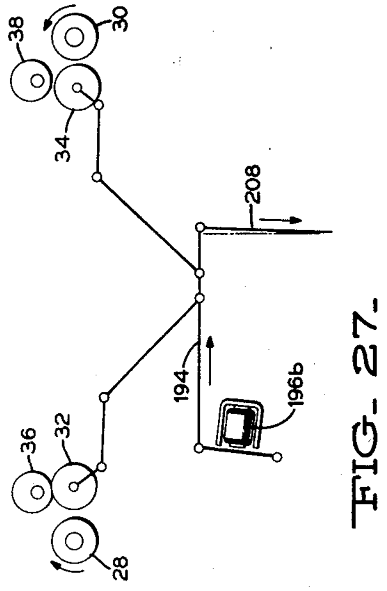

FIG. 27 is a diagrammatic view of the mechanism shown in FIG. 26 with the parts in position to stop tape movement following the feed of the tape in a forward direction.

Figure 28:
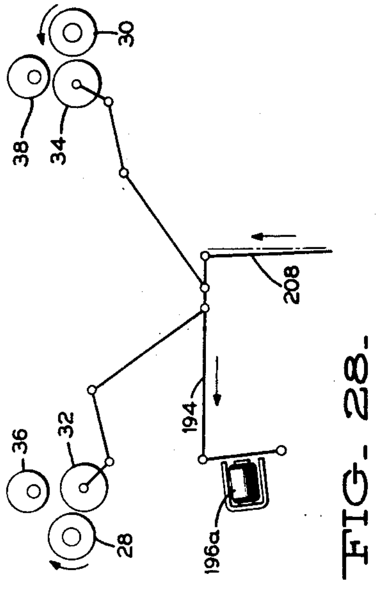
Figure 31:
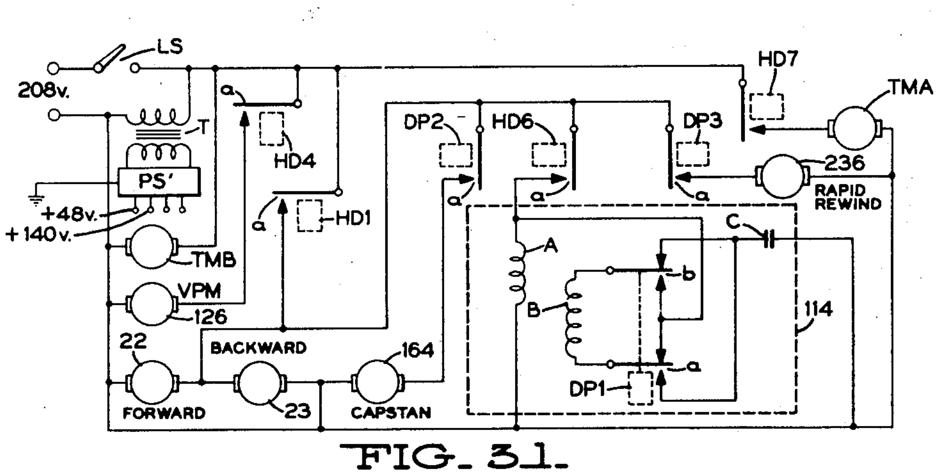

FIG. 28 is a diagrammatic view of FIG. 26 with the parts in position to effect backward feed of the tape.

Figure 29:
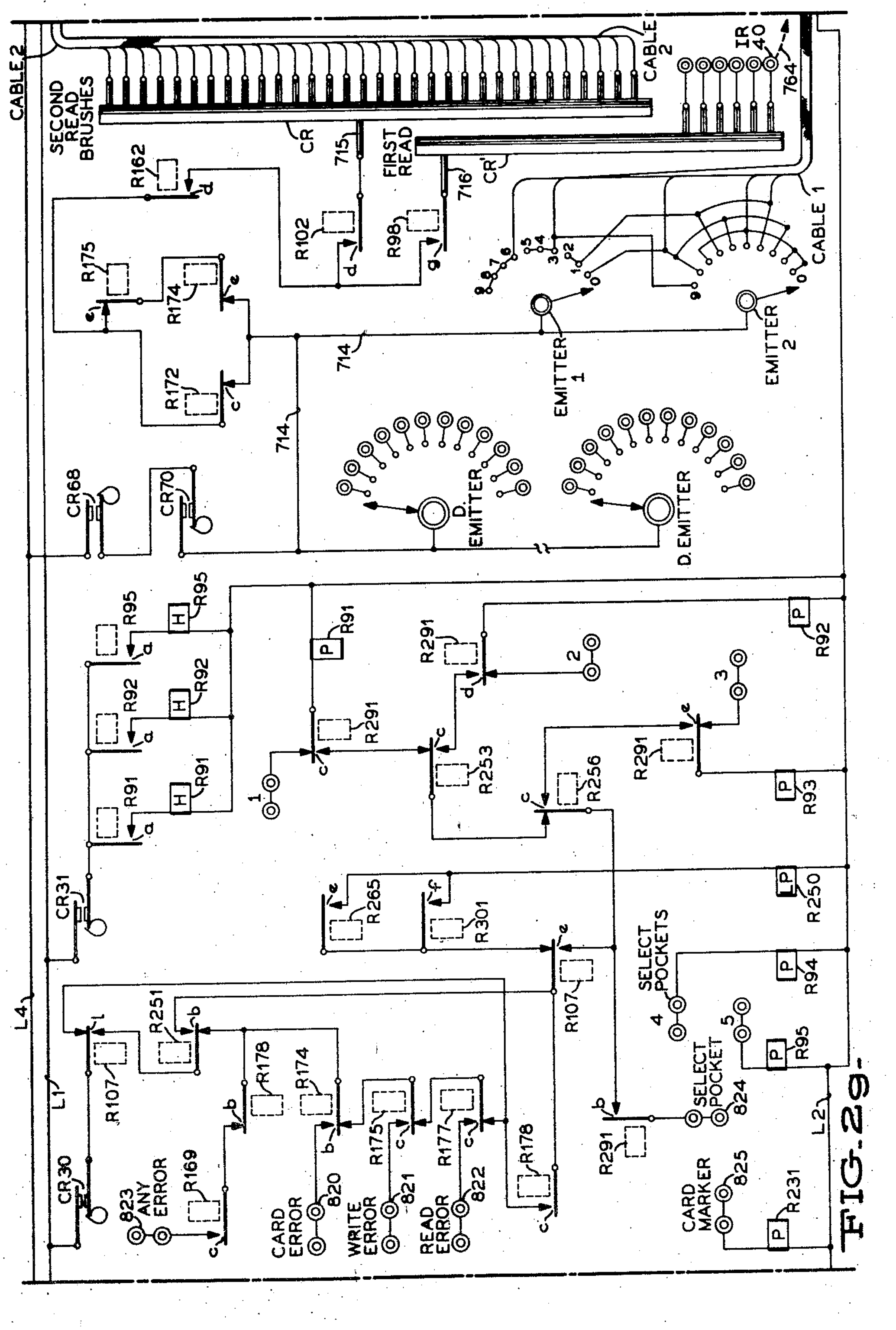

FIG. 29 is a diagrammatic view of FIG. 26 with the parts in position to stop the tape following the backward feed thereof.

Figure 30:
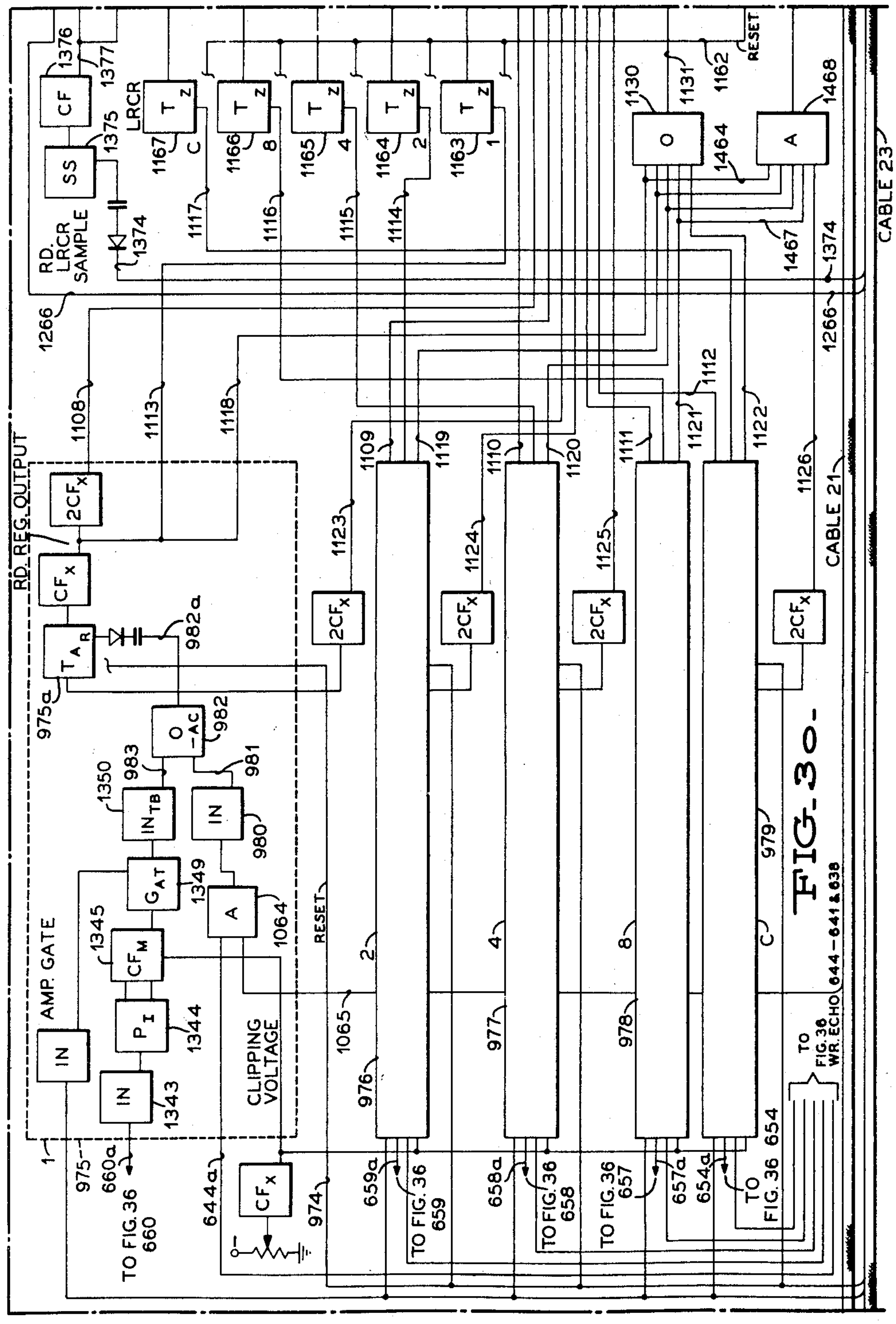

FIG. 30 is a diagramatic view of FIG. 26 showing the position of the drive and stop capstans when the tape unit is in an unloaded position.

Figure 31:
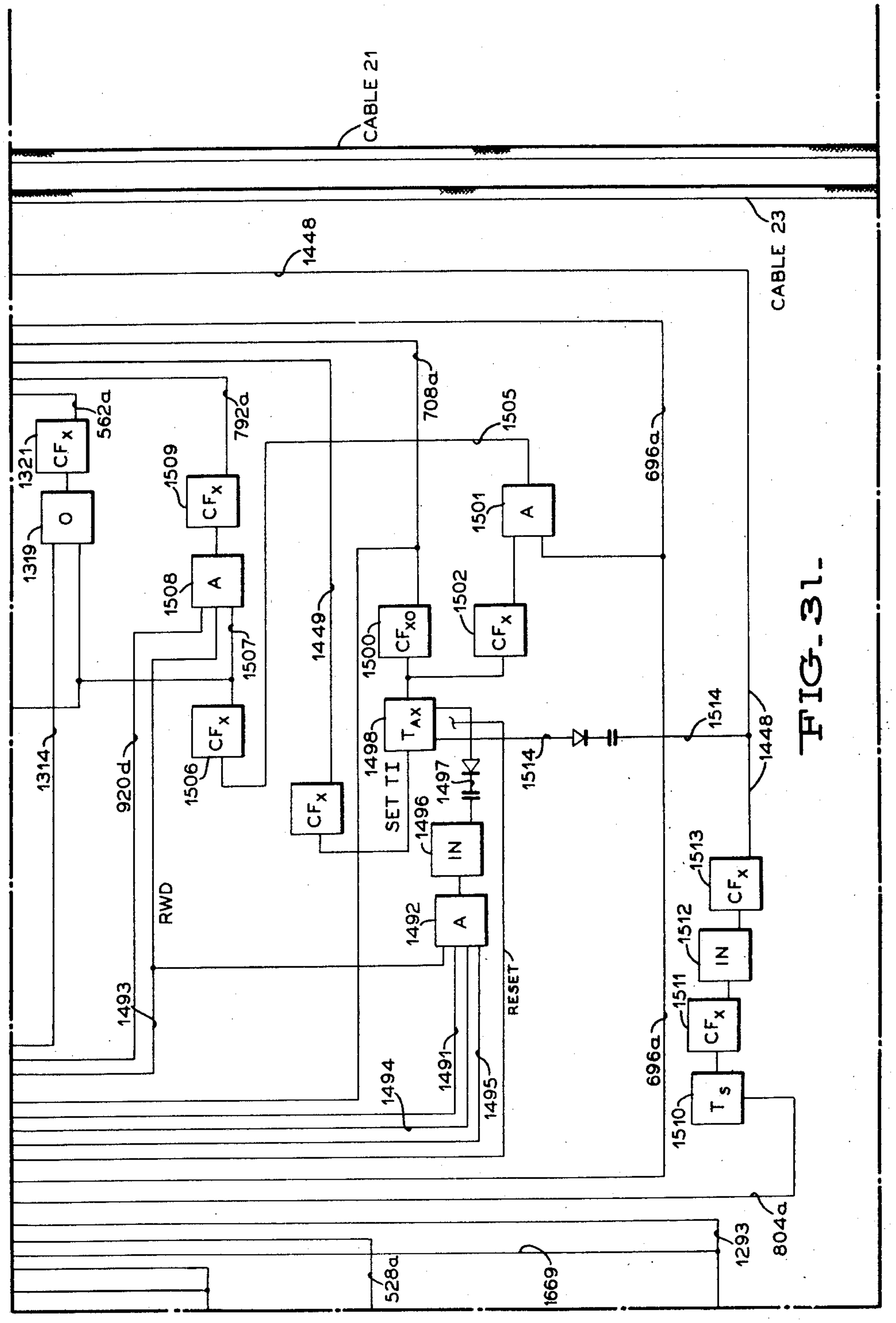

FIG. 31 is a portion of a circuit diagram showing the the various drive motors of the tape unit.

Figure 32:
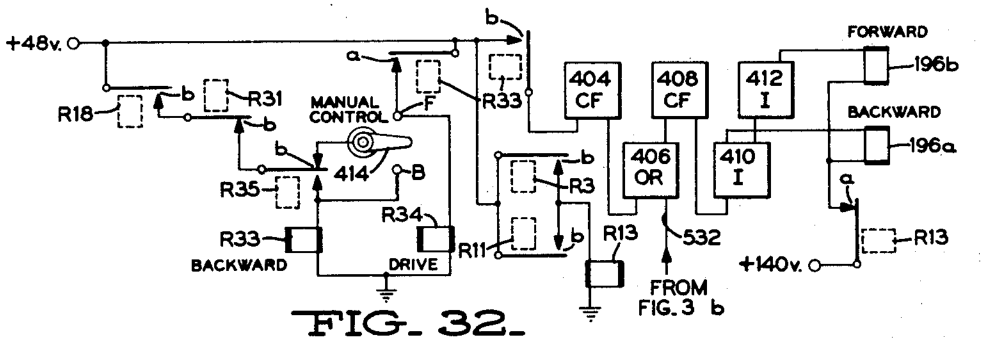

FIG. 32 shows the forward and backward control magnet circuits of the tape unit.

Figure 33:
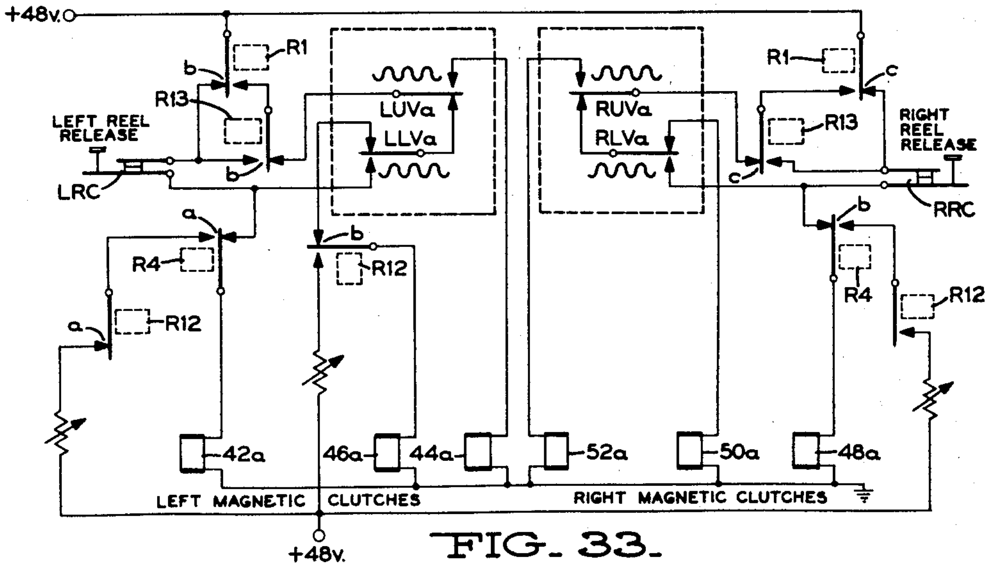

FIG. 33 shows the right and left magnetic clutch control circuits of the tape unit.

Figure 34A:
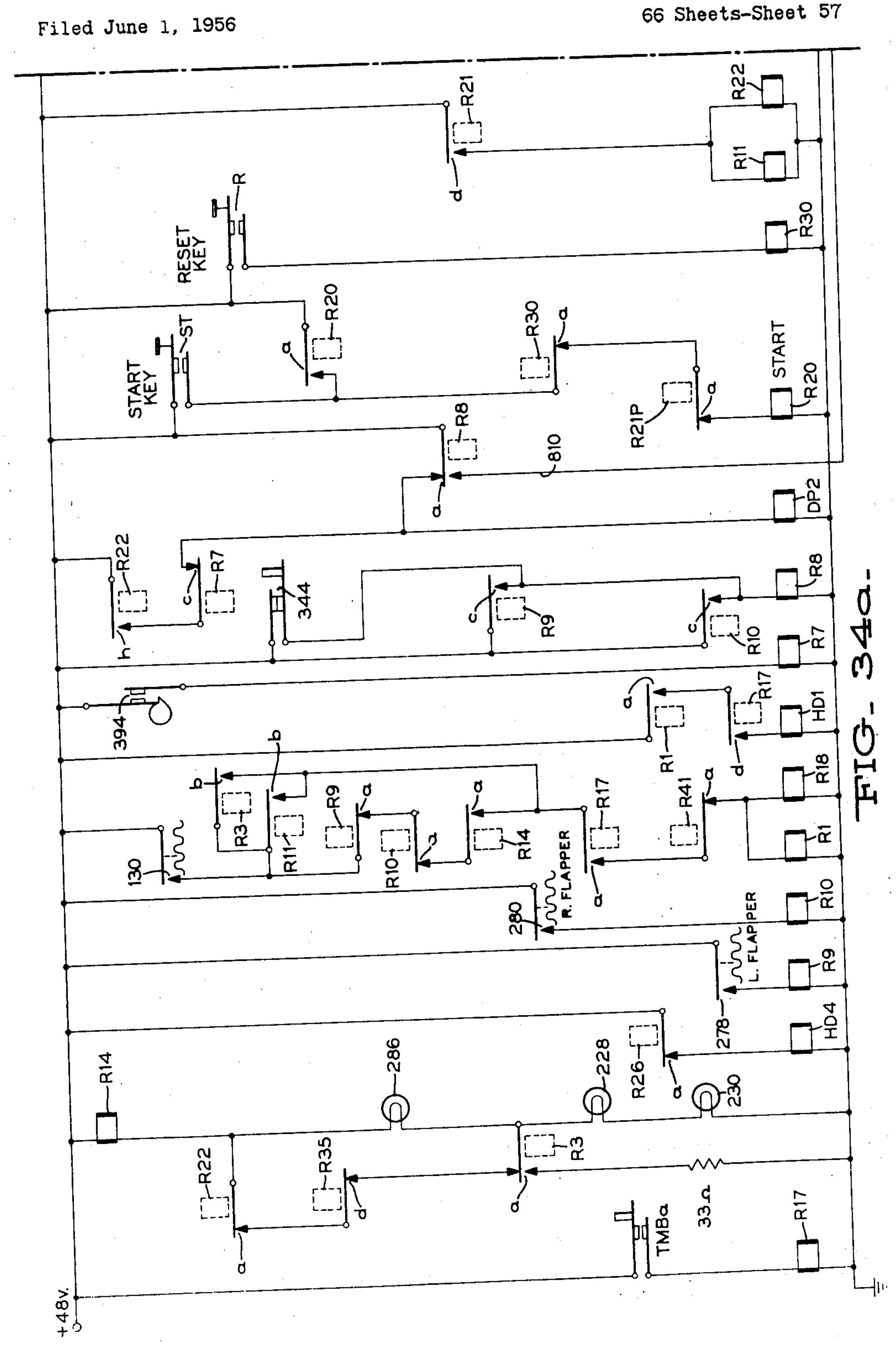
Figure 34B:
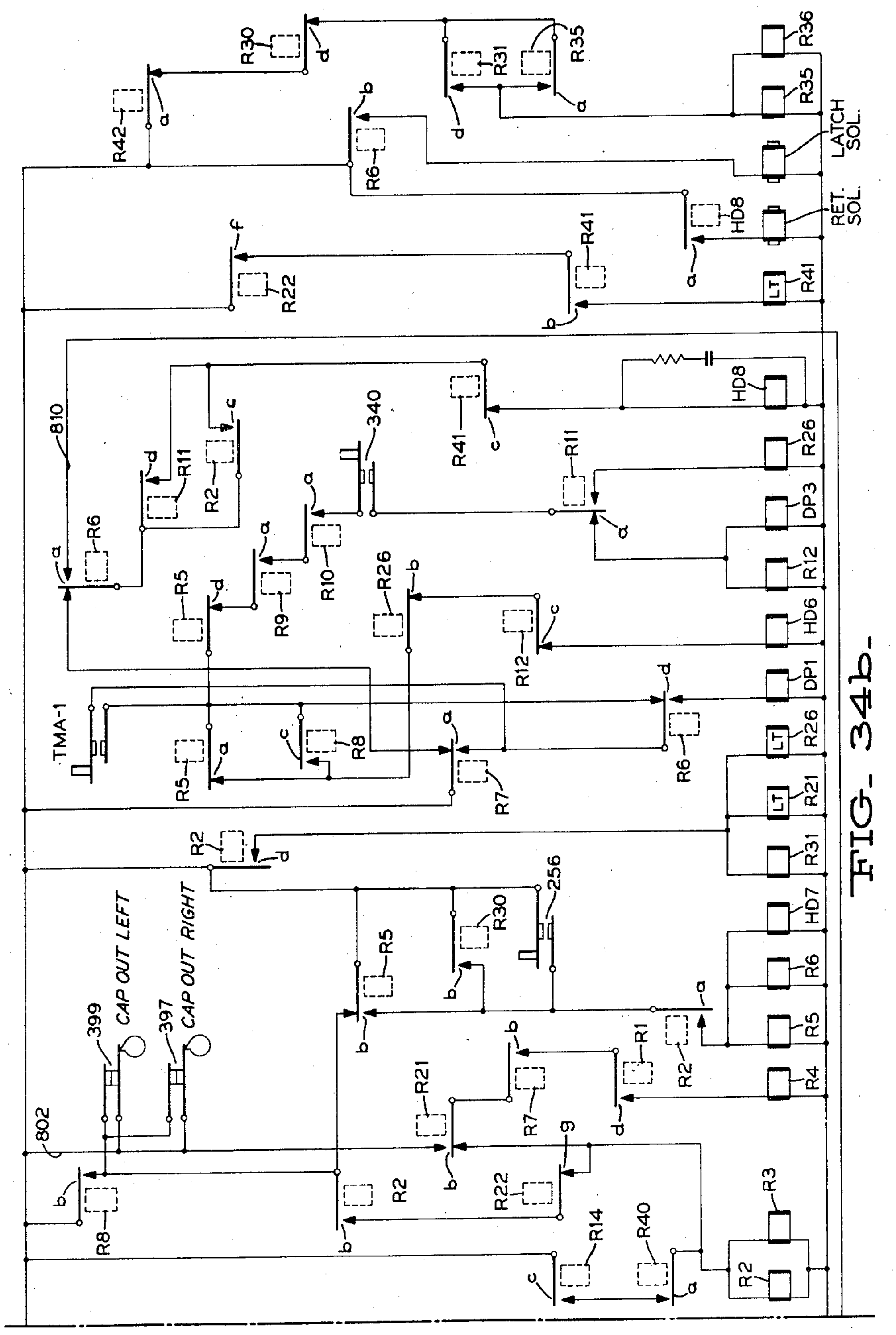

FIGS. 34*a* and 34*b* constitute a circuit diagram of the tape unit showing principally the various relay control circuits.

Figure 35A:
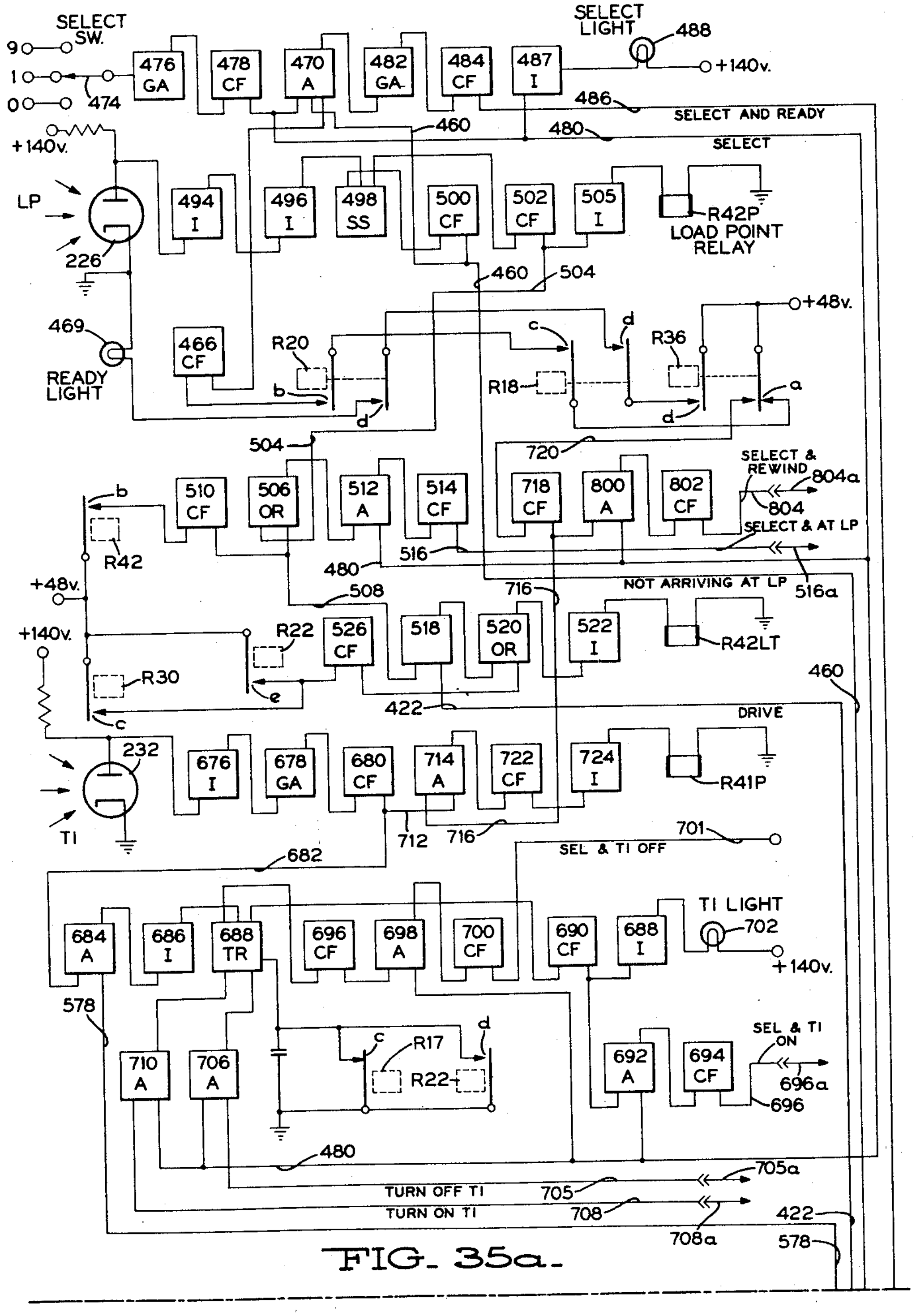
Figure 35B:
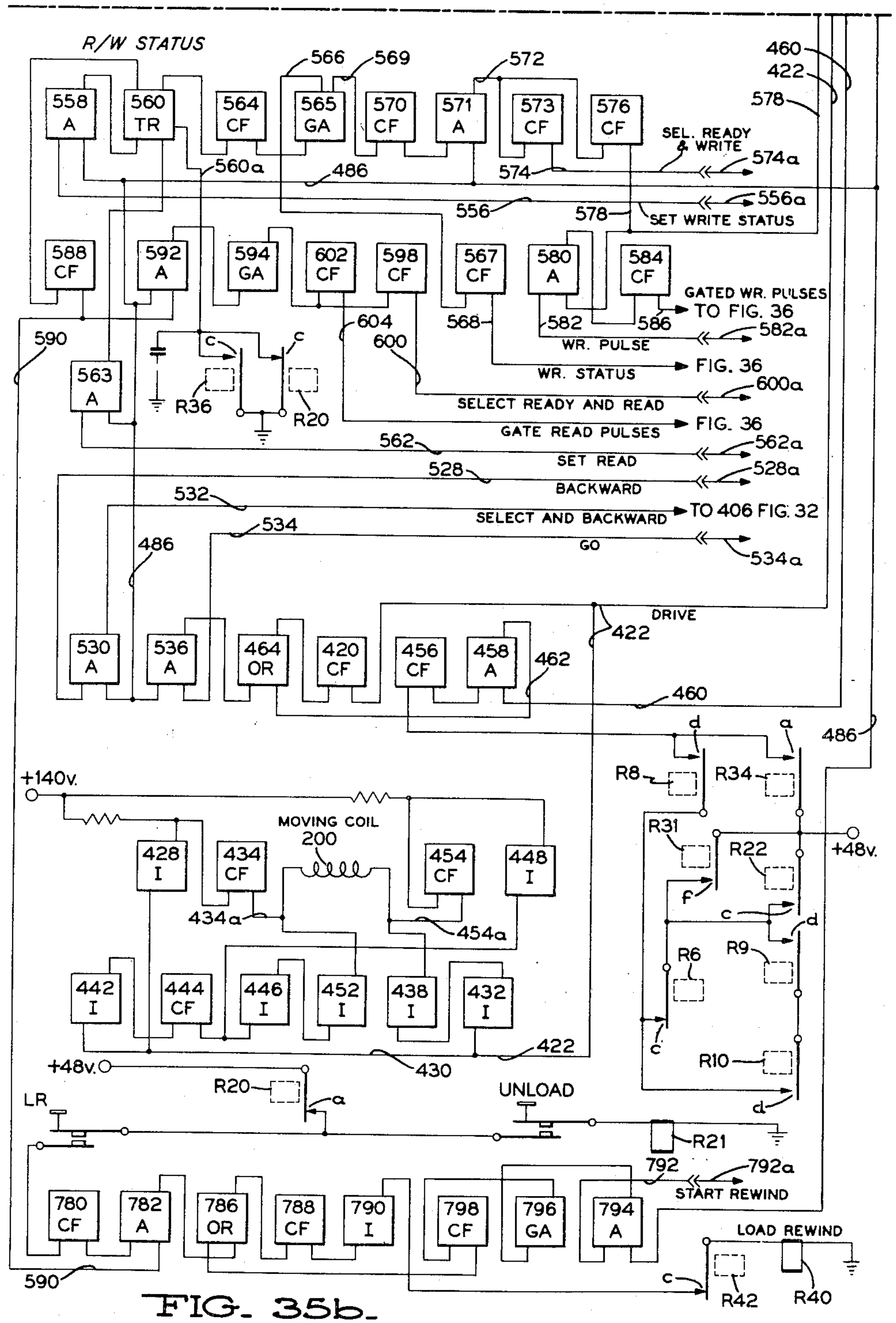

FIGS. 35*a* and 35*b* constitute a circuit diagram of the tape unit showing the principal electronic controls and signal lines.

Figure 36:
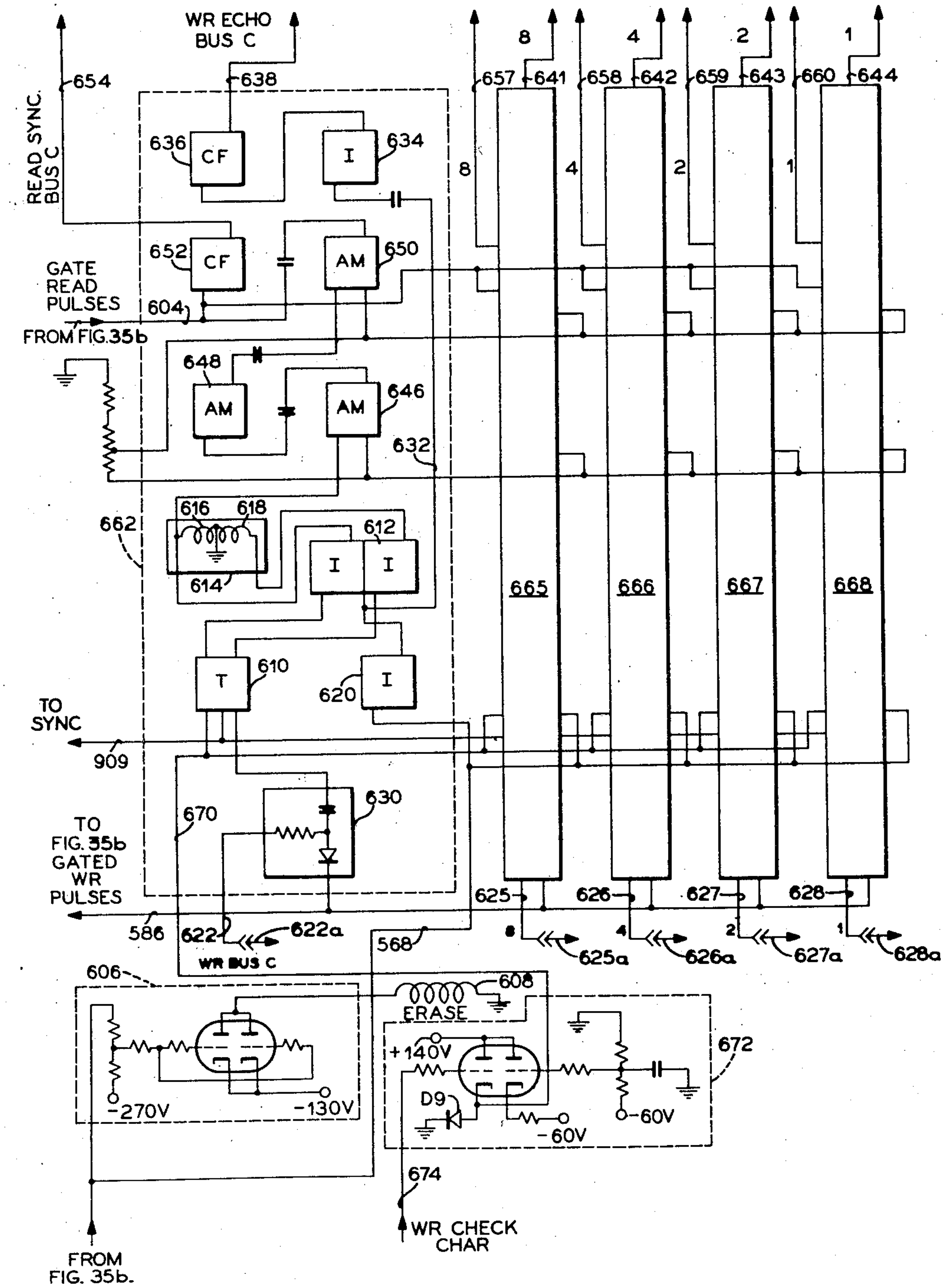

FIG. 36 is a circuit diagram of the tape unit showing the reading and writing circuits.

Figure 37:
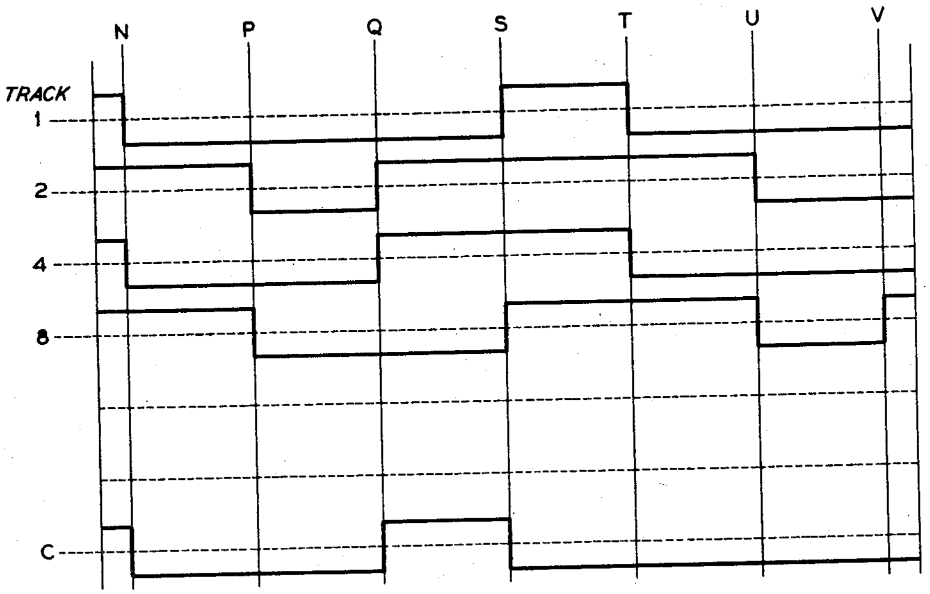

FIG. 37 is a chart of the tape writing pattern.

Figure 38:
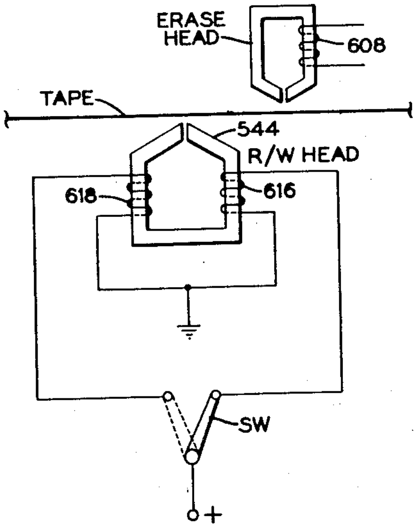

FIG. 38 is a diagrammatic drawing showing the relative relationships of the R/W head, the erase head and the tape.

Figure 39:
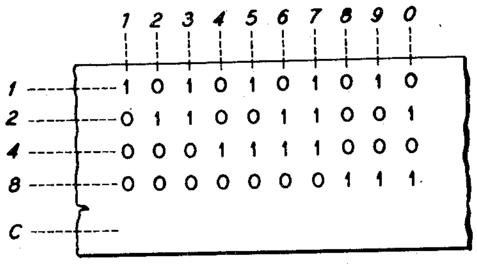

FIG. 39 is a view showing the bit representations distributed in the various tracks of the tape.

Figure 40A:
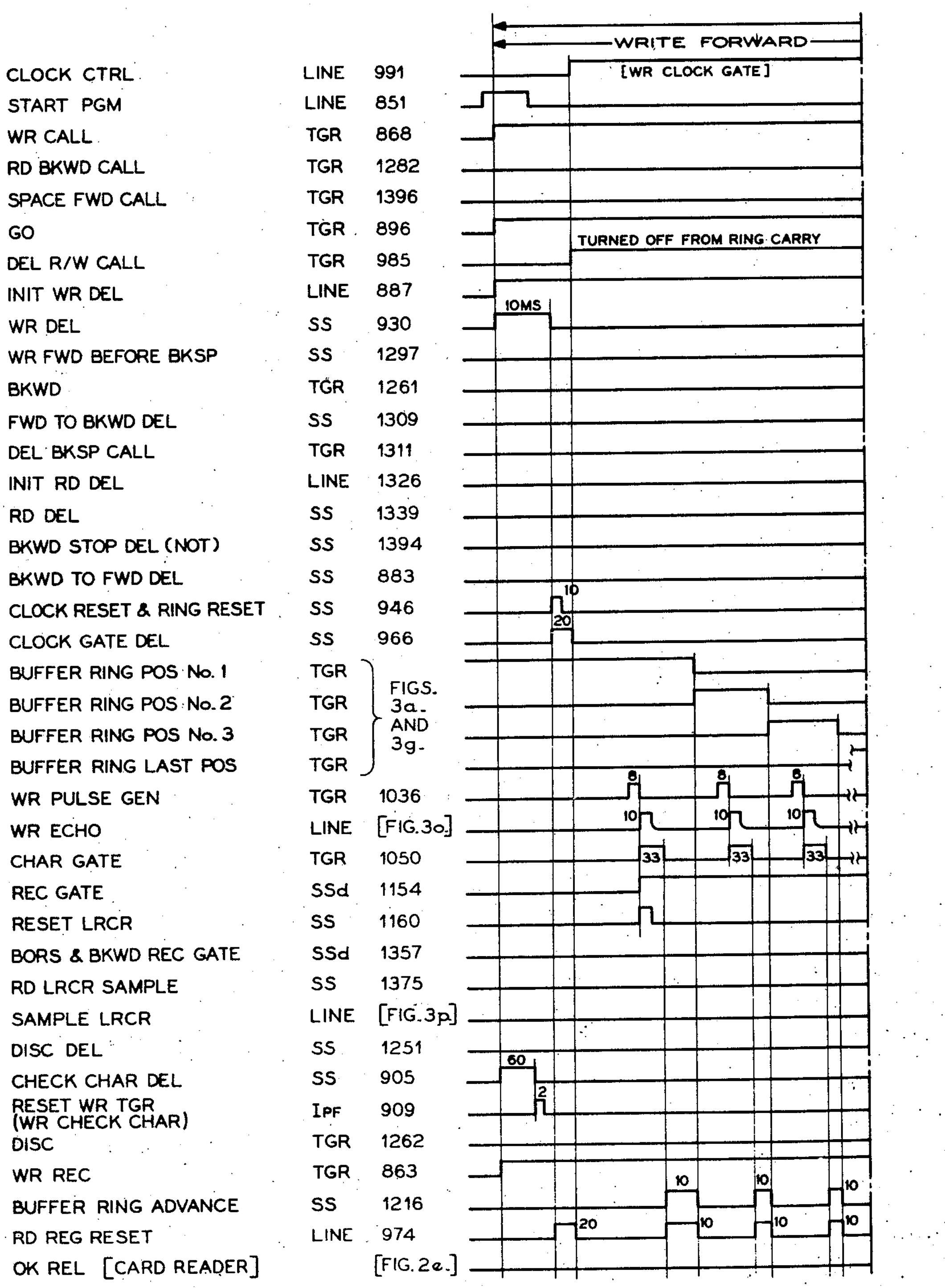
Figure 40B:
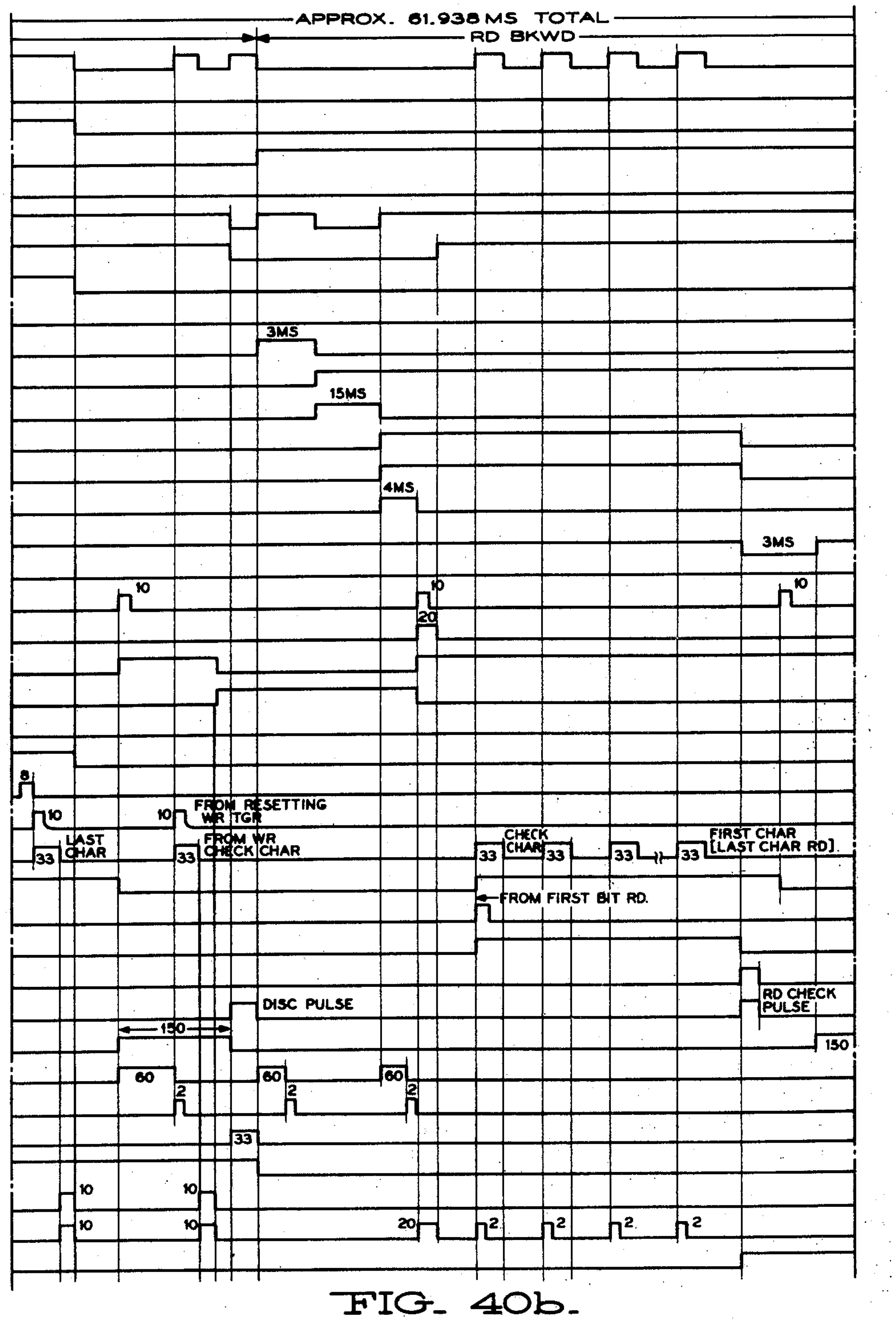
Figure 40C:
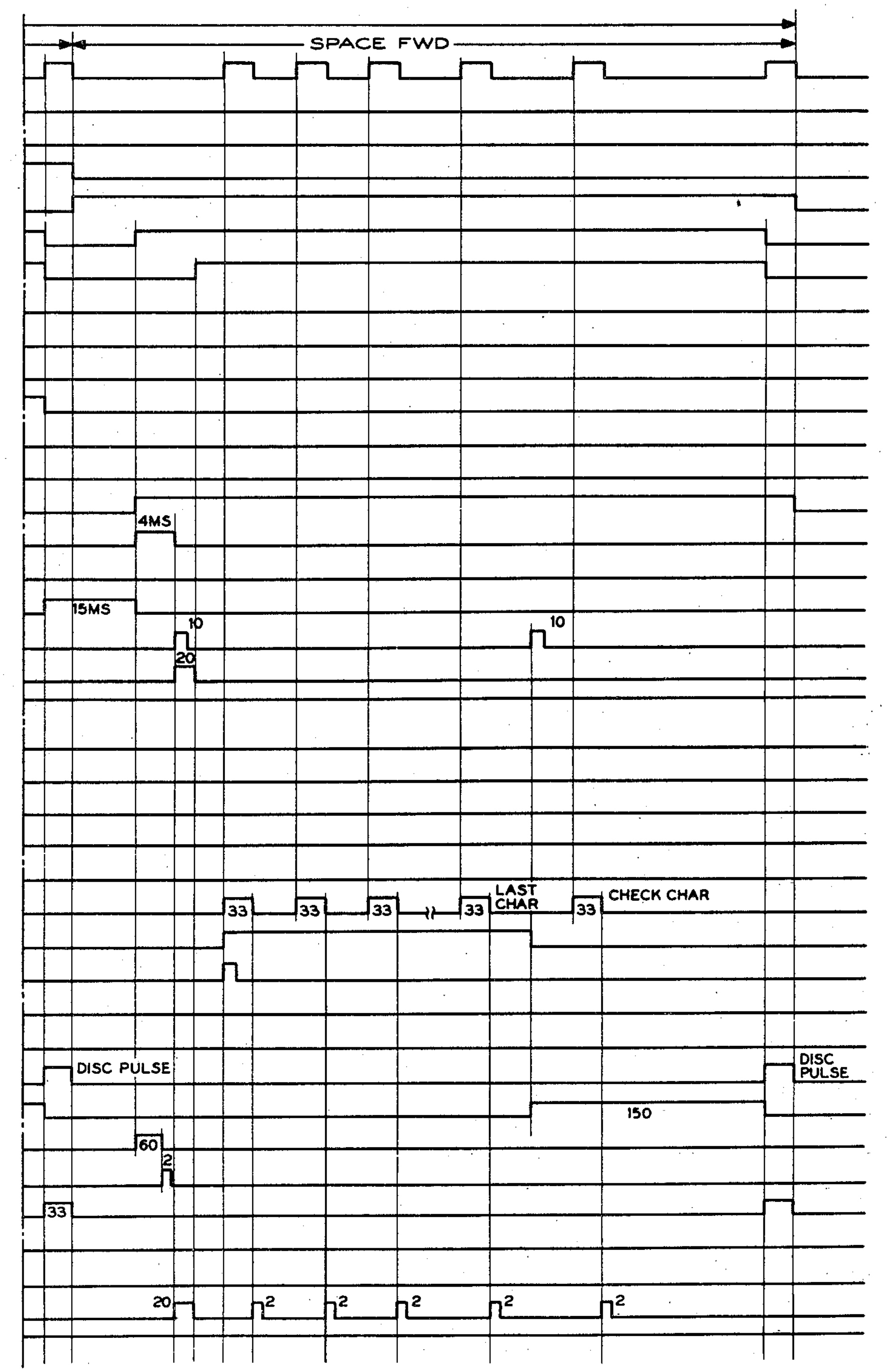

FIGS. 40*a*, 40*b* and 40*c* constitute a sequence chart of the three basic program steps, namely, WRITE FORWARD, READ BACKWARD, and SPACE FORWARD.

Figure 41:
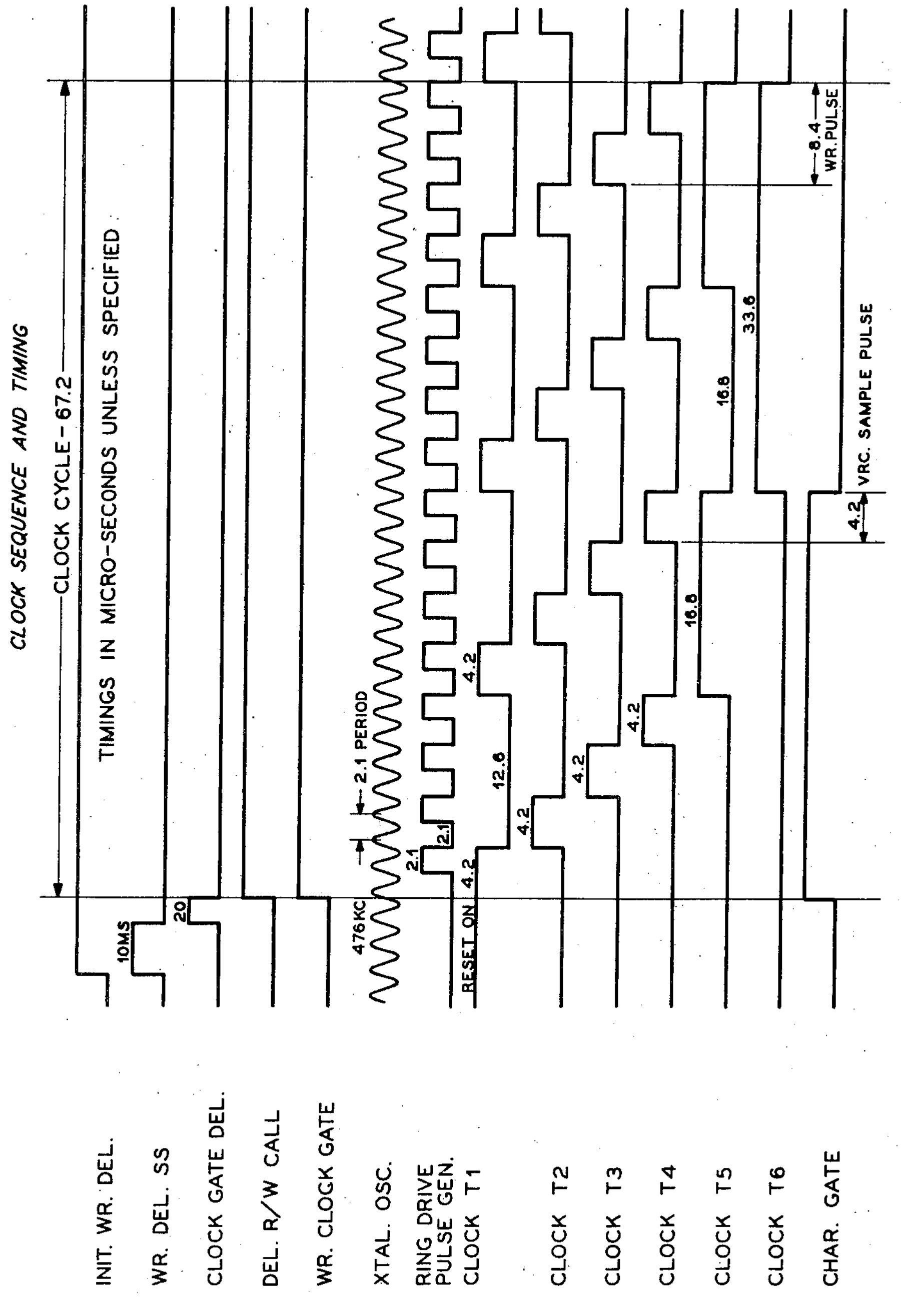

FIG. 41 is a sequence chart of the clock.

FIGS, 42, 43 and 44 show circuits, respectively, for a pullover inverter, thyratron, and a reset control.

Figure 42:
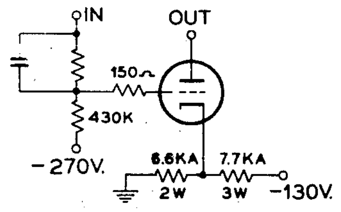
Figure 42A:
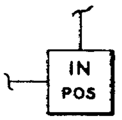
Figure 43A:
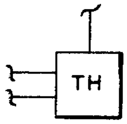
Figure 43:
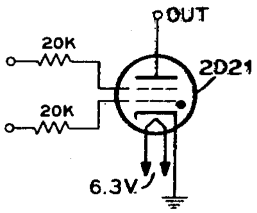

FIGS. 42*a* and 43*a* are block representations.

GENERAL

Figure 1:
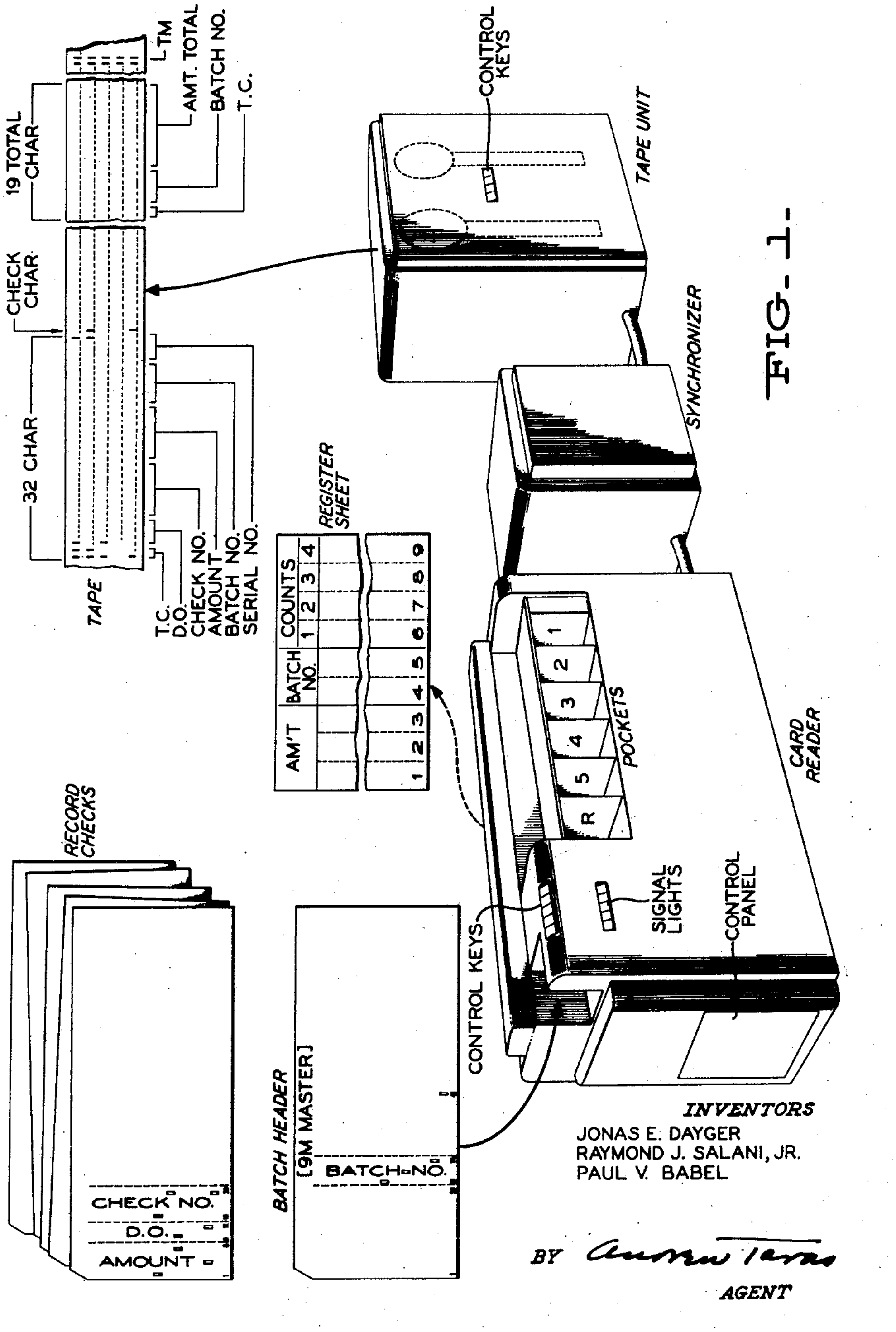

As a preliminary to the check transcribing procedure and with reference to FIG. 1, the checks, in the form of perforated record cards, are arranged in batches, usually a thousand per batch. Each batch is preceded by a master card known as a batch header perforated with data representing, among other things, such information as batch number, disbursing office, transaction code, and other pertinent check information. Each card check contains a check number, amount, transaction code, disbursing office, date and other pertinent check data. The batches of card checks, each preceded by its associated batch header, are loaded into the card reader through which the card checks are sequentially passed and while en route through the machine each is serialized, classified and sorted. The object of passing the header card through the machine first is to set up instrumentalities adapted to print on the succeeding card checks appropriate batch number and a serial number designation, the latter facilitating the location of any particular card check in subsequent check reconciliation procedures and filing operations.

The data sensed from each card check, as it passes through the card reader, is directed into a buffer storage from which it is extracted in serial fashion then translated by appropriate converting means to binary coded data and then written by appropriate magnetic read-write (R/W) heads on magnetic tape.

The tape unit is of the type employed with large scale data processing systems and is capable of moving magnetic tape at a high rate of speed through an appropriate R/W station. The latter is provided with a plurality of R/W heads arranged in a row coinciding with the transverse axis of the tape. For the particular application involved, five R/W heads are employed and each is energized in accordance with a five bit binary code to write the data pertaining to each card check, which data is extracted serially from the buffer storage as earlier mentioned.

The synchronizer is employed to provide the proper coordination between the tape unit and the card reader. It also provides converting means to translate the numerical coded data into five bit binary code. In addition it provides the various clock timing and synchronizing pulses which maintain the proper coordination between the various electronic units. Also included in the synchronizer are various logic and checking circuit means to insure accurate recording of the data on the tape.

In the general operation of this system, thirty-two characters of check data pertaining to each record check are read into a buffer relay storage. The latter employs a 2-out-of-5 relay checking means for the detection of either blank or overpunched columns in the card checks passed through the card reader. An error detected by this checking means is hereinafter designated as either a buffer error or a card error. The buffer storage is serially scanned by a 32-position ring. The output from each buffer storage position is fed into ten decimal lines. A signal is provided on one of these ten decimal lines for each numerical data character scanned in the buffer. The ten decimal lines are fed into a logic circuit having five output lines, which lines are energized in accordance with a five bit binary code. The logic circuit is arranged to provide an even number of bit signals for each of the numeric characters 0 through 9 applied to its input. A redundant bit, hereinafter referred to also as a "C" bit, is supplied in those instances where an odd number of binary bits would appear for the numerical digit values 1, 2, 4, 7 and 8.

To determine whether or not a valid number of character bit signals have been directed to the R/W heads, there is provided means associated with each R/W head for generating a write echo pulse for each character bit signal directed to a R/W head. The write echo associated with a particular R/W head is fed into an appropriate one of five read registers. For each character bit signal directed to the tape the appropriate read registers are accordingly triggered from an OFF status to an ON status. The read registers in turn provide appropriate signals to a logic circuit adapted to provide an error signal in response to an invalid number of signals generated by the read registers. The absence of an error signal indicates that a valid number of R/W heads were energized. During a writing operation an error signal, generated in the manner just described, is hereinafter known as a write error. The checking operation described accompanies the writing of each character on tape and is referred to as a vertical redundancy check.

Following the writing of a record on tape, a check is made of the status of a plurality of longitudinal redundancy check register (LRCR) triggers, one for each tape channel. If this status is found to be OFF, it is an indication that a valid number of write bit signals have been directed to each of the R/W heads. In this checking scheme, the bit signals directed to each R/W head are also directed to the associated LRCR triggers which operate in binary fashion and thus provide an OFF status after an even number of bit signals have been directed to the trigger input, and an ON status after an odd number of bit signals. Following the writing of the thirty-second character, an appropriate check mark is written on the tape. The bit signals for this check mark are applied to the associated R/W heads which were energized presumably with an odd number of bit signals. In response to these check bit signals, the appropriate LRCR triggers are turned either ON or OFF depending upon the previous status. Now if all operations are in order, the LRCR triggers should be in OFF status, which status is an indication that an even number of bit signals had been directed to the appropriate R/W heads. If under these conditions an LRCR trigger is found to be ON, a write error signal is generated.

The writing of the check character is executed in the following manner. Upon the termination of the writing operation for the thirty-second character, the tape unit is instructed to turn off the appropriate writing circuits. The latter provides a reset pulse to each one of the five write triggers. These triggers are in an OFF status at the beginning of a writing operation. Each time that a write trigger is flipped, a bit is written on tape. Now then, if an even number of write pulses had been directed to the write trigger, the status of the latter at the end of the writing of the thirty-second character should be one that is OFF. Conversely, if an odd number of bit signals had been directed to the write trigger, the status should be ON. Thus, when the reset pulse is directed to each of the write triggers at the termination of the writing of the thirty-second character, as many check bits are written on tape in appropriate channels as there are write triggers flipped from ON to OFF status. The writing of the check character provides appropriate check echo signals which are directed to the appropriate read registers. The latter are turned ON. When the read registers are turned OFF, the associated LRCR registers are thus triggered to an OFF status signifying that an even number of writing signals have been generated for the specific tape channel of the record. If the status of the LRCR register at this time is ON, it indicates a writing error; accordingly, a write error signal is issued by the tape unit.

In addition, means are provided to check the actual bits recorded on the tape after the completion of a writing operation. This check is preceded by first instructing the tape unit to feed the tape in a reverse direction while at the same time placing the tape unit in a read status. During this read check operation, each recorded bit passing by an associated R/W head generates an EMF which provides a read echo pulse. The latter is fed to the same read registers and the LRCR register described under write operations. For each character read a vertical redundancy check is effected. At the end of the reading of the record, which includes the reading of any possible check mark bits, the LRCR register is tested for an OFF status. If by virtue of this test a read error is indicated, the tape unit does not advance the tape but awaits instructions from the card reader to write a new record over the previously written record as the tape advances forwardly.

The record card corresponding to the previously written tape record for which an error is indicated, is sorted into an appropriate error pocket of the card reader.

In the absence of an error following a read backward operation, appropriate instructions are given the tape unit to advance over the previously written area of the tape after which the tape is stopped. The tape unit awaits further instructions from the card reader to write another check record on tape as a new record check is fed through the card reader.

After recording all the record checks of a particular batch, the card reader is instructed to effect a total taking operation. The instruction is derived upon the sensing of the new batch header card preceding the next batch. When this occurs, card feeding is suspended; at the same time, the tape unit is signaled to initiate a total writing operation while the card reader proceeds to effect total taking operations. During the immediate succeeding total taking cycles, the record check printing instrumentalities are readjusted with a new batch number. At the same time, the serializing device is reset to start serializing the next batch of record checks to be processed through the card reader.

The card reader effects a series of nine total taking cycles to print various totals on a register sheet. In the first three cycles, the amount is printed; in cycle 4, a series of three 9's is printed whenever a total tape writing error is detected. Also, the fifth position of the batch number is printed. In cycle 5, the remaining four positions of the batch number are printed. In cycles 6, 7, 8 and 9, the totals for unit counters 1, 2, 3 and 4, respectively, are printed. These counters may be controlled by control panel wiring to count in any desired manner the write, read and card errors as well as total count of all checks passed through the card reader.

Novel means are provided to check the accuracy of the batch and serializing printing instrumentalities, the operation of which will be described at a more appropriate time in the ensuing description of the machine.

In order to facilitate a comprehension of the card reader forming a part of the invention, it seems appropriate at this point to briefly describe the statistical machine shown and described in detail in the Lake et al Patent 2,615,569. To this end reference is invited to the diagrammatic drawing of FIG. 4 which shows in part the principal features of the machine. Here are seen card feeding, distributing, and printing instrumentalities. In the card feeding and distributing instrumentalities, CARD CHECKS, or other record cards for that matter, are placed in a hopper, not shown, and fed therefrom sequentially by means of the well-known picker knife arrangement. The CARD CHECKS are transported through the machine by means of CARRIER ROLLS driven from a HORIZONTAL DRIVE SHAFT, the latter being driven by a DRIVE MOTOR. In passing through the machine, the CARD CHECKS pass through appropriate sensing stations and a distributing or sorting station. In accordance with the classification data sensed in the CARD CHECKS, the latter are directed to various SORTING POCKETS of the machine.

In the afore-mentioned patent to C. D. Lake, the statistical machine has thirteen pockets; however, in the card reader forming a part of the instant invention, six pockets are employed and arranged in the order shown in the diagrammatic drawing of FIG. 4. In addition to driving the CARRIER ROLLS, the HORIZONTAL DRIVE SHAFT operates various cam contacts diagrammatically represented in box form with appropriate designations such as CB1, PRINT CAM CONTACTS, CR CAM CONTACTS. These cam contacts are distributed throughout the circuits of the CARD READER to control various machine operations to be later described.

The printing instrumentalities comprise four PRINTING TYPE BARS which are reciprocated vertically by means of a CROSSHEAD. Each type bar is connected to an associated TYPE BAR OPERATING ARM in turn connected by means of a spring to the CROSSHEAD. Each type bar is selected for printing by an associated STOP PAWL having an integral portion thereof serving as an armature which cooperates with a PRINT MAGNET. The latter when energized causes the associated STOP PAWL to engage a particular one of a plurality of teeth, forming part of the TYPE BAR, to cause the latter to be stopped. The CROSSHEAD is reciprocated by appropriate CAMS connected to a PRINT SHAFT driven from another SHAFT S having pulley and belt connections to the HORIZONTAL DRIVE SHAFT. Motion from SHAFT S to the PRINT SHAFT is effected through the provision of a PRINT CLUTCH under control of a PRINT CLUTCH MAGNET energized by means of circuits, to be later described, to effect total printing cycles of the machine.

Associated with the PRINTING TYPE BARS is a

PLATEN for supporting the register sheet, not shown, on which card check data is to be printed. The PLATEN is supported by a CARRIAGE which is shifted horizontally in front of the printing bars to present the register sheet thereto for printing operations. The CARRIAGE is provided with a rack having teeth spaced at intervals, each of which is equal to spacing of the four PRINTING TYPE BARS. This enables printing of only four characters at a time on the same line. In order, for example, to print a 12-position total, three printing cycles accompanied by two horizontal shifts of the carriage would be required. Shifting of the carriage is effected under control of an escape solenoid ES which controls an escapement mechanism represented diagrammatically by the armature cooperating with the escapement magnet ES, and a portion of a bar ES' shown immediately below and to the left of the platen. At the end of a printing operation, suitable means are provided, represented by a RETURN SPRING, to restore the CARRIAGE to its initial starting position. The return mechanism also includes means, not shown, to automatically line space the platen preceding each restoring action of the carriage.

Associated with the carriage is an EMITTER STRIP which is employed to close circuits for selecting groups of accumulators and counters during the printing operations. The EMITTER STRIP has a series of conducting inserts 502 and a common contact strip 503. These elements are in contact with associated wiper 505 carried on an insulating block 507 secured by appropriate means to the CARRIAGE. Each insert corresponds to each columnar printing position on the register sheet. Each insert accordingly provides the means for connecting, four at a time, the various accumulator positions and counting positions during a total printing cycle.

There are also shown in diagrammatic form two sets of emitters, namely PRINT EMITTERS and H. S. EMITTERS. The former are operated at relatively slow speed during printing cycles while the latter operate continuously at a higher speed while the machine is in operation. Various PRINT CAM CONTACTS, continuously running CR CAM CONTACTS, DIGIT EMITTERS, NUMBERING UNIT EMITTERS and CAM CONTACTS are shown in box form bearing appropriate designations. These devices are distributed throughout the wiring diagram of the card reader and their timings are shown in the timing charts.

Also shown in this diagrammatic drawing of FIG. 4 is a MARKING MAGNET energized in accordance with the manner in which appropriate control circuits are plugged. Briefly, when this magnet is energized, a marking instrument is deflected downwardly and against a card passing thereunder whereby the latter is marked. Under a normal application, cards in error are marked in this manner. As shown in FIG. 4 of the afore-mentioned Lake patent, the marking device is located above the sorting station of the machine. Now to be described in detail are the various components and devices constituting the card reader forming a part of the instant invention.

*Accumulator*

The card reader is equipped with accumulating mechanisms capable of receiving entries under control of the record cards. The accumulating mechanism is similar to the one disclosed in application Serial No. 9,498, filed February 19, 1948, now Patent No. 2,480,744, by C. D. Lake et al., and in the afore-mentioned Patent No. 2,615,569 issued to C. D. Lake et al.

The accumulator mechanism in the present case comprises twelve units or orders of which eight positions are employed for accumulating and the remaining four positions for carry, i.e., spillover.

Figure 5:
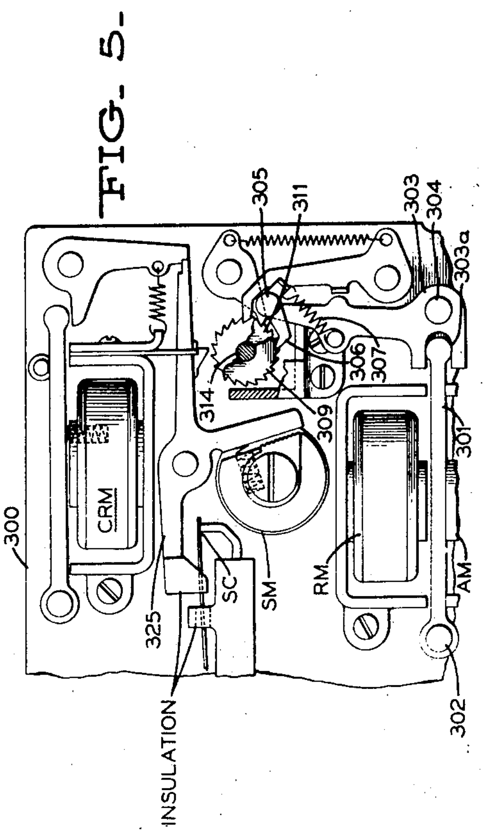
FIG. 5 is a vertical elevation of an accumulator order position.

A self-contained accumulator unit for a single order position is shown in FIG. 5 (and in FIGS. 28 to 35 in the Lake Patent 2,615,569). The parts and mechanism forming each of the accumulator units are carried by a support plate 300 which is mounted in a vertical plane in the machine. Carried by the plate 300 are two magnets consisting of a return magnet RM and an add magnet AM and interposed midway between the cores of these magnets is an armature 301 which is pivoted on a stud 302. In the normal position of the armature 301, the latter is against the core of the magnet AM. The right-hand end of the armature 301 has a fork connection 303*a* with lever 303 which is pivoted on a stud 304. Pivoted on a stud 305 carried by the lever 303 is an operating pawl 306 urged clockwise into engagement with a tooth of a ratchet wheel 309 by a spring 307 which is anchored to the tail of the pawl 306 and to a pin carried by the lever 303.

It is evident that when the armature 301 is attracted by the core of the magnet RM the lever 303 will rock clockwise about its pivot 304 and pawl 306 will be moved to the right over the ratchet wheel 309 and move behind the next tooth to the right. In such position, the pawl 306 is in a position to rotate the ratchet wheel 309 clockwise one tooth when the magnet RM is de-energized and the add magnet AM is energized. When the add magnet AM is energized after magnet RM is de-energized, the armature 301 will positively rock the lever 303 counterclockwise to effect a one-tooth revolution of ratchet wheel 309. In this manner, a unit is entered for each oscillation of lever 303.

Transmission of a succession of pairs of alternating impulses to magnets RM and AM will cause a repetition of the above-described operations to either add or enter complements of numbers to effect subtraction and thus the accumulator unit will be advanced a number of steps commensurate with the number of effective pairs of impulses transmitted to the magnets. To enter the digit "1," only one pair of impulses is transmitted to said magnet RM and magnet AM, respectively; whereas to enter the digit "3," for example, three pairs of impulses will be transmitted to the magnets RM and AM.

As may be appreciated from the detail in FIGS. 30 and 31 in said Lake patent, the shaft 314 carries a set of cams which are adapted to close associated wire contacts (of the type identified as SC shown in the drawing of FIG. 5 in this application). In FIG. 2*m* of the wiring diagram of the card reader, only a nines contact NC and a tens contact TC are employed in the adding and total taking operations of the accumulator. The tens contact TC is operated when the ratchet wheel moves from 9 to 0 whereupon is initiated a carry operation into the next higher order position of the accumulator. The nines contact NC closes whenever the appropriate accumulator order stands at 9.

These contacts are restored upon operation of a contact release magnet CRM in the manner explained in the afore-mentioned Lake patent.

Each accumulator order is also provided with a total readout mechanism constructed in accordance with conventional principles. This readout mechanism is shown in FIG. 18 and is located in a moulding 334 of insulating material secured to the opposite face of the plate 300 to that carrying the accumulator mechanism. The moulding 334 is provided with a series of ten conducting segments 335, the inner ends of which are disposed along the edges of a circular opening in the moulding 334 and spaced 18° apart. The moulding is also provided with a semicircular common contact segment 336 which extends around the remaining portion of the circular opening.

This mechanism is utilized to read out totals standing on the accumulator mechanism under various conditions which will be explained more fully hereinafter in conjunction with the wiring diagram.

*Unit counters*

Figure 6:
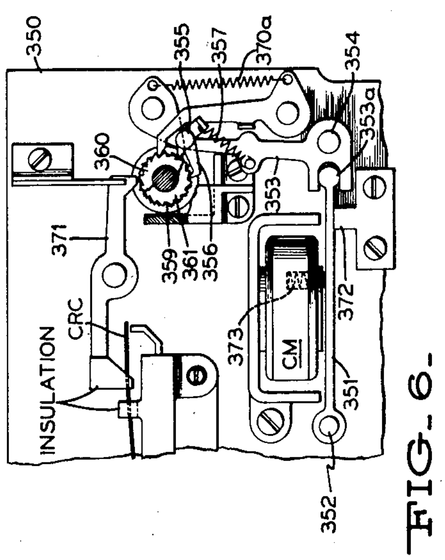
FIG. 6 is a vertical elevation of one of the unit counters.

The card reader is also provided with unit type counters of the type shown in FIG. 6 of the instant application (and FIGS. 36 to 40 of said Lake patent). A single denominational order unit of the unit counter, shown in FIG. 6, includes a base plate 350 on which is mounted a counter magnet CM similar in function to the magnet RM of the accumulator mechanism. The magnet CM has associated with it a series of parts designated 351 to 371, including the ones designated with the suffix letter *a* which are similar in shape, function and operation to the parts designated 301 to 321 in FIG. 5. Since the magnet AM is omitted, the unit counter is provided with a stop 372 against which the armature 351 is held by a spring 373 received in a bore formed in the pole piece of the magnet CM, the spring urging the armature 351 in a clockwise direction.

When the magnet CM is energized, the spring 373 is compressed and the lever 353 rocked clockwise to draw the pawl 356 to the right as in the case of the accumulator unit.

When the magnet CM is de-energized, the spring 373 assisted by the spring 370*a*, restores the parts to the position shown in FIG. 6, and the member 371 functions to prevent overthrow in exactly the same fashion as in the case of the parts shown in FIG. 5.

The mechanism is provided with nines carry contacts designated CNC actuated by an appropriate cam and lever arrangement. The counter is also provided with a counter reset contact CRC also operated by an appropriate cam and lever arrangement. The CNC contacts are closed when the counter stands at 9. The CRC contacts are closed during all digit representing positions of the counter except zero. The CRC contacts terminate the resetting impulses delivered to the counter magnet CM during the operation of resetting the counter to 0. These contacts are shown in FIG. 2*r* of the wiring diagram.

Readout from the unit counters is effected by means of its nines contact CNC.

*Total counter*

A total counter is also employed in the card reader. This counter is made up of a plurality of order positions each of which resembles in part the accumulator counter described. The CRC and CNC contacts associated with the total counter may be seen in FIG. 2*p* of the card reader wiring diagram. Readout circuits for this counter are shown in FIG. 2*o*.

The bulk of the card reader forming a part of the present invention will now be described in connection with FIG. 7 which shows a vertical section of the statistical machine augmented by the provision of an additional sensing or reading station. As presently constituted the card reading facilities comprise CARD READING 1 and CARD READING 2 stations. Each is provided with eighty sensing or reading brushes for sensing the eighty columns of the record card. A printing station, to be described in greater detail, includes printing instrumentalities for printing the batch number identification of five positions and four positions of serial printing instrumentalities. In addition, the sorting station is modified to the extent that only five chute blades 1 through 5 are employed to distribute the perforated records into six pockets of the machine. As seen in FIG. 4, six pockets are schematically shown numbering from 1 through 5 to R reading from left to right.

The spacing between chute blades, i.e., the spacing between the tips of one chute blade to the next succeeding one is now a half inch instead of the quarter inch employed in the statistical machine of the Lake patent. This increased spacing provides greater margin of safety in card feeding operations.

Figure 7:
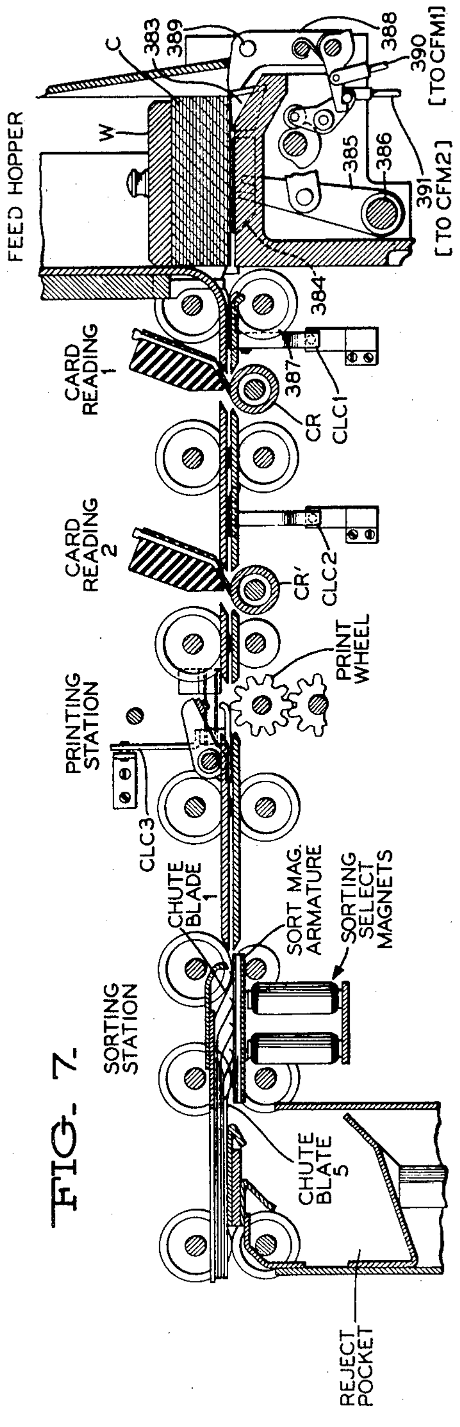
FIG. 7 is a cross-sectional view of the card reader showing in part the feeding, sensing, printing and distributing instrumentalities.

Referring to FIG. 7, it may be seen that the CHUTE BLADES rest upon a SORT MAGNET ARMATURE which is deflected downwardly upon energization of SORT SELECT MAGNETS. The latter are energized by means of control circuits to be described. Energization of the SORT SELECT MAGNETS operates the SORT MAGNET ARMATURE to select a passageway through a particular pair of chute blades to direct the card to a particular sorting pocket. Since only six pockets are employed, it will be explained at a more appropriate time how and under what circumstances the SORT SELECT MAGNETS are energized to direct cards into the six sort pockets.

The machine as seen in FIG. 7 is provided with the usual carrier rolls 387 for transporting the perforated cards along the card path of the machine. The perforated cards are placed in a feed hopper from which the cards are ejected singly by means of the familiar card pickers 383. A card weight W keeps the cards flat to aid in the feeding of the cards. The picker knives are mounted on slides 384 which have pin and slot connections to arms 385 connected to a shaft 386. The arms and shaft are oscillated by means of an appropriate link and crank mechanism, not shown, to cause a card to feed for each card feeding cycle of operation. As the card is ejected from the hopper, it is gripped by a first set of carrier rolls 387 which convey the card past the CARD READING 1 brushes. The latter are in contact with a contact roller CR. Along the card path appropriate carrier rolls engage the card to transport the latter through the CARD READING 2 brushes which are in contact with an associated contact roll CR′. The card then passes through a printing station wherein the printing instrumentalities mentioned cause the batch identification and serial numbers to be printed on the bottom side of the card. The card upon emerging from the printing station is fed through the sorting station which directs the card to an appropriate sorting pocket.

Distributed along the path of card travel are the familiar card lever contacts, three of which are shown here and appropriately identified as CLC1, CLC2 and CLC3. These card lever contacts are employed for sensing the cards in the various stations in the machine to provide certain preliminary circuits in the start, running and runout operations of the machine.

As explained in the said Lake patent, appropriate means are provided to suspend card feeding operations during total taking cycles. As seen in FIG. 7, this means includes card lifter levers 388 which are shaped to extend underneath the cards in the hopper on each side of the card pickers. These card lifter levers pivot about a shaft 389. Appropriate means for the suspension of card feeding are provided to cause the levers 388 to swing clockwise to cause cards, that is, the bottommost card of the card pack, to be raised above the card pickers. This action is initiated upon energization of a card feed magnet CFM1, not shown in this drawing but which is shown in the circuit diagram. This CFM1 magnet when energized causes motion to be imparted to a link 390 which operates appropriate means to cause the above action. To restore the mechanism to a card feeding status, it is necessary to energize a card feed magnet CFM2, shown in FIG. 1*b* of the wiring diagram. Upon energization of this magnet, motion is imparted to an appropriate link 391 which imparts motion to appropriate means, shown and described in the aforementioned Lake patent, for lowering the card lifter levers to a card feeding status.

*Sort check*

Figure 8:
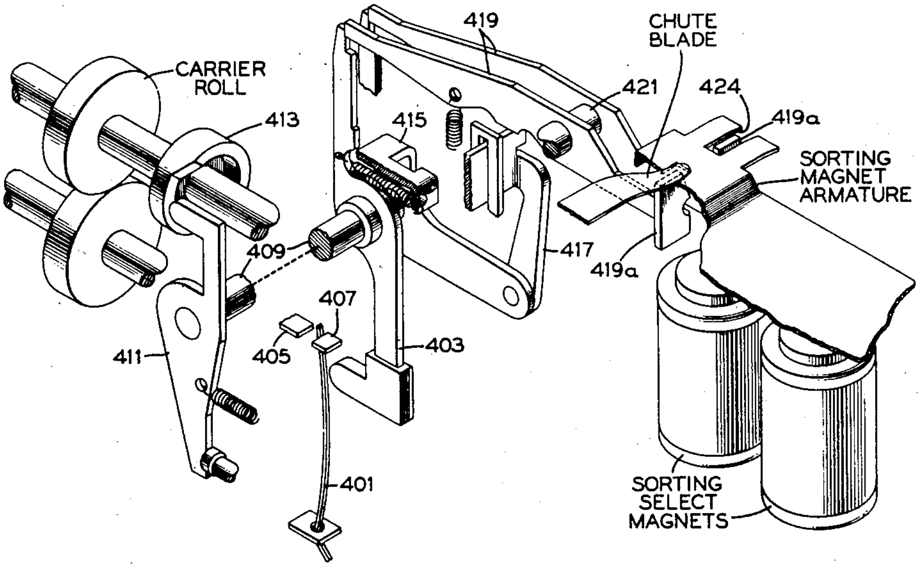
FIG. 8 is an exploded view showing in part the sort check mechanism of the card reader.

Ordinarily, the sort check feature is a means for checking whether or not the sorted card was directed to the correct pocket in accordance with the index perforation sensed in the card. This check sort mechanism has the advantage of providing greater reliability in the checking operations by avoiding the electrical failures inherent in the check sort mechanism employed in the statistical machine of the Lake patent. The sort check means is shown in FIG. 8. Here it is seen that a wire contact member 401, of which there are six in all, is positionable under control of an associated pivoted lever 403 to make contact with either one or the other of two contact elements 405 and 407. The lever 403 freely pivots on a shaft 409 oscillated by means of an arm follower 411 adapted to cooperate with a cam 413 secured to an appropriate one of the card carrier rolls. A lever bail 415 is secured to the shaft 409 and oscillates with the latter. The bail 415 carries a plurality of upright levers 417, one of which is shown. A suitable guide is provided to assist in maintaining the levers 417 in an upright position. Each lever 417 is adapted to cooperate with an associated one of a plurality of chute blade sensing fingers 419. The sensing fingers 419, of which only two are shown, are pivoted on a shaft 421 suitably mounted in the frame structure of the sort check structure. The end portion 419*a* forming a part of the sensing finger 419 is adapted to pass through an appropriate one of five openings 424 in the SORTING MAGNET armature. The openings 424 are disposed in the armature in positions overlapped by the tips of the chute blades.

When, during the course of a sorting operation, the sorting select magnets are energized, a guide path is provided for the card by means of a particular set of chute blades. The card in accordance with its position relative to the chute blade tips passes under certain ones of the latter. At an appropriate time in the sorting cycle the cam 413 causes the arm follower 411 to rotate clockwise. This produces clockwise rotation on the shaft 409 and the bail 415. As the latter rotates, it causes the bail levers 417 to move downwardly and out of contact with their associated sensing levers 419. The sensing levers are urged, by means of associated springs, counterclockwise. This counterclockwise rotation of the levers is arrested when the sensing finger portion 419*a* encounters a chute blade as the portion 419*a* passes through an associated opening 424 in the sort magnets armature. Under this condition, the left end of the sensing finger in question clears the tip end of its associated lever 403. This permits the latter to follow the bail 415 in its clockwise rotation. The movement of the lever 403 at this time results in the shifting of the contact 401 from the position shown to a position where contact is made with element 407. Now for those sensing lever portions which pass through associated openings in the armature and do not encounter any chuate blades by virtue of the fact that the latter have been lifted by means of the card thereunder, the appropriate contact members 401 will not be transferred but will remain in the positions shown. This is because the left end of each of the sensing levers is placed in an interfering position with its associated lever 403.

*Batch and serial number—card printer unit*

This unit is adapted to print a five position batch number and a serial number on each card check passing through the print station of the card reader. The batch number is derived from the batch header card preceding the record checks associated therewith. The serial number printing comprises four printing positions to print consecutively a serial number beginning with one for the first record check of the batch and consecutively number printing the remaining card checks for that batch.

Figure 9:
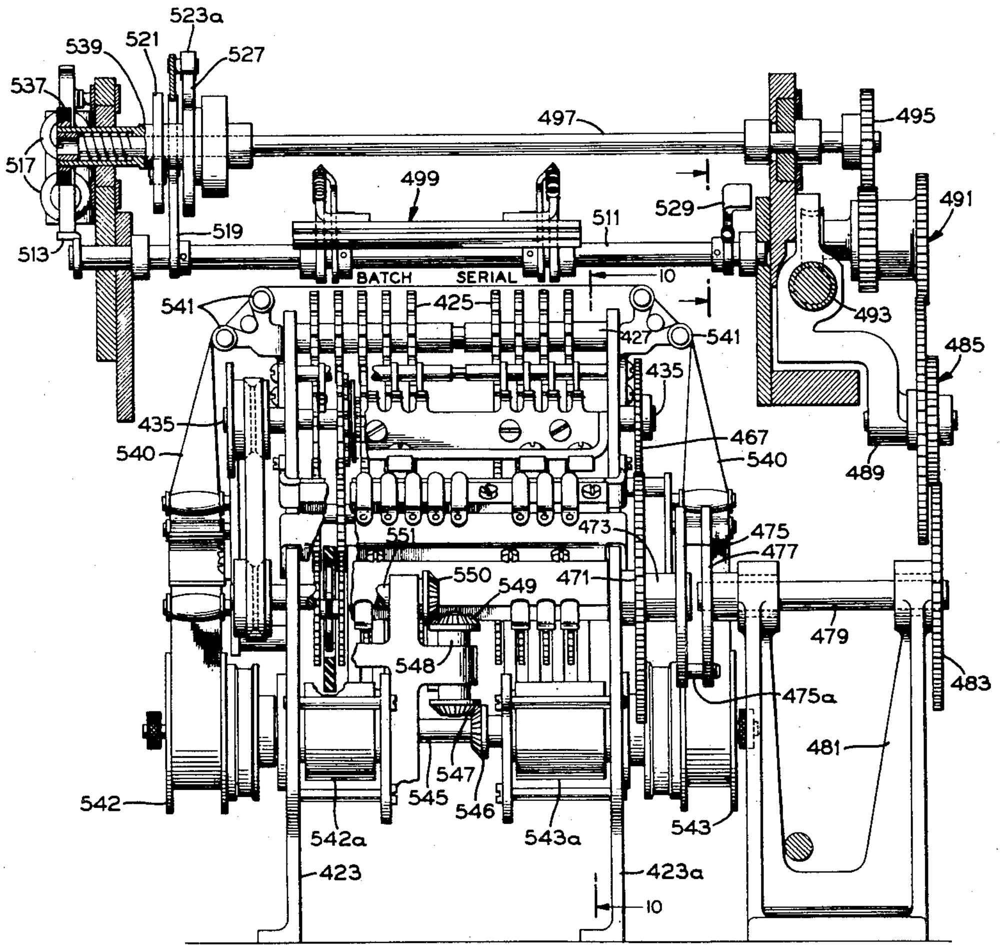
FIG. 9 is a vertical elevation of the batch numbering and serial numbering card printing instrumentalities.

As seen in the drawing of FIG. 9, the five batch printing wheels are in a left group while the four serial printing wheels are in a group to the right thereof.

Figure 10:
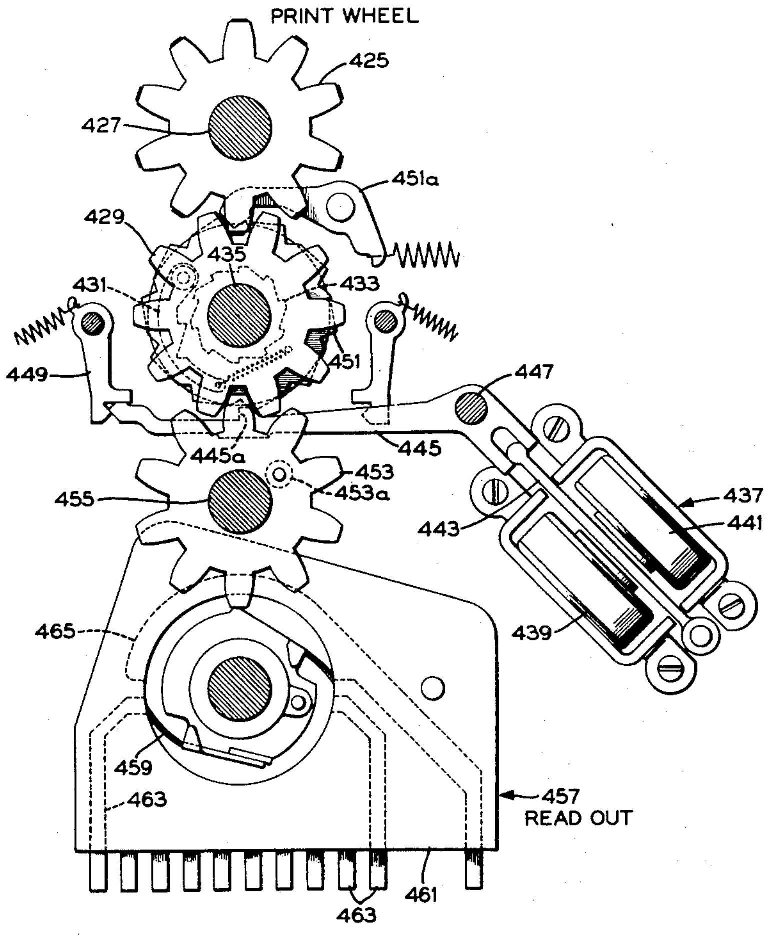
FIG. 10 is a sectional view of FIG. 9 taken generally along the line 10—10 in FIG. 9.

The unit in FIG. 9 is supported by a pair of side frames 423 and 423*a* removably secured to the base structure of the card reader. The nine printing instrumentalities are all alike in structure and therefore a description of one should suffice for the remaining ones. For the description of one of the printing instrumentalities reference is invited to FIG. 10 which is a sectional view taken along lines 10—10 in FIG. 9. Here is shown a print wheel 425 having ten equally spaced teeth, each bearing on the periphery thereof one of the numeric digits 0 through 9. The print wheel is freely carried on a shaft 427 supported by the side frames of the unit. The wheel 425 is engaged to a ten-toothed drive gear 429 having a spring biased dog 431 freely pivoted to the side face thereof. The dog is adapted, by means to be described, to engage a continuously rotating ratchet 433 secured to a continuously rotating shaft 435. The means for controlling the operation of the dog comprises a magnet assembly 437, a stop magnet 439 and a start magnet 441. Disposed between the pole faces of the magnets and adapted for cooperation therewith is a pivoted armature 443 having a pin and slot connection to a lever 445 freely pivoted on a stud 447. The lever 445 cooperates with a spring urged detent 449 adapted to position the lever in either of two positions in accordance with the position assumed by the armature 443. The lever 445 has a toothed portion 445*a* adapted for cooperation with a ten-toothed disc 451 which is clearly seen in FIGS. 2 and 3 of Patent No. 2,328,653 issued to C. D. Lake et al. The various parts described above are identical to the accumulator structure shown and described in detail in said Lake patent 2,328,653. A detent 451*a* is adapted for detenting action with the disc 451. The disc 451 is configured in such a manner that when the latter is released for rotation upon energization of the start magnet, the dog 431 is permitted to engage the continuously rotating ratchet 433 to cause the wheel 429 to rotate counterclockwise. As a result, the printing wheel 425 is rotated while, at the same time, the rotation of another ten-toothed wheel 453 is caused by virtue of the fact that the latter is engaged with said wheel 429. The wheel 453 is freely pivoted on a shaft 455 and carries a reset roller 453*a* adapted to cooperate with the lever 445 especially during a reset operation of the unit. The wheel 453 is also engaged to a somewhat similar wheel, not shown, which is employed to control the operations of a familiar type of readout device 457. The latter is comprised essentially of a rotatable wiper 459 and emitter assembly 461 having a circular opening therethrough and around a 180° portion thereof are ten equally spaced apart readout inserts 463 adapted to make contact with the wiper 459. A common insert 465 is also adapted to make contact with the wiper assembly 459.

Motion to drive the unit is effected by way of the shaft 435 (FIG. 9), by means of a gear 467 in turn engaged to a large gear 471 suitably journaled in the side frame 423*a*. The gear 471 is attached to a bushing 473 in turn secured to a disc 475 having a pin 475*a* on the face thereof, which pin passes through an opening disposed in another disc 477 secured to a shaft 479 suitably journaled in a bracket 481 attached to the base of the card reader. The pin and hole connections just described facilitate the removal of the unit from the driving means. The shaft 479 also carries a gear 483 which meshes with a compound gear assembly 485 rotatably mounted on a bracket 489. The gear assembly 485 is further engaged to another compound gear assembly 491 adapted to be driven by the main horizontal drive shaft 493 of the card reader. The gear assembly 491 is also attached to drive a gear 495 secured to a print cam shaft 497 suitably journaled in a structure forming part of the card reader. The cam shaft 497 in conjunction with means to be described control the operation of a printing bail assembly 499 to effect printing of the batch and serial numbers on each card passing through the printing station.

Figure 11:
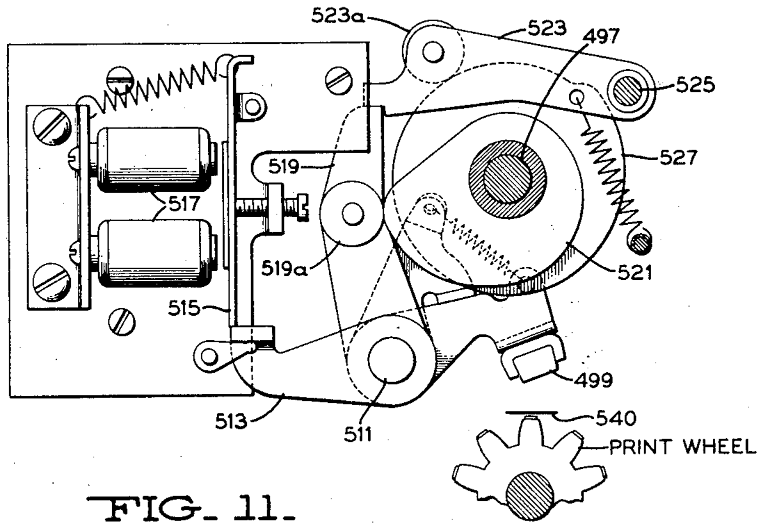
FIG. 11 is a detailed view of the card printing bail control means.

Referring to FIG. 11, the printing bail assembly 499 is carried on a shaft 511 suitably journaled in the side frames of the machine. The shaft 511 carries on one end thereof an arm 513 adapted for cooperation with an armature 515 associated with a print control magnet assembly 517. The shaft 511 also carries a reset arm 519 having a follower roller 519*a* adapted for cooperation with a cam 521 carried on the cam shaft 497. The arm 519 is also adapted to cooperate with a hammer bail latch 523 pivoted on a shaft 525 suitably supported by the side frames of the machine. The latch 523 carries a follower roller 523*a* adapted for cooperation with a trip cam 527 also carried on the cam shaft 497.

Figure 12:
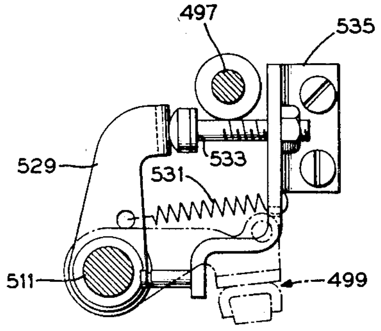
FIG. 12 is a detailed view of the card printing bail stop and associated mechanism.

To initiate operations of the print bail assembly, the print control magnet assembly 517 is energized to cause its associated armature 515 to unlatch the arm 513. The latter action places the rotation of the print bail shaft and hence the print bail assembly to be under control of the hammer latch 523. At an appropriate time in the card printing cycle the trip cam operates the latch 523 to permit, by means of an appropriate spring, the shaft 511 and the bail assembly 499 to swing clockwise impacting the record card against the print wheels. The opposite end of the shaft 511, shown in FIG. 12, carries a stop armature 529 adapted to limit the clockwise rotation of the shaft 511. This arm 529 is connected to a spring 531 which provides the rotative motion to the shaft 511 when the latter is released in the manner described. An adjustable stop means 533 is positionable in a bracket 535 secured to the side frame of the machine. The restoring and relatching of the print bail assembly 499 is effected by means of the cam 521 and the reset arm 519 to cause the shaft 511 to rotate counterclockwise to relatch the arm 513 on the armature 515.

The time of release of the print bail assembly is variable in order to provide for selectively printing on one of a plurality of different areas on the record card. This means may be appreciated from FIG. 9 which shows a hand knob 537 secured to a sleeve 539 which is positionable by any suitable detent means in relation to the shaft 497.

An inked ribbon 540 is adapted to be moved along the card printing line passing between the print bail assembly and the print wheels. The ribbon is guided by suitable guide rollers 541 attached to the side frames 423 and **423*a*. The ribbon is adapted to be carried on appropriate supply reels 542 and 543, respectively, adapted to be selectively connected, by means of suitable magnetic clutches 542*a* and 543*a*, to a common drive shaft 545. The latter is continuously rotated by means of a train comprising a pair of bevel gears 546 and 547, a short shaft 548, a pair of bevel gears 549 and 550, a shaft 551 having pulley and belt connections to the shaft 435** which is driven by the means earlier described.

The magnetic clutches **542*a* and 543*a*** are energized by suitable control circuits to drive the ribbon first in one direction from end to end, after which ribbon reversing means is brought into operation to control the direction of ribbon feed. This means is well known in the art and is adapted to operate suitable microswitches. The latter are disposed in the ribbon feed control circuits to cause energization of the magnetic clutches.

TAPE UNIT

The tape unit is of the type shown and described in the copending application of W. S. Buslik and T. L. Vinson, Serial No. 468,832, filed November 11, 1954, now Patent No. 2,919,076.

As a preliminary to an explanation of the detail machine operations of the tape unit, it might be well to briefly point out various operations of the tape machine and how they are generally controlled.

The tape unit is said to be in a loaded condition when the tape is fully threaded throughout the machine and is in position for either a tape reading operation or a tape writing operation. When an appropriate go signal is given the tape unit, various tape feeding instrumentalities are set into operation to cause the tape to unwind from a file reel to a machine reel. The tape is adapted to pass through a read-write station, read-write hereinafter being designated R/W. At the end of a complete tape writing operation a tape mark is usually recorded to signify the end of the writing operation, after which a stop signal is directed to the tape unit. This stop signal may come from a data processing machine controlling the writing operations of the tape unit. The stop signal may also come from the tape unit per se upon the sensing of a point denoting the end of the tape. This end point is referred to as the tape indicator point (TI). When the latter is sensed, appropriate means are set into operation calling for a rewind operation of the tape. In this operation the tape is moved in a backward direction unwinding from the machine reel and winding itself onto the file reel. The rewind operation is effected at a high rate of speed. As the end of the rewind operation approaches, the machine is conditioned to transfer from a rapid rewind rate of speed to a slower or normal backward speed of operation. The machine will continue to operate at this slower speed until the beginning of the tape is sensed whereupon tape feeding is stopped after which the tape may be removed from the machine. The beginning point of the tape is called the load point (LP).

For a tape reading operation the tape is advanced from the file reel to the machine reel in the manner described. During the reading operation the R/W station issues various data signals generated by the appropriate R/W heads which detect the various magnetized portions of the tape representing the recorded data on the tape.

In accordance with the invention, the tape unit is controlled to feed tape in a forward direction while writing a record of thirty-two characters in binary form after which the tape is fed in a backward direction to enable the written data to be verified. In the absence of an error the tape is then spaced in a forward direction over the previously written record after which the tape is stopped. The above operations are repeated for each record written on the tape. In the event of an error the third step, i.e., space forward, is not effected; instead, the next record is written over the previously written record and in the process the previously written record is erased.

A general understanding of the machine and its function may be attained by referring to FIGS. 19 and 20 of the drawings. Here there is shown a file reel 10 and a machine reel 18. The former serves as the supply reel having a supply of tape upon which data is to be written as the tape passes through a recording and reading head 16 and then onto the machine reel. Before entering and after leaving the recording station, the tape is looped in appropriate vacuum columns identified as 24 and 26. The arrangement thus enables the feeding of a small supply of tape at high speeds of operation. The machine reel 18 is driven by means of a spindle 20, whereas the file reel is driven by means of a spindle 12. Both spindles are selectively driven in either direction by means of a FORWARD motor 22 and a BACKWARD motor 23 and appropriate clutch mechanisms. Magnetic brakes 48 and 42, best seen in FIG. 22 are provided, one for each spindle, to provide braking action or locking action as required under different conditions of operation. In accordance with the controls effected upon the appropriate clutches, the tape reels will be caused to either wind or unwind tape into the vacuum column.

The manner in which the tape is threaded and guided through the various feeding instrumentalities may be explained with reference to FIG. 19. Here it is seen that the tape on the reel 10 is guided around an idler 132; then it passes into and out of vacuum column 24, whereby a loop is thus formed. The tape emerges from the vacuum column 24 and passes between a BACKWARD DRIVE capstan 28, driven clockwise and an idler pulley 32. The tape then continues around an idler 134 before passing between an idler pulley 34 and a FORWARD DRIVE capstan 30, driven counterclockwise. The tape then descends into vacuum columns 26, forms a second loop, emerges from the vacuum column and is guided around roller 140 before being coiled on the machine reel 18.

The pulleys 32 and 34 are each adapted to move the tape either into or out of engagement with their associated drive capstans. By means of a common linkage, to be described, these pulleys 32 and 34 are coordinated in their operations to either drive the tape forwardly or backwardly depending upon the operation called for.

A nonrotary STOP capstan is also associated with each of the tape moving idler pulleys so that these pulleys may be moved into contact with their related STOP capstans to hold the tape stationary. Thus, the idler pulley 32 has associated therewith a FORWARD STOP capstan 36, and the tape moving idler pulley 34 has associated therewith a BACKWARD STOP capstan 38.

To make alignment easier, DRIVE capstan 28, idler pulley 32 and STOP capstan 36 are all mounted on a cylinder 39*a* which in turn is mounted in the main plate 13. For the same reason, DRIVE capstan 30, idler pulley 34 and STOP capstan 38 are all mounted on a cylinder 39*b* in the main plate 13.

*Clutches and brakes*

The mechanism for driving the tape reels 10 and 18 may now be referred to in connection with FIGS. 21, 22 and 23. The spindles 12 and 20 are mounted for rotation in a frame member 40 which in turn is mounted on the back of the main plate 13. The spindle 12 has mounted thereon an electromagnetic file reel brake 42 (FIG. 22), an electromagnetic unreeling clutch 44 and an electromagnetic reeling clutch 46.

The machine reel spindle 20 has mounted thereon an electromagnetic machine reel brake 48 (FIGS. 20 and 22), an electromagnetic reeling clutch 50 and an electromagnetic unreeling clutch 52.

The drive rings of the clutch elements 44 and 52 are adapted for continuous rotation under the influence of the drive motors 22 and 23.

The clutches 44 and 50 are driven in a clockwise direction by the motor 22 through a drive belt 22*a*, while the clutches 46 and 52 are driven in a counterclockwise direction by the motor 23 through a drive belt 23*a*, the motor shaft 58 having a normal counterclockwise rotation and the motor shaft 60 having a normal clockwise rotation.

Noting FIG. 19 of the drawings, it may be seen that the file reel 10 is disposed for reeling tape thereon when driven in a counterclockwise direction, while the machine reel 18 is disposed for tape winding upon clockwise rotation. In light of this arrangement, the clutch 46 operates as a reeling clutch for the file reel 10, while the clutch 52 operates as an unreeling clutch for the machine reel 18. By the same token, the clutch 44 operates as an unreeling clutch for the file reel 10, while the clutch 50 operates as a reeling clutch for the machine reel 18.

The file reel brake 42 and the machine reel brake 48 perform dual functions. They act as brakes to lock their respective shafts against rotation and also act to feed tape slowly during LOAD-REWIND and UNLOAD operations as described in said copending application.

Fig. 23 of the drawings illustrates the specific nature of the brake and clutch units. These units are of identical structure, and a description of the clutch 50 will therefore suffice as a description of all. A driving member 64, including the ring or shell 50, is mounted on the shaft 20 for free rotation thereon. The driving member includes an end plate 66 in which is mounted a pair of commutator rings 68 which provide a current path for an electromagnetic coil 50*a* mounted within an annular recess in the driven member 64 and held therein by an annular plate 72. The opposite face of the structure has fixed thereto a closure plate 74. Suitable hub rings 76 support the driving member for rotation on the shaft 20.

A driven member 78 is spaced from and disposed between the annular plate 72 and the closure plate 74. The driven member 78 is keyed to the shaft 20 by means of a suitable keying structure 80.

It will be apparent now that when the driving member 64 and the driven member 78 are caused to rotate in unison, drive will be imparted to the shaft 20. Such drive coupling is achieved through the use of iron powder disposed between the driving member 64 and the driven member 78.

The commutator rings 68 are in contact with a brush 94 carried on the end of a resilient contact strip 96 which is connected into the control circuit by means of terminal screws 98 (FIG. 22).

The clutches at the rear end of the spindles 12 and 20 are of the same construction as that described hereinabove, and their mounting on their respective shafts is the same except that they are reversed so that the end plate 66 is oppositely disposed to present the commutator rings in a more accessible position. It now follows that the energization of the coils 44*a* and 52*a* (corresponding to clutches 44—52) will result in the corresponding FORWARD or BACKWARD drive of the respective spindles 12 and 20.

The brake assemblies 42 and 48 are also constructed substantially like the clutch assembly just described, and the manner of mounting these on their respective shafts is also the same with the exception that ring gears 100 and 101 carrying gear teeth 102 and 103, respectively, are affixed around the closure plates 74 to the brake assemblies 42 and 48, respectively. The gear teeth 102 and 103 mesh with worm gears 104 and 105, respectively (FIG. 3), fixed to shafts 106 and 107, respectively. Fixed to the top end of shafts 106 and 107 are gears 108 and 109, respectively, with worm gears 110 and 111, respectively, on a shaft 112 of a LOW SPEED motor 114. The rotation of LOW SPEED motor 114 will cause the rotation of worm gears 110 and 111 which will effect the rotation of worm gears 104 and 105, respectively, which in turn will slowly rotate gear plates 100 and 101, respectively. Because of the driving relationship in the above arrangement, gear plates 100 and 101 will rotate counterclockwise and clockwise, respectively.

Energizing the coils 42*a* and 48*a* of the brakes 42 and 48, respectively, will cause the shafts 12 and 20, respectively, and therefore the reels 10 and 18 to rotate in the direction of the gear plates 100 and 101. Reversing the direction of rotation of LOW SPEED motor 114 will cause reels 10 and 18 to rotate clockwise and counterclockwise, respectively. This low speed rotation of the reels is used for feeding tape into and out of the columns during automatic LOAD-REWIND and UNLOAD operations of the tape feed machine, as will be more fully described hereinafter.

It is apparent that a worm gear may act as a brake where an attempt is made to rotate the gear with which the worm gear is in mesh. Thus, if the LOW SPEED motor 114 is unenergized, worm gear 104 is stationary and it acts to prevent ring gear plates 100 and 101 from rotating. Therefore, when the coil in the brake assembly associated therewith is energized, the clutch is engaged and the spindles 12 and 20 are held against rotation. As will be seen at a later point herein, the control circuit is such that drive through either of the clutches on a drive spindle will take place only upon de-energization of the associated brake assembly coil, and that ordinarily the coil in the brake assembly will be energized to hold its associated spindle against rotation when the clutch coils are de-energized.

The rotary movements of the tape reels are under control of the positions of the tape loops in the control columns 24 and 26. The tape loops control the operation of vacuum switches which are connected to various circuits, to be described, to control the clockwise and counterclockwise rotations of the file and machine reels.

For each of the control columns 24 and 26 there is provided a pair of side walls 116, a transparent face panel 120 and a bottom wall, not shown, all joined together in airtight contact. In the base of each column there is provided a header 124, communicating with a vacuum pump 126 suitably driven by a vacuum pump motor VPM seen in broken outline. When the open ends of the columns 24 and 26 are closed by the loops of the tape, a vacuum is thereby created, the effect of which is detected by means of bellows 128 which control a contact 130, not seen, enclosed within the housing 128a.

Spaced along the length of the control columns are a pair of vacuum controlled switches, the details of which are shown in FIG. 24. Switches LUV and LLV are associated with column 24, whereas switches RUV and RLV are associated with column 26. These switches are identical in structure and operation, therefore, a description of one will suffice for the others.

Referring to FIG. 24, it will be seen that the switch structure is incased in a shell 142 which fits tightly against a base plate 144, the base plate being held behind the back panel 118 of the control column so that a cylindrical aperture 146, shown dotted in FIG. 19, of the back panel registers with a cylindrical passage 148 in the base 144 of the switch structure. Within a cavity formed between the base plate 144 of the switch structure and an overlying cover 150 is a pressure responsive diaphragm 152 to which a contact operating shaft 154 is attached, this connection between the diaphragm and the shaft 154 being airtight. Adjustably secured to the opposite end of the contact operating shaft 154 is a transfer contact assembly comprising contact blades LUV–1, normally closed, and LUV–2 contacts, normally open. When the diaphragm is subjected to a vacuum within the columns, the contact assembly is transferred, i.e., LUV–1 will open while LUV–2 closes. This operation also applies to the contacts LLV–1 and LLV–2 associated with switch LLV, contacts RUV–1 and RUV–2 associated with switch RUV, and also to contacts RLV–1 and RLV–2 associated with switch RLV. The operations of these switches will be more fully explained in connection with the wiring diagram of the tape unit.

During normal operation of the machine, the tape loops in columns 24 and 26 will be disposed between switches RUV—RLV and LUV—LLV of the respective column pairs. Under these conditions the switches LUV and RUV are subject to atmospheric pressure only, whereas switches LLV and RLV are influenced by vacuum in the columns 24 and 26, the tape loops constituting a column air seal above the switches LLV and RLV.

The device is designed so that the tape loops in the control columns 24 and 26 are maintained between the respective upper and lower vacuum switches. To this end the vacuum switch LUV is in the control circuit of the magnetic coil 44a in the unreeling clutch 44, while the vacuum switch LLV is in the control circuit for the magnetic coil 46a of the reeling clutch 46. In like manner, the vacuum switch RUV is in the control circuit of the unreeling clutch 52, while the vacuum switch RLV is in the control circuit for the reeling clutch 50.

Should either tape loop drop below its lower vacuum switch, such switch will be subject to atmospheric pressure on both sides of its diaphragm 152, causing the contact points thereof to transfer. Consequently, under such conditions, the switch LLV will call into action the file reel reeling clutch 46 and the switch RLV will call into operation the machine reel reeling clutch 50.

Such tape loops will be taken up by the reeling action of the respective reels, or either thereof, until the bight of the loop is above the lower control column switch, whereupon the switch will again transfer its contact points under influence of vacuum within the column.

In like fashion the upper vacuum switches LUV and RUV, which are subjected to atmospheric pressure on both sides during normal operation of the machine, will transfer their contact points when the bight of the tape loop rises above these switches. Under these conditions, the upper switches will be subject to the vacuums within their respective control columns. The low pressure on the inner side of the diaphragm 152 will thereupon permit atmospheric pressure on the opposite side to transfer the contact points of the upper switch structure. Upon such transfer the switch LUV will serve to energize the coil 44a in the unreeling clutch 44, and the switch RUV will call into action the unreeling clutch 52 whereby the file reel 10 and machine reel 18, respectively, or either one of them, will be rotated to unreel tape therefrom and thereby lengthen the loop in the control columns 24 and 26, respectively, until the bight thereof once more drops below the upper switches LUV and RUV.

From the foregoing it will be seen that the operation of the tape reels 10 and 18 is in effect a self-compensating operation whereby the tape loops in the control columns 24 and 26 are maintained in an optimum position. Furthermore, it is apparent that the controls for the reels 10 and 18 are independent one from the other.

The second contact point of each vacuum switch is used to provide a circuit for their respective brake coils. When the control circuit is described, it will appear that a circuit is established through closed points of switches LUV and LLV to energize the coil 42a of the file reel brake 42 and that a circuit is provided through closed points of switches RUV and RLV to energize the coil 48a in the machine reel brake 48. It is intended that the brake coils be energized whenever the reeling and unreeling clutches are de-energized.

*Tape drive*

The mechanism for driving the tape through the tape head 16 in a FORWARD direction is shown in FIG. 26 of the drawings, FIGS. 27 through 30 diagrammatically illustrating other DRIVE and STOP positions. The DRIVE capstan 30 is constantly driven by means of a capstan motor 164 (FIG. 21) whose shaft 166 rotates in a clockwise direction. The DRIVE capstans 28 and 30 are journaled for rotation in the main plate 13 of the machine, and the shafts 28a and 30a extend to the rear of the main plate 13 where they have affixed thereto belt pulleys 168 and 170, respectively. A drive belt 172 is trained about the pulley 170, a motor shaft pulley 174 and an idler pulley 176, so that upon clockwise rotation of the motor shaft 166, the capstan shaft 28a will be constantly rotated in a clockwise direction while the capstan shaft 30a will be constantly rotated in a counterclockwise direction.

By reference to FIG. 26 of the drawings, it will be seen that the tape moving idler pulleys 32 and 34 are mounted for rotation at the free end of levers 178 and 180, respectively. The inner ends of the levers 178 and 180 are fixed to pivot shafts 182 and 184, respectively. The pivot shafts 182 and 184 are journaled for rocking movement in the main plate 13, and each of these shafts has attached thereto a short link 186 and 188, respectively. The inner free ends of the links 186 and 188 have pivoted thereto levers 190 and 192, respectively, which have their opposite ends pivoted to a common operating lever 194.

With the foregoing structure, the tape moving idler pulley 32 may be selectively engaged with either its related DRIVE capstan 28 or with its STOP capstan 36. In like manner, pulley 34 may be selectively engaged either with its related DRIVE capstan 30 or with STOP capstan 28.

For the purpose of controlling the movement of the tape moving idler pulleys 32 and 34, there is provided a FORWARD-BACKWARD actuator 196 comprising a BACKWARD MAGNET 196a, a FORWARD MAGNET 196b, and a DRIVE-STOP actuator 198 which consists of a DRIVE-STOP moving coil 200 disposed in a magnetic field generated by a permanent magnet 202. The BACKWARD and FORWARD MAGNETS 196a and 196b are mounted on a supporting yoke in spaced relation to each other. A pivoted armature 204 is disposed for cooperation with either magnet and is attached to the operating lever 194 by means of a pivot stud 206.

The DRIVE-STOP moving coil 200 has affixed thereto a rod 208 which is connected to the free end of the operating lever 194. Suitable electrical controls, later to be explained, enable the coil 200 to be energized with current flowing either in a forward or a reverse direction. Consequently, the coil will either be attracted toward or repelled from the magnet 202. When the coil is repelled, the DRIVE staus is attained; conversely, when the coil is attracted, the STOP status is achieved.

When the coil 200 is energized in a manner that will repel it, an upward thrust will be imparted to the rod 208 which in turn imparts motion to the linkage to swing the tape moving idler pulleys 32 and 34 such that each swings in toward its associated capstan. When the FORWARD magnet 196b is energized under the above DRIVE status condition, the armature 204 is accordingly attracted to cause the operating lever 194 to be biased to the right (as in FIG. 26). As a result of this operation, the tape moving idler pulley 34 is engaged with the FORWARD DRIVE capstan 30 to cause the tape 14 to be driven downwardly into the control column 26.

The foregoing describes one of four positions into which the tape moving idler pulleys may be biased during normal FORWARD and BACKWARD operations. The three other positions are illustrated in FIGS. 27, 28 and 29.

FIG. 27 shows the position of the tape moving idler pulleys for STOPPING tape feed following FORWARD feed of the tape. At this point it may be appropriate to mention that the tape is always pulled through the tape head unit 16 and is stopped by braking the tape at a position behind the tape head unit 16. This will insure sufficient tape tension at the tape head unit 16 at all times.

Reverting to FIG. 27, it will be seen that the tape 14 is STOPPED by engaging the tape between the FORWARD STOP capstan 36 and the tape moving idler pulley 32. To achieve this function, the BACKWARD magnet 196b must remain energized, and the flow of current through the DRIVE-STOP moving coil 200 is reversed to enable the coil 200 to be attracted to the permanent magnet 202. This results in a downward pull on the rod 208 with the result that pulley 32 is engaged with the FORWARD STOP capstan 36, and pulley 34 is disengaged both from capstans 30 and 38.

FIG. 28 shows the position of the parts to cause the tape to move in a BACKWARD direction. To bias the tape moving idler pulley 32 into contact with the BACKWARD DRIVE capstan 28, it is necessary to energize the DRIVE-STOP moving coil 200 to cause an upward movement of the rod 208 and also to energize the BACKWARD magnet 196a.

The BACKWARD STOP position of the tape drive mechanism is shown in FIG. 29. Here the tape moving idler pulley 34 is brought into engagement with the BACKWARD STOP capstan 38. To achieve this engagement, the BACKWARD magnet 196a must remain energized but the current in the DRIVE-STOP moving coil 200 is reversed to cause the coil to move downwardly so that the rod 208 exerts a downward pull on the operating lever 194 with the result that the tape moving idler pulley 34 is brought into contact with the BACKWARD STOP capstan 38.

FIG. 30 shows the position assumed by the parts under conditions of an UNLOAD operation. It is to be noted that both the capstans 28 and 30 are shown in dotted form. This is to indicate that these capstans are in a retracted position. The top face of each capstan 28 and 30 lies in a plane parallel to but beneath the plane of the drawing. In this position the tape is free from both capstans 28 and 30. Also to be noted is the disengaged position of the idlers 32 and 34 relative to their stop capstans 36 and 38. The position of the parts as seen in FIG. 30 is brought about by reversing the current flow through the coil 200 so as to cause the latter to impart an upward movement to the rod 208 and by causing the lever 194 to assume a position midway between the magnets 196a and 196b. To achieve this position of the lever, the magnets 196a and 196b are both in a deenergized state.

It may be appreciated that during a LOAD operation idler pulleys 32 and 34, respectively, will assume positions against the associated stop capstans 36 and 38, respectively. To achieve this dual engagement, the BACKWARD and FORWARD magnets 196a and 196b must remain de-energized but the current in the DRIVE-STOP moving coil 200 is such as to cause the coil to be energized and thus is moved downwardly so that the rod 208 exerts a downward pull on the lever 194.

At this point it may be well to consider the means provided in the tape unit to give an indication of the beginning and the end of the tape to insure that the tape is not completely unwound from the reel when the tape is being driven. For this purpose there is provided an aluminum strip fastened close to each end of the tape. The start point is hereinafter referred to as the LOAD POINT and the end point as the TAPE INDICATOR POINT. The TAPE INDICATOR POINT is placed far enough away from one end of the tape so that the latter will not unwind from the file reel 10 during a FORWARD operation. The LOAD POINT aluminum strip is located from the other end of the tape so that the latter will not unwind during a BACKWARD operation. Both of these points are sensed, in a manner to be described hereinafter, by appropriate photocells located within the head cover 136 of FIG. 19.

In loading the machine the machine reel is manually rotated clockwise until the load point has moved past the tape head 16, assuming, of course, that the tape is threaded through the machine.

To start the machine at its LOAD POINT, it is necessary to depress a load rewind button LR located on the front panel seen in FIG. 19. A circuit, to be later explained, is energized to cause the LOW SPEED motor 114 to rotate the file reel 10 clockwise and the machine reel 20 counterclockwise, thereby feeding tape into each of the columns. The head cover is also lowered and then the drive capstans are moved forwardly from their retracted positions. An indication is automatically given by the machine to feed the tape backward until the load point is reached, whereupon the machine stops in its LOADED position and signals that it is READY for normal FORWARD operation.

*Rapid rewind*

To prepare the machine for RAPID REWIND operation, it is to be assumed that most of the tape is wound around the machine reel 18 and that the machine is in a position to sense the end, i.e., the INDICATOR POINT of the tape. The tape ordinarily is moved in a backward direction at a normal speed when it is desired to move only a small portion of tape. However, for a long sustained backward movement of the tape, a rewind at high speed is desirable. Before a RAPID REWIND may be initiated, it is necessary that the tape unit be in the UNLOAD position. This position, as earlier explained, is one wherein the head 136 is placed in a raised position, the tape is removed from each of the columns 24 and 26, the capstans 28 and 30 are in a retracted position, and finally the tape is guided from one reel to the other only by the idlers 132 and 140.

The RAPID REWIND mechanism may be explained with reference to FIGS. 20, 21 and 22. Here it is seen that the reeling clutch 46 is connected through a drive belt 234 to a pulley 235 of a RAPID REWIND motor 236 which is selectively rotatable in a counterclockwise direction, see FIG. 21. When the tape is in the UNLOAD position, the FORWARD and BACKWARD motors 22 and 23 are inoperative. When a RAPID REWIND operation is initiated, the RAPID REWIND motor 236 is energized and reeling clutch 46 is at first lightly energized to avoid snapping the tape, after which the clutch is fully energized. The energization of the clutch 46 causes the counterclockwise rotation of the file reel 10 to effect a rewinding of the tape.

In terminating the REWIND operation, the tape is gradually decelerated prior to its coming to a stop. To this end there is provided an arm 238, see FIG. 19, having a roller 240 cooperating with the tape wound on the machine reel 18. The arm 238 controls a contact 256, shown in the wiring diagram, which is controlled at an appropriate time depending upon the position of arm 238, to disable the circuit to the REWIND motor and to close a circuit for controlling the braking of the tape until the LOAD POINT is reached, whereupon the movement of the tape is stopped.

To insure disabling the circuit to the REWIND motor, a timing device is set into operation under control of the contacts 256. The timing device controls a set of contacts TMA*a* which operate appropriate circuits to disable the circuit to the REWIND motor.

In the operations of tape machine certain precautions are maintained to guard against tape breakage as well as to provide certain preliminary control circuit. To this end there is provided in each vacuum column an associated flapper valve 266 shown in FIGS. 19 and 25. The flapper valve 266 is attached to a rotatable shaft 268 on one end which is attached a cam member 270. Cooperating with said cam is a follower 272 forming a part of a contact assembly 278. The absence of tape in the vacuum columns while the vacuum pump motor is energized causes a flow of air into the columns. In the case of column 24, flapper valve 266 is forced by means of air pressure to the position shown in FIG. 25, in which position contacts 278 are closed. When tape enters the column, the latter is accordingly sealed to prevent the further admission of air. Accordingly, a vacuum is created within the sealed column and under this condition the flapper 266 is moved to a position to open contacts 278. A similar flapper arrangement, not shown, is provided in vacuum column 26 to operate an associated pair of contacts 280. By means of these contacts and associated circuitry, tape feeding is suspended should the latter break in either vacuum columns or in other parts of the tape path in the machine.

The tape head 16 contains a READ/WRITE magnet head unit 289 (FIG. 26) comprising seven parallel READ/WRITE magnetic heads which READ from and WRITE on the tape, in a manner to be described. A tape break light is also contained within the tape head unit 16. The tape head unit 16 has a head cover 136 which is movable in a vertical path by means under control of the LOW SPEED motor 114. The head cover 136 also supports an ERASE head 290 and the sensing means for sensing the LOAD POINT and the INDICATOR POINTS, the latter means is described in the said copending application.

To indicate the position of the head cover 136, a pair of switches are provided for operating electrical circuits to be described hereinafter. When the head cover 136 is in its raised position, contacts of a normally open HEAD COVER UP switch 340 are closed. When the head cover 136 is in its lowered position, contacts of a normally closed HEAD COVER DOWN switch 344 are opened.

As further explained in the afore-mentioned copending application, means under control of a RETRACT SOLENOID are utilized to retract the drive capstans 28 and 30. This means comprises in general a shaft which when rotated in one direction, under control of said RETRACT SOLENOID, causes associated linkage means to retract said capstans. Upon a subsequent de-energization of said RETRACT SOLENOID and upon the return of the associated mechanism to a normal position, the drive capstans are restored to a normal extended position. In the circuit diagram, the RETRACT SOLENOID is identified as 346.

Associated with the control of the RETRACT SOLENOID is a SOLENOID LATCH magnet, identified as 382 in the wiring diagram. When the latter magnet is in a de-energized position, it enables the RETRACT SOLENOID plunger to be latched in an energized position after the latter has assumed such a position, thus maintaining the capstans in a retracted position indefinitely until such time as the SOLENOID LATCH magnet is energized to cause the RETRACT SOLENOID plunger assembly to be restored to a normal position.

In addition, contact assemblies, identified as 394, 397 and 399, shown in the wiring diagram, are operated by associated cams located on said capstan operating shaft. Cam contacts 394 are adjusted to be opened when the capstans are in a normal extended position, and closed when the capstans are in a retracted position. Cam contacts 397 and 399 are adjusted to be closed when the capstans are in their normal extended position, and opened when the capstans are in a retracted position.

CARD READER CIRCUITS

Before proceeding with an explanation of the various circuits of the machine it may be well to point out that certain relays of the machine are comprised of either a single coil or of two coils. In a two-coil relay, one coil is used to pick up the relay while the other coil is used to maintain the relay in its picked up state. The relay is designated with appropriate nomenclature, for example, R112P and R112H. Other relays are of the latch type in which a pickup coil, designated LP, operates the contacts to a latched position in which they are held closed or open as the case may be. A trip magnet, designated LT, is energized to release the latch and restore the contacts to their original condition.

Where a relay contact is either normally closed or normally opened, appropriate nomenclature such as n/c or n/o will be used accordingly throughout the ensuing description of the circuits. The cam contacts, which were designated as either L or LC contacts in the description of the statistical machine shown and described in the afore-mentioned Lake Patent 2,615,569, are designated as CR cam contacts in the machine constituting the card reader forming a part of the present invention. The timings issued by these CR cam contacts are shown in the timing chart of FIGS. 13*a* through 13*c*.

The control keys include a START KEY, a STOP KEY, a RESTORE KEY, a TAPE MARK KEY, a REWIND KEY, a MANUAL PRINT KEY and a MAIN LINE SWITCH.

The initial starting condition and the stopping of the machine when cards run out will first be described without reference to any particular type of operation in order to explain how the machine is started and stopped in operation under various conditions.

The cards are placed in the feed hopper face down with the 9's edge disposed to enter the feed rolls of the machine first. When the MAIN LINE SWITCH is closed, a power supply PS is energized to provide the machine with various voltages. It is desirable that the application of various voltages to the various electron tubes and other electron devices be delayed in order to provide proper heat up time.

Figure 2A:
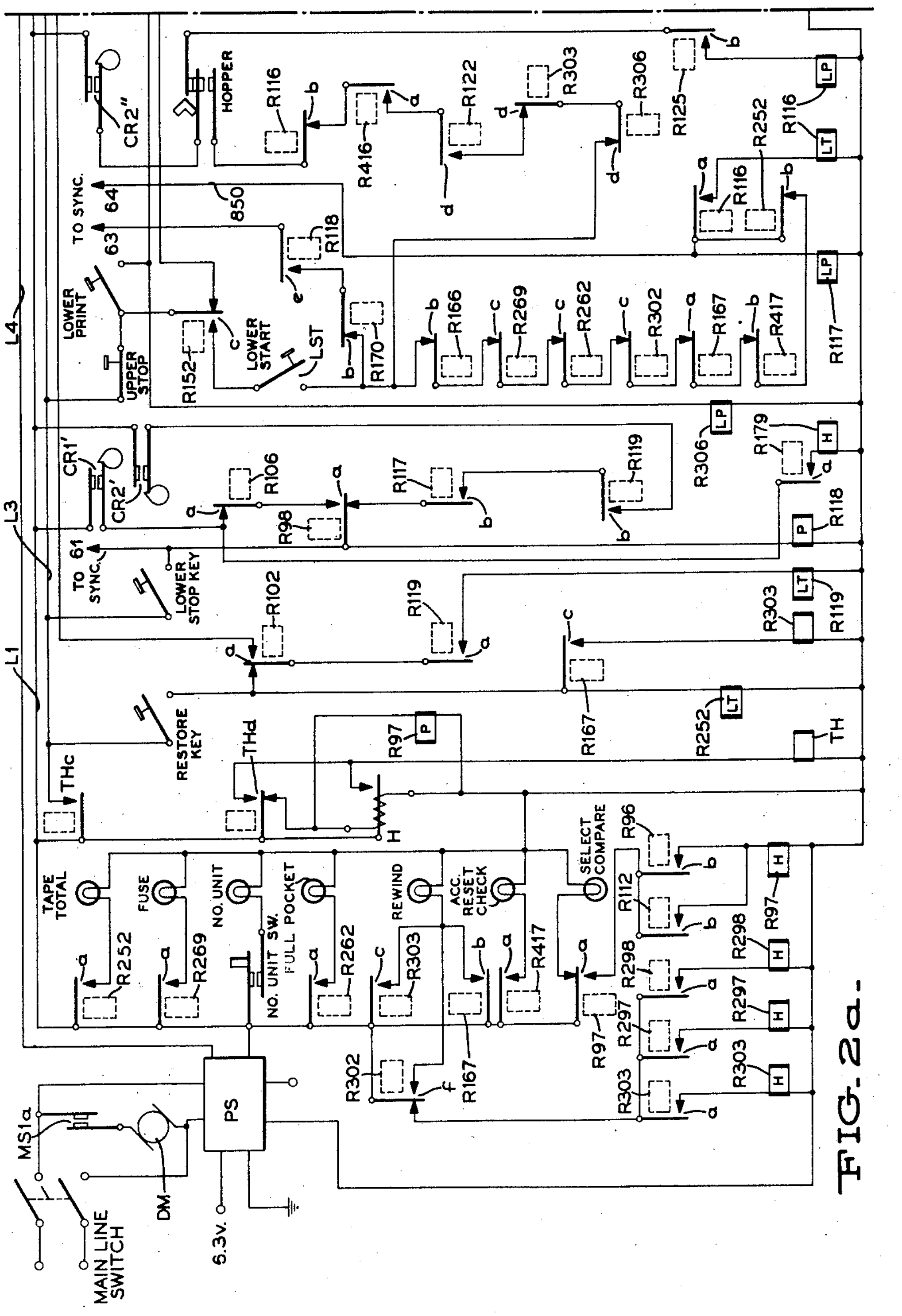

Current flow during this warm-up period extends from line L1, FIG. 2*a*, through a heater element H to line L2. After the appropriate time period has elapsed the H element contacts are closed to energize the thermo relay TH whereupon all contact points associated with the latter relay will transfer. When contact TH*d* transfers, a hold circuit for the TH relay is established. At the same time, the circuit to the heater element H is isolated.

Also during the warm-up period a select non-check relay R97P is energized upon closure of the contacts TH*d*. Upon the closure of contacts TH*c*, a path is established to energize an interlock relay R152 by way of a circuit path which includes the CARRIAGE HOME SW., shown in FIG. 2b, the latter contact is closed when the carriage of the card reader is in its home position.

When the start key in FIG. 2a is depressed, an associated pair of contacts LST close to establish a circuit to pick up relay R117LP. This circuit extends from line L2, relay R117LP, R252b n/c contacts, R417b n/c contacts, R167a n/c contacts, R302c n/c contacts, R262c n/c contacts, R269c n/c contacts, R166b n/c contacts, start key contacts LST, R152c n/o contacts, stop key contacts to line L3.

A branch path is also energized to provide the synchronizer with an appropriate impulse which eventually finds its way to the tape unit in a manner to be later described under the synchronizer. This branch path extends from the relay R117LP and proceeds along wire 850, which wire will be referred to hereinafter as the initiate write load point delay (INIT WR LP DEL) line.

Figure 2B:
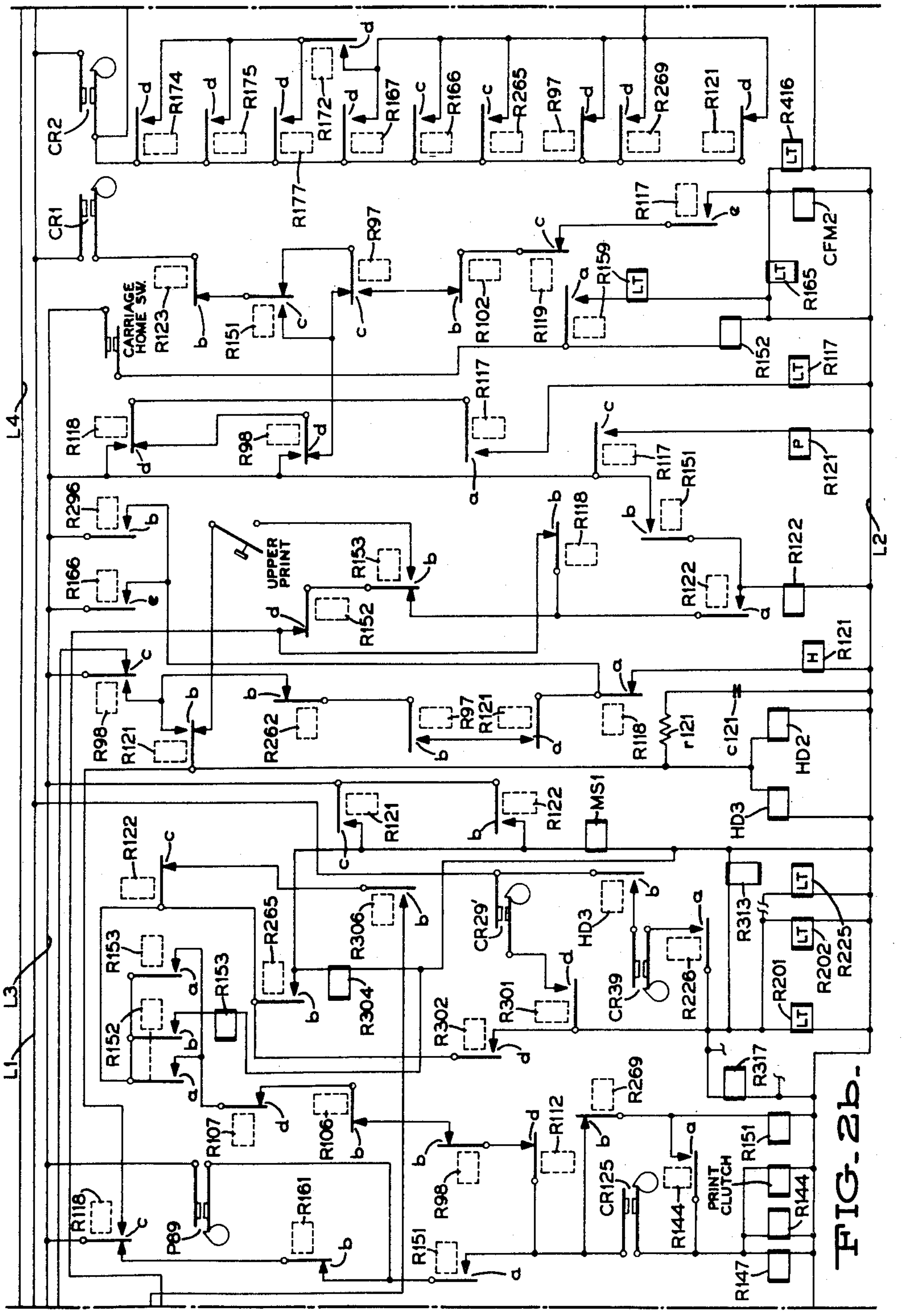
Figure 2C:
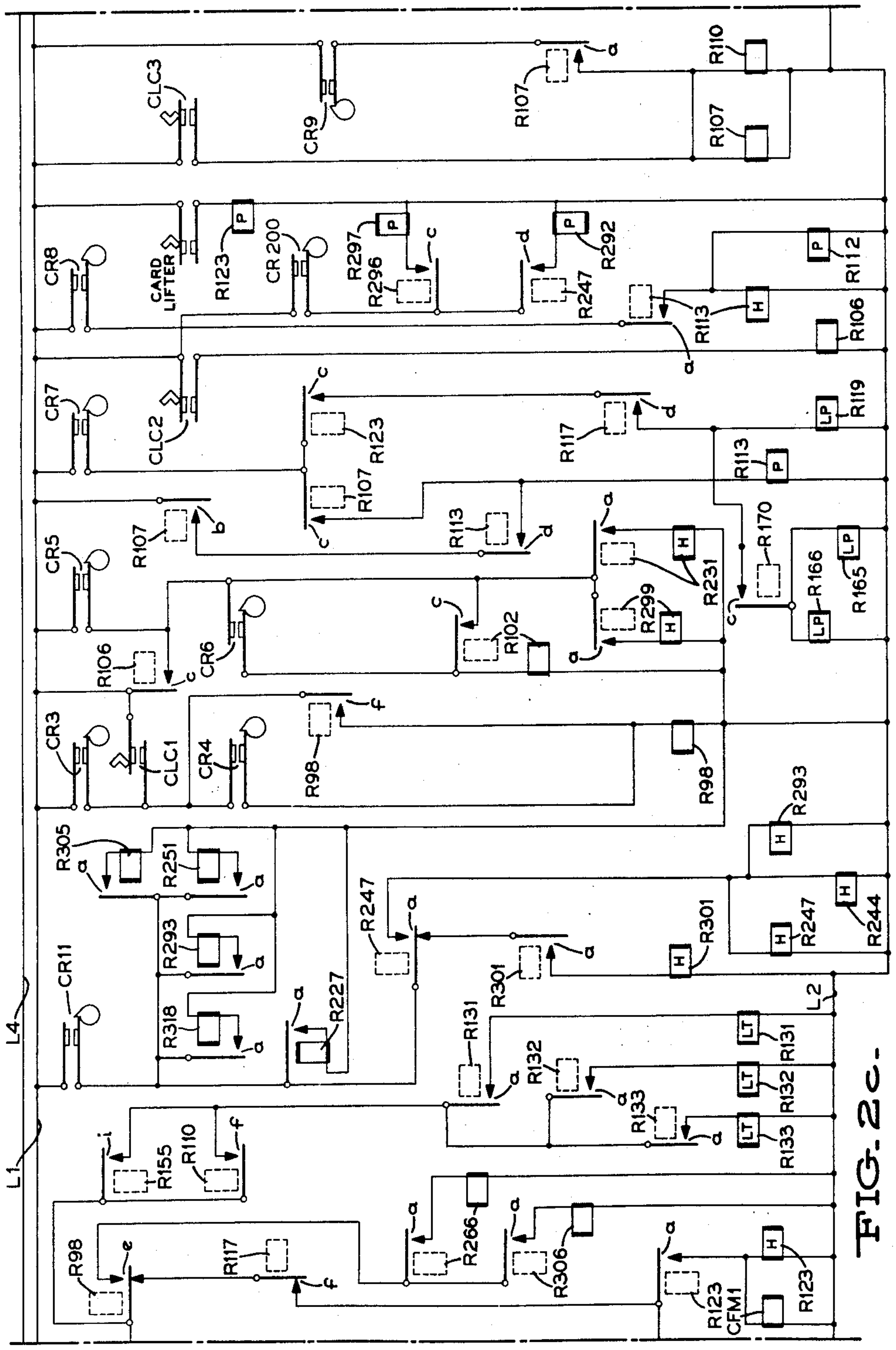
Figure 2D:
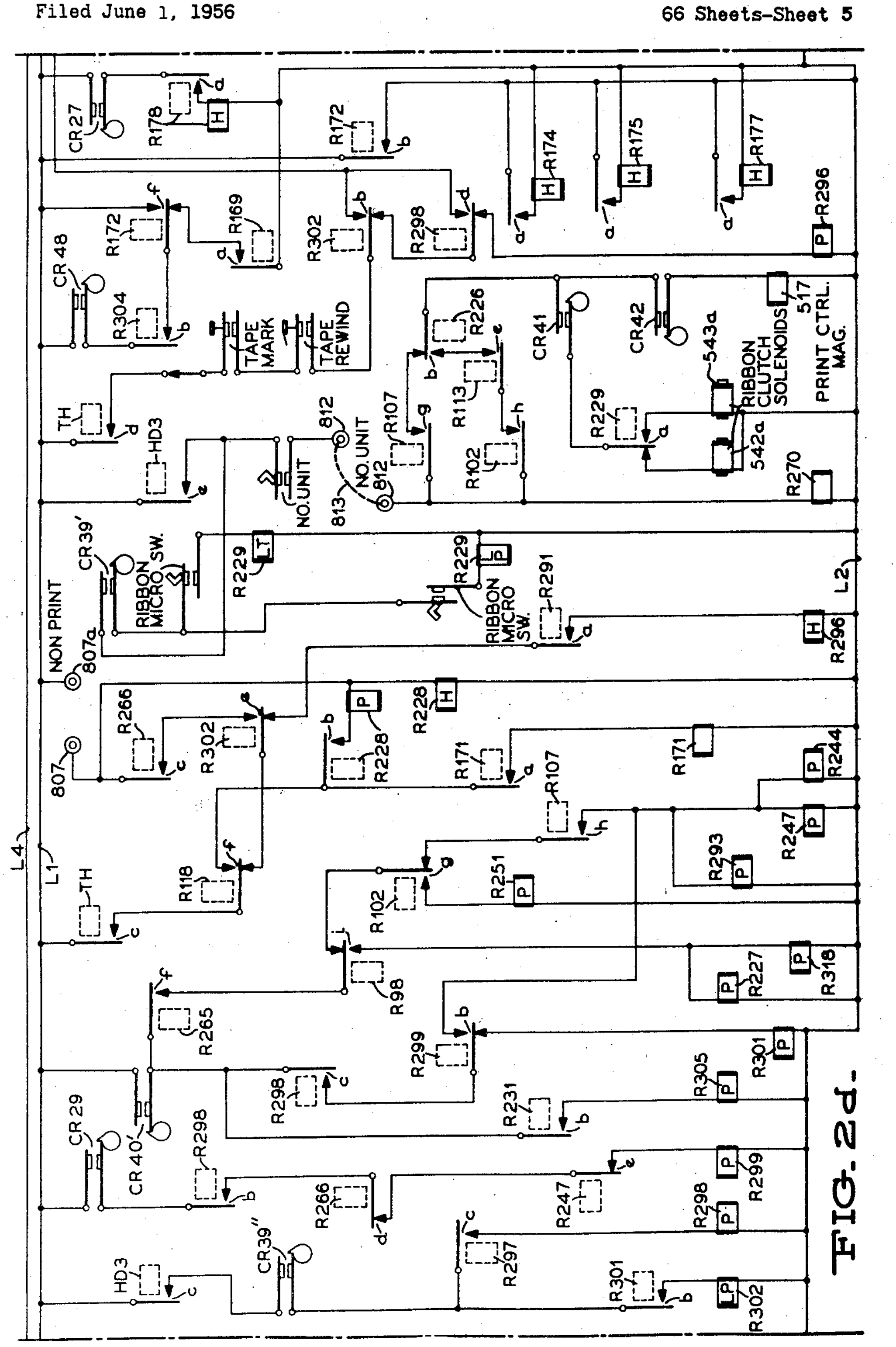
Figure 2A:
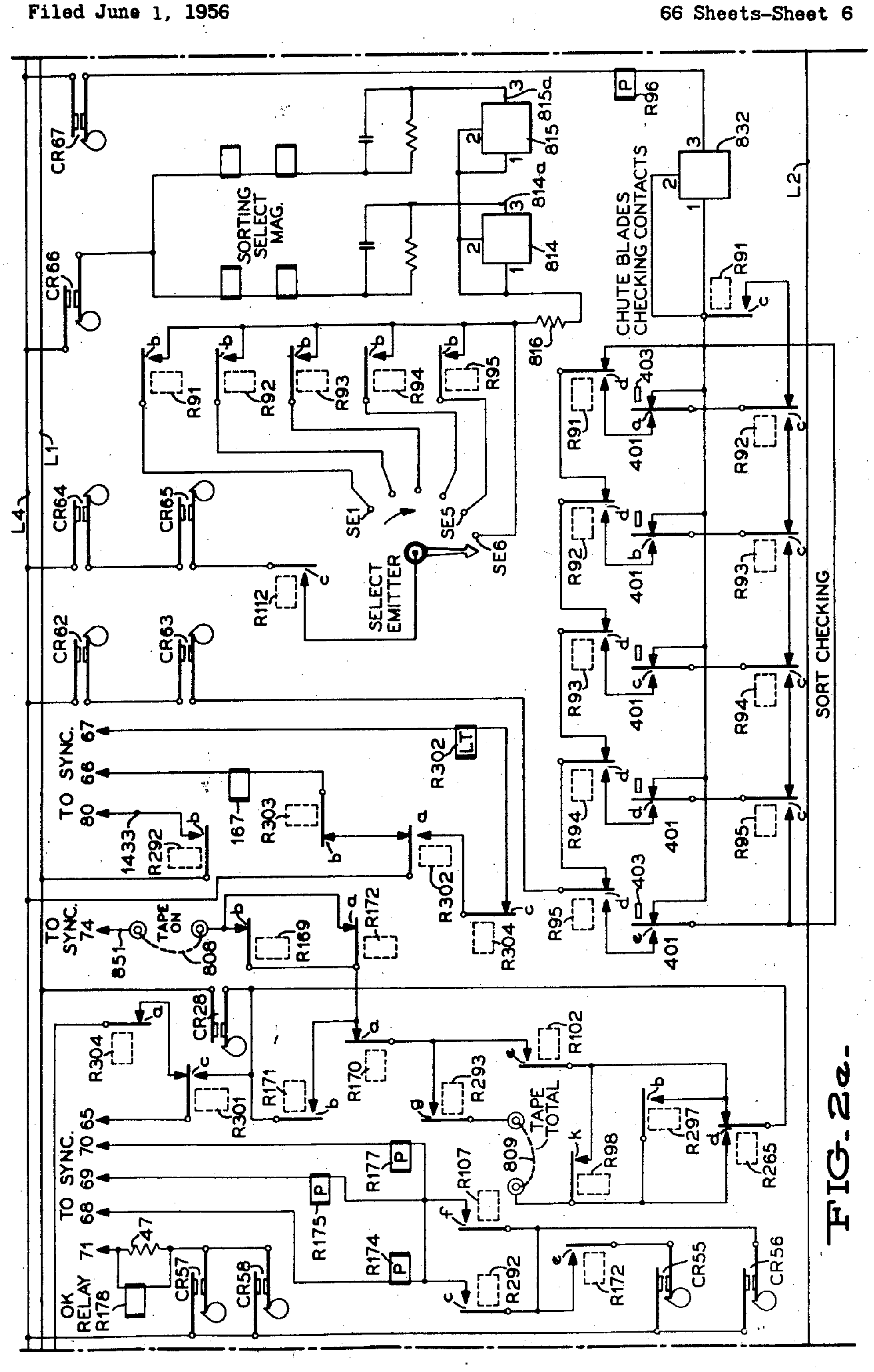

Upon closure of start relay contacts R117c, in FIG. 2b, a motor start control relay R121 is energized by means of a path following through line L2, relay R121P, relay R117c n/c contacts to line L3. A hold circuit for the relay R121H is established on the following machine cycle when the first card encounters the card lever 1 to close associated contacts CLC1, shown in FIG. 2c. Accordingly, a card lever relay R98 is energized. The hold circuit for the relay R121 follows through the relay R121H, R118a n/c contacts, R121a n/o contacts, R97b n/o contacts, R262b n/c contacts, R98c n/o contacts to line L3. Upon closure of relay contacts R121c, a circuit is established to energize a motor start relay MS1, in FIG. 2b, by means of a path beginning with line L2, the motor start relay MS1, relay R121c n/o contacts to line L3. The closure of the motor start relay contacts MS1a, in FIG. 2a, provides a circuit path to energize the drive motor DM.

Feeding of cards is initiated by energizing the card trip magnet CFM2, in FIG. 2b, by means of a path extending through line L2, CFM2, R117e n/o contacts, R119c n/c contacts, R102b n/c contacts, R97c n/o contacts, R151c n/c contacts, R123b n/c contacts, cam contacts CR1 to line L3. At approximately 95° of the machine cycle, the first card is advanced into the machine by means of the card pickers 383. Since the card lifters 388 (FIG. 7) are now in card feeding status, an associated pair of CARD LIFTER contacts (FIG. 2c) are closed to energize a card lifter control relay R123P. Upon closure of relay R123c contacts and cam contacts CR7, a circuit path is established to energize a stop control relay R119LP. The relay contacts R123b open to prevent succeeding impulses from unnecessarily energizing the trip magnet CFM2. After the card lever contacts CLC1 are closed, a circuit path under the control of cam contacts CR4 is closed to energize the relay R98 seen in FIG. 2c. The latter is held up through a hold circuit including cam contacts CR3 and relay contacts R98f. This hold circuit is the final control path for the relay R98 when the last card runs through the machine to permit the card lever contacts CLC to open. When relay R98d contacts close, a circuit to energize relay R117LT is established through the line L2, relay R117LT, R117a n/o contacts, R118d n/c contact points, R98d n/o contacts, to the line L3. Accordingly, when the contacts R117c open, the relay R121P de-energizes. However, a hold circuit to the relay R121H remains energized until after the last card is fed through the machine and into its respective pocket. This hold circuit for the relay R121H is established by means of an RC network comprising a resistor r121 and a capacitor c121. The charge on the capacitor c121 supplies the energy to maintain the relay R121 energized until the charge is completely dissipated, whereupon the relay R121H drops out. Under this condition the motor start relay MS1 accordingly drops out to stop the machine.

As the card moves by the CLC1 contacts, it passes through the CARD READING 1 station wherein the 80 FIRST READ brushes (FIG. 2g) may be energized in accordance with the perforations sensed in the card. After passing through this station, the card encounters the CLC2 contacts to energize other preliminary circuits. Upon closure of the CLC2 contacts (FIG. 2c), an interlock relay R106 is energized and remains in that status until the CLC2 contacts open after the last card passes thereover. An associated card lever 2 relay R102 is energized by means of a path extending through line L2, relay R102, cam contact CR6, relay R106c contact points to line L1. A hold circuit through contact points R102c and cam contact CR5 is effective until 310° of the cycle in which the last card passes through the card reading 2 station. As the card leaves the CARD READING 2 station, it passes through the card PRINTING STATION where it encounters the CLC3 contacts. Accordingly, appropriate card lever relays R107 and R110 (FIG. 2c) are energized until cam contact CR9 opens in the cycle in which the last card passes over the CLC3 contacts. Upon closure of relay R107c contacts and cam contacts CR7, a last card interlock relay R113P is energized. A circuit comprising R113d contact points and R107b contact points is also employed to energize relay R113P. A hold circuit for relay R113H is established under control of relay R113a contact points and cam contacts CR8. A last card interlock control relay R112P also picks up by way of the R113a contact points and cam contacts CR8. A hold circuit for relay R112H (FIG. 2s) is traceable through R112a contact points and cam contacts CR10, the relay remaining energized until 326° of the cycle after CLC3 contacts open.

In the preparatory circuits described, the machine is prevented, except for a runout operation, from being stopped by virtue of the fact that a stop relay R118 (FIG. 2a) is held de-energized. The stop relay R118P is energized in a variety of ways. For example, one way of energizing the relay R118P is by depressing the stop key. Another way is by means of a circuit which depends upon the presence or absence of cards along the card path in the machine. This condition is reflected in the control circuits adjusted by means of the card lever contacts arranged to operate a stop control relay R119 having an LP coil (FIG. 2c) and an LT coil (FIG. 2a). The R119LP relay is under the control of a circuit which includes relay R117d n/o contact points, relay R123c n/o contact points and cam contacts CR7. The relay R119LT is under the control of a circuit path which includes relay R119a n/o contact points, relay R102a n/o contact points, and relay R98c n/c contact points. Moreover, when cards are not in the card path of the machine and the relay R102a contacts are n/c, the relay R119LT may also be energized under the control of the RESTORE KEY.

The feeding of cards during the various machine operations and conditions may be suspended by means of a circuit including a plurality of relay contact points arranged in parallel to control the card lifter control magnet CFM1. This circuit path extends through line L2, CFM1 and relay R123H, in parallel therewith, relay R123a n/o. The circuit then proceeds by way of a plurality of n/o contact points arranged in parallel including R269d, R97d n/c, R265c, R166c, R167d, R177d, R175d, R174d, through cam contacts CR2 to line L1. The three contact points, namely, R177d, R175d, and R174d, are further conditioned by a stop on error control relay contact point R172d. The above-mentioned contact points represent various machine conditions and operations dealing with a blown fuse, select non-check operation, 9M master card control, single card feeding, tape indication rewind, tape read check error, tape write check error, and tape card check error.

Machine operations during total printing cycles are dependent upon the energization of a print control relay R151 (FIG. 2b) energized by means of a circuit to be described. This relay controls an associated contact point R151*b* to energize a motor start relay R122 (FIG. 2*b*). Upon closure of relay R122*b* contact points, a path is established to energize the MS1 relay (FIG. 2*b*), the latter controlling the energization of the drive motor DM.

In the case of sort checking operations, to be later explained, the relay R96 (FIG. 2*e*) is energized during correct sorting operations. This relay enables a circuit path to be established to energize the relay R97H, in FIG. 2*a*.

Figure 2F:
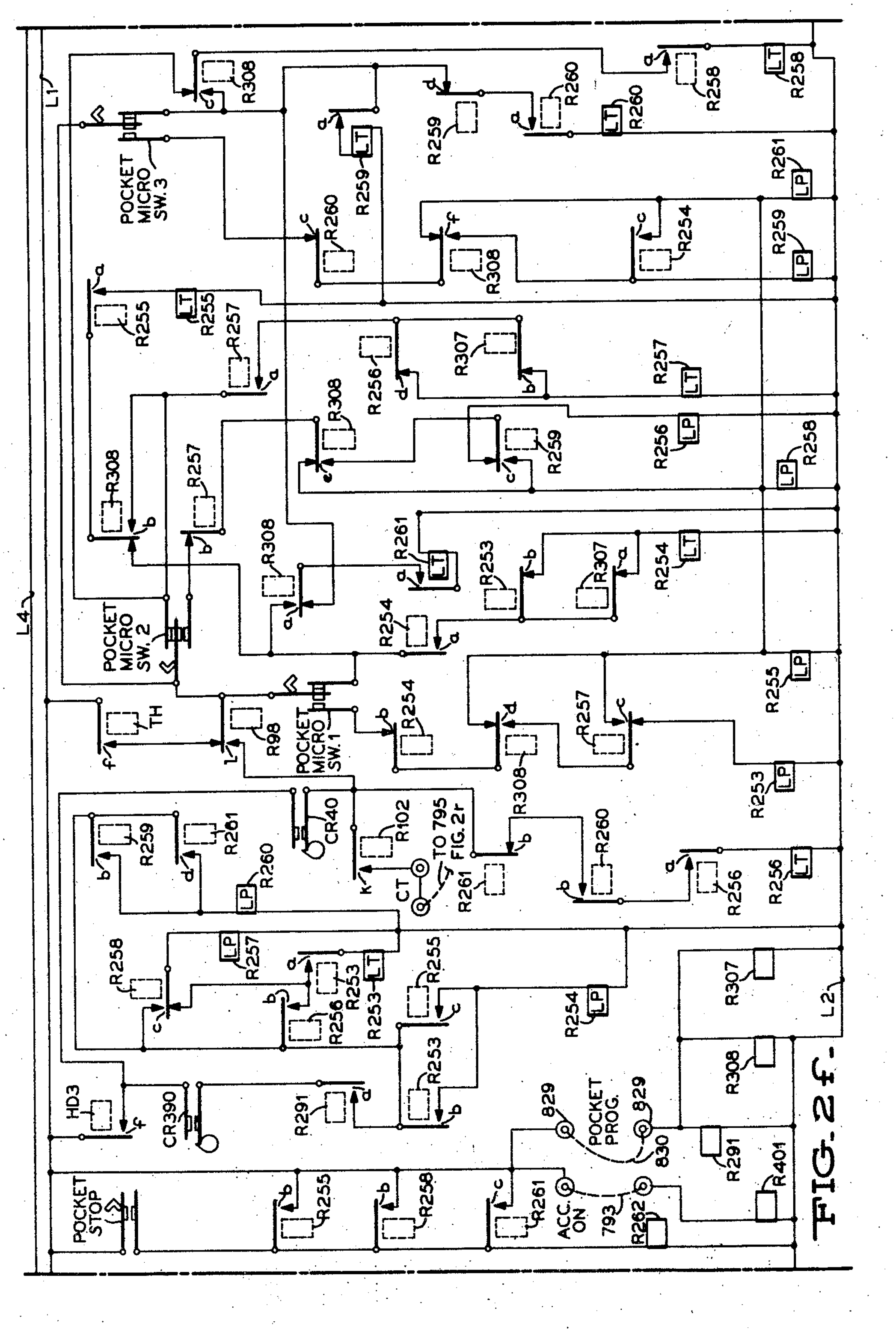

Stopping of the machine in the event of a full pocket is effected upon the energization of a relay R262, in FIG. 2*f*. Upon the transfer of R262*b* contact points, relay R121H (FIG. 2*b*) is de-energized to stop the machine immediately by virtue of the fact that this circuit operation takes precedence over the operation of the RC network previously described to provide runout operations of the machine when the last card passes therethrough. In like manner, when a sort check error is discovered, relay R97 drops out, in a manner to be later explained, to immediately drop out the relay R121H.

The foregoing explains various preliminary circuits necessary for the operation of various card reader functions as well as circuits concerned with the coordination of the card reader in the system. The following is concerned with the various functions dealing with the entry of the various card check data into the buffer unit from which the data is serially extracted and thereafter transcribed in binary coded form on magnetic tape. During the course of the ensuing description on the card reader, in order to avoid detailed and repeated reference to the tape machine, only generalized statements regarding the operations of the tape unit will be made. In this way attention will not be diverted unnecessarily from the description of the card reader.

As earlier pointed out, the batch header card is the first card passing through the card reader. This header sets up the batch and serial number instrumentalities for printing appropriate identification on the succeeding card checks passing through the card reader. To simplify the explanation, it will be assumed for the present that the header card has set up the printing instrumentalities and that the first card check is passing through the second reading station whereat the various check data is sensed then entered into the buffer unit. With the above assumption in mind, reference is now invited to FIGS. 2*g*, 2*h*, 2*i*, and 2*j*, where there may be seen the SECOND READ BRUSHES, associated read brush sockets 2R1 through 2R32, and the tape entry positions TE1 through TE32. Tape entry for positions 1, 3 and 20 are shown partly in detail while the remaining tape entry positions are shown in block form. Associated with each tape entry position are five relays, namely, A, B, C, D, E, adapted to be energized on a 2-out-of-5 basis in accordance with the chart shown below to represent the digit values 0 through 9.

| Digit | Buffer (2-out-of-5) | Card Reader (2-out-of-4) |
|---|---|---|
| 0 | BC | BC |
| 1 | AB | B |
| 2 | AC | C |
| 3 | AD | D |
| 4 | BD | BD |
| 5 | CD | CD |
| 6 | AE | E |
| 7 | BE | BE |
| 8 | CE | CE |
| 9 | DE | DE |

The relays B, C, D and E under the caption Card Reader (2-out-of-4) will be explained later on at a more appropriate time.

Figure 2H:
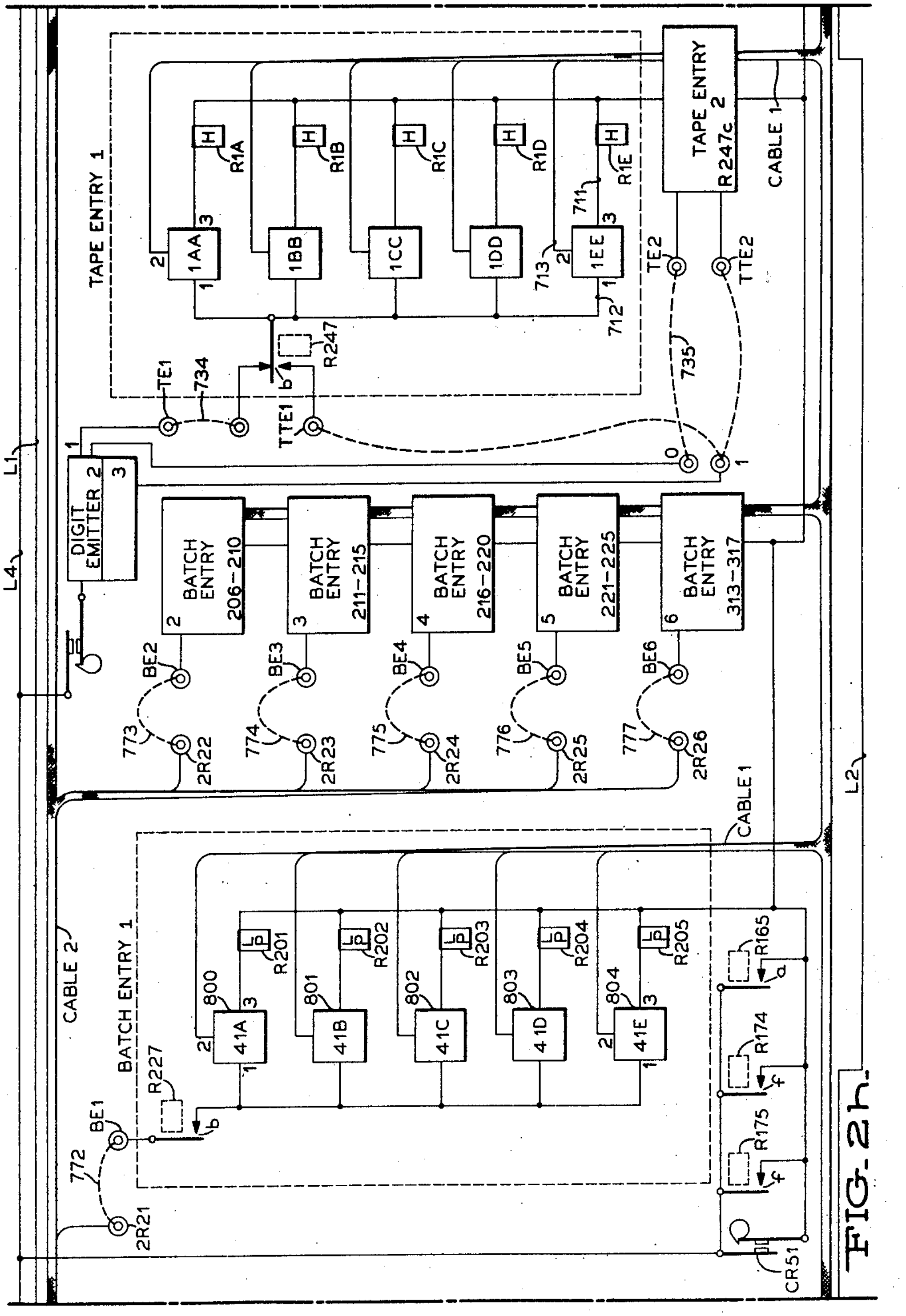
Figure 2I:
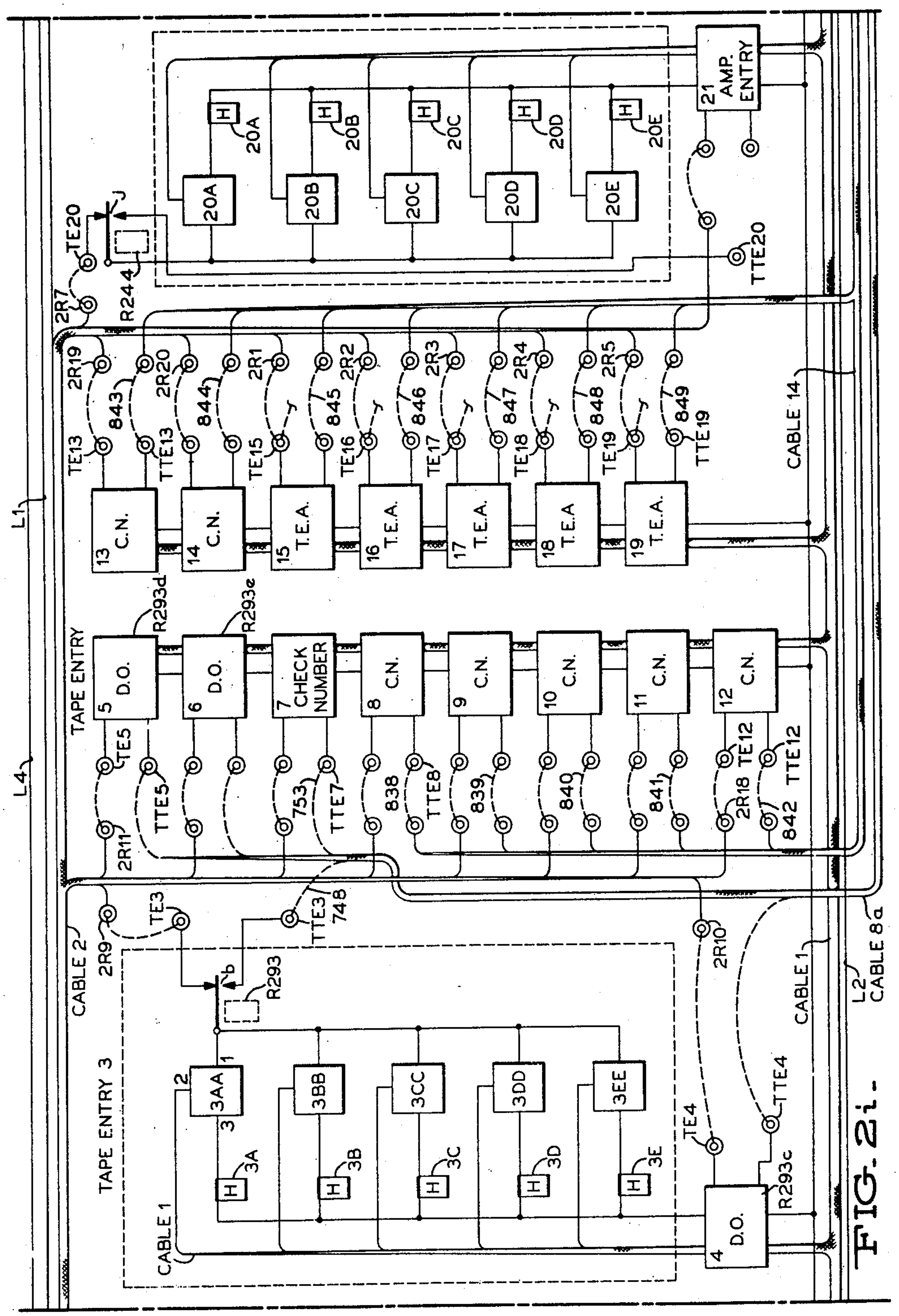
Figure 2J:
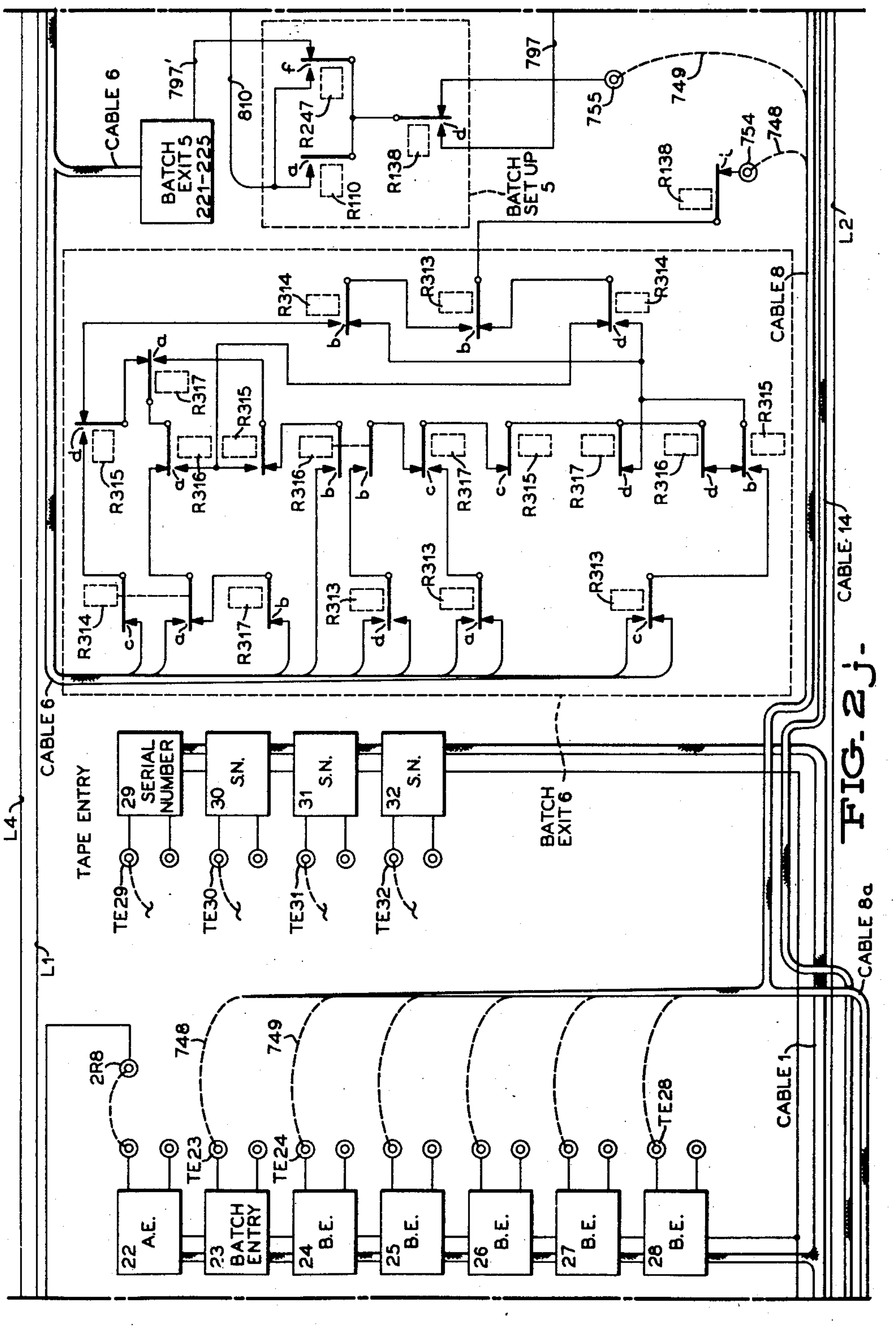
Figure 2K:
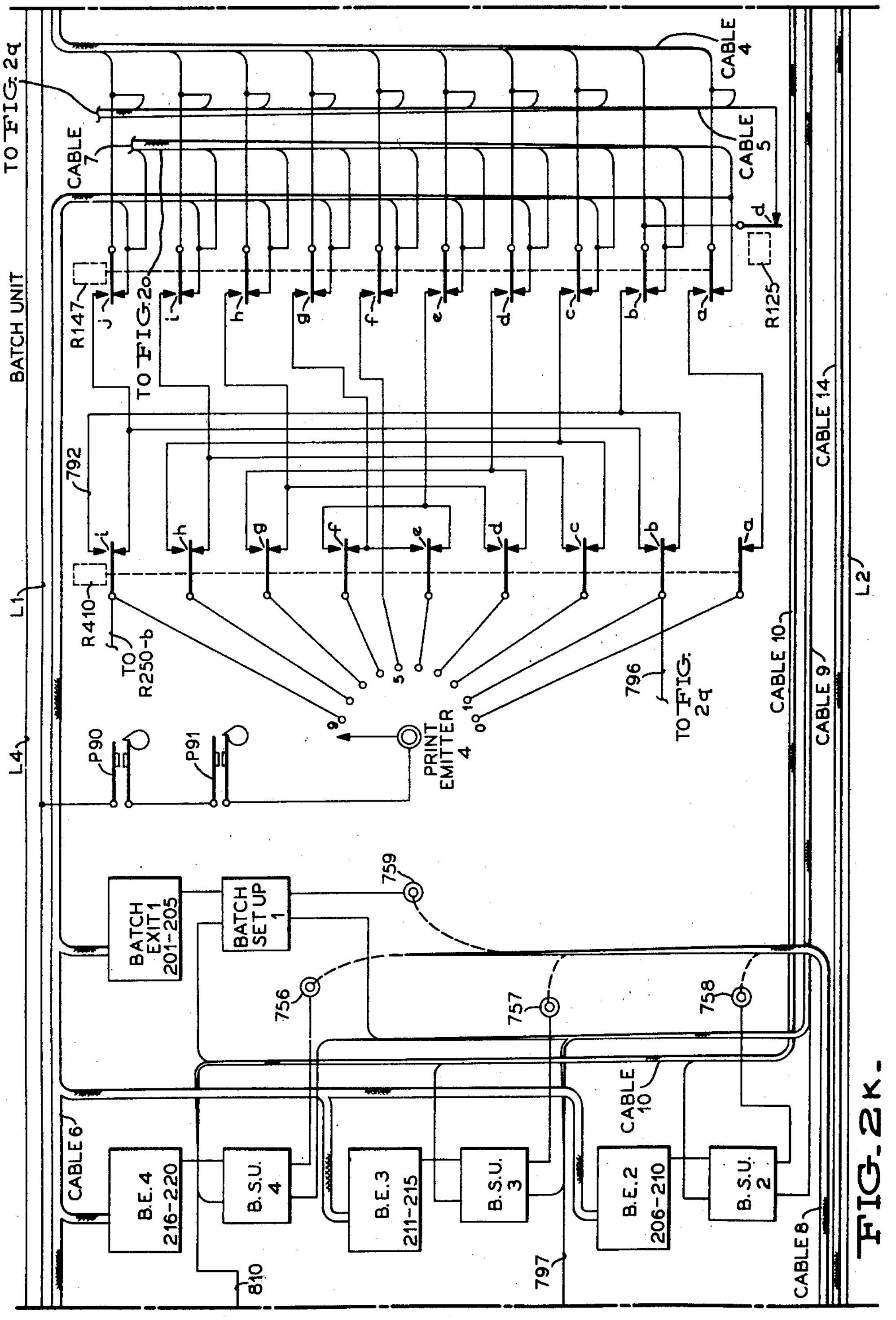
Figure 2M:
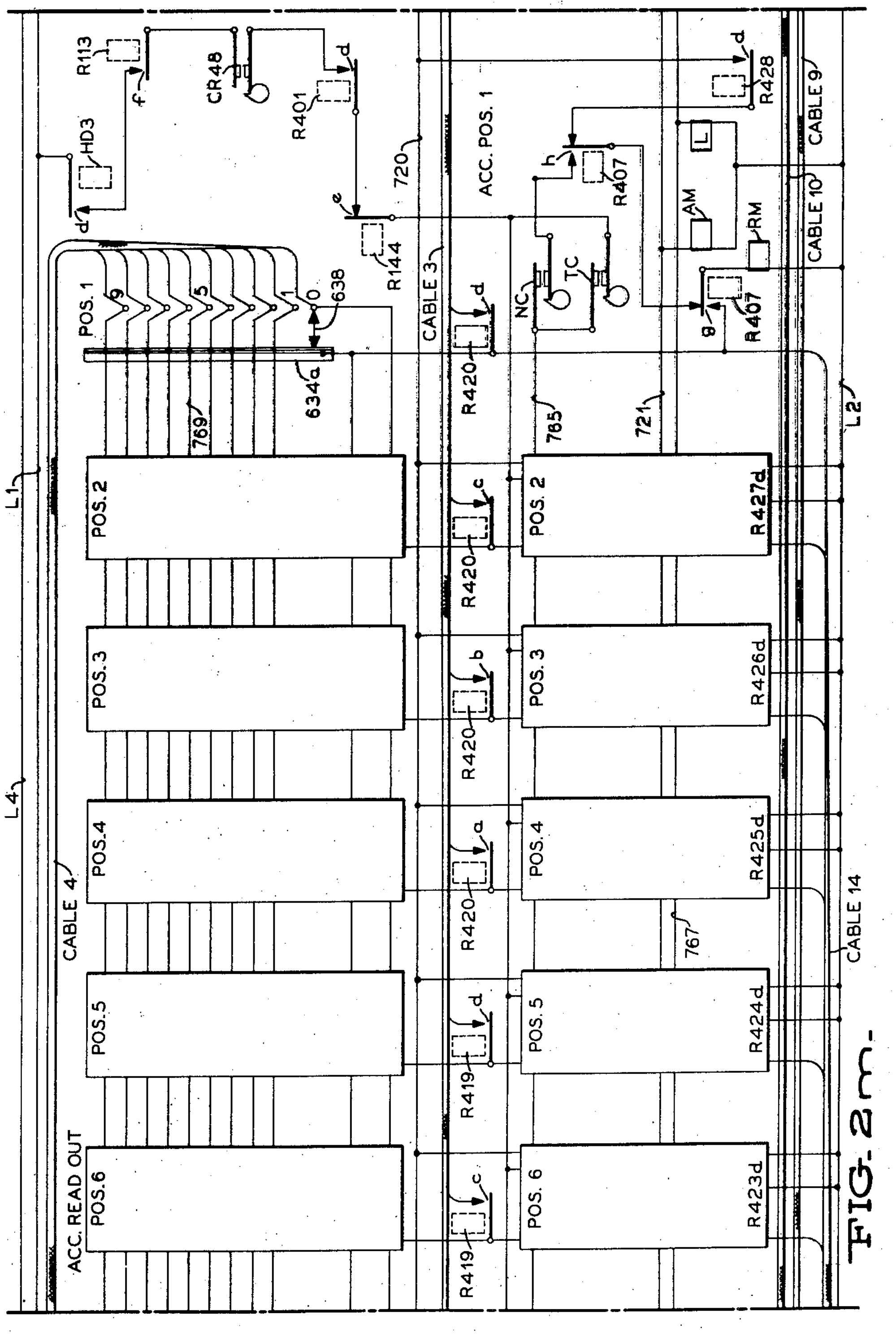

Referring to FIG. 2*h*, the tape entry position TE1 comprises relays 1A, 1B, 1C, 1D and 1E. Each relay is connected to an associated gas tube shown in block form, five or which are identified, namely as 1AA, 1BB, 1CC, 1DD and 1EE.

The particular gas tube employed has a cathode, two control grids, and a plate. The details of this tube may be seen from the detailed drawing shown in FIG. 14. Returning to FIG. 2*h*, particularly to the gas tube identified as 1EE, the plate 3 thereof is connected to a wire 711, control grid 1 is connected to wire 712, while control grid 2 is connected to wire 713. Firing of the gas tube is effected when there is a coincidence of positive pulses on both the control grids. The number 2 control grids of all five tubes are connected through a cable 1 to emitters 1 and 2 shown in FIG. 2*g*. Said emitters are both connected to a wire 714 in turn connected to cam contacts CR70, CR68 to the line L4. The emitter segments 0 through 9 are connected in such a manner as to cause 2 out of the 5 relays to be energized for the repesentation of the digit values 0 through 9.

Again referring to FIG. 2*h*, the control grid 1 of each of the five tubes in tape entry position TE1 are connected to a common line in turn connected to a transfer blade of contacts R247*b*, the top blade of which has a normally closed connection to a tape entry socket TE1, while a lower blade of this contact R247*b* has a normally open connection to a tape entry socket TTE1 (total tape entry 1). Connections to the latter socket are established during total taking operations to permit entry of data identified with tape totals. With each tape entry position there are associated two such tape entry hubs. In the particular application concerned with the present invention, thirty-two positions of tape entry are made by way of sockets TE1 through TE32 for each card check cycle while only nineteen positions of entry are made on total taking cycle by way of the tape entry positions TTE1 through TTE19.

A typical circuit path for the entry of data, during a card check cycle, into the buffer is traceable from line L4, FIG. 2*g*, through cam contacts CR68, cam contacts CR70, wire 714, relay R172*c* n/c contacts, relay R162*d* n/o contacts, relay R102*d* n/o contacts, common brush 715, contact rolls CR, data perforations in the card check (not shown), SECOND READ BRUSHES, cable 2, second read brush socket 2R9 (FIG. 2*i*), plug wire, tape entry socket TE3, relay R293*b* n/c contacts, control grids number 1 of gas tubes 3AA through 3EE. Accordingly, in the manner explained, two of the relays 3A through 3E are energized to store in the buffer the particular digit value sensed in the card check, which digit value will be transcribed in binary form and written on tape.

In accordance with an abbreviated showing of the control panel as seen in FIG. 15, the check amount is sensed by the second read brush positions 2R1 through 2R8 and entered in the buffer by way of positions TE15 through TE22. By means of an internal relay network, to be described, the check amount is simultaneously stored for subsequent entry into an 8-position accumulator depending upon whether the check amount is correctly written on the magnetic tape.

The internal relay network, hereinafter known as ACCUMULATOR STORAGE (A.S.), comprises a set of five relays, A, B, C, D, E for each of eight positions of relay accumulator storage. To avoid unnecessary duplication of circuitry, a representative number of relays for positions 1 and 8 are only shown in FIGS. 2*r* and 2*s*. The relays for the remaining positions may be ascertained from the following chart which shows the various relays associated with eight positions of relay accumulator storage.

| Accumulator Position | Accumulator Storage Relays | | | | |
|---|---|---|---|---|---|
| | A | B | C | D | E |
| 1 | 83 | 85 | 86 | 88 | 89 |
| 2 | 76 | 77 | 79 | 80 | 82 |
| 3 | 68 | 70 | 71 | 73 | 74 |
| 4 | 61 | 62 | 64 | 65 | 67 |
| 5 | 53 | 55 | 56 | 58 | 59 |
| 6 | 46 | 47 | 49 | 50 | 52 |
| 7 | 38 | 40 | 41 | 43 | 44 |
| 8 | 33 | 34 | 35 | 36 | 37 |

The accumulator relay storage network is arranged in such a way that for the representation of digits 2 through 9 the B, C, D, E relays are energized. To represent the digit 1, the A relay will be energized in a manner to be described. The B, C, D, E relays for positions 1 and 8 are shown in FIG. 2*s*. Here position 1 comprises relays R85B, R86C, R88D and R89E energized under the control of relay contacts in the buffer unit, which contacts are identified as R22B*e*, R22C*e*, R22D*e*, R22E*e*, in FIG. 2*s*. In like manner, position 8 is comprised of relays R34B, R35C, R36D, R37E, energized respectively by buffer unit contacts, namely, R15B*e*, R15C*e*, R15D*e*, R15E*e*, in FIG. 2*s*. The above network is wired to relay R107*i* n/o contacts, an accumulator control relay R401*a* n/o contacts, cam contacts CR36 to line L1. Each of the above accumulator storage relays is provided with a holding relay, a few of which are shown, namely, R34B, R35C, R36D, R37E, R89E. These hold relays are under the control of cam contacts CR35 connected to line L1.

The A relays of the accumulator storage positions 1 through 8, as seen in the above chart, comprises the following relays: R33A, R38A, R46A, R53A, R61A, R68A, R76A and R83A. Of these only relays R33A and R83A are shown wired in FIG. 2*r*, which relays are energized only when the associated B accumulator storage relays are energized. A typical pickup circuit for the energization of an A relay is traceable through relay R83A, R85B*e* n/o contacts, R86C*e* n/c contacts, R88D*d* n/c contacts, R89E*d* n/c contacts, cam contacts CR29 to line L1. The A relay provides for the storage of the digit value 1. The A relay network provides in effect a secondary storage network for the digit value 1. This arrangement is necessary because of design considerations and the lack of sufficient machine time.

While the check amount is being stored in the above relay network, the same check amount is being transcribed in coded form on magnetic tape. The tape unit provides an appropriate signal to the card reader when it has been determined that the record data has been correctly transcribed on tape, in which event the amount in the relay accumulator storage network is transferred to eight positions of the 12-position accumulator shown in FIGS. 2*l* and 2*m*. The relay accumulator storage is provided with a readout network, shown in FIG. 2*s*, wherein is shown the details only for readout position 1, the circuits therefor being enclosed in a rectangle identified as ACCUMULATOR STORAGE 1. The circuits for position 1 include the contacts associated with the following relays: R83A, R85B, R86C, R88D, R89E. The left side of this relay network includes ten digit lines connected to EMITTER 6 fed by means of cam contacts CR38 and CR37. The right side of this network is connected to an accumulator control relay R428. The latter is energized in the machine cycle at a precise time interval which is governed by the digit values stored in the accumulator storage relays for position 1. When the relay R428 becomes energized, associated contacts permit the required number of pulses to enter the accumulator magnets RM an appropriate number of times whereby the digit value is entered into the accumulator. The readout networks for the remaining relay accumulator storage positions 2 through 8 are shown in block form with appropriate identification. These positions 2 through 8 control the energization of associated accumulator control relays R427 through R421, the operation of which control the entry of an appropriate number of pulses to the accumulator magnets RM in the appropriate orders of the accumulator positions 2 through 8 to cause entry of digit values therein.

As it was earlier mentioned in the description of the accumulator, the transmission of a succession of pairs of alternating impulses to the accumulator magnets RM and AM causes the entry of a digit value into the accumulator. The RM and AM accumulator magnets, as well as other accumulator components, are shown wired in a circuit network enclosed in a block identified as Acc. Pos. 8 in FIG. 2*l*. In like manner, circuit details for Acc. Pos. 1 are shown in FIG. 2*m*. The accumulator positions for Pos. 2 through Pos. 6 are shown in block form. Accumulator positions Pos. 9 through Pos. 12 have no entry control and therefore are provided solely for spillover capacity for the accumulator.

Returning to Acc. Pos. 1, FIG. 2*m*, entry of say a digit 9 value is effected upon energization of accumulator control relay R428. Upon closure of relay R428*d* contacts, nine pulses accordingly energize the Pos. 1 RM magnet, the Pos. 1 AM magnets being energized in a manner to be described. A typical circuit path for energizing an RM magnet is traceable through line L1, FIG. 2*n*, HD3*a* n/o contacts, relay R107*j* n/o contacts, cam contact CR44, relay R178*d* n/o contacts, relay R401*b* n/o contacts, wire 720, relay R428*d* n/o contacts, relay R407*h* n/c contacts, relay R407*g* n/c contacts, Pos. 1 RM magnet to the line L2.

Figure 2N:
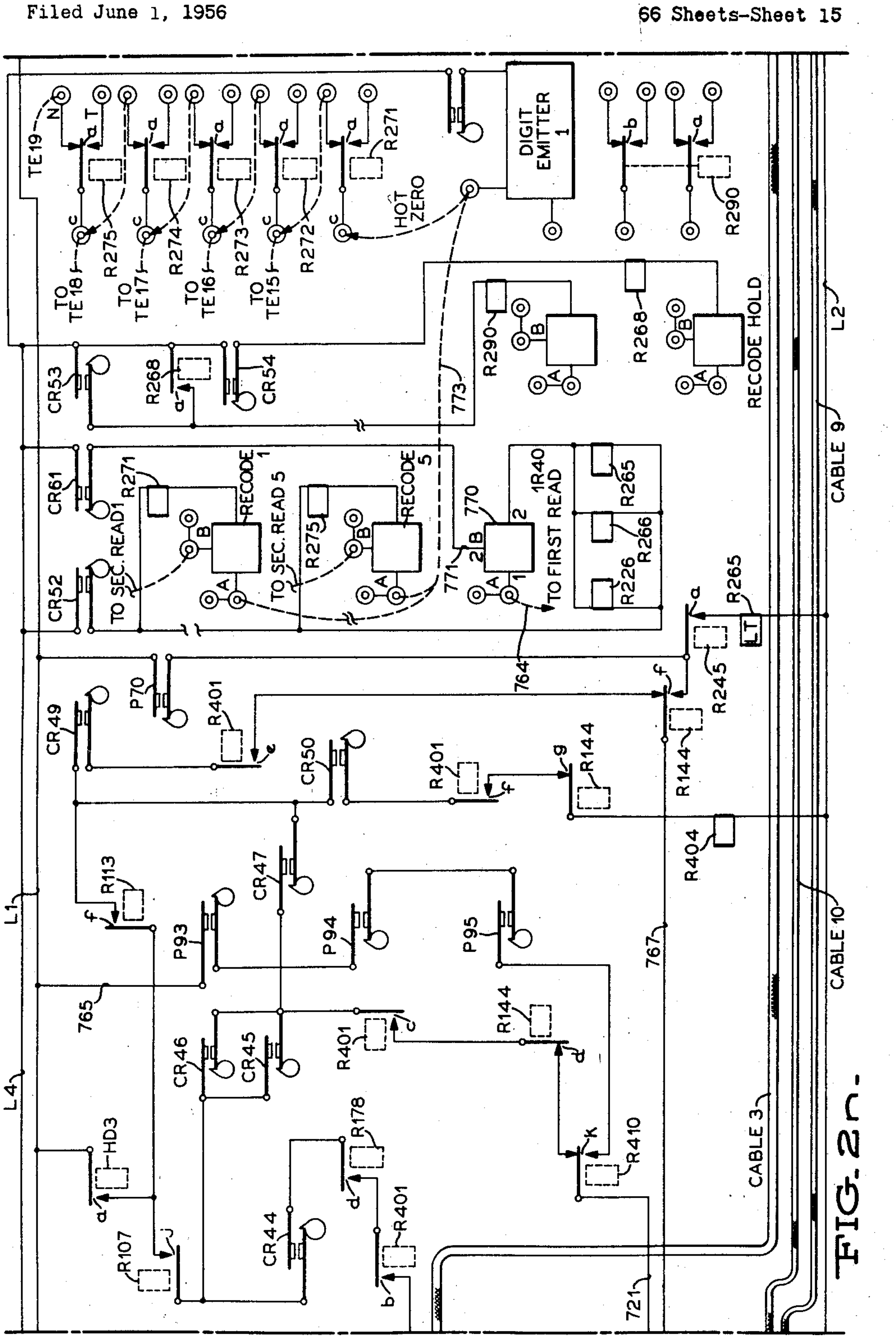
Figure 2O:
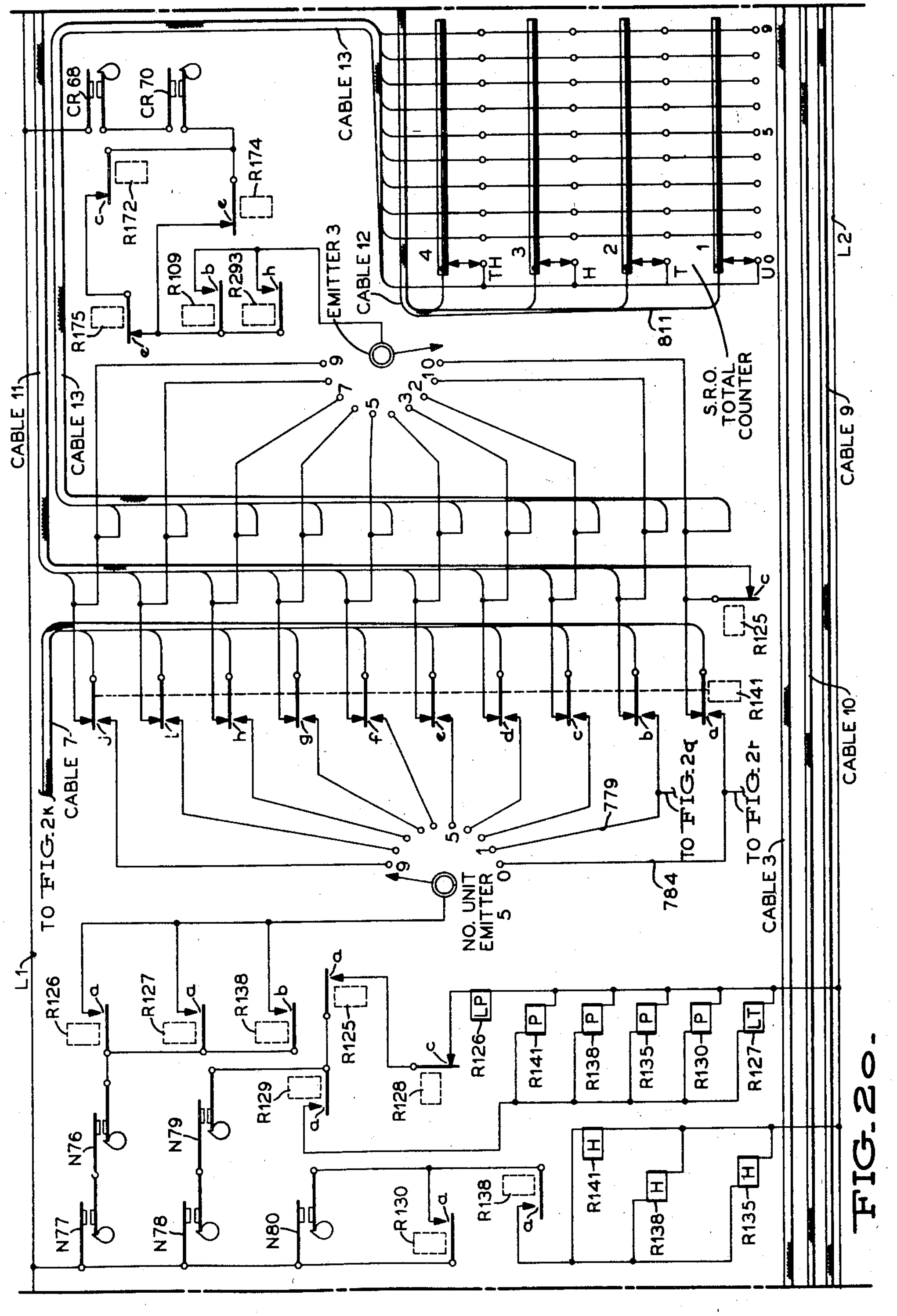
Figure 2P:
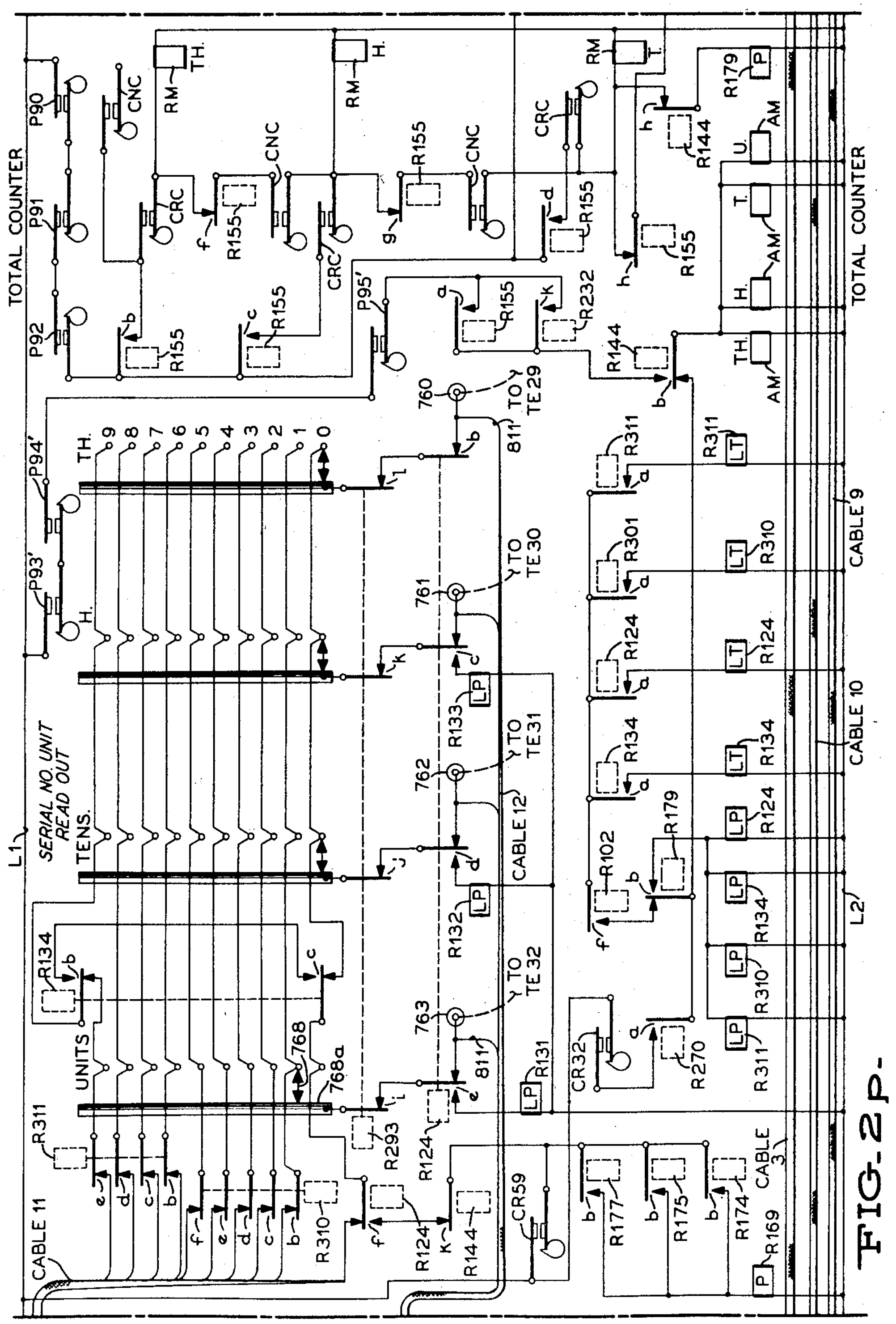

A circuit path for energizing the Pos. 1 AM magnet is traceable through line L1, FIG. 2*n*, HD3*a* n/o contacts, relay R107*j* n/o contacts, cam contacts CR46 and CR45 both wired in parallel, relay R401*c* n/o contacts, R155*d* n/c contacts, relay R410*k* n/c contacts, wire 721, Pos. 1 AM magnet to line L2.

Carry operations of the accumulator are performed in the well-known manner under control of the 10's contact TC. When the latter is closed, a carry into the next higher order position of the accumulator is effected at carry time of the cycle. The carry operation is performed by energizing the RM magnet with a carry pulse and immediately thereafter energizing the AM magnet with a pulse also applied at carry time of the machine cycle. An exemplary circuit path for energizing the RM magnet proceeds through the line L1, FIG. 2*m*, relay HD3*d* n/o contacts, R113*f* n/o contacts, cam contacts CR48, R401*d* n/o contacts, R144*e* n/c contacts, 10's contact TC, wire 765, and now skipping over to contacts R404*a* n/o contacts, shown in FIG. 21, the circuit continues through the latter contacts, R407*e* n/c contacts, the RM magnet, to the line L2. In the above and in the circuit to follow, it must be assumed that the accumulator Pos. 8 is the next higher order position to accumulator Pos. 1. This assumption is necessary owing to the diagrammatic showing of accumulator Pos. 2.

The circuit to energize the AM magnet is by means of a path extending from line L1, FIG. 2*n*, relay HD3*a* n/o contacts, R113*f* n/o contacts, cam contacts CR47, R401*c* n/o contacts, R410*k* n/c contacts, wire 721, and now again skipping over to and through the AM magnet, in FIG. 21, to line L2.

Assuming that a nine value is registered in the accumulator Pos. 8 under the condition just described, a carry is then effected not only in accumulator Pos. 8 but accumulator Pos. 9 as well because of the parallel manner in which the 9's contact NC is connected to the wire 765, the latter providing the carry impulses in the manner described. It might be observed that for Pos. 9, 10 and 11 only the 9's contacts for these particular positions are wired in the circuitry to provide for carry operations.

The contacts of each accumulator order position are restored upon energization of an associated latch magnet L. A typical circuit is traceable through line L1 (FIG. 2*n*), relay HD3*a* n/o contacts, R113*f* n/o contacts, cam contacts CR49, R401*e* n/o contacts, R144*f* n/c contacts, wire 767 through all accumulator latch magnets L to line L2.

Provision is made for supplying zeroes to the buffer to the left of the highest significant order position of the amount in those instances where the amount is less than the number of positions allotted therefor in the amount field in the record check and wherein these positions are blank. The corresponding positions in the buffer will be supplied with zeroes in order to prevent the appearance of blank column areas on the written tape. To this end a zero circuit is provided which will supply a zero to the particular positions in question in the amount section of the buffer.

*Zero control circuit*

Referring to the control panel in FIG. 15, the zero control circuit includes five RECODE SELECTORS, each provided with a pair of pickup sockets A and B. The recode selector is described in detail in the aforementioned Lake et al. Patent No. 2,615,569. Briefly, a recode selector comprises mainly a relay means having a plurality of transfer type contacts which terminate at sockets located on the control panel of the machine. These sockets are appropriately identified as T, N and C. When both the pickup sockets A and B of the recode selector are simultaneously energized, the recode selector becomes operative to provide connections between the associated T and C sockets. When the recode selector is inoperative, connections are established between the associated N and C sockets. The zero pulse is supplied by way of a plug wire 722, one end of which is plugged to a zero socket forming a part of digit emitter 1. The other end of the plug wire 722 is plugged to the C socket of RECODE SELECTOR 1. The zero circuit extends internally through the transfer contacts of the recode selector 1 and emerges from the associated N socket. From the latter the circuit extends through a plug wire 723 to the C socket of RECODE SELECTOR 2. A split wire portion 723*a* is plugged to tape entry position TE15. The zero pulse is capable of entering the tape entry positions TE16 through TE19 of the buffer under control of plug wires 724, 724*a*, 725, 725*a*, 726, 726*a* and 727. When the RECODE SELECTORS are inoperative, the zero circuit accordingly extends simultaneously to all the tape entry positions TE15 through TE19. As mentioned above, each RECODE SELECTOR is provided with two pickup sockets A and B. In the example at hand, the B sockets of these five RECODE SELECTORS are plugged to the amount field second read positions 1 through 5 by means of plug wires 728 through 732, respectively. The corresponding A sockets of these five recode selectors are connected in common to a plug wire 733 connected to digit emitter 1 which supplies the plug wire 733 with machine timed pulses 1 through 9. In accordance with the values sensed by the second read positions 1 through 5, the status of the five RECODE SELECTORS will be accordingly adjusted to supply a zero to appropriate ones of the tape entry positions TE15 through TE19.

The foregoing explains the entry of the amount into buffer positions TE15 through TE22 and into the relay accumulator storage positions 1 through 8 as well as the readout of the amount from the relay accumulator storage into eight positions of the 12-position accumulator.

Next to be considered is the manner in which entry of data representing Transaction Code (T.C.) is made into the buffer. The T.C. data is plugged in the manner shown in FIG. 15 to supply a zero and a 1, derived from digit emitter 2, to tape entry positions 1 and 2 by means of plug wires 734 and 735. Since this code is exemplary, it is understood that any digit value may be plugged from the digit emitter and entered into desired positions of the buffer. Referring again to the control diagram in FIG. 15, the next entry to be considered concerns entry of the Disbursing Office (D.O.) number from second read positions WR9 through 2R12 to the tape entry buffer positions TE3 through TE6 by means of plug wires 736 through 739. In the entry of the T.C. data, as well as the D.O. data, the appropriate A, B, C, D, E relays of the buffer are energized on a 2-out-of-5 basis in the manner described.

Check serial number is entered into buffer positions TE7 through TE14 from second read positions 2R13 through 2R20 by means of plug wires 740 through 747.

Batch number is entered into buffer positions TE23 through TE28 by means of plug wires extending from batch exit sockets 754 through 759. The latter sockets provide the buffer with the same batch number for each check associated with a particular batch number. Operations dealing with the entry of the batch number from its appropriate batch header card will be described later on at a more appropriate time. For the present, it is assumed that the batch number is available at the batch exit sockets and therefore provide, during each card cycle, the buffer with the appropriate batch number data.

In like manner, operations dealing with the setup of the serial number for serializing each card check will likewise be deferred until a more appropriate time presents itself. For the present, it is assumed that the serial number exit sockets 760 through 763 provide the buffer positions TE29 through TE32 with an appropriate serial number for each card check associated with a particular batch.

The above tape entry operations are carried out for each card check cycle until a new batch header card is encountered in which event appropriate machine signals are generated to disable feeding of the succeeding card checks and to prepare the card reader for total taking operations after which card check feeding is again enabled. Just prior to the total taking cycles, the tape unit is instructed to write the totals with appropriate identification on tape.

The sensing of the batch header card is effected at the first read station upon the sensing of a 9 perforation by first read position 1R40. The latter has a plug wire connection 764 to a socket designated 9M. During the ensuing total taking cycles, the setup of the batch number and serial number devices will be effected. Next to be considered is an explanation of the above operations beginning with circuits energized upon the sensing of the 9 perforation in the batch header card. For this, reference is invited to FIG. 2*n*.

Here the relays R226, R265 and R266 are energized means of a circuit extending through the line L4, cam contacts CR52, the relays R226, R265 and R266 all wired in parallel to the plate circuit 3 of a gas tube in a box 770. The control grids associated with the gas tube devices 770 are energized as follows. Control grid 1 is energized when the 9 perforation is sensed in the batch header card when the latter is passing through the first read station. This circuit includes the plug wire 764, partly shown, which is plugged to the FIRST READ socket 1R40.

The control grid 2 is connected by means of wire 771 to cam contact CR61 to the line L4. When both grids are concurrently energized, the tube device 770 fires and accordingly energizes the relays R226, R265 and R266. The contacts associated with these relays are distributed throughout the various machine circuits to enable the energization of other circuits to be described. The contacts associated with the relay R226 are employed to energize latch trip relays R201 through R225 and R313 through R317, in FIG. 2*b*, in order to efface the previous batch number setting and to prepare the batch relays for entry of a new batch number. Referring to FIG. 2*b*, the circuit extends from the line L2 and proceeds through the relays R201 through R225 and R313 through R317, relay R226*a* n/o contacts, and cam contacts CR39, relay HD3*b* n/o contacts to the line L1.

During the cycle in which the batch header card passes through the second read station, the batch number is sensed by second read positions 2R21 through 2R26 and entered into batch entry positions BE1 through BE6 by means of plug wires 772 through 777.

Each position of batch entry storage is provided with a set of five relays, A, B, C, D, E, numbered in accordance with the batch entry relay chart shown below.

BATCH ENTRY RELAYS

| Position | A | B | C | D | E |
|---|---|---|---|---|---|
| 1 | 201 | 202 | 203 | 204 | 205 |
| 2 | 206 | 207 | 208 | 209 | 210 |
| 3 | 211 | 212 | 213 | 214 | 215 |
| 4 | 216 | 217 | 218 | 219 | 220 |
| 5 | 221 | 222 | 223 | 224 | 225 |
| 6 | 313 | 314 | 315 | 316 | 317 |

The manner of energizing the batch relays is similar to that described for the buffer unit relays in that each is energized upon the firing of an associated gas tube. As seen in FIG. 2*h* for batch position 1, five tubes are shown in block form and referenced 800 through 804, respectively. Control grids 1 of each of these gas tubes are connected to a common line wired to a relay **R227*b* n/o contacts in turn connected to the batch entry sockets BE1. The control grid 2 of each of these gas tubes are connected to cable 1 which, as earlier explained, is wired to the EMITTERS 1 and 2** shown in FIG. 2*g*.

The batch number is thus stored and on one of the ensuing total taking cycles will be transmitted to the batch numbering unit in a manner to be described. Now to be considered is the initiation of a series of total taking cycles during which card feeding is suspended, the writing of tape totals is effected, batch number is entered and the serial numbering unit and batch numbering unit are zeroized in preparation for printing on the next batch of card checks.

*Total taking cycle operations*

Referring to FIG. 2*b*, the print control relay R151 is energized by means of a path beginning with the line L2, relay R151, **R269*b* n/c contacts, R112*d* n/c contacts, R98*b* n/c contacts, R106*b* n/c contacts, R107*d* n/c contacts, R152*a* n/o contacts, R265*b* n/o contacts, R121*c* n/o contacts, to the line L3. The print control relay R151 remains energized until a clutch dropout relay R161 is picked up to terminate the total taking operations in a manner to be later explained. Upon closure of R151*b*** contacts (FIG. 2*b*), a circuit is established to provide a path to maintain relay R122 energized. Upon closure of **R122*b* contacts, a path is accordingly established to energize the MS1 relay to keep the motor running during total taking cycles. Upon closure of relay R151*a* contacts and cam contacts CR125, a path is established to energize relays R144 and R147 and the print clutch magnet. Upon closure of relay R144*a*** contacts, a hold circuit is established for the above relays and the print clutch.

Figure 2Q:
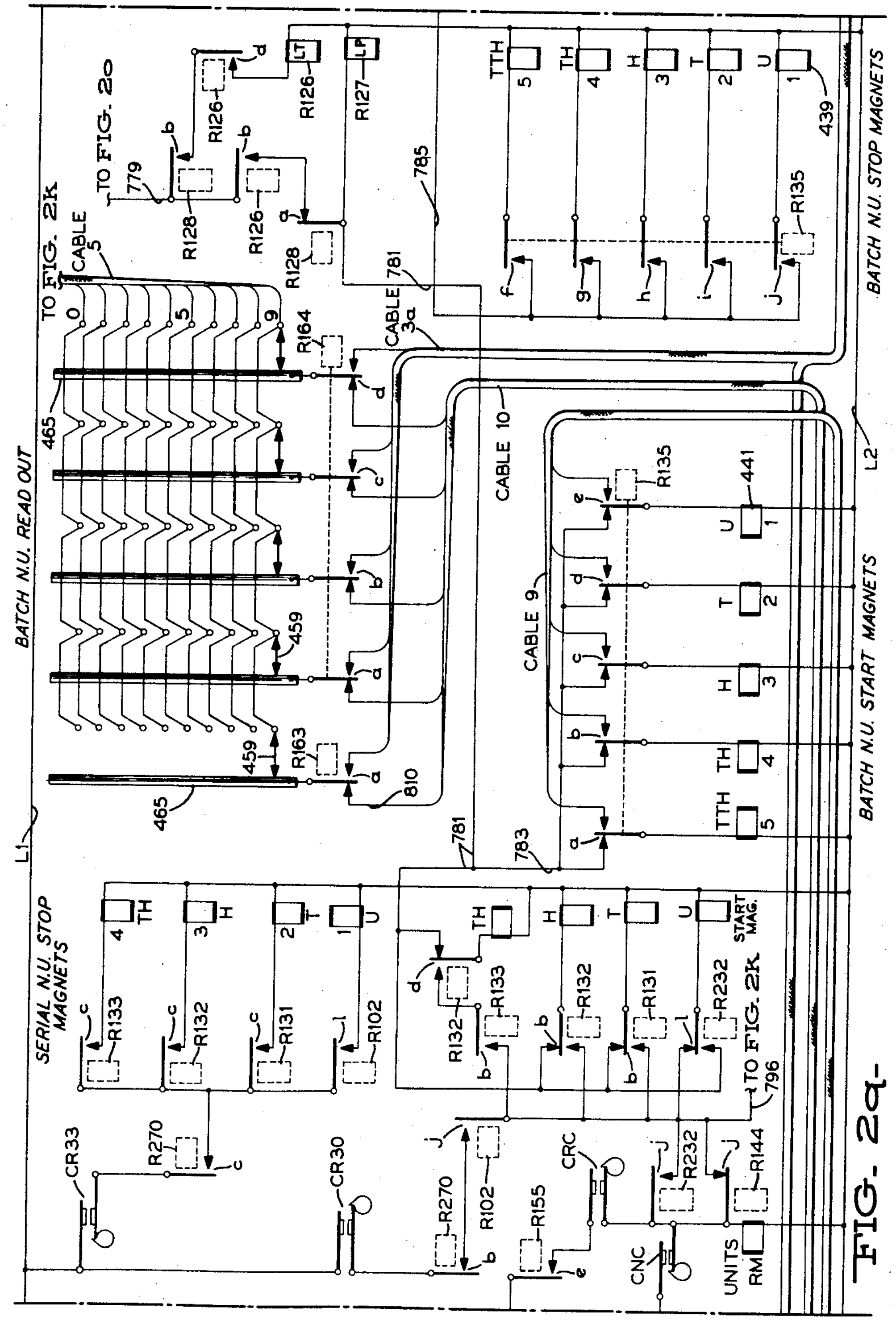
Figure 2R:
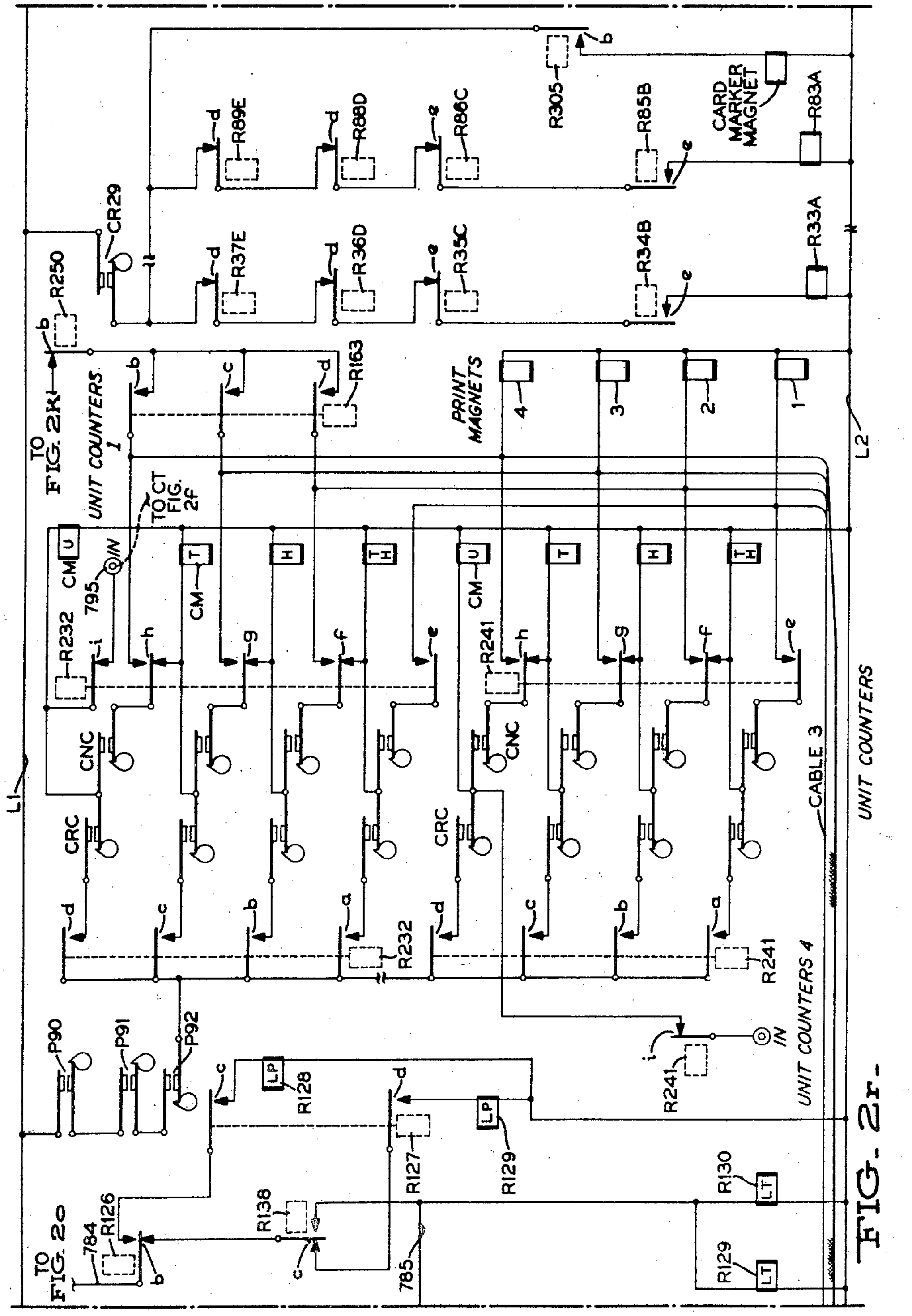
Figure 2S:
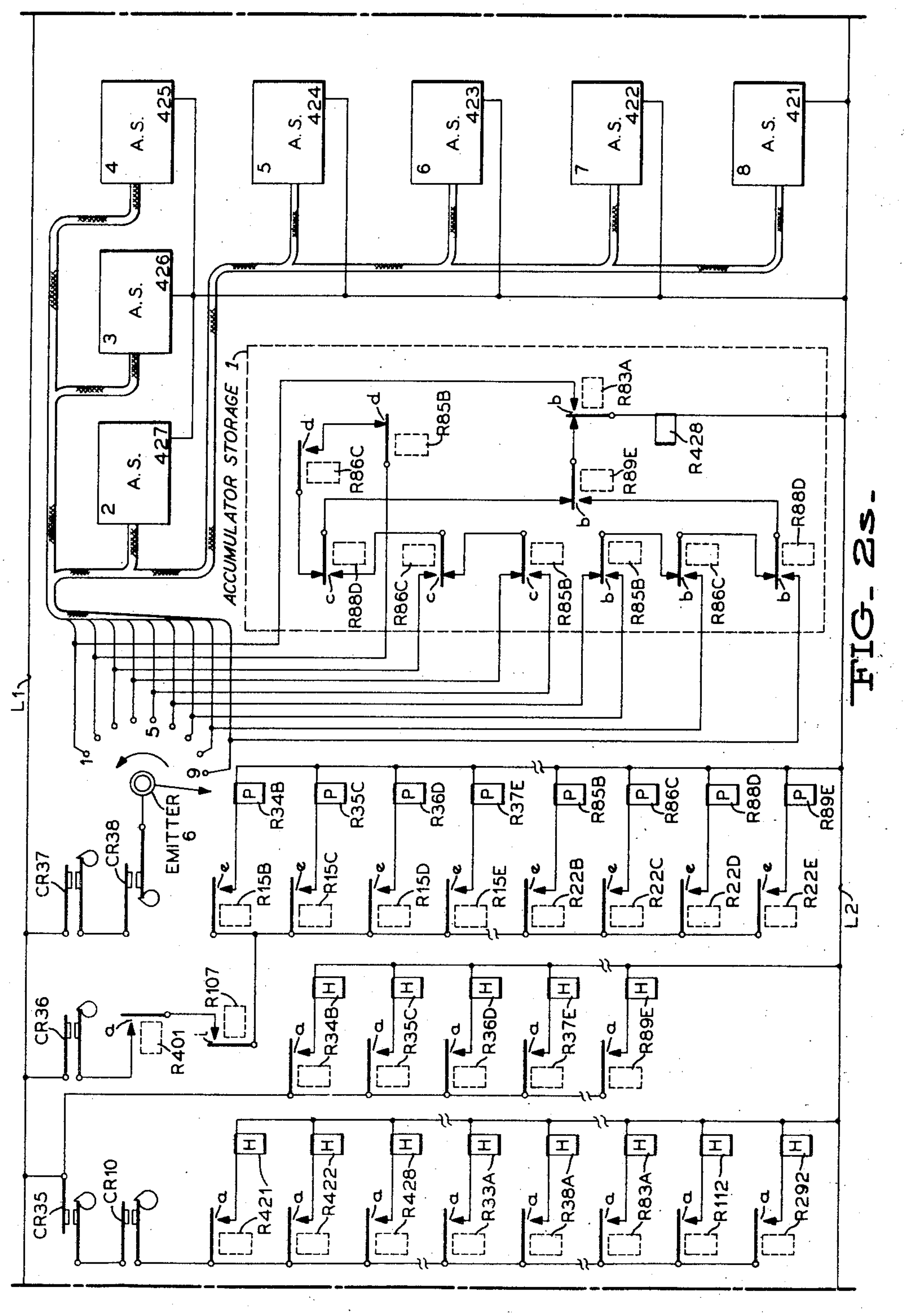
Figure 2T:
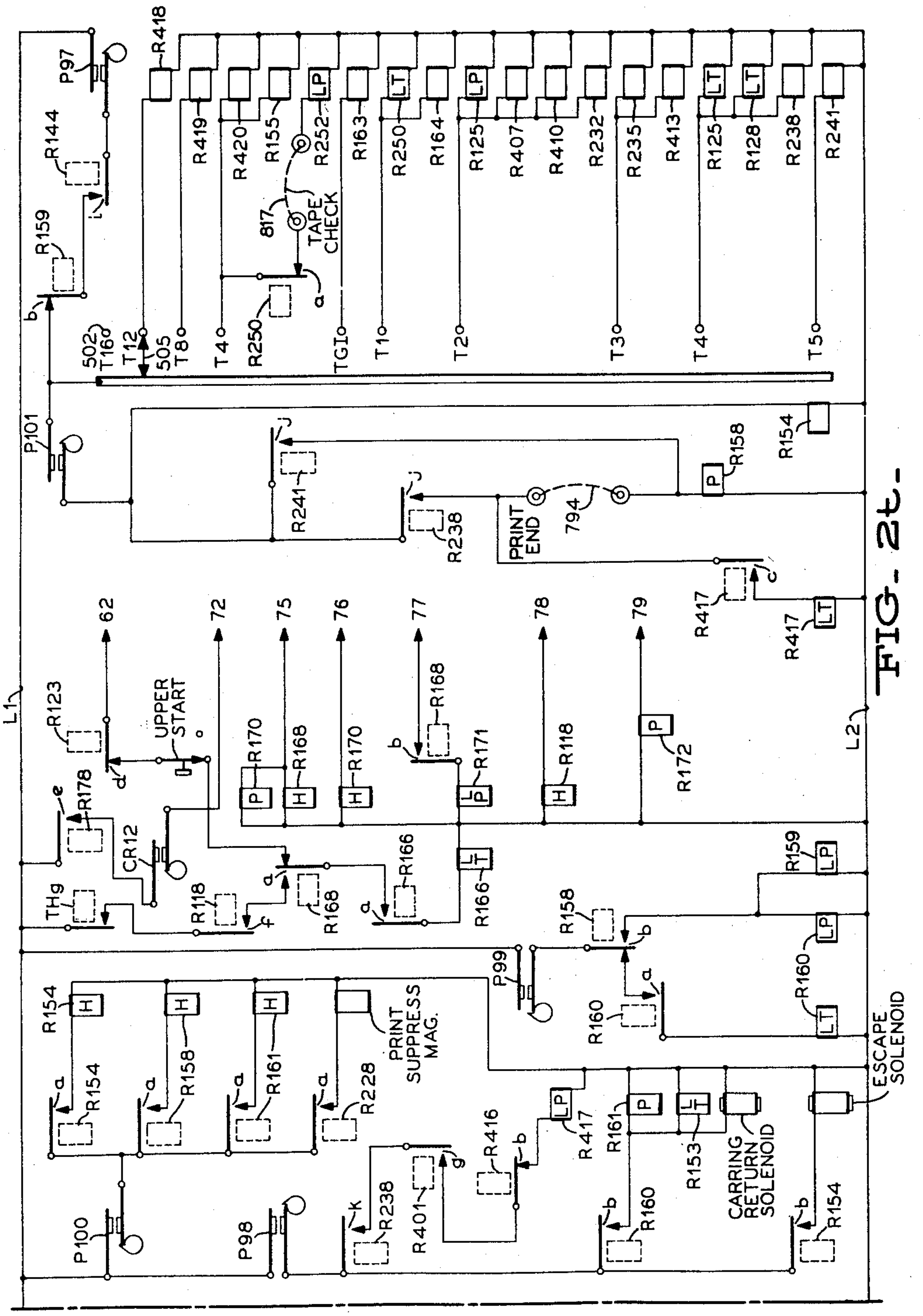

Spacing of the platen is under control of print cam contacts P101 to energize relay R154 shown in FIG. 2*t*. Print cam contacts P100 along with relay **R154*a* contacts provide a hold circuit for the relay R154H**.

Energization of the escape solenoid ES (FIG. 2*t*) for each total printing cycle is effected upon the closure of relay **R154*b* contacts and print cam contacts P98 to cause the carriage to be shifted horizontally. After the carriage has shifted, the wiper assembly 505** (FIG. 2*t*) makes contact with an appropriate insert 502 which initiates the printing of the accumulator positions 12 through 9. Each succeeding total printing cycle is effected under control of print cam contacts P98 and **R154*b* contacts. On the ensuing total taking cycles, the carriage is shifted laterally, in the manner described, to cause the wiper assembly 505 to make contact successively with the inserts 502** representing respectively positions 8, 4, G.I., 1 through 5. These insert positions provide circuit paths to various relays to be presently described.

When the wiper 505 makes contact with insert 502, T12, relay R418 is energized to close associated contacts *a*, *b*, *c*, *d* located in the accumulator readout circuits shown in FIG. 21. When this occurs, the accumulator positions 12 through 9 are connected with the four print magnets positions 4 through 1, respectively. The print magnets, as earlier explained, control the positioning of associated type print bars to print the values read out from the accumulator order positions 12 through 9.

A typical accumulator readout circuit to the print magnet, assuming that a digit 5 is to be read out and printed, is traceable beginning with line L1 (FIG. 2*k*) through print cam contacts P90 and P91, PRINT EMITTER 4, through segment 5 thereof, **R147*f* n/o contacts, cable 4, accumulator readout segment 5, wire 769** (FIGS. 2*m* and 21), wiper 638, readout segment **634*a*, R418*a*, cable 3, PRINT MAGNET 4**, FIG. 2*r*, to the line L2. Similar circuits for each of the accumulator order positions are effected during the sweep of the print emitter 4 to cause energization of the remaining print magnets 32 and 1 to cause printing from the succeeding order positions of the accumulator positions 11, 10 and 9.

On the next shift of the carriage, the wiper 505 (FIG. 2*t*) makes contact with insert 502, T8, to energize relay R419 to cause associated contacts *a*, *b*, *c*, *d* to close thereby causing accumulator order positions 8 through 5, respectively, to read out and print in the four print magnets, positions 4 through 1, respectively, by means of circuit paths similar to those just described.

On the next total print cycle after the carriage shifts to insert 502, T4, relays R420, R155 (and R252) are energized, in FIG. 2*t*. Associated contacts *a*, *b*, *c*, *d* of the relay R420 close to cause readout from accumulator order positions 4 through 1. The relay R155 establishes the necessary circuits for the resetting of the total counter. The relay R252 provides for stopping machine operations in the event of a tape total writing error.

When the relay R252LP is energized under the conditions set forth, the **R252*b*** contacts, in FIG. 2*a*, open to prevent energization of the start relay R117LP after completion of the total taking operations. At the same time, relay **R252*a* contacts close to energize the TAPE TOTAL light. The relay R252LP is de-energized upon depression of the RESTORE key which causes relay R252LT** to be energized.

Referring to FIG. 2*e*, a tape OK relay R178 picks up whenever an OK signal is issued by the tape unit, which signal is sent from the tape unit by way of SYNC connector 71. Accordingly, relay **R178*c*** contacts, in FIG. 2*g*, close to provide a path to energize tape error relay R250. This path follows through relay R250LP, **R265*e* n/o contacts, R107*e* n/c contacts, R178*c* contacts now closed, R107*l* n/c contacts, cam contacts CR30 to the line L1. Under a tape OK condition, the relay R250 picks up and thus prevents energization of the relay R252 upon opening of the relay R250*a*** contacts shown in FIG. 2*t*. On the other hand, an error condition in the tape unit would not permit energization of the relay R250. This would then lead to the energization of the relay R252 during the third total taking cycle.

Just after sensing the 9M master card by the card reader and before total taking cycles are initiated in consequence thereof, the accumulator totals as well as batch number and transaction code are entered into the buffer by way of the tape total entry sockets TTE1 through TTE19. Referring to the control panel wiring in FIG. 15, the entry of the accumulator totals to the tape total entry positions TTE8 through TTE19 are effected by way of plug wire connections 838 through 849. Batch number is entered into positions TTE3 through TTE7 by way of plug wire connections 749 through 753, the batch number coming from the batch exit positions 755 through 759. The transaction code is directed from DIGIT EMITTER 3 to TTE1 and TTE2 by way of a split wire connection. The tape unit, in a manner to be described, extracts this data from the buffer and transcribes the same on magnetic tape. These operations will be described at a more appropriate time.

In total printing cycle 4, when the G.I. insert is energized by means of the wiper 505, the batch print number 1 control relay R163 is energized to cause printing of the fifth position of the batch number under control of relay R163*a* contacts, FIG. 2*q*, on the register sheet by means of the print bar number 1, the remaining three printing bars being inoperative on this cycle. However, should the record on tape prove to be incorrectly written, appropriate circuits are accordingly set up to cause these three print bars to print three 9's, which 9's are indicative of totals incorrectly written on the tape, which totals are erased on the subsequent operation. The circuit for printing a value, for example a 5, in this cycle extend through the line L1, in FIG. 2*k*, cam contacts P90 and P91, PRINT EMITTER 4, segment 5, R147*f* n/o contacts, cable 5 to FIG. 2*q*, 5 spot, wiper 459, readout segment 465, relay R163*a* n/o contacts, cable 3*a*, cable 3, PRINT MAGNET 1, in FIG. 2*r*, to the line L2. The circuit for printing a 9 in printing positions 2, 3 and 4 in this same cycle in the event of a tape total error traces through the PRINT EMITTER segment 9, FIG. 2*k*, relay R410 center blade as a terminal, then through relay R250*b* n/c contacts, in FIG. 2*r*, through *b*, *c* and *d* contacts of relay R163, PRINT MAGNETS 4, 3 and 2 to the line L2.

On the following total cycle, the first four positions of the batch number are printed when relay R164 is energized by means of the wiper 505 coming in contact with insert 502, T1. The associated contacts *a*, *b*, *c*, *d* of said relay R164 are located in the batch numbering unit readout circuits, in FIG. 2*q*, and accordingly close to effect readout of the four positions of the batch number. A typical readout circuit from the batch numbering unit readout, shown in FIG. 2*q*, is traceable beginning with the line L1, FIG. 2*k*, through print cam contacts P90 and P91, PRINT EMITTER 4, assuming a value 5 is to be read out, the circuit then proceeds through segment 5 of said emitter, relay R147 n/o contacts, cable 5 to FIG. 2*q*, 5 spot, wiper 459, readout segment 465, relay R164*d* n/o contacts, cable 3*a*, cable 3 to the appropriate print magnet, in FIG. 2*r*. It may be noted that relay R250LT is energized in this cycle. This relay is concerned with tape checking functions previously described.

In the sixth total print cycle, relays R125LP, R407, R410 and R232 are energized. The relay R125 sets up circuitry for resetting the numbering unit while the relays R407 and R410 are concerned with the resetting of the 12-position accumulator. The relay R232 is concerned with printing and resetting operations of units counter 1. The operation of units counter 1 as well as units counters 2 and 3, which operate on subsequent total cycles, will be described following the last total taking cycle. Taking up the operations of relay R125 first, reference is invited to FIG. 2*o*, where upon closure of relay R125*a* contacts in conjunction with numbering unit cam contacts N78 and N79, a circuit path is established to the latch pick relay R126LP. Following the pickup of this relay at "one" time of the NO. (numbering) UNIT EMITTER, a circuit path is established to latch pick relay R127 as follows. Beginning with the line L1, the path extends through numbering unit cam contacts N77 and N76, R126*a* n/o contacts, NO. UNIT EMITTER, 1 spot thereof, wire 779, and now referring to FIG 2*q*, the circuit proceeds through relay R126*b* n/o contacts, R128*a* n/c contacts, through latch pick relay R127LP to the line L2. Simultaneously, the circuit path branches off along wires 781 and 783 to energize the batch numbering unit start magnets positions 1 through 5 by way of the normally closed contacts *a*, *b*, *c*, *d*, *e* associated with relay R135. Upon the energization of each start magnet, the numbering unit wheels and associated print wheels 425 begin to rotate until the wheels are stopped mechanically at zero time. Following this, the next occurrence of a zero pulse causes the latch pickup of relay R128LP which sets up appropriate circuitry for terminating resetting operations of the numbering unit. The circuit to energize R128 extends from the zero spot on the NO. UNIT EMITTER, in FIG. 2*o*, and proceeds along wire 784 to FIG. 2*r*, then by way of relay R126*b* n/o contacts, R127*c* n/o contacts, latch pick relay R128LP to the line L2. The opening of relay R128*a* contacts prevent a second reset operation of the numbering unit.

Upon the next occurrence of a "one" pulse through the NO. UNIT EMITTER, a circuit path is established to latch trip relay R126LT as follows. Referring to FIG. 2*o*, the circuit extends through the NO. UNIT EMITTER along wire 779 to FIG. 2*q* then through relay R128*b* n/o contacts, R126*d* n/o contacts, latch trip relay R126LT to the line L2. The next "zero" pulse emitted from the NO. UNIT EMITTER causes the latch pickup of relay R129LP by means of a path extending through wire 784 in FIG. 2*o*, R126*b* n/c contacts, in FIG. 2*r*, R138*c* n/c contacts, R127*d* n/o contacts, latch pick relay R129LP to the line L2. Upon closure of relay R129*a* n/o contacts (FIG. 2*o*), the next index pulse through numbering unit cam contacts N78 and N79 causes the latch tripping of relay R127LT. The same circuit path also energizes relays R130P, R135P, R138P, R141, the batch number unit setup relays.

Resetting of the ACCUMULATOR under control of the relays R407 and R410 will now be considered. Resetting of the accumulator is effected on a complemental basis, i.e., each accumulator order position is advanced with a number of pulses equal to the 9's complement of the value standing in the particular accumulator order position. For example, to reset an accumulator order position standing at 1, a series of nine successive pulses are transmitted to that order position, under control of PRINT EMITTER 4, to advance the accumulator order position to 0. The circuitry for resetting the accumulator order position to 0 includes the accumulator readout means electrically connected with the PRINT EMITTER 4. A typical circuit for transmitting the first in the series of eight pulses to accumulator order position 1 for example, assuming a 1 standing therein is traceable through a path beginning with PRINT EMITTER 4, FIG. 2*k*, segment 9 thereof, relay R410*i* n/o contacts, wire 792, relay R147*b* n/o contacts, cable 4, accumulator order position 1, in FIG. 2*m*, one segment in the accumulator readout circuitry, wiper 638, common segment 634*a*, relay R407*g* n/o contacts, RM magnet to the line L2. The associated AM magnet is energized immediately thereafter by a pulse following through a path beginning with the AM magnet, wire 721, relay R410*k* n/o contacts, print cams P95, P94, P93 to the line L1. The setting of the accumulator wheel is accordingly advanced from a setting 1 to a setting 2 to provide another path for energizing the accumulator order position 1 AM magnet when the PRINT EMITTER 4 makes on segment 8 in conjunction with the energized status of contacts R410*h* and R147*c*. Immediately thereafter the AM magnet is energized, in a manner described, to advance the accumulator order position 1 from setting 2 to setting 3. Succeeding pulses from the print emitter 4, in conjunction with a like number of alternate pulses to the AM magnet, will eventuate in the advancement of the accumulator wheel to 0 at which time relay R410*a* contacts open to prevent further energization of the AM magnet. The transmission of complemental sets of pulses, in the manner described, is directed to the remaining accumulator order positions to reset the same to 0.

The seventh total cycle is initiated under control of relays R235 and R413 energized when the wiper 505 makes contact with insert 582, T3. The relay R235 is concerned with the resetting of the unit counters 2 while the relay R413 is concerned with an accumulator reset check control circuit for testing the zero setting of each order position of the 12-position accumulator after a reset operation.

Upon the energization of the relay R413 and upon the subsequent emission of a zero pulse from the print emitter 4, a circuit path is established to test the zero setting of all accumulator order positions 12 through 1. If all positions are setting at 0 after a reset cycle, a circuit path is accordingly established to latch pick relay R416. Contacts R416*b* accordingly open to prevent energization of relay R417. The failure to pick up relay R417 results in a circuit condition which indicates a valid reset. Accordingly, an auto start signal is directed to the card reader upon the termination of the last in the series of total taking cycles. On the other hand, if the relay R416 fails to pick up, indicating an invalid reset, then the relay R417 is picked up. Accordingly, when R417*a* contacts close, a circuit is established to energize the reset check light.

Referring to FIG. 21, the reset test circuit is traceable through a path extending from the line L2, relay R416LP, R413*a* n/o contacts, common segment 634*a*, zero setting of wiper 638, relay R413*b* n/o contacts, common segment 634*a* of the accumulator order position 11, zero setting of wiper 638, relay R413*c* n/o contacts, the circuit then proceeds through the zero settings in the succeeding accumulator order positions Pos. 10 through Pos. 1. The circuit finally emerges from the accumulator order Pos. 1, zero setting of wiper 638, and then extends through cable 4, R125*a* n/o contacts in FIG. 2*k*, R410*a* n/c contacts to the zero segment on the print emitter 4 through print cams P91 and P90 to the line L1.

Failure of the accumulator to effect a valid reset results in preventing the relay R416 from being energized. Accordingly, on the next print cycle, the relay R417 is picked up by means of a circuit path beginning with the line L1, FIG. 2*t*, through print cam contacts P98, relay R238*k* n/o contacts, relay R401*g* n/o contacts, relay R416*b* n/c contacts, latch pick relay R417 to the line L2.

Upon closure of contacts R417*a*, in FIG. 2*a*, an obvious circuit path is established to energize the reset check light.

Upon opening of relay R417*b* n/c contacts, the normal circuit path to latch pick the start control relay R117, shown in FIG. 2*a*, is accordingly disabled.

Depression of the print key provides a circuit path for energizing the latch trip relay R417, the latter causes total cycles to follow.

Clearing of the reset error is effected by removing the control panel wiring controlling relay R401 thereby de-energizing the latter relay, after which a total cycle is effected. De-energization of relay R401 suppresses accumulating operations of the accumulator. The accumulator control relay R401 is shown in FIG. 2*f* and is energized when the Acc. ON sockets are connected by means of a plug wire 793. The contacts associated with relay R401 are distributed throughout the various accumulator control circuits, most of which are shown in FIGS. 2*m* and 2*n*.

Also, during this total taking cycle, the batch number printing instrumentalities are adjusted with digit values derived from a batch number relay storage network which had been previously set up with a batch number derived from a 9M master card. The readout of the batch number from the batch storage relays R201 through R225 and R313 through R317 is effected in the manner to be presently described. Before describing the circuit details, the batch number storage relay networks will first be described. The contacts associated with the above-mentioned batch relays are wired in a network shown in FIGS. 2*j* and 2*h*. Here it is observed that only the details for BATCH EXIT 6 are shown and partly for BATCH SET UP 5, while the remaining batch positions 4 through 1 (i.e., B.E. 4 through B.E. 1 and B.S.U. 4 through B.S.U. 1) are shown in block form in FIG. 2*k*. It is to be further noted that for BATCH EXIT 6, FIG. 2*j*, the left side of its network is comprised of ten lines connected to cable 6. Each of these ten lines terminate at an appropriate one of the ten contacts *a* through *j* associated with the relay R147 seen in FIG. 2*k*. From these contacts *a* through *j*, ten wires are connected to a cable 7 which wires terminate at appropriate ones of the ten contacts *a* through *j* associated with the batch set up relay R141 shown in FIG. 2*o*. The lower blades of these contacts *a* through *j* associated with relay R141 are connected to segments 0 through 9 of NO. UNIT EMITTER 5. Returning again to the BATCH EXIT 6, it is noted that the right side of the batch relay network for BATCH EXIT 6 terminates at the socket 754 also seen in FIG. 15. The remaining five BATCH EXIT positions terminate at the sockets 755 through 759. It is to be mentioned that the five BATCH EXIT positions 5 through 1 have additional circuitry not included in BATCH EXIT 6. This additional circuitry, as shown for BATCH EXIT 5, contains a network including contacts of relays R110*a*, R247*f* and R138*d*. Similar networks, not shown, are provided for the remaining batch positions B.E. 4 through B.E. 1. The particular circuitry in question provides each of the five BATCH EXIT positions with the proper output signals for enabling the batch number to be validly entered into appropriate positions of the batch numbering unit during the various card cycles and total taking cycles of the card reader. This verification of the batch number as well as of the serial number will be described in detail later on.

Returning now to an explanation of the circuitry associated with reading out the batch number from the batch number relay network described to the batch numbering unit printing instrumentalities, a typical circuit for entering a value into the fifth position, for example, of said numbering unit is traceable beginning with position 5 of the batch numbering unit start magnet 441, FIG. 2*q*, through R135*a* n/o contacts, cable 9 which extends into FIG. 2*k*, wire 797 to FIG. 2*j*, relay R138*d* n/o contacts, relay R247*f* n/c contacts, wire 797' through adjusted contacts of the batch number relays 221 through 225, cable 6 to FIG. 2*k*, to the contacts *a* through *j* associated with the relay R147, then through cable 7 to FIG. 2*o*, contacts *a* through *j* associated with the relays R141 now energized, through the NO. UNIT EMITTER, relay R138*b* n/o contacts, numbering unit cam contacts N76 and N77 to the line L1. Simultaneously, during the sweep of the NO. UNIT EMITTER, the remaining batch numbering unit start magnets 441 for positions 4 through 1 are energized with digit values read out from the batch relay setup positions B.S.U. 4 through B.S.U. 1.

At zero time of the NO. UNIT EMITTER, a zero pulse is directed to the numbering unit stop magnets 439, positions 5 through 1 seen in FIG. 2*q*, to stop the rotation of the batch numbering unit printing instrumentalities. This zero pulse is traceable through a path beginning with the zero segment on the NO. UNIT EMITTER, in FIG. 2*o*, through wire 784 to FIG. 2*r*, relay R126*b* n/c contacts, relay R138*c* n/o contacts, wire 785 to Fig. 2*q*, through contacts *f, g, h, i, j* associated with the relay R135, through all the batch numbering unit stop magnets 439 positions 1 through 5 to the line L2. The above describes the energization of the batch numbering unit start and stop magnets with digit values stored in the batch storage setup relays to permit setting up of the batch numbering unit printing instrumentalities. The latter causes the batch number to be printed on the card checks passing through the card reader.

In this, the eighth total taking cycle, latch trip relays R125 and R128, shown in FIG. 2*t*, are energized. These relays are concerned with the dropping out of the resetting control circuits initially picked up in the sixth total cycle. Also energized in this eighth total taking cycle is relay R238 which provides for the printing and resetting control operations of unit counters 3. In addition, relay R238 provides for the termination of the total taking operations of the card reader if appropriate control panel wiring is plugged. This may be effected by plugging plug wire 794 to the PRINT END (PE) sockets to energize the print end relay R158. The circuit path for energizing relay R158 is traceable through the line L2, FIG. 2*t*, relay R158, print end sockets PE connected by means of the plug wire 794, relay R238*j* n/o contacts, print cam P101, relay R159*b* n/c contacts, relay R144*i* n/o contacts, print cam P97, to the line L2.

On the other hand, if it is desired to delay the energization of the print end relay R158 until the last or ninth total taking cycle, the PE sockets must not be plugged, the relay R158 is then energized under control of relay R241*j* contacts, the latter being controlled by means of its parent relay R241 which is provided to control the print and reset operations for unit counters 4. The relay R241 is energized in the ninth total taking cycle when the wiper 505 makes contact with insert 502, T5.

In any event, when the relay R158P is energized, a hold circuit for relay R158H is established through relay R158*a* contacts and print cam contacts P100. Upon the transfer of contacts R158*b* and upon the subsequent closure of print cam P99, seen in FIG. 2*t*, the clutch dropout latch pick relay R160LP and latch pick relay R159LP are energized. The latter serves to prevent the print end and reset operations from being effective if the print end operations are initiated in the eighth total taking cycle.

In the ninth total taking cycle, upon closure of relay R160*b* contacts and print cam contacts P98, seen in FIG. 2*t*, relay R161P, latch trip relay R153LT and the carriage return solenoid magnet are energized. A hold circuit for relay R161H is established through relay R161*a* n/o contacts in conjunction with print cam contacts P100.

Upon the opening of contacts R161*b*, shown in the circuit for maintaining the energization of the print control relay R151 in FIG. 2*b*, the latter accordingly drops out upon the subsequent opening of print cam contacts P89 to thus bring an end to the sequence of total taking cycles initiated under control of the 9M batch header card.

The energization of the carriage return solenoid enables the carriage to be returned to its initial position under control of appropriate means shown and described in the afore-mentioned Lake patent. When the carriage is thus restored to its initial position, the CARRIAGE HOME SW contacts, shown in FIG. 2*b*, are closed to energize the carriage home interlock relay R152.

Upon the transfer of relay R152*c* contacts, seen in FIG. 2*a*, the motor control relay R122, shown in FIG. 2*b*, is de-energized. (In addition No Tape Total Error and other interlocks are de-energized.) Because of the fact that a valid accumulator reset operation has been successfully completed during one of the earlier total taking cycles, the accumulator reset check relay R416LP (FIG. 21) was accordingly energized. The relay R416*a* contacts enabled the energization of the latch pickup start relay R117LP, shown in FIG. 2*a*. Accordingly, relay R117*c* contacts, in FIG. 2*b*, had closed to pick up the MS control relay R121P. When this occurred, a circuit path for the MS1 relay was established and in turn a path was established to maintain operations of the drive motor DM. Thus, in the manner described, automatic start operations are effected to again enable the feeding of card checks associated with the last encountered batch header card through the card reader.

Before describing the various checking (or verification) operations that take place during the ensuing card feed cycles, there is to be explained the printing and resetting operations of the unit counters 1, 2, 3, 4 and the total counter.

The unit counters 1 through 4 are each comprised of four individual unit type counters representing respectively the units, tens, hundreds and thousands order positions. Each order position includes a counter magnet CM (FIG. 2*r*) which, when energized, causes a unit advancement of an associated counter wheel. Appropriate cams are also included for each order position to control an associated 9's contact CNC and a reset contact CRC. The CNC contact is closed when a 9 value is setting in the counter while the reset contact CRC is closed for all digit value settings except zero.

Referring to FIG. 2*r*, only two unit counter circuits are shown, namely, unit counters 1 and unit counters 4.

Entry into unit counters 1, for example, is effected by way of an associated IN socket which is connected to relay R232*i* contacts. From the latter, the circuit extends to the units order CM magnet and also to a junction between the reset contact CRC and the 9's contact CNC. For each unit entry admitted by way of the IN socket 795, the unit magnet CM is energized to advance the associated counter wheel one unit.

A unit "one" impulse is available from a count socket CT, shown in FIG. 2*f*, which is connected to R102*k* n/o contacts, cam contacts CR40, relay HD3*f* n/o contacts to the line L1. By means of a plug wire connection, the "one" impulse is admitted into the IN socket of the UNIT COUNTER. The UNITS COUNTERS may also be controlled to count selectively by wiring the CT impulse by way of RECODE SELECTORS before entering the signal into the IN sockets. In this instance, the RECODE SELECTORS may be controlled by specific perforations in the cards passing through the machine or by controls as taught in the afore-mentioned Lake et al. patent.

When there is a 9 value setting in the units order, the next entry by way of socket 795 advances the units and tens order positions one unit each. The tens order position CM magnet is energized by means of a circuit path which extends from the IN socket 795 through relay R232*i* n/c contacts, 9's contact CNC, relay R232*h* n/c contacts, to and through the tens order counter magnet CM to the line L2.

If 9's are standing in both units and tens order positions, then upon the next unit entry both the units and tens order positions are simultaneously advanced by one unit causing the counter to stand at 100.

Counter printing and resetting operations for unit counters 1 during a print cycle is effected when the relay R232 is energized. Accordingly, contacts *a* through *i* associated with the latter relay, are transferred to provide circuit paths to energize the CM magnets of the four order positions by way of the associated reset contacts CRC and also to provide circuit paths to appropriate ones of the four print magnets 4 through 1 to cause unit counters totals to be printed on the register sheet.

An exemplary reset circuit path for the units order of unit counters 1 is traceable through the line L1 (FIG. 2*r*), cam contacts P90, P91, P92, relay R232*d* n/o contacts, reset contacts CRC, units magnet CM to the line L2. The cam contacts P90 and P91 provide differentially timed pulses 9 through 0. When an order position advances to 9, the associated 9's contact CNC closes to provide a path to an appropriate print magnet. When the next pulse is issued by cam contacts P90 and P91, a circuit is presented to the print magnet by way of a path extending through line L1, cam contacts P90, P91, P92, relay R232*d* contacts, reset contacts CRC, 9's contacts CNC, relay R232*h* n/o contacts, print magnet position 4 to the line L2. At the same time, a branch circuit extends through the units magnet CM. Energization of the latter causes advancement of the counter wheel to zero whereupon the CRC contacts open to disable the reset circuit. The circuits for the remaining order positions as well as for the unit counters 2, 3 and 4 are similar in structure and operation. As earlier mentioned, the print and reset control circuits for the unit counters 2, 3 and 4 are energized on ensuing total taking cycles. These circuits are initiated under the control of relays R235, R238, R241 energized in the manner previously explained.

Next to be considered are the circuit operations of the TOTAL COUNTER, shown in FIGS. 2*o* and 2*p*. The latter is employed conjointly with the serial numbering unit to provide a means for verifying the serial number.

The TOTAL COUNTER comprises four positions, each provided with an associated RM magnet and an AM magnet for controlling an associated counter wheel, reset contacts CRC and 9's contacts CNC. During total taking cycle 3, it may be recalled that the total counter also resets under the control of relay R155 after which a 1 is entered into the total counter on the following total taking cycle. The total counter is thus prepared with a 1 setting therein for subsequent card feed cycle operations during which a 1 is entered for each card check passing through the numbering unit printing station.

In the ensuing description, it will be explained how the serial number is verified conjointly by the serial numbering unit and the total counter readout circuits. It is also to be mentioned, that the conjoint verification of the serial number is effective for all card feed cycles except every tenth card feed cycle on which cycles these verification circuits are disabled.

Before explaining detail circuit operations of the total counter, it may be well to explain generally the operations of the total counter. This operation begins on the total taking cycle in which the total counter is reset. On the following total cycle, a 1 is entered into the units order position of the counter. Thereafter, during subsequent feed cycles, a 1 is entered into the units order position for each card check passing through the check printing station. The serial numbering unit, on the other hand, is reset to zero on one of the prior total taking cycles and accordingly is prepared with a zero setting when card feeding is resumed and will advance to aone setting during the time the first card check presents itself for printing of the serial number.

The difference in the settings of the total counter and the serial numbering unit is brought about by the fact that the serial number, which is to be written on tape, is entered into the tape buffer unit at least a cycle before the serial number is printed on the card check passing through the card printing station. By means of this arrangement, there is thus secured the proper coordination between the means for writing on tape the serial number and the means for printing the corresponding serial number on the appropriate card check.

The total counter readout and entry circuits are shown respectively in FIGS. 2*o*, 2*p* and 2*q*. Along the right hand edge of FIG. 2*p* may be seen the RM magnets and associated circuitry for the tens, hundreds and thousands order positions of the total counter, the units order RM magnet being shown in the lower left-hand corner of FIG. 2*q*, the corresponding AM magnets are shown in the lower right-hand corner of FIG. 2*p*.

Entry of a 1 into the units order position of the total counter during a total taking cycle is effected by first energizing the RM magnet after which the AM magnet is energized. The circuit for energizing the RM magnet extends through line L2, through units order RM magnet, relay R232*j* n/o contacts, wire 796 to FIG. 2*k*, segment one on the PRINT EMITTER 4, cam contacts P91, P90 to the line L1. The units order AM magnet circuit extends through the line L2, FIG. 2*p*, through all AM magnets, relay **R144*b* n/o contacts, relay R232*k* n/o contacts, cam contacts P95′, P94′, P93′ to the line L1. The relay R232*k* contacts are closed at this time by virtue of the fact that the parent relay R232 was energized during total taking cycle 6**.

Entry of a 1 into the units order position of the total counter on each subsequent card feed cycle is traceable through the line L2, through RM magnet relay **R144*j* n/c contacts, relay R102*j* n/o contacts, relay R270*b* n/o contacts, cam contacts CR30 to the line L1. The associated AM magnet is energized by way of a path extending to the line L2, through the AM magnet, relay R144*b* n/c contacts, R270*a*** n/o contacts, cam contacts CR32 to the line L1.

When the units order advances to 9, the associated 9's contacts CNC close to energize relay **R179*p***, the latter prepares to disable the verification circuits of the counter and serial numbering unit on the following card feed cycle (the tenth card feed cycle). This circuit path extends through the line L2, FIG. 2*p*, relay R179*p*, relay **R144*h* n/c contacts, relay R155*h* n/c contacts, 9's contacts CNC, FIG. 2q, relay R144*j* n/c contacts, relay R102*j* n/o contacts, relay R270*b* n/o contacts, cam contacts CR30 to the line L1. A hold circuit for relay R179H**, shown in FIG. 2*a*, is effective upon the closure of contacts **R179*a* in conjunction with cam contacts CR1′**.

Upon the transfer of contacts **R179*b***, in FIG. 2*p*, a path is established to energize latch pickup relays R311, R310, R134 and R124. This path extends from the line L2 through the above-mentioned relays, through relay **R179*b* contacts now transferred, relay R270*a* n/o contacts, cam contacts CR32 to the line L1. The contacts associated with the relays R310 and R311** are shown wired in the serial numbering unit readout circuits shown in the upper left-hand corner of FIG. 2*p*. It is obvious that when these contacts open, these readout circuits are disabled. The above circuits are operative on the tenth cycle to prevent the verification of the serial number because of the difference in the settings in the total counter and serial numbering unit. On the following card feed cycle, verification of the serial number is resumed. This is effected by energizing the latch trip relays R311, R310, R134 and R124 when relay **R179*b* contacts transfers to its normal setting. When the latter transfer occurs, a circuit path is established through the latch trip relays R134, R124, R310 and R311** by way of their associated "*a*" contacts, relay R102*f* n/o contacts, relay R179*b* n/c contacts, relay **270*a* n/o contacts, cam contacts CR32 to the line L1**.

Carry operations into the tens order RM magnet occurs simultaneously with the energization of the relay R179*p* by means of an obvious circuit path. Upon the next subsequent energization of the tens order AM magnet and the units order position as well, the counter will reflect a setting of ten at the termination of the carry operation. Carry into the remaining order positions of the total counter are effected by means of circuits which, because of their similarity, need not be described.

Reset operations of the total counter are initiated upon the energization of the relay R155 during the third total taking cycle. The latter causes associated contacts **R155*b* through R155*e*** to close to establish circuit paths in conjunction with associated reset contacts CRC to appropriate order position RM magnets.

An exemplary reset circuit path is traceable through the line L1, FIG. 2*p*, cam contacts P90, P91, P92, relay **R155*b* n/o contacts, reset contacts (thousands order position) CRC, RM magnet to the line L2. The appropriate AM magnet is energized by means of a path extending through the line L1, cam contacts P93′, P94′, P95′, relay R155*a* n/o contacts, relay R144*b* n/o contacts, AM magnets to the line L2**. Transmission of a succession of alternate pulses to the RM and AM magnets continues along the paths described until the appropriate reset contacts CRC open to terminate the resetting operation.

During the ensuing card feed cycles, the verification circuits will be further amplified to show specific circuit details and connections to the readout circuits of both the total counter and the numbering unit.

During card feeding cycles, the entry of a "1" into the serial numbering unit for advancing the latter is effected by means of a path extending through the line L1, FIG. 2*q*, cam contacts CR30, relay **R270*b* n/o contacts, relay R102*j* n/o contacts, relay R232*l* n/c contacts, START MAG. in the units position to the line L2**. Twenty-seven numbering degrees later (or fifty-four degrees later in the machine time cycle since the serial numbering unit, cam contacts, etc., are operated at half the machine cycle speed) the serial numbering wheel starts an advance which continues until an appropriate STOP MAGNET is energized to terminate the advance. This occurs through a path extending through cam contacts CR33, FIG. 2*q*, relay R270*c* n/o contacts, relay R102*l* n/o contacts, through the STOP MAGNET (and also through relay R131*c*, relay R132*c* and relay R133*c* for energizing the remaining STOP MAGNETS) to the line L2.

Carry operations in the serial numbering unit are initiated under control of total counter operations as follows. On the ninth card feed cycle as the total counter units order position advances to 9, relay R179P is energized by way of a path extending through the line L2, FIG. 2*p*, relay R144*h* n/c contacts, relay R155*h* n/c contacts, 9's contact CNC, relay R144*j* n/c contacts, relay R102*j* n/o contacts, relay R270*b* n/o contacts, cam contacts CR30 to the line L1. Upon transfer of relay R179*b* contacts, a path is established through cam contacts CR32, FIG. 2*p*, relay R270*a* n/o contacts, relay R179*b* n/o contacts, through relay R311LP, relay R310LP, relay R134LP and relay R124LP. The relays R311 and R310 isolate the serial numbering unit readout circuits during the tenth card feed cycle. The relay R124 closes its contacts to provide a circuit to energize the serial numbering units carry relay R131LP on the eleventh card feed cycle in the following manner: line L2, FIG. 2*p*, relay R131LP, relay R124*e* n/o contacts, relay R293*i* n/c contacts, units collector ring 768*a*, wiper 768, relay R124*f* n/o contacts, relay R144*k* n/c contacts, cam contacts CR59 to the line L1. Shortly thereafter, cam contacts CR30 close to energize the START MAG. in the tens and units order positions of the serial numbering unit shown in FIG. 2*q*. This circuit path extends through the cam contacts CR30, relay R270*b* n/o contacts, relay R102*j* n/o contacts, relay R131*b* n/o contacts through the tens position START MAG., while relay R232*l* n/c contacts provide the path through the units START MAG.

The serial numbering unit STOP MAGNETS are energized under the control of cam contacts CR33 to stop the units and tens serial numbering wheels, leaving the units wheel standing at 0 and then tens wheel standing at 1. In view of the fact that wiper 768 in the units order of the serial number readout is displaced (advanced) by one unit, the readout from this order position accordingly provides a "1" impulse. The readout from the TOTAL COUNTER at this time is likewise a "1" for both the units and tens order positions thereof.

De-energization of the relays R124LP, R134LP, R310LP and R311LP, previously energized, is effected upon the energization of the LT coils of these relays through a path extending tnrough line L1, FIG. 2*p*, cam contacts CR32, relay R270*a* n/o contacts, relay R179*b* n/c contacts, relay R102*f* n/o contacts, and then through parallel paths formed by relay contacts R134*a*, R124*a*, R301*a* and R311*a*, through the LT relays just mentioned to the line L2.

If the count in the numbering unit progresses to a point where 99 is reached, carry circuits are completed to energize not only the relay R131LP, in the manner previously described, but also a relay R132LP. The latter is picked up by way of a branch path extending through the wiper 768*a*, through relay R134*c* n/o contacts, relay R134*b* n/o contacts, through the tens position wiper, 9 spot, tens position collector ring, relay R293*j* n/c contacts, relay R124*d* n/o contacts, relay R132LP to the line L2.

A carry into the hundreds position START MAG., FIG. 2*q*, follows through the line L1, cam contacts CR30, relay R270*b* n/o contacts, relay R102*j* n/o contacts, relay R132*b* n/o contacts, hundreds position START MAG. to the line L2 (at the same time R131*b* and R232*l* provide paths to energize the tens and units order START MAG., respectively).

In a similar manner, should the count in the serial numbering unit advance to 999, a relay R133LP will be energized in addition to the relays R131LP and R132LP. This is effected by way of a branch path which extends from the wiper and collector rings in the hundreds order position of the serial numbering unit readout circuit, then through relay R293*k* n/c contacts, relay R124*c* n/o contacts, relay R133LP to the line L2. The carry into the thousands position START MAG., FIG. 2*q*, extends through the cam contacts CR30, relay R270*b* n/o contacts, relay R102*j* n/o contacts, relay R133*b* n/o contacts, relay R132*d* n/o contacts, START MAG. to the line L2.

De-energization of the carry control relays R131, R132 and R133 is effected upon energization of associated LT relays, shown in FIG. 2*c*, by means of a path extending through the line L2, relays R131LT, R132LT and R133LT, all of which are wired in parallel, branches further extending through associated contacts, namely, R131*a* n/o contacts, R132*a* n/o contacts, and R133*a* n/o contacts, respectively, then through either relay R110*f* n/o contacts or relay R155*i* n/o contacts, in a manner to be explained, through cam contacts CR2, FIG. 2*b*, to the line L1. Should the carry operations occur during the card feeding operations, the carry relays are de-energized by way of the relay R110*f* contacts on the card feed cycle following their energization. If the carry operation is set up at a time when the last card passes through the card reader, the carry relays set up remain energized. Subsequently, upon the passage of the first card through the card reader, a carry operation is effected in the serial numbering unit. On the next following card feed cycle, the carry relays which were picked up are de-energized by means of the relay R110*f* contacts. If a carry operation is set up before a total taking cycle, the relay R155*i* contacts control the de-energization of the carry relays.

It will be recalled in the description of the card reader dealing with the entry of various check data into the buffer storage unit, an assumption was made to the effect that the batch number and serial number had been entered and made available to the buffer unit from appropriate exit sockets for each card cycle of the card reader. It seems appropriate at this time to describe circuit details concerned wth the entry of the batch number and the serial number into the tape buffer unit and also to describe the circuits for the verification of this data.

Taking in order first the entry of the batch number into the buffer unit, it is to be mentioned that the appropriate batch number positions of the buffer unit are energized during card feed cycles by a circuit network comprised of batch storage relay networks in combination with the batch numbering unit readout circuits. This combined circuit network is operative for all card feed cycles except the first card feed cycle of each run-in operation. During the run-in cycle, the batch storage relay network alone provides the buffer unit with the batch number. The reason for this arrangement is that a failure to read the batch number initially into the batch entry relays would not be detected subsequently by the combined networks. Only by employing the batch exit relay readout network alone on run-in feed cycle will it be possible to check that entry into the batch entry relays was validly made. The check or validity of the batch number is finally determined by the 2-out-of-5 relay network in the buffer unit. In the event of a disagreement in the settings of the numbering unit and the entry relay set up, more than two out of five relays will be picked up to provide a buffer error.

A typical circuit for entering a digit of the batch number during the run-in cycle from batch position 5, for example, under control of the batch storage relay network, into the buffer unit tape entry position TE24, is traceable through a path beginning with EMITTER 3, shown in FIG. 2*o*, through the 5 segment thereof, assuming that a value 5 is setting in the batch storage, through relay R141$f$ n/c contacts, through cable 7 which extends to FIG. 2$k$, to relay contacts R147$f$ as a terminal, then through cable 6 which enters the BATCH EXIT 5, shown in FIG. 2$j$ in box form. As earlier explained, this BATCH EXIT 5 is comprised of batch storage relays R221 through R225, the contacts of which are arranged in a pattern similar to that shown for the pattern of relays comprised of relays R313 through R317 for BATCH EXIT 6 seen to the left of the BATCH EXIT 5. The cable 6 passes ten input lines to the network comprised of the relays R221 through R225. The output from the latter is connected to wire 797 which extends through relay R247$f$ n/c contacts, relay R138$d$ n/c contacts, to the batch exit socket 755. From the latter socket, the circuit continues by way of plug wire 749 which passes through cables 8 from which the plug wire 749 emerges and connects to the buffer socket position TE24, in FIG. 2$j$. Upon entry of the digit value by means of the circuit path described, two out of five buffer relays are energized to store the batch number digit 5. Similar circuits for the BATCH EXITS 4 through 1 are operative to enter the remaining four positions of the batch number into appropriate positions of the buffer unit. The sixth position of the batch number is written on tape but not printed on each record check passing through the batch number printing unit. This explains why batch position 6 relay storage does not include the added circuits common to BATCH EXITS 5 through 1.

On all ensuing card feed cycles following the first card feed cycle described, the batch number circuit just described is connected in parallel with corresponding circuits associated with the batch numbering readout unit. The reason for this arrangement is to provide a check in the event the batch printing instrumentalities are accidentally changed as the result of malfunctioning during the card check printing operations for a given batch.

The parallel circuit above mentioned, associated with BATCH EXIT 5, is connected to the center blade of relay contact R138$d$ and extends through relay R110$a$ n/o contacts (wired in parallel with the relay R247$f$ contacts), through wire 810, through cable 10, over to FIG. 2$q$ where wire 810 emerges from the cable 10 and connects to relay R163$a$ n/c contacts, through the latter to common segment 465 for position 5 of the batch numbering unit readout circuit, wiper 459 associated therewith, segment 5 representing the digit value 5, through cable 5 to FIG. 2$k$, through relay R147$f$ n/c contacts, to and through cable 7 extending to FIG. 2$o$, through relay R141$f$ n/c contacts to the 5 segment on the EMITTER 3. Circuits for the remaining positions 4 through 1 associated with the batch numbering unit readout circuits are similar to the one described, and for that reason, need not be traced.

Any difference in the settings between the batch numbering unit readout circuits and the batch storage relay network circuits provides more than one output pulse from the appropriate batch exit socket to the appropriate buffer unit relays. Accordingly, this condition causes more than two out of five buffer relays to be picked up thereby resulting in a card error. An appropriate card error signal is thus generated by the buffer unit and transmitted, by means to be described, to the tape unit to efface the last written record on tape and also to instruct the card reader to dispose of the card check in question to an appropriate card error pocket.

Next to be considered are the circuits details concerned with the entry of the serial number into the buffer under the control of a combined network comprised of the serial numbering unit readout circuits and the total counter readout circuits. This combined network is effective for nine cycles out of every ten card feed cycles, the total counter readout circuits being effective on every cycle to provide the buffer unit with the serial number. The conditions preparatory to the operation of the above network are as follows. The serial numbering unit is reset to zero on a previous total taking cycle, in a manner described. The serial numbering unit readout circuit devices are designed to reflect the exact digit value settings in the serial numbering unit for all order positions except the units order position; in the latter, the readout setting is offset by one unit, i.e., when the numbering unit is standing at zero, the associate readout device is setting at one. The reason for this offset arrangement is that entry of the serial number into the buffer unit, from which the serial number is extracted for eventual tape writing operations, is effected one cycle earlier than the cycle in which the same serial number is printed on the card check. Furthermore, since verification must be made of the serial number on the same entry cycle, it follows that the precise serial number must be presented in order to be properly verified. Therefore, to meet these conditions, the numbering unit readout device is accordingly offset (advanced) by one digit.

As mentioned above, the entry of the serial number into the buffer for every tenth card cycle, is under control of the total counter readout circuits. This is necessary because of the fact that the value settings in both the numbering unit and total counter are not in agreement due to the fact that carry operations are not effected in the same cycle for both devices. This may be appreciated from the fact that initially the numbering unit starts counting from zero while the total counter starts counting from one.

The serial numbering readout circuits are shown in the top half of FIG. 2$p$, while the total counter readout circuits are shown in the lower-right hand corner of FIG. 2$o$. In tracing a typical circuit path for entering a position of the serial numbering readout circuits to the buffer, it will be assumed that the digit value 5 is being read out from the units order position of the combined networks for all card feed cycles except the tenth, in which cycle the readout will be under control of the units order of the total counter readout circuit. A typical circuit thus extends from the segment 5 of EMITTER 3, shown in FIG. 2$o$, through cable 11 to relay R310$f$ n/c contacts, segment 5 of the units order position, the wiper 768, common readout segment 768$a$, relay R293$i$ n/c contacts, relay R124$e$ n/c contacts, serial number exit socket 763, plug wire to the buffer entry socket TE32. Simultaneously, a circuit path parallel to the above extends from said socket 763 to wire 811, through cable 12 over to FIG. 2$o$ where the wire 811 emerges and connects to the common readout segment in the units order position, through the associate wiper, segment 5 to cable 13. From the latter, the circuit emerges and connects to the segment 5 on the EMITTER 3.

On every tenth card feed cycle, the relay R124, in conjunction with the relays R310 and R311, is energized, in the manner described, to isolate the serial numbering unit readout circuits, in FIG. 2$p$, thereby providing the buffer unit relays with pulses directed only from the total counter readout circuits.

During total taking cycles, relay contacts R293$i$ through R293$l$, in FIG. 2$p$, isolate the numbering unit readout circuits.

The above verification circuits provide the buffer unit relays with the appropriate number of signals. When this number of signals is in excess of a valid number, accordingly more than two out of five buffer relays pick up to cause an appropriate card read error signal to be generated.

During each of these card feeding cycles, various circuits incidental to the tape entry operations are completed to effect the actual printing of the batch number and serial number on each card check passing through the card reader. In addition, other circuits are energized to cause the card printing ribbon to be advanced after each card printing operation. As a preliminary to these circuit operations, it is necessary that the numbering unit sockets 812 (FIG. 2$d$) be connected by means of a plug wire 813. Printing during each card cycle on the card checks is under control of a circuit to the print control magnet assembly 517. This circuit follows a path through the line L2, in FIG. 2*d*, print control magnet 517, cam contacts CR42, relay R226*b* n/c contacts, relay R107*g* n/o contacts, numbering unit sockets 812, plug wire 813, numbering unit contacts closed when the numbering unit is properly secured in the card reader, relay HD3*e* n/o contacts to the line L1.

Energization of the ribbon clutch solenoids **542*a* and 543*a***, seen in FIG. 2*d*, are selectively energized under control of relay R229*a* transfer contacts in conjunction with cam contacts CR41. The operation of the relay R229*a* transfer contacts are under control of associated latch trip and latch pickup relays each of which are controlled by an associated microswitch contact suitably secured to the side frames of the numbering unit. These microswitch contacts are operated by the ribbon in a well-known manner to cause energization of the above-mentioned relays. Energization of the relay R229LP is caused by means of a path extending through the line L2, relay R229LP, through associated microswitch contacts, cam contacts CR39′, relay HD3*e* contacts, to the line L1. Energization of the relay R229LT is effected by means of a path extending through the line L2, relay R229LT, through the associated microswitch contacts, cam contacts CR39′, relay HD3*e* contacts, to the line L1. Also energized by means of a path extending through the sockets 812 and the plug wire connection 813 is a relay R270 adapted to control circuits, previously described, concerned with the serial numbering unit and total counter.

Next to be explained are circuits concerned with sorting and classifying the record checks and those concerned with pocket progression.

Sorting of the card checks in the card reader is effected by energizing the sorting select magnets at differential times within the machine time cycle.

The sorting select magnet circuits are shown in FIG. 2*e*. Here are shown four SORTING SELECT MAG. wired in pairs. Each pair is incorporated in a separate branch circuit and each branch includes an appropriate one of two gas tubes 814 and 815. The plate connections 3 of these tubes are made to wires **814*a* and 815*a*, respectively. The control grids 1 and 2 of each gas tube are all connected in common to a resistor 816** in turn connected to a network comprised of parallel branch circuits in which are included pocket select contacts R91*b*, R92*b*, R93*b*, R94*b* and R95*b*. Each of the parallel branches terminates at one of a plurality of emitter segments SE1 through SE6 forming part of a SELECT EMITTER. The latter is connected to the line L1 by way of relay R112*c* n/o contacts, cam contacts CR65, CR64 to the line L4. The segregation of cards in error from those not in error may be executed in a variety of ways in accordance with the manner in which appropriate sockets are wired on the control panel. These sockets are shown in FIGS. 15 and 2*g*. The sockets from which error signals emanate are appropriately identified as CD (card) error 820, WR (write) error 821, RD (read) error 822. An appropriate socket identified as ANY error 823 provides an impulse upon the occurrence of any one of the abovementioned errors. Conversely, an appropriate socket identified as SELECT pocket 824 provides a signal when no error is encountered, providing pocket progression sockets are not wired. A card marker socket 825, which when impulsed, causes the card check in question to be marked by means of the marking devices previously described. Ordinarily, this socket 825 is plugged to the ANY error socket 823 to mark every card check in error. The SELECT POCKETS sockets 1, 2, 3, 4, 5 represent inputs to pocket select relays (pocket progression not wired), which, when energized in a manner to be described, cause the card checks to be directed into appropriate ones of five pockets. In the absence of a signal to any one of the above sockets 1 through 5, the card check in question will enter the reject pocket. It is apparent that the card checks may be sorted and marked in a variety of ways depending upon the manner in which the control panel is wired, an illustrative example of which is seen in FIG. 15. Here plug wire 826 is used for marking all card checks in error, plug wire 827 causes card errors to be directed into pocket 4, plug wire 828 causes write errors to be directed into pocket 5.

Cards not in error are directed into pockets 1, 2 and 3 in succession under control of pocket progression circuits which are set up by the fact that the pocket progression sockets are connected, for example, by plug wire 830.

In connection with the latter control, it will be explained how these internal circuits function without interrupting card feeding operations. For the present, the circuit description will be concerned with directing card checks not in error to pocket 1.

In accordance with the control panel wiring, circuits are set up to cause the card reader to feed cards continuously until an error is detected.

Card check sorting is verified by means of a select check circuit which includes the checking contacts adjusted, in the manner described, by means of the position of the card in relation to the chute blades.

The circuit to cause the card check to be directed into pocket 1 depends upon the energization of relay R91P. The latter is energized by means of a path which extends from line L2, in FIG. 2*g*, relay R91P, relay R291*c* n/o contacts (pocket progression being plugged energizes the relay R291), relay R253*c* n/c contacts, relay R256*c* n/c contacts, relay R107*e* n/o contacts, relay R178*c* n/o contacts, relay R177*c* n/c contacts, relay R175*c* n/c contacts, relay R174*b* n/c contacts, relay R251*b* n/c contacts, relay R107*l* n/o contacts, cam contacts CR30 to the line L1. In the above circuit, the relay R291*c* contacts are transferred by reason of the fact that the parent relay R291 is energized. This latter circuit is traceable through a path extending through the line L2, seen in FIG. 2*f*, through relay R291, pocket progression socket 829, through plug wire 830 to the line L1.

The sorting of card checks into pocket 2 and 3 depends upon the energization of relays R92 and R93, respectively, in a manner to be described.

Pocket 4, in accordance with the control panel wiring, admits card checks characterized as CD check errors. In this instance, the circuit path extends from the line L2, through relay R94P, SELECT pocket socket 4, plug wire 827, CD error socket 820, relay F174*b* n/o contacts, relay R251*b* n/c contacts, relay R107*l* n/o contacts, cam contacts CR30 to the line L1. The relay R174*b* contacts are under control of its parent relay seen in the upper left hand corner of FIG. 2*e*. The relay R174 is energized by means of a circuit path extending from the buffer unit, the latter issuing a signal upon the occurrence of a card error. This signal is then fed into the card reader by way of SYNC connection 68, through relay R174P, R107*f* n/o contacts, cam contacts CR56 to the line L4.

Selection of write errors into pocket 5 is effected by means of a circuit path extending through the line L2, seen in FIG. 2*g*, relay R95P, SELECT pocket 5, plug wire 828, write error socket 821, relay R175*c* n/o contacts, relay R174*b* n/c contacts, relay R251*b* n/c contacts, relay R107*l* n/o contacts, cam contacts CR30 to the line L1. In this instance, write error contacts R175*c* are transferred upon energization of its parent relay seen in FIG. 2*e*. This relay R175P is energized when the tape unit detects and accordingly transmits a write error signal by way of tape unit connection TU69, through the relay R175P, relay R107*f* n/o contacts, and cam contacts CR56 to tht line L4.

In the case of a read error issued by the tape unit, relay R177P is energized by means of a path extending through SYNC connection 70, through relay R177, relay 107*f* n/o contacts, cam contacts CR56 to the line L4. It is to be noted that the read error socket 822 is conditioned by read error contacts R177*c* to provide this socket 822 with an impulse when a read error occurs. Since in the present setup this socket is not wired, the card check in question is directed into the reject pocket. The circuits for energizing the sorting select magnets, shown in FIG. 2*e*, for the conditions described, depend upon the closing of an appropriate one of the contacts R91*b*, R92*b*, R93*b*, R94*b* and R95*b*. As an example, when relay contacts R91*b* close, a circuit path is established to energize the SORTING SELECT MAG. causing the card check in question to be directed into pocket 1. This circuit path extends through the line L4, FIG. 2*e*, through cam contacts CR64 and CR65, relay R112*c* n/o contacts, the SELECT EMITTER, segment SE1 thereof, relay R91*b* n/o contacts, now closed, resistor 816, to the control grids 1 and 2 of the gas tubes 814 and 815. Upon the firing of the latter, the SORTING SELECT MAG. are energized in the manner described. In the case of a card error, relay contacts R94*b* provide a path to the SORTING SELECT MAG. In like manner, relay contacts R95*b* provide the path in the case of a write error to direct the card check into pocket 5 in accordance with the control panel wiring described above.

The failure to energize the SORTING SELECT MAG. by means of the branch circuits, controlled by the contacts R91*b*, R92*b*, R93*b*, R94*b* and R95*b*, causes the card check in question to pass into the reject pocket. In accordance with the above setup, this would cause card checks characterized as read errors to pass into the reject pocket.

By appropriate plugging, the pockets 4 and 5 may be controlled to accept any combination of errors, for instance, a split plug wire connection to the card error and write error sockets may be plugged to pocket 4 or 5. As another example, the ANY error socket 823 may be plugged to either pockets 4 or 5 to cause all error cards to enter either pocket 4 or 5. On the other hand, by not plugging either of these pockets, all error cards will be directed into the reject pocket. Error cards may likewise be directed into pockets 1, 2 or 3 as desired. Under this setup, it is necessary to remove the plug wire 830 from the pocket progression sockets 829 in order to remove the internal control circuits to enable the error cards to be directed, under plug wire control, into pockets 1, 2 or 3. The error sockets may likewise be coupled singly, or in any desired combination, and then plugged to the pockets 1, 2 or 3 to accordingly cause any desired combination of errors to be directed into these pockets. If pocket progression is wired, cards not in error can be directed into any pocket 1 through 5 by wiring from SELECT socket to desired pocket ENTRY socket.

Turning now to the sort checking circuits, in FIG. 2*e*, there is provided a network which includes the *c* and *d* contacts associated with the pocket select relays R91 through R95, and the chute blade checking contacts 401*a* through 401*e* operated in a predetermined manner depending upon the position of the card in relation to the chute blades. The right side of this network is connected to a gas tube 832 in turn connected to relay R96P, through cam contacts CR67 to the line L4. The left side of this network is connected to a circuit extending to cam contacts CR63, CR62 to the line L4.

As earlier described, whenever the SORTING SELECT MAG. are energized, as many chute blades checking contacts are transferred as there are chute blade tips in contact with their associated levers 419 (FIG. 8). If, for example, the sorting select magnets are energized at a time when relay contacts R91*b* are closed, then the card should pass over the chute blade 1. Under this condition, the associated blade tip is permitted to transfer, by the means described, the associated chute blade checking contact. Under this condition, all checking contacts 401*a* through 401*e* are thus transferred.

Conversely, when a card is destined for the reject pocket, the card is interposed between all of the chute blade tips and the sorting magnet armature to thereby prevent the transfer of any of the chute blade checking contacts. When the card assumes a position intermediate the first and fifth chute blade, as many checking contacts are transferred as there are chute blade tips in contact with their associated levers 419. The sort checking network is adapted to provide an impulse for each valid circuit condition arising as a result of the displacement of the proper number of chute blades checking contacts in conjunction with an appropriate control circuit initiated to control energization of the sorting select magnets. In other words, a check circuit is provided to give an indication in the event a card is mis-sorted by testing the initial sort control circuit with the displacement of an appropriate number of chute blade check contacts.

In the sort check circuit of FIG. 2*e*, relay R96P is picked up on every card feed cycle in which a valid sort condition arises. The following circuit is employed to test a valid sort condition arising as a result of sorting a card into pocket 1 under control of the relay R91. This circuit is traced through the line L4, cam contacts CR62 and CR63, relay R95*d* n/c contacts, relay R94*d* n/c contacts, relay R93*d* n/c contacts, relay R92*d* n/c contacts, relay R91*d* transferred contacts, through the chute blade checking contact 401*a*, relay R92*c* n/c contacts, relay R91*c*, n/o contacts, to control grids 1 and 2 of gas tube 832. Accordingly, the latter is fired to provide a circuit path to energize the relay R96P. As a further illustration, assuming that a card error is to be sorted into pocket 4 under control of the relay R94, a circuit path should be established through the chute blade checking contacts 401*d* and 401*e* in view of the fact that the card is between chute blades 3 and 4 while enroute to pocket 4, chute blades 1, 2 and 3 being isolated at this time by the card, while chute blades 4 and 5 are permitted to make contact with their associated checking contact operating levers which provide for the transfer of checking contacts 401*d* and 401*e*. Under this condition, a test circuit is traceable through the line L4, cam contacts CR62 and CR63, relay R95*d* n/c contacts, relay R94*d* contacts, now transferred, chute blade checking contacts 401*d*, now transferred, through relay R95*c* n/c contacts, relay R94*c* contacts, now transferred, chute blade checking contacts 401*c* n/c, to the control grids 1 and 2 of the gas tube 832. The latter is accordingly fired to energize the relay R96P.

It may be appreciated that if the chute blade checking contacts 401*d* did not transfer in the above circuit, the latter would not be completed to fire the tube 832. Accordingly, the relay R96 would not be energized. Under this condition, the card reader will stop feeding cards. The failure of the relay R96 to be energized results in the failure to close its associated contacts R96*b* located in FIG. 2*a*. Consequently, the relay R97*h* will not be energized. Under this condition, contacts R97*b* remain open to drop out the hold circuit to the motor start relay R121H, seen in FIG. 2*b*. With the relay R121 de-energized, card feeding is terminated by virtue of the fact that the card lifter magnets become energized to raise the cards above the feed knives.

Pocket progression control circuits are provided to prevent unnecessary stopping of the machine when a pocket becomes filled to capacity and there are available other empty pockets to receive the cards. The pocket progression controls are adapted to be controlled by means of microswitches, one in each of the three pockets 1, 2 and 3. Each switch is adapted to be operated from a normal setting to a transferred setting whenever the associated pocket becomes filled to capacity. Upon the transfer of the switch, cards will be directed to a succeeding empty pocket. At the outset, when all three pockets are empty and card feeding operations are initiated, cards are directed into pocket 1 until the associated microswitch 1 is transferred as a result of pocket 1 reaching its capacity. Accordingly, appropriate pocket progression circuits are established to cause the succeeding cards, not in error, to be directed into pocket 2 until the latter becomes filled, whereupon microswitch 2 transfers to set up appropriate pocket progression circuits to cause the succeeding cards not in error to be directed into pocket 3. When the latter becomes filled, microswitch 3 transfers setting up appropriate pocket progression circuits to cause the succeeding cards not in error to be directed into pocket 1 provided the latter had been emptied of the cards previously entered therein. The sequence from here on in is repeated if the succeeding pockets previously filled have been cleared and made available for the reception of cards not in error. On the other hand, if the succeeding pocket had not been cleared at a time when the immediate preceding pocket reached capacity, the card reader stops feeding and the FULL POCKET indicator light turns on. The card reader remains idle until the cards are cleared from the filled pockets and after which the RESTORE KEY is depressed to again enable card feeding operations.

A microswitch is also employed and controlled upon any of the pockets 4, 5 and R (reject) becoming filled. When any one of these pockets become filled, the card reader is controlled to stop card feeding operations.

As a preliminary to the operations of the pocket progression control circuits, it is necessary that the pocket progression sockets 829 be connected together by means of a plug wire, for example plug wire 830, in FIGS. 2*f* and 15. As a result, pocket progression relays R291, R307 and R308 are energized in the manner previously described. Contacts of these relays are distributed throughout the pocket progression circuits, shown in FIG. 2*f*, and also in the circuits wired to the pocket select control relays R91, R92 and R93, shown in FIG. 2*g*. The pocket progression relays, in FIG. 2*f*, include latch pickup and latch trip relays for R253 through R261. The circuit to cause feeding of cards into pocket 1 is through the line L2, FIG. 2*g*, relay R91P, relay R291*c* n/o contacts, relay R253*c* n/c contacts, R256*c* n/c contacts, R107*e* n/o contacts, R178*c* n/o contacts, R177*c* n/c contacts, R175*c* n/c contacts, R174*c* n/c contacts, R251*b* n/c contacts, R107*l* n/o contacts, cam contacts CR30 to the line L1. This circuit is effective to direct all cards not in error to pocket 1 until such time as the microswitch 1 is transferred as a result of pocket 1 reaching its full capacity. Thereupon, pocket 1 select control relay R253LP (FIG. 2*f*) is latch picked by means of a path extending through the line L2, relay R253LP, R257*c* n/c contacts, R308*d* n/o contacts, R254*b* n/c contacts, the transferred side of the POCKET MICRO SW. 1 contacts, R98*l* n/o contacts, cam contacts CR40, relay HD3*f* n/o contacts, to the line L1. Upon closure of contacts R253*b*, a path is prepared for energizing latch pick relay R254, which path extends through the line L2, R254LP, R253*b* n/o contacts, R291*a* n/o contacts, cam contact CR390, relay HD3*f* n/o contacts to the line L1. Upon opening of contacts R254*b*, the circuit path to energize R253LP is disabled. Upon transfer of contacts R253*c*, in FIG. 2*g*, the relay R92P is energized to direct all succeeding cards not in error into pocket 2. The transfer of contacts R253*c* disables the circuit path to the relay R91 and enables a circuit path to be completed to energize the relay R92 by means of a path extending through the line L2, FIG. 2*g*, R92P, R291*d* n/o contacts, R253*c* n/o contacts, R256*c* n/c contacts, R107*e* n/o contacts and eventually to cam contacts CR30 by means of the path previously described. The above circuit is effective to direct all succeeding cards not in error to pocket 2 until the latter is filled up, whereupon the POCKET MICRO SW. 2 contacts, in FIG. 2*f*, transfer to direct all succeeding cards not in error into pocket 3.

Upon transfer of the POCKET MICRO SW. 2 contacts, relay R256LP is energized by means of a path extending through the line L2, FIG. 2*f*, R256LP, R259*c* n/c contacts, R308*e* n/o contacts, R257*b* n/c contacts, the transferred side of the POCKET MICRO SW. 2 contacts, R98*l* n/o contacts, cam contacts CR40, relay HD3*f* n/o contacts to the line L1. Upon closure of contacts R256*b*, relay R253LT is energized by means of a path extending through the line L2, R253LT, R253*a* n/o contacts, R256*b* n/o contacts, R291*a* contacts, cam contacts CR390, relay HD3*f* n/o contacts to the line L1. Upon closure of contacts R256*b*, a path is established to energize latch pick relay R257. This path extends through the line L2, relay R257LP, R258*c* n/c contacts, R256*b* n/o contacts, R291*a* n/o contacts, CR390, relay HD3*f* n/o contacts to the line L1. Upon transfer of contacts R256*c*, a path is prepared to energize the pocket select 3 relay R93, in FIG. 2*g*. This path proceeds through the line L2, relay R93P, R291*e* n/o contacts, R256*c* n/o contacts, R107*e* n/o contacts and eventually to the line L1 by means of the path previously described.

Cards not in error continue to feed into pocket 3 until the latter is filled up, whereupon POCKET MICRO SW. 3 contacts in FIG. 2*f* transfer to cause a repetition of the sequence previously described providing cards have been removed from pocket 1 before the transfer of POCKET MICRO SW. 3. Upon removal of the cards from pocket 1, relay R254LT is energized by means of a path traceable through line L2, relay R254LT, R253*b* n/c contacts, R254*a* n/o contacts and through the normally closed side of the POCKET MICRO SW. 1 contacts.

Upon thansfer of the POCKET MICRO SW. 3 contacts, a path is established through the line L2, R259LP, R308*f* n/o contacts, R260*c* n/c contacts, the transfer side of POCKET MICRO SW. 3 contacts, R98*l* n/o contacts, cam contacts CR40, relay HD3*f* n/o contacts to the line L1.

Upon closure of contacts R259*b*, relay R260LP is energized by means of a path extending through the line L2, relay R260LP, R259*b* n/o contacts, R291*a* n/o contacts, cam contacts CR390, relay HD3*f* n/o contacts to the line L1.

Upon closure of contact R260*b*, a path is established to energize relay R256LT by means of a path extending through the line L2, R256LT, R256*a* n/o contacts, R260*b* n/o contacts, R261*b* n/c contacts, cam contacts CR40, relay HD3*f* n/o contacts, to the line L1. Energization of the latch trip relay R256LT restores contacts R256*c*, and with contacts R253*c* also restored, the relay R91, in FIG. 2*g*, will again be energized, by means of the path previously described, to again feed cards not in error to pocket 1.

The contacts R253*c* are closed in the above circuit as a result of R253LT being energized upon the closure of relay R256*b* contacts. When pocket 3 is emptied, the POCKET MICRO SW. 3 restores to establish a path to energize the relay R259LT. This path extends through the line L2, relay R259LT, R259*a* n/o contacts, the normally closed side of POCKET MICRO SW. 3 contacts, R98*l* n/o contacts, cam contacts CR40, relay HD3*f* n/o contacts to the line L1. Also, relay R260LT is energized by a path extending through R259*a* n/o contacts, R259*d* n/c contacts, R260*a* n/o contacts, relay R260LT to the line L2. The relay R254LT is energized when MICROSWITCH 1 is normally closed and relay R253LT is energized to close relay R253*b* contacts. The path to energize R254LT extends through the line L2, R254LT, R253*b* n/c contacts, R254*a* n/o contacts, the normally closed side of POCKET MICRO SW. 1, R98*l* n/o contacts, cam contacts CR40, relay HD3*f* n/o contacts to the line L1.

When pocket 2 is also emptied, the POCKET MICRO SW. 2 is also restored to its normal setting to energize relay R257LT by means of a path extending through line L2, R257LT, R256*d* n/c contacts, R257*a* n/o contacts, the normally closed side of the POCKET MICRO SW. 2 to the line L1 by means of the path previously described.

If cards were not removed from pocket 2 during the transfer of the POCKET MICRO SW. 1, stop relays R255LP, R258LP and R261LP will be energized to stop the machine. The circuit path is traceable as follows: line L2, relays R255LP, R258LP, R261LP, all in parallel, through relay R257*c* n/o contacts, R308*d* n/o contacts, R254*b* n/c contacts and the POCKET MICRO SW. 1 n/o contacts, now transferred, cam contacts CR40 to the line L1.

In like manner, the same stop relays are energized under condition when cards have not been removed from pocket 3 and upon transfer of POCKET MICRO SW. 2 as pocket 2 reaches capacity. The circuit path in this instance follows through line L2, the stop relays in question, relay R259*c* n/o contacts, R308*e* n/o contacts, R257*b* n/c contacts, POCKET MICRO SW. 2, now transferred, to line L1 in the manner previously explained.

When the POCKET MICRO SW. 3 contacts are in their normal setting, and relay R259LT has been energized, a path is established to energize relay R260LT. This path proceeds through the line L2, R260LT, R260*a* n/o contacts, R259*d* n/c contacts, through the normally closed side of POCKET MICRO SW. 3 contacts and eventually to the line L1 by means of the path previously described.

The relay R262, seen in the left-hand corner of FIG. 2*f*, is energized upon closure of any one of the following contacts: R255*b*, R258*b*, R261*c* and the POCKET STOP contacts controlled by pockets 4, 5 and R. Upon closure of contacts R262*a*, shown in FIG. 2*a*, the FULL POCKET light is turned on. Upon closure of contacts **R255*c*** (FIG. 2*f*), the relay R254LP is energized under the control of cam contacts CR390.

Upon opening of relay contacts R262*b*, in FIG. 2*b*, the circuit for maintaining the relay R121H energized is broken. The de-energization of the latter relay stops the machine in the manner described. Upon the opening of contacts R254*b*, the pocket stop relays are prevented from energizing. Removal of the cards from all pockets enables the pocket stop relays and the pocket stop interlock relays to be latch tripped with the result that the circuit to maintain relay R262 energized is disabled. Consequently, relay R262*b* contacts, in FIG. 2*b*, close to enable the motor start control relay R121H to be energized to enable the machine to be restarted in the manner described.

*Tape mark and rewind control circuits*

When the TI point on the tape is detected by the tape unit, a signal is directed to the card reader for instructing the latter to stop operations, whereupon card feeding operations are suspended, feed interlock circuits are energized, and the rewind light is turned on. To resume operations, it will be necessary to depress the RESTORE KEY in order to release the card feed interlocks and then the START KEY to enable card feeding operations if it is desired to feed another batch of checks through the card reader. During ensuing card feeding operations, when a 9M master card is encountered, automatic card feeding operations will again be suspended. Upon the repression of the TAPE MARK KEY and the REWIND KEY, total printing and total writing operations are initiated, and upon completion of the latter, the tape unit is instructed to write a tape mark and an appropriate check character and, if the latter operation proves to be valid, the tape unit proceeds with instructions to rewind the tape onto the file reel.

The following is concerned with circuit operations in the card reader when the TI point is detected in the tape unit TM. Upon sensing of the TI mark, the tape unit directs a signal through SYNC connector 66, shown in FIG. 2*e*, through relay R167, R303*b* n/c contacts, **R302*a* n/c contacts to the line L4. Accordingly, R167*d*** n/o contacts close to energize the card lifter magnets CFM1, which interrupts card feeding, shown in FIG. 2*c*. The closure of **R167*b*** contacts provide a circuit for the rewind light, shown in FIG. 2*a*. The transfer of **R167*a* contacts disable the pickup circuit to the start relay R117,** shown in FIG. 2*a*. The closure of the RESTORE KEY contacts, FIG. 2*a*, cause energization of relay R303. The latter holds until relay R302LP is energized. In turn the **R303*b*** n/c contacts, shown in FIG. 2*e*, open to de-energize the relay R167. Relay **R303*c*** n/o contacts, shown in FIG. 2*a*, close to insure a circuit path to the REWIND light, in FIG. 2*a*. Relay **R303*d*** n/c contacts, shown in FIG. 2*a*, open to prevent auto start after a 9M master card passes through the card reader.

Upon depression of the TAPE MARK KEY and the REWIND KEY, shown in FIG. 2*d* (following the passage of a 9M master card through the card reader), the following circuits are established. Relay R296P, shown in FIG. 2*d*, is energized by way of **R298*d*, R302*b* and through the TAPE MARK and TAPE REWIND KEY contacts. A hold circuit for relay R296H is effective until R302*e* contacts transfer upon the energization of the parent relay R302LP. R296*b*** contacts, FIG. 2*b*, close to energize the relay R121H, the latter, in the manner explained, causes operation of the drive motor DM. Relay R297P, FIG. 2*c*, is picked up by means of a path including **R296*c* contacts and cam contacts CR200.** Relay R298P, FIG. 2*d*, is energized by means of a path extending through **R297*c* contacts and cam contacts CR39″.** Relays R297 and R298H, in FIG. 2*a*, hold up until relay R302 is energized (relay **R266*d* contact points, open at this time because of the fact that the last card was a 9M card, prevent relay R299 from being picked up). Tape mark control relay R301P,** FIG. 2*d*, is energized by means of a path extending through **R299*b* n/c contacts, R298*c* n/o contacts and cam contacts CR40′. Relay R301H holds through cam contacts CR11,** FIG. 2*c*. Upon closure of **R301*c***, in FIG. 2*e*, a path is established to send a signal to the SYNC to write a TM and REWIND. The path follows through line L1, CR28 cam contacts, **R301*c* n/o contacts to SYNC connector 65. R301*b*** n/o contacts, FIG. 2*d*, close to energize relay R302LP under control of cam contacts CR39″. **R302*f*** n/o contacts, FIG. 2*a*, also maintains a circuit path for the REWIND light. Upon closure of **R302*e* n/o contacts, in conjunction with R266*c* n/o contacts (the lattter being closed as a result of a 9M** card operation), FIG. 2*d*, the non-print control relay R288H is thus energized. **R302*c*** n/c contacts, FIG. 2*a*, upon opening, prevents card feeding operations until after a new reel of tape has been loaded in the tape unit. The batch storage relays, FIG. 2*b*, R201 through R225 and R313 through R317 (R314 through R316, not shown) are energized by means of a path including **R301*d* contacts and cam contacts CR29′. Relay R151,** FIG. 2*b*, is also energized at this time by a path extending through **R269*b* n/c contacts, R112*d* n/c contacts, R98*b* n/c contacts, R106*b* n/c contacts, R107*d* n/c contacts, R152*a* n/o contacts, R265*b* n/o contacts as a terminal, R302*d* n/o contacts, R301*d* n/o contacts, and cam contacts CR29′.**

If the tape unit fails to write a TM character through the normal path including cam contacts CR28, FIG. 2*e*, relays **R301*c* n/o contacts and SYNC connector 65, a second path is provided under control of the following: line L1,** in FIG. 2*d*, relay **TH*d* n/o contacts, TM and RWD key contacts, relay R302*b* n/o contacts or relay R298*d* n/o, relay R304*a* n/c contacts, relay R301*c* n/c contacts, and through the SYNC connector 65.**

The following circuits are established upon depression of the TAPE MARK KEY and REWIND KEY before the card reader encounters a 9M master card. The relays R296, R297 and R298 are energized in the manner previously explained. Relay R299P, shown in FIG. 2*d*, is energized by a path including relay **R266*d* n/c contacts, cam contacts CR29.** This energization occurs in the cycle following the one in which R298 is energized. The energization of R299 delays the pickup of relay R301 for one cycle. A hold circuit for relay R298H, FIG. 2a, is under control of R302f contacts. The total entry relays, FIG. 2d, R244, R247 and R293 are energized by means of a circuit path including R299b contacts, R298c contacts and cam contacts CR40'. These relays hold until the following cycle under control of cam contacts CR11, shown in FIG. 2c.

A program start signal for instructing the tape unit to write a total is issued by the card reader and directed to the SYNC by way of a path through the line L1 (FIG. 2e), cam contacts CR28, relay R265d n/c contacts, R297b n/o contacts, plug wire 809, relay R293g n/o contacts, relay R170a n/c contacts, relay R169b n/c contacts, plug wire 808, wire 851, SYNC connector 74 to the SYNC wherein the tape writing instructions will be initiated for writing of a tape total.

The instruction from the card reader to direct the tape unit to write a tape mark is issued on the cycle following the writing of tape totals extending from line L1, cam contacts CR28, relay R301b n/o contacts and through SYNC connector 65.

When the tape total is correctly written, an OK signal is provided to energize the OK relay R178. Accordingly, relay R250LP is energized by means of the following path: line L1, in FIG. 2g, cam contacts CR30, R107l n/c contacts, R178c n/o contacts, R107e n/c contacts, through either R265e n/c contacts or R301f n/o contacts, relay R250LP to the line L2. Energization of the latter prevents the picking up of relay R252. In addition, the energization of relay R250 prevents printing of 9's on a total cycle, which 9's, when printed, provide an indication that an error in writing the total has occurred.

Entry of data by way of the tape total entry (TTE) sockets of the buffer in preparation for the tape writing operations is under control of the appropriate plug wire connections seen in FIGS. 15, 2h and 2i. The sockets TTE1 through TTE19 are conditioned by contacts associated with the relays R244P, R247P and R293P, which relays are energized by means of a path extending through the line L1, FIG. 2d, cam contacts CR40', relay R298c n/o contacts, R299 n/c contacts, through the relays R244P, R247P and R293P to the line L2. An alternative path for energizing the same relay during a 9M operation is as follows: line L1, in FIG. 2d, cam contacts CR40', R265f n/o contacts, R98i n/c contacts, R102g n/c contacts, R107h n/o contacts, relays R244, R247, R293 to the line L2. A typical circuit path for entering, for example, a value 5 from the units order position of the accumulator total into the buffer is traceable beginning with the EMITTER 3, seen in FIG. 2o, through the 5 spot of said emitter, R141f n/c contacts, through CABLE 7 to FIG. 2k, through R147f n/c contacts, through CABLE 4 to FIG. 2m, 5 spot on the ACC. READ OUT POS. 1, wiper 638, segment 634a, through cable 14, ACC. READ OUT socket, plug wire 849, in FIG. 2i, to the socket TTE19. Accordingly, the appropriate buffer relays are energized, in the manner previously described, to store this digit value.

Entry of the batch number and the transaction code are effected by means of circuit paths previously described. As seen in FIG. 15, the transaction code is entered into buffer positions TTE1 and TTE2 under control of DIGIT EMITTER 3. The batch number is entered into the buffer from batch exit sockets to sockets TTE3 through TTE7 by way of plug wires 749 through 753.

Printing of the accumulator total, batch number, transaction code and unit counters totals on the register sheet of the card reader is initiated in one of the following ways: 9M master card control, depression of the PRINT KEY, or by depressing both the REWIND KEY and TAPE MARK KEY providing the immediately preceding operation was not a 9M operation.

When the PRINT KEY is depressed, FIG. 2a, relay R306LP is energized. Accordingly, relay 306b contacts, in FIG. 2b, close to complete a path to energize the print control relay R151. In turn, R151a contacts close to energize the PRINT CLUTCH. Relay contacts R151b close to energize the motor start control relay R122, the latter energizing the drive motor DM in the manner previously explained.

Total printing under control of a 9M master card is effected upon the de-energization of relay R112 following the completion of a tape total writing operation. Accordingly, relay R112d contacts, in FIG. 2b, provide a path to energize the print control relay R151, the latter causing total printing operations to be initiated in the manner described.

If a tape total error is detected during a tape writing operation relay R252LP, seen in FIG. 2t, is energized since, under this condition, the relay R250a contacts remain closed as a result of the error condition. Accordingly, relay R252a contacts, in FIG. 2a, close to energize the TAPE TOTAL light. R252b contacts open to prevent an auto start. Depressing the RESTORE KEY energizes the relay R252LT to enable the machine to be restarted. In the absence of a tape total writing error, an auto start is permitted after a total cycle initiated by a 9M master card.

TAPE RELAY CIRCUITS

Before describing the circuits of the tape unit it might be well to point out the various control keys of the tape unit. Referring to FIG. 19, the tape unit is provided with a start key ST, a reset key R whose function is to stop the machine as well as to reset various tape control circuits to be described, an unload key U whose function is to remove the tape from the vacuum columns, and a load rewind key LR whose function is to load the machine if the tape is in position to be loaded, and, if the tape is not ready to be loaded, the machine will be instructed to initiate a rewind operation.

In the following description of the circuits, it is assumed that the tape unit is in a LOADED condition, i.e., the tape is threaded around the various feeding instrumentalities and looped in the vacuum columns. Also, certain preliminary circuits must be established as a basis of operation for these control circuits. These preliminary circuits are set up upon closure of switch LS.

Referring to FIG. 31, closing of switch LS supplies 208 volts to a transformer T (diagrammatically indicated), which feeds a power supply PS', adapted to provide the tape unit with the necessary voltages. Most of the relays, for example those shown in FIGS. 34a and 34b, are connected to the +48 volt power supply, while the higher voltages, not shown, provide the various plate voltages, bias voltages, etc., required by the several electronic units. To insure that the high voltages in the power supply are built up to their operating values, a reset timer TMB is energized by the 208 volt A.C. source. This reset timer operates in a manner similar to that described for reset timer TMA to provide sufficient delay to allow the high voltages to build up. At the end of the time delay, contacts TMBa (FIG. 34a) close to complete a circuit from a +48 volt line, through contacts TMBa to energize a POWER ON relay R17. Energization of the latter causes a photolight relay R14 to be energized through normally closed UNLOAD relay contacts R22a, normally closed REWIND STATUS relay contacts R35d, normally closed LOAD-REWIND relay contacts R3a, LOAD POINT light 228 and TAPE INDICATOR light 230.

The TAPE BREAK light 286 is connected between the relay contacts R22a and the contacts R3a. During an UNLOAD operation, UNLOAD relay contacts R22a open to activate the TAPE BREAK light 286. During a LOAD-REWIND operation, relay contacts R3a transfer to activate the TAPE BREAK light 286. At the same time, the transfer of LOAD-REWIND relay contacts R3a deactivates the LOAD POINT light 228 and TAPE INDICATOR light 230 by shunting the lights with a circuit which includes a 33 ohm resistor.

A vacuum pump motor relay HD4 is energized through normally closed relay contacts R26*a*. With relay HD4 energized, its normally open contacts HD4*a* (FIG. 31) are closed, energizing the vacuum pump motor 126. When the vacuum pump motor 126 comes up to speed, the bellows 128 collapse closing vacuum supply switch contacts 130, as previously described. With tape in the columns, the operation of the vacuum pump motor 126 will create a vacuum in the columns to cause the left flapper contacts 278 (FIG. 25) and the right flapper contacts 280 to open in the manner previously described. In FIG. 34*a*, it can be observed that the opened flapper contacts 278 and 280 prevent the energization of a LEFT COLUMN relay R9 and a RIGHT COLUMN relay R10.

A circuit is completed to energize RUN relays R1 and R18 from the +48 volt line, through the now closed vacuum supply switch 130, the normally closed LEFT COLUMN SWITCH contacts R9*a*, normally closed RIGHT COLUMN SWITCH contacts R10*a*, now closed photolight contacts R14*a*, now closed POWER ON contacts R17*a*, normally closed tape break relay contacts R41*a*, RUN relays R1 and R18, in parallel, to ground.

Upon closure of relay R1*a* contacts, a circuit is established to energize relay HD1, from +48 volt line via RUN relay contacts R1a, R17d, now closed, and MOTORS relay HD1. Accordingly, HD1a contacts (FIG 31) close to cause a circuit to energize the FORWARD and BACKWARD motors 22 and 23.

Referring again to FIG. 34*a*, since the drive capstans are OUT, CAPSTAN IN switch 394 is open, as previously described, accordingly, CAPSTAN IN relay R7 is de-energized. With the head cover 136 DOWN, the HEAD NOT DOWN switch 344 opens, as previously described, thereby causing the HEAD NOT DOWN relay R8 to be de-energized. Accordingly, relay R8*a* normally closed points complete a circuit path for energizing CAPSTAN MOTOR relay DP2. In FIG. 31, upon closure of contacts DP2*a*, a circuit path, including contacts HD1*a*, is completed to energize the CAPSTAN MOTOR 164. The foregoing explains the preliminary circuit established upon closure of the line switch LS under the condition described.

Before presenting a description of the main control circuits, it will be necessary to point out the various electronic components employed in these circuits and to describe their operations rather briefly in as much as detailed descriptions have already been made for each of these components, shown in FIGS. 42 through 58, in the afore-mentioned copending application of W. S. Buslik and T. L. Vinson. The electronic components include AND circuits, OR circuits, cathode followers, inverters, grounded grid amplifiers, single shot multivibrators, triggers and diode gates. Each of the above circuit components is shown diagrammatically in block form in FIGS. 35*a* and 35*b* of the instant application.

*Tape unit electronic components*

The following describes briefly the function of the electronic components of the tape unit mentioned above and shown in the circuits of FIGS. 35*a* and 35*b*.

An AND circuit is a term employed to define a coincidence circuit which will produce an output pulse of a given polarity when there is a coincidence of input pulses of the same polarity on all of the input lines of the AND circuit. The AND circuit component is identified by the letter A.

An OR circuit is employed where there are two or more inputs which must be isolated from each other but which operate in such a way that if either one or all of the input lines are impulse, the output will produce a pulse of the same polarity. The OR circuit is identified by the letters OR.

A CATHODE FOLLOWER is essentially a triode in which an input is applied to the grid thereof and the output is taken from the cathode circuit. Essentially, it is an impedance matching device in which a high input impedance is converted to a low output impedance accompanied by gain in power and with no change in polarity in the output. The CATHODE FOLLOWER is identified by the leters CF.

An INVERTER, as the term suggests, has the function of inverting an input signal of a given polarity to an output signal of opposite polarity. The INVERTER is identified by the letter I.

A GROUNDED GRID AMPLIFIER has the function of changing an input signal to an output signal of increased amplitude with no change in polarity. This device is identified by the letters GA.

A SINGLE SHOT MULTIVIBRATOR resembles a trigger circuit in that it may be flipped from one state to another. It differs from the trigger in that once the device is "flipped" it automatically returns to its previous state after a predetermined time interval. Its normal state may be referred to as its stable state. Its flipped state may be referred to as its quasi-stable state, in which state it remains until a predetermined time period has elapsed. In the stable state, the left triode section is cut off while the right triode section conducts. The SINGLE SHOT MULTIVIBRATOR may be flipped either by a plate pullover method or by an appropriate signal to either grid. This device is identified by the letters SS.

The TRIGGERS are of the Eccles-Jordan type well known in the art. The TRIGGER is identified by the letter T. A TRIGGER comprises two cross-coupled triodes, a left triode section and a right triode section. When the left triode section is conducting, the right triode section is nonconducting. This state of stability is known as the ON condition of the TRIGGER. The OFF condition represents the second state of stability and occurs when the right triode section is conducting, while the left triode section is nonconducting. To change the status of the TRIGGER from one state to another, a variety of controls may be employed. A common way of changing the status, or what is known as "flipping" of the trigger, is to apply a negative pulse to the grid of the triode section which is conducting. Another method, known as plate pullover, consists of applying a negative voltage of sufficient amplitude to the plate of the nonconducting triode section. In resetting a TRIGGER to either an ON or an OFF condition, a positive voltage is accordingly applied to the grid of the appropriate triode section.

A DIODE GATE is a coincidence device which operates to provide a negative output when there is a coincidence of a positive voltage on a resistance input and a negative shift on another input. This device is identified by the letters DG.

Next to be described are tape unit circuits of a preparatory nature after which follows a description of circuits controlled by the start key ST.

The circuits concerned with a load point operation are initiated upon the sensing of the load point LP strip 212 by the load point photocell 226. When this occurs, the tape unit will issue a SELECT and READY signal indicating that it is ready to operate. Returning now to the load point circuits, it may be appreciated, in FIG. 35*a*, that the photocell 226 and its associated circuitry provides a negative pulse upon the sensing of the tape strip 212. This negative pulse is applied to an inverter 494 which issues a positive output. The latter is applied to the input of another inverter 496 which provides a negative output. The latter is applied to a single shot multivibrator 498 which is flipped by plate pullover action and remains in its flipped state for 20 milliseconds. In its flipped state, the left section of device 498 conducts. Accordingly, the output of the left section provides a negative pulse for 20 milliseconds, while the right section provides a positive pulse for 20 milliseconds. After the 20 millisecond interval, this device 498 returns to its orignal state whereupon the above signals are inverted. The 20 millisecond negative pulse is applied to the input of a cathode follower 500 which provides a negative output that is applied to a line 460 called the NOT ARRIVING AT LOAD POINT LINE. When the tape unit is being conditioned for a load point operation while the tape is in operation, the above nomenclature for the line 460 indicates that for 20 milliseconds the tape is arriving at load point. Thus, when the tape is not at load point, the line 460 is maintained at a positive potential. During the flipped state of device 498, a 20 millisecond positive pulse is issued from the right side of the device 498 and is applied through a cathode follower 502 to a line 504 which is connected to the output of the cathode follower 502 and to the input of an inverter 505 whose output is connected to a load point relay R42P in turn connected to ground. The relay R42P is energized to control stopping of the tape in a manner to be described.

Returning to line 504, it is further seen that the later is also connected to one input of an OR circuit 506 whose output is applied to an input of an AND circuit 512. The latter is also conditioned by the line 480, which, if positive, permits the AND circuit 512 to issue a positive pulse. The latter is applied to the input of a cathode follower 514. This positive output is then applied to the line 516 designated as SELECT AND AT LOAD POINT. This nomenclature indicates that the tape unit in question is selected for operation and that it is also at load point. In this application, although a plurality of tape units may be employed, only one, however, is used. The SELECT line 480 may for all practical purposes be assumed to be energized for all operations of the tape unit.

To explain the manner in which the line 480 is energized, reference is invited to FIG. 35*a*. Here it is noted that a SELECT SWITCH 474 is positioned to one of a plurality of lines of which line 1 may be assumed to be energized. Accordingly, with the switch 474 set into contact with line 1, a positive signal is then issued to a grounded grip amplifier 476 whose output issues a positive signal to the input of a cathode follower 478. The latter provides a positive output to the SELECT line 480. To indicate that the tape unit is in a SELECTED status, there is provided a circuit which includes an inverter 487 and a SELECT LIGHT 488 connected to a +140 v. source.

The SELECT line 480 is combined with a READY line to provide a SELECT AND READY line 486. The latter line, when positive, provides an indication that the tape unit is in a fully operative status and that the tape is not at load point. Energization of the line 486 is under control of an AND circuit 470 having three inputs and a single output. One input is connected to the SELECT line 480, a second input is connected to the NOT ARRIVING AT LP line 460, while the third input is connected to a circuit supplied by +48 volts. This circuit is energized by means of a path beginning with said third input to the AND circuit 470 and extending to the input of cathode follower 466, through the output of the latter, through R20*b* n/o contact points, relay R18*c* n/o contact points, relay R36*a* n/c contact points to a +48 volt source. The relay R18*c* contact points are now closed as a result of operations earlier described. The relay R20*b* contact points are closed as a result of a start key ST operation.

Referring to FIG. 34*a*, closure of the start key contacts ST picks up start relay R20 by means of a path extending through said relay R20, relay R21*a* contact points, relay R30*a* contact points, the start key ST contacts to the +48 volt line. An obvious hold circuit for the start relay R20 is immediately established upon closure of relay R20*a* contacts. Upon the closure of these contacts, the READY line 468 is energized with a positive pulse in the manner earlier described. A READY LIGHT 469 (FIG. 35*a*) glows upon closure of start relay contacts R20*b*, which contacts are connected in a circuit including a +48 volt source, relay R36*d* contact points, relay R18*d* contact points, relay R20*d* contact points and the READY LIGHT 469.

The circuits employed to advance the tape in a FORWARD direction will now be explained. In this operation, the forward control magnet 196*a* and the coil 200 are energized to place the feeding instrumentalities in DRIVE status to cause the tape to move in a forward direction.

Referring to FIG. 35*b*, the moving coil 200 is wired on one side to a line 434*a* connected between cathode follower 434 and the output of an inverter 452. The opposite end of the coil 200 is wired to a line 454*a* connected between cathode follower 454 and the output of an inverter 438 whose input is connected to the output of an inverter 432, the input of which being connected to a line 430 in turn connected to a DRIVE line 422. The inverter 452 is connected to the output of an inverter 446. When the DRIVE line 422 is energized, a positive pulse causes the moving coil network to impress a positive potential on the left end of coil 200 to cause current to flow through the coil from left to right to place the tape unit in DRIVE status. Conversely, the absence of a positive pulse on the DRIVE line 422 causes the moving coil network to impress a negative potential on the left end of the coil 200 to cause current to flow therethrough from right to left to place the tape unit in a STOP status.

Energization of the DRIVE line 422 may be effected in several ways, one way being by energizing the GO line 534 under the control of the SYNCHRONIZER in a manner to be later explained.

Referring to FIG. 35*b*, a coincidence of a positive pulse on the GO line 534, connected to one input of AND circuit 536, and on the SELECT and READY line 486, connected to the second input of said AND circuit 536, provides a positive output from the latter. This positive output is applied to an input of an OR circuit 464 which in turn provides a positive output that is impressed upon a DRIVE STOP cathode follower 420. The output of the latter impresses a positive pulse on the DRIVE line 422.

Energization of the FORWARD control magnet 196*b* is effected in the following manner. Referring to FIG. 32, there is shown the FORWARD control magnet 196*b* wired in a circuit which begins at a +140 volt source and then extends through relay R13*a* normally closed contact points, the FORWARD control magnet 196*b* to the output of an inverter 412 in turn wired to an inverter 410. As described in the afore-mentioned copending application, under the condition of a forward control operation the inverter 410 is placed in a nonconducting status. Accordingly, a positive pulse is passed on to the input of the inverter 412. The latter then supplies a negative potential to the left side of the magnet 196*b*. Under this condition, the FORWARD control magnet 196*b* is energized. With the latter magnet energized and with coil 200 energized in the manner described, the tape is driven in a FORWARD direction.

The tape unit may also be placed in DRIVE status by positioning the MANUAL CONTROL switch 414 (FIG. 32) to its FORWARD (F) position. With the switch 414 set to its F position, drive relay R34 is energized by means of a circuit traceable from ground, relay R34, F position of switch 414, relay R35*b* n/c contacts, relay R31*b* n/c contacts, relay R18*b* n/o contacts to +48 volt source. Accordingly, relay R34*a* contacts close to establish a circuit which energizes the DRIVE line 422 to duplicate operations previously described in connection with the energization of the moving coil 200. Referring to FIG. 35*b*, closure of relay R34*a* contact points applies a +48 volt source to a cathode follower 456. The latter applies a positive output to an input of an AND circuit 458 also conditioned by the line 460. The latter, when positive, causes the AND circuit 458 to provide a positive output to a line 462 connected to one output of the OR circuit 464. The latter provides an output to and through the cathode follower 420 to impress a positive potential on the drive line 422. The energization of the line 422 energizes the moving coil 200, in the manner described, to place the tape unit in DRIVE status. In the circuit network which is between the +48 volt source and the input to the cathode follower 456, it may be appreciated that the other circuit paths may be established to place the tape unit in DRIVE status. For an explanation of the circuits, reference is invited to the aforementioned copending application. The tape unit, when placed in a forward condition, causes the tape to advance until it is stopped either by a stop signal from the SYNCHRONIZER or, when the end of the tape unit is sensed, by the TI photocell 232.

Before describing BACKWARD control circuits, it might be well to describe circuit operations contingent upon the sensing of the TI point on the tape. Referring to FIG. 35*a*, upon the sensing of the TI strip 212 by the tape unit photocell 232, the latter provides a negative output to an inverter 676 which provides a positive output to a line 682 by way of a grounded grid amplifier 678 and a cathode follower 680. The line 682, in conjunction with a SELECT, READ and WRITE signal on a line 578, provides a positive pulse on the output of an AND circuit 684. The latter is connected to an inverter 686 which supplies a negative output to flip on, by plate pullover action, a trigger 688. Flipping the trigger on causes the right side thereof to provide a positive output which is fed through a cathode follower 690 to an AND circuit 692 which is also conditioned by the SELECT line 480. The latter, if positive, causes the AND circuit 692 to provide a positive output which is fed through a cathode follower 694 to a SEL & TI ON line 696. This line is employed to indicate the fact that the tape unit has sensed the TI point. A visual indication is also given of this condition by a TI LIGHT which is connected to the cathode follower 690 by means of a circuit which includes line 703 and inverter 688, the TI LIGHT 702 connected to a +140 volt source. Returning to trigger 688, while the latter is in its flipped condition, the left side thereof provides a negative pulse through a cathode follower 696 to an input of an AND circuit 698, also conditioned by the SELECT line 480. When the latter is positive and the trigger 688 is ON, the AND circuit 698 provides a negative output through a cathode follower 700 to a SEL & TI OFF line 701.

After receiving signals from both lines 696 and 701, the machines in question proceed to act accordingly, after which appropriate signals are directed to the tape unit to turn off the trigger 688 by means of a positive signal fed through a TURN OFF TI line 705, AND circuit 706 also conditioned by the SELECT line 480, from the output of the AND circuit 706 to a right input of said trigger 688.

The trigger 688 may be turned on by means of a signal fed through a TURN ON TI line 708 which is connected to a left input of the trigger 688 by way of an AND circuit 710 also conditioned by the SELECT line 480.

Resetting of the trigger 688 is assured during preliminary operations of the tape unit by means of a circuit which applies a grounded signal to another input fed to the right side of the trigger 688. This circuit is under control of a power relay contact point R17*c*, and also relay R22*d* contact points.

The foregoing explains tape indicator circuit operations. The following is concerned with backward operations of the tape. The instructions to the tape unit to initiate a backward operation may be controlled either from the SYNCHRONIZER or by means of a manual operation.

The manual operation is initiated upon setting the switch 414 to its backward position B, in which event the backward control magnet 196*a* is energized, also the moving coil 200 is energized to place the tape feeding instrumentalities in what has been referred to as the DRIVE status. When both the backward magnet 196*a* and the coil 200 are energized, the tape is caused to be moved in a backward direction under control of the following circuits.

Energization of the magnet 196*a* is accomplished by means of the circuit shown in FIG. 32. Upon the setting of the switch 414 to its backward position B, backward relay R33 is energized by means of a path beginning with ground, relay R33, B position of switch 414, relay R35 n/c contacts, relay R31*b* n/c contacts, relay R19*b* n/c contacts to +48 volt source. This circuit provides a positive pulse through relay R33*b* n/c contacts, through cathode follower 404, through OR circuit 406, cathode follower 408 to the input of inverter 410. The latter provides a negative output which is impressed on one side of the backward control magnet 196*a*, through the latter, relay R13*a* n/c contacts, to +140 volt source to energize the backward control magnet 196*a*.

Upon energization of the relay R33, the associated relay R33*a* n/o contacts close to energize drive relay R34 by means of a circuit path beginning with ground, relay R34, relay R33*a* n/o contacts, to the +48 volt source. Upon closure of relay R34*a* contacts, the moving coil 200 is energized in a manner to place the tape feeding instrumentalities in DRIVE status. Referring to FIG. 35*b*, closure of relay R34*a* contact points causes +48 volt to be impressed through cathode follower 456 to the AND circuit 458 also conditioned by the line 460. When the latter is also positive, the output of the AND circuit 458 is passed through the OR circuit 464, through cathode follower 420 to energize the DRIVE line 422. Energization of the latter line causes the moving coil 200 to be energized to cause the tape to feed in a backward direction.

Backward operations of the tape may be controlled by means of a combination of a backward signal and GO signal issued by the SYNCHRONIZER. In this instance, the latter applies a positive pulse to a BACKWARD line 528 shown in FIG. 35*b*. If the SELECT and READY line 486 is also energized, AND circuit 530 permits a positive pulse to be applied to line 532 which is connected to the OR circuit 406, shown in FIG. 32. The positive pulse passes through the latter, through a cathode follower 408, an inverter 410 which applies a negative pulse to the backward control magnet 196*a* to cause the latter to be energized.

When a positive pulse is also applied to GO line 534 at a time when the SELECT and READY line is also energized, the DRIVE line 422 is also energized to cause energization of the moving coil 200 in the manner set forth.

Backward operations of the tape may also be carried out under control of the LOAD REWIND button. The latter closes contacts which initiate a backward operation either in the manner described or under a high speed operation known as RAPID REWIND, depending upon the position of the tape as described in the aforementioned copending application. Assuming that the tape position dictates a slow speed backward operation, then when the load rewind button contacts are closed, it eventuates a circuit which energizes a load rewind relay R40. The contact points of this relay control various circuits which prepare the feeding instrumentalities of the tape unit for backward operations of the tape described in detail in the aforementioned copending application.

Energization of the relay R40 is accomplished by means of the following circuit. Referring to the bottom of FIG. 35*b*, the circuit path begins from +48 volt source and extends through relay R20*a* n/c contacts, LR contacts, through cathode follower 780, AND circuit 782 also conditioned by a READ status line 590 now assumed to be at a positive potential. From the output of the AND circuit 782, the circuit proceeds through OR circuit 786, through cathode follower 788, inverter 790 which provides a negative output pulse, relay R42*c* n/c contacts, relay R40 to ground.

Relay R40*a* contacts, FIG. 34*b*, in conjunction with relay R14*c* contacts, close to pick up the relays R2 and R3. A hold circuit for these relays is established through relay R2*b* contact points. Upon the closure of relay R2*d* contact points, a circuit is established to energize relay R21LT. Closure of R2*a* contact points, in conjunction with contacts 256, establish a circuit path to pick up relays R5, R6 and HD7, the latter controls the timing motor TMA, shown in FIG. 31.

Upon release of the LR button, the above relays R2, R3, R5, R6 and HD7 are deenergized in view of the fact that holding circuits are not established under the conditions described. However, circuits will be established to energize the low speed motor 114 (FIG. 31) in order to drive the tape slowly in a backward direction. This is accomplished by energizing relay DP1, in FIG. 34*b*. Also, relay R2*d* contacts close under control of the LR button contacts to pick up relays R31, R21LT and R26LT. Accordingly, relay R31*d* contacts close to energize rewind status relays R35 and R36. Relay R35 contacts close to establish a hold circuit for the relays R35 and R36. In FIG. 32 is will be seen that the R35*b* contacts transfer to establish a circuit for the backward control relay R33. The latter initiates a backward drive operation in the manner described. The tape continues to move in a backward direction until the load point is encountered, whereupon circuits are established to stop the machine at load point. When the latter is sensed, the relay R42 is energized as earlier described, accordingly, the contacts 42*a*, in FIG. 34*b*, drop out the relays R35 and R36. Relay R35*b* contact points also open to drop out the backward control relay R33.

When conditions dictate a rapid rewind operation, the tape is moved in a backward direction at high speed by means of the rapid rewind motor shown in FIG. 31. The operation is initiated upon closure of the LR button contacts (FIG. 35*b*) which energize relay R40 in the manner described. This in turn results in the energization of relays R2 and R3, in FIG. 34*b*. The latter relays remain energized after the LR button contacts are released. Rewind start relay R12 and relay DP3 are also energized at this time. The former relay causes the brake magnets 42*a* and 48*a* to be lightly energized and also to permit a slight energization of the reeling clutch magnet 46*a* to allow slippage of the clutch as earlier mentioned. Upon energization of relay R4, the brakes 42*a* and 48*a* are isolated from the circuit. Upon closure of DP3*a* contact points, a circuit is established to energize the rapid rewind motor 236. As the tape approaches its end point (TI), arm switch contacts 256 close to pick up relays R5, R6 and HD7. R5*d* contact points accordingly open to drop out the relays R12 and DP3. Contacts DP3*a* in turn open to de-energize the rapid rewind motor 236. The contact points of the relay R12 in turn provide a circuit to energize lightly the brake magnets 42*a* and 48*a* to cause the tape to slow down. The relay R6 enables, among other things, the energization of the relay DP1. Also, the timing motor TMA is energized under control of HD7*a* contact points. TMA*a* contact points close to complete a circuit to the low speed motor relay HD6. The latter, when closed, initiates a circuit to energize the low speed motor which causes the tape to move slowly until the load point is encountered after which the tape is stopped. The foregoing briefly describes circuit operations attending a slow speed rewind and also a rapid rewind. Other variations of slow speed rewind and rapid speed rewind are described in the aforementioned copending application.

Before describing the READ and WRITE circuits of the tape unit, it might be well to point out the function of the reset key. The latter, when manually operated, closes associated contacts R to energize relay R30 shown in FIG. 34*a*. The contact points of relay R30 are distributed throughout various circuits to either initiate or stop various machine functions. One of these functions is to cancel a start condition previously set up in the machine. The action of relay R30 in this case de-energizes the start relay R20. Another of these functions is to stop the movement of the tape while the latter is being moved either in a forward or in a backward direction. Still another function is to slow down the movement of the tape to a slow backward operation when the tape is initially caused to move at a rapid rewind rate of speed. This last function is controlled by depressing both the RESET button and the LR button simultaneously.

The tape unit described in the afore-mentioned copending application employs a 7 bit code to represent the numeric, alphabetic and other special characters. Each bit is written by means of an associated R/W head. Seven of such heads are employed and placed in vertical alignment side by side. Each head is capable of writing on, or reading from, a specific track extending longitudinally of the tape. Accordingly, the bit representations for each character are written, or read, simultaneously, to designate a particular character. The binary code 1—2—4—8 is employed to represent numeric characters. A binary 1—2—4—8—A—B code is employed to represent alphabetic and special characters. A "C" bit is employed for redundant coding when it is desired to represent the numeric characters by an even or odd number of bits, depending upon the choice selected. Since the numeric 1—2—4—8 code, together with an appropriate "C" bit, is only employed in the embodiment forming the present invention, it will not be necessary to describe the coding employed to represent alphabetic and special characters. The numeric characters 0–9 are represented by the following binary code:

| Numeric Digits | Binary Tracks C | 8 | 4 | 2 | 1 |
|---|---|---|---|---|---|
| 0 | | x | | x | |
| 1 | | | | | x |
| 2 | | | | x | |
| 3 | | | | x | x |
| 4 | | | x | | |
| 5 | | | x | | x |
| 6 | | | x | x | |
| 7 | | | x | x | x |
| 8 | | x | | | |
| 9 | | x | | | x |

In the above the "C" bit is not shown since the latter will be employed, depending upon the choice selected, to represent the numeric characters by either an even number or an odd number of bits. If the latter is selected, a "C" bit is written for the digits 0, 3, 5, 6 and 9. On the other hand, if an even number of bits is desired, the "C" bit is written for the digits 1, 2, 4, 7 and 8.

In FIG. 38 there is shown, in diagrammatic form, a R/W head 544 provided with a pair of windings 616 and 618. When these WINDINGS are alternately energized, a corresponding change is produced in the flux influencing the tape passing over the head, which tape is moving in a direction from left to right. In this arrangement, current flow is continuous through one or the other of the windings 616 or 618. A bit representation is made on the tape at a point when current flow is switched from one winding to the other, at which point flux is generated in a reverse direction to effect a corresponding change in the orientation of the magnetizable medium on the tape. As long as current flow through a particular coil winding is continuous, the flux generated is continuous, hence no recording of bits takes place. The absence of a flux change denotes the absence of a bit, hence, a binary zero.

In FIG. 37 there is seen a chart of a writing pattern on the 1—2—4—8 and C tracks on the tape. Writing is effected at the intervals indicated at the top of the chart as N, P, Q, S, T, U and V. At interval N, for example, a bit is written on tracks 1, 4 and C. At interval P bits are written on tracks 2 and 8. At inerval Q, bits are written on tracks 2, 4 and C, etc.

FIG. 39 is represented to show the various bit representations on the 1—2—4—8 tracks of the tape for the digits 0 through 9.

During a reading operation, signals are read from the tape when a change in orientation is sensed by the R/W head 544 in which event a signal is generated. Before the bits can be written on the tape to represent the various characters, it will be necessary to first describe the various preparatory writing control circuits, shown in FIG. 35*b*.

With reference to FIG. 35*b*, when it is desired to place the tape machine in a write status, a SET WRITE line 556 is energized in a positive sense by means of a line **536*a* from the synchronizer. The coincidence of the positive voltage on the SET WRITE line at one terminal of an AND circuit 558 with a positive voltage on the SELECT and READY line 486 at the other terminal of AND circuit 558, provides a positive output which is fed to the left-hand input of a R/W status trigger 560 turning it on as an indication of write status. On the other hand, when it is desired to place the tape unit in a read status, a SET READ line 562*a* from the synchronizer is shifted positive. The coincidence of the positive voltage on the SET READ line 562 at one terminal of an AND circuit 563 with a positive voltage on the SELECT and READY line 486 at the other terminal of AND circuit 563, provides a positive output which is fed to the right-hand input of the R/W status trigger 560** turning it off as an indication of read status.

When the R/W status trigger 560 is in the write status, its right-hand output terminal is at a positive potential. This positive potential is transmitted via a cathode follower 564, a grounded grid amplifier 565, line 566, and a cathode follower 567 to a WRITE STATUS line 568. This write status line 568 is utilized by the R/W circuits of FIG. 36 in a manner to be presently described. A positive output of grounded grid amplifier 565 is also transmitted via a line 569, and a cathode follower 570 to one input of an AND circuit 571. The other input of AND circuit 571 is connected to the SELECT and READY line 486 which is positive during the SELECT and READY status of the machine. The positive output of AND circuit 571 is transmitted via a line 572, through cathode follower 573 to a SELECT, READY and WRITE line 574. The latter is used to indicate the fact that the tape unit in question is ready to write. The positive potential on the line 572, also indicative of SELECT, READY and WRITE, is fed via a cathode follower 576 to a SELECT, READY and WRITE line 578 which is utilized by the tape feed machine itself in a manner to be described. SELECT, READY and WRITE line 578 is connected to one input of an AND circuit 580, the other input of which is connected to a WRITE PULSE line 582. WRITE PULSE line 582 is energized by the synchronizer by means of a line **582*a* in a manner to be explained for gating a writing operation. A positive potential on the two inputs of AND circuit 580 accordingly causes a positive voltage to be transmitted from the latter and through a cathode follower 584 to a GATED WRITE PULSE line 586**.

When the R/W status trigger 560 is in read status, its left-hand output terminal is at a positive potential. This positive potential is applied via a cathode follower 588 to a read status line 590. The latter is applied to one input of an AND circuit 592, the other input of which is connected to the SELECT and READY line 486. When both inputs of AND circuit 592 are positive, the output is positive and is applied via a grounded grid amplifier 594 through a cathode follower 598 to a SELECT, READY and READ line 600. The SELECT, READY and READ line 600 is connected to the synchronizer. The output of the grounded grid amplifier 594 is also connected via a cathode follower 602 to a GATE READ PULSE line 604.

To avoid writing prematurely on the tape, the trigger 560 is maintained in read status by means of a circuit which includes line **560*a*, start relay contacts R20*c* and the normally open rewind status relay contacts R36*c*, in parallel therewith, to ground. Ground potential on the line 560*a* maintains the trigger 560 in its read status. The start relay contacts R20*c* are closed until the start button is actuated, the tape unit being held in a read status until the start of operations. Rewind status relay contacts R36*c*** close during a rewind operation to prevent writing on the tape during rewind.

The foregoing explains the energization of the WRITE STATUS line 568, the GATED WRITE PULSE line 586 and the GATE READ PULSE line 604.

The following is concerned with the R/W circuits of the tape machine. During a writing operation, it should be mentioned that the erase head coil 608, shown in FIGS. 38 and 36, is continuously energized. In FIG. 38 it may be seen that, when the erase head coil 608 is energized and with the tape moving from right to left, any information previously written on the tape will be erased in order to present a clean tape to the R/W heads during a writing operation. On all other tape operations the erase head is maintained in a de-energized state.

The write circuits are shown diagrammatically in FIG. 36. Here we find enclosed in a rectangle 614 the R/W coils 616 and 618, which coils are associated with the R/W head positioned over the C track to read or write the C bit on the tape. The circuitry associated with this R/W head is shown enclosed within a rectangle 662, the circuitry associated with each of the remaining R/W heads being similar. Accordingly, a diagrammatic representation is made of the remaining R/W head circuits and each is identified by one of the following rectangles: 665, 666, 667 and 668. In the order named, these represent the circuits for the reading or writing of the bits 8—4—2—1 tracks on the tape. As seen in FIG. 36, the coils 616 and 618 are connected to appropriate left and right triode sections of the double inverter 612. The latter is controlled by a R/W trigger 610 and a write status inverter 620. The inverter 620 has its input connected to the GATE WRITE PULSE line 586. The trigger 610 has its left input connected to a cathode follower 672 whose input is connected to a WR CHECK CHAR line 674. When a positive pulse is impressed on this line, it passes through the cathode follower 672 to the R/W trigger 610 to turn the latter off in the event the trigger is conducting. The same positive pulse has no effect on the trigger in the event the latter is in its off state. The right side of the R/W trigger 610 is connected to the output of a diode gate 630 which has its diode input connected to the GATE WR PULSE line 586, and a resistance input connected to a WR BUS C socket 622. For each C bit to be written, the diode gate 630, in a manner to be described, provides a negative output which flips the trigger 610. Now if the write status inverter 620 is in a conductive state, then the above operation of the trigger causes an appropriate triode section of the inverter 612 to be energized, causing in turn an appropriate one of the windings 616, 618 to be energized. Upon energization of the appropriate winding and the consequent change in the flux produced thereby, a corresponding change in the orientation of the magnetizable medium of the tape is produced. This latter change accomplishes the writing of a bit on the C track of the tape.

Energization of the erase head 608, shown in FIG. 36, is effected during a writing operation by way of a path traceable through the erase head 608 through a double triode enclosed within the box 606. Control of the grid of the latter triode is applied by way of WR STATUS line 568 which line is energized, in the manner previously described, under control of the R/W status trigger 560.

For each bit written, there is an accompanying write echo pulse generated. In the case of the C bit, a write echo pulse is generated by the inverter 612 and impressed on an output line 632. The latter is capacitively coupled to an inverter 634, from which an output is connected through a cathode follower 636 to a WRITE ECHO BUS C socket 638. Appropriate WRITE ECHO BUS sockets 639 through 644 are provided for the remaining WR circuits as seen in FIG. 36. These write sockets are connected in a manner to be explained for the purpose of checking the writing operation.

Read circuits are also provided for each of the R/W heads. In the case of the reading of the C bit, appropriate circuits are provided to sense the C bit representations on the tape. As seen in FIG. 36, the C bit reading circuit extends from the left-hand side of the coil winding 616 and includes three stages of amplification, namely, amplifiers (AM) 646, 648 and 650. The output of the latter is capacitively coupled to a cathode follower 652, the output of which is connected to a READ SYNC BUS C socket 654. Similar circuits for the remaining R/W heads terminate in appropriate hubs designated 655 through 660. Also connected to the input of the cathode follower 652 is the GATE READ PULSE line 604. When the latter is positive during read status of the tape machine, the cathode follower 652 is conditioned to pass signals originating at the output of the amplifier 650 through the cathode follower 652 to its appropriate socket 654. Thus, during a read operation, when a bit is sensed on a C track of the tape, an appropriate signal is provided at the C socket 654. In like manner, signals are generated on appropriate ones of the sockets 655 through 660 for bits sensed on the remaining tracks of the tape.

SYNCHRONIZER

The synchronizer provides, among other things, the necessary program means to achieve the proper coordination between the card reader and the tape unit. A three-position ring is provided to cause the tape unit to write a record, read it backward for verification, and finally space forward over the recorded data, after which the tape advance is stopped until further instructions to advance are given for the writing of the next record. The above sequence is carried out for each record accurately transcribed on the tape. However, in those instances where a card error, write error, or read error occurs during a transcribing opeation, or, where in the absence of these errors the card reader fails to send an OK signal to the synchronizer, the space forward, i.e., the third step of the program, is not executed; instead, the tape unit, after executing steps one and two of the program, initiates the writing of the next record on top of the immediately preceding written record. The writing of the record data in this instance on the portion or area of the tape on which record data was previously written has no effect on the validity of the record data to be written as the former is erased in the process.

It might be well to mention the fact that the various electronic components, with the exception of those shown in FIGS. 14, 14*a*, 42, 42*a*, 43, 43*a* and 44 of the instant application used in the synchronizer forming a part of the present invention, are the same as those shown and described in detail in a pending application to W. D. Winger et al., Serial No. 566,401, filed February 20, 1956, titled "Data Transmission System" and assigned to common assignee. It is therefore only necessary to describe briefly the general operation of these components as well as explain the notations employed within the various blocks representing these components.

An AND circuit is a coincidence device identified as A. An OR circuit is identified as O, $O_{-AC}$, $O_{+AC}$.

TRIGGERS are identified as T, $T_S$, $T_A$, $T_K$, $T_C$.

The basic trigger, well known in the art, is identified as a T within the block. The side that is normally conducting is identified by an alphabetic character shown either in the lower left-hand corner or the lower right-hand corner of the block. The trigger is considered OFF when the right-hand portion thereof is conducting, in which instance the output from the right side of the block is considered to be down, while the output from the left-hand side of the block is considered to be up.

The trigger is controlled in its operation by input line drawn to the bottom side of the block on either the left or right sides. The trigger is turned ON by applying either a positive signal on the bottom left input, or by applying a negative signal on the bottom right input. The trigger is turned OFF upon application either of a negative signal on the bottom left input or a positive signal on the bottom right input.

The trigger may also be controlled in binary fashion by applying a negative voltage transition on an input line directed to the bottom center of the block.

These input lines may be further conditioned by either a capacitor or a diode or a combination of both. When the capacitor is used alone, the trigger is then responsive to a voltage shift applied to the input. When the diode alone is used, the trigger is responsive to voltage levels either up or down depending upon the orientation of the diode in the input circuit. When the combination of a capacitor and a diode is employed in the input, the trigger is responsive to a transient, either positive or negative, depending upon the orientation of the diode in the circuit. Various alphabetic notations are used in the blocks to indicate under what circumstances the triggers are reset, for example, an X indicates power on reset. The letters R, U, V, W, X and Z indicate reset either by logic alone, or, either by logic or power on reset.

The trigger identified as $T_A$ is similar in operation to that described for trigger T. The trigger $T_C$ functions as a shaping amplifier whose output follows its input which is not responsive to noise signals. The input is drawn to either the bottom side of the left-hand side, while the output is drawn to either the top side of the right side of the block.

The trigger $T_S$ is another shaping amplifier but faster in operation than the $T_C$ trigger.

Trigger $T_K$ operates in the manner described for the trigger T except that it has no reset control and is not responsive to noise signals.

CATHODE FOLLOWERS in general add nothing to the logic but are used principally to power a signal. Cathode followers identified as $CF_O$ and $CF_{XO}$ behave as OR circuits.

SINGLE SHOT MULTIVIBRATORS are identified as SS or $SS_D$.

The normal state of an SS is OFF, which means that the right-hand portion thereof is conducting. The inputs to an SS device are conditioned by the combination of a capacitor and a diode to enable the SS to be controlled, in the manner described, for the control of the triggers. In the operation of an SS, when the latter is flipped, the status is changed for a given period of time, after which it returns back to its normal state.

An $SS_D$ is flipped upon the application of an input signal and remains flipped as long as the input signals are applied at a rate greater than the timing of the $SS_D$, the timing of the latter beginning at the point where the input signals terminate. The input to the $SS_D$ is conditioned by an inverter $IN_{POS}$.

INVERTERS in general are used to invert a signal. The inverter identified as $IN_{PF}$ is a pulse forming inverter which provides a 2 $\mu$s. positive output pulse in response to a negative shift applied to its input.

Figure 44:
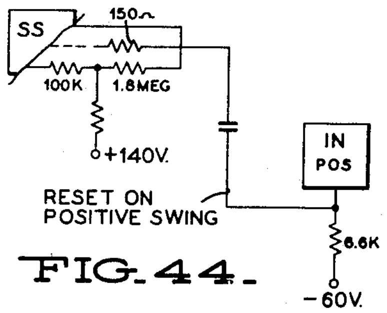

The inverter $IN_{POS}$ is used in conjunction with an $SS_D$ and operates on positive-going pulses. The details of this circuit are shown in FIG. 44.

A DIODE GATE is identified as a $D_G$ and is a resisted gated AND device having a driving input directed to the left side of the block and a set input directed to the top side of the block. The output is taken from the right side of the block. The output is negative in response to a negative shift on the drive input providing the set input is up.

A PHASE SPLITTER is identified as $P_I$.

Figure 3A:
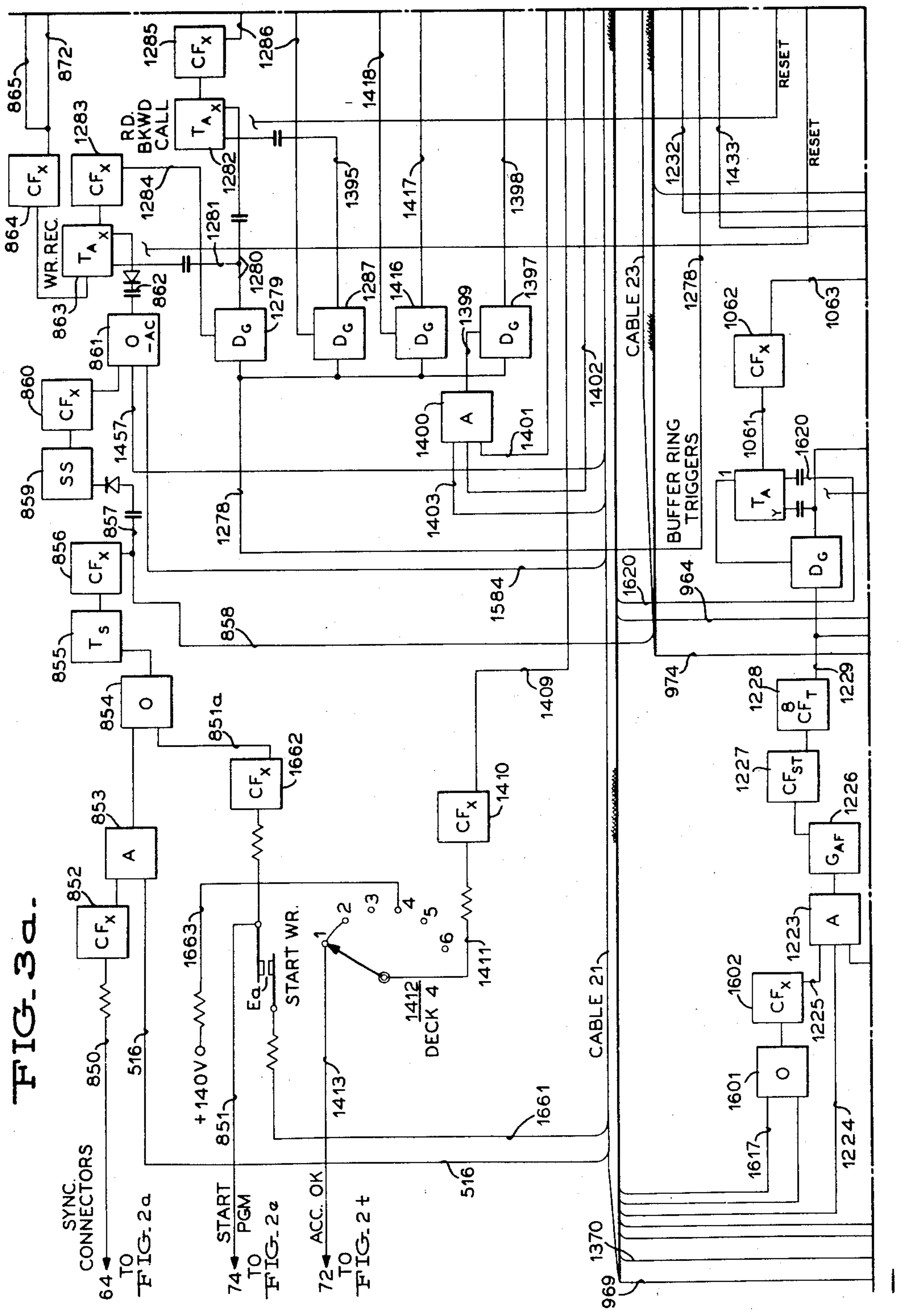
Figure 3B:
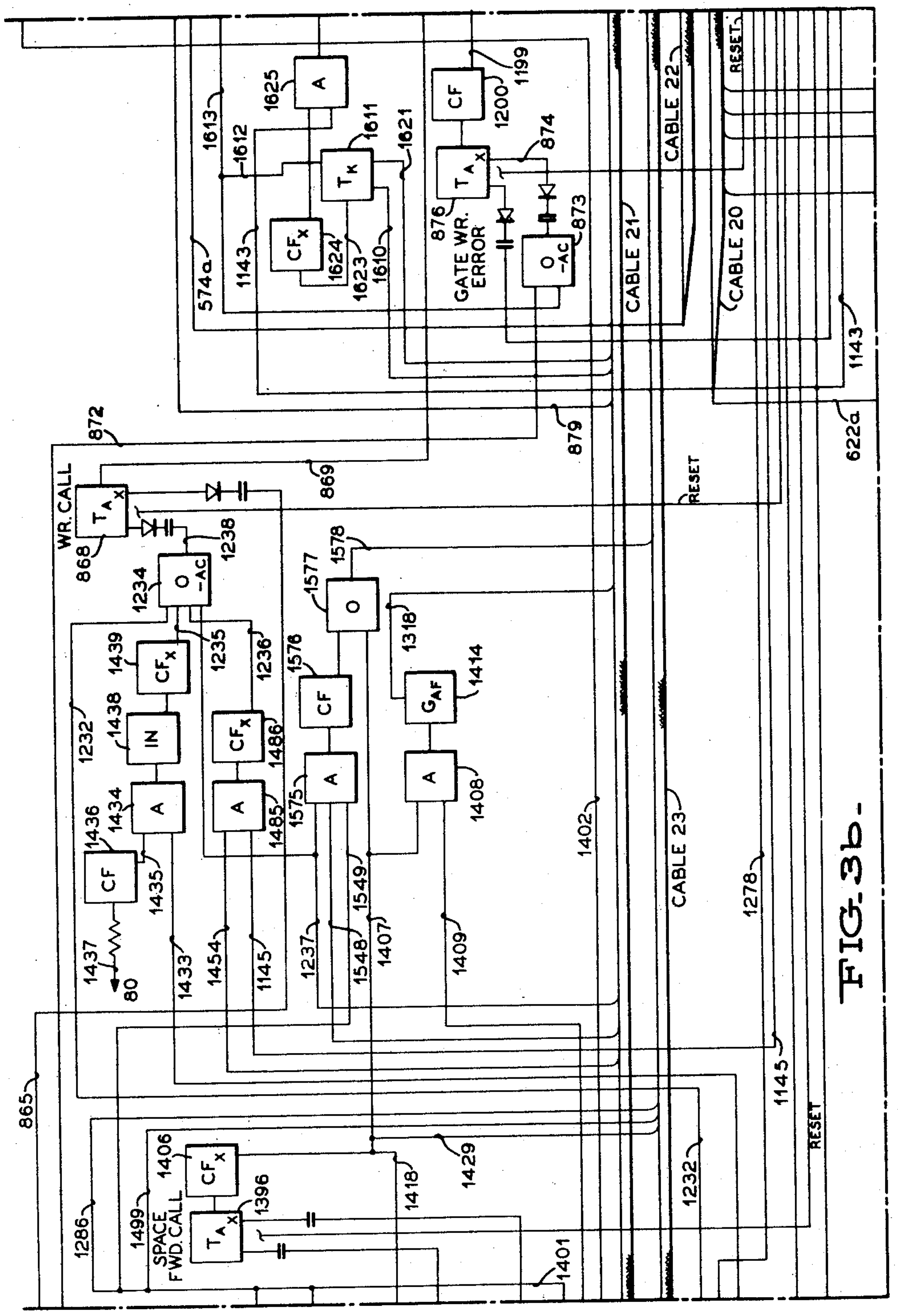
Figure 3C:
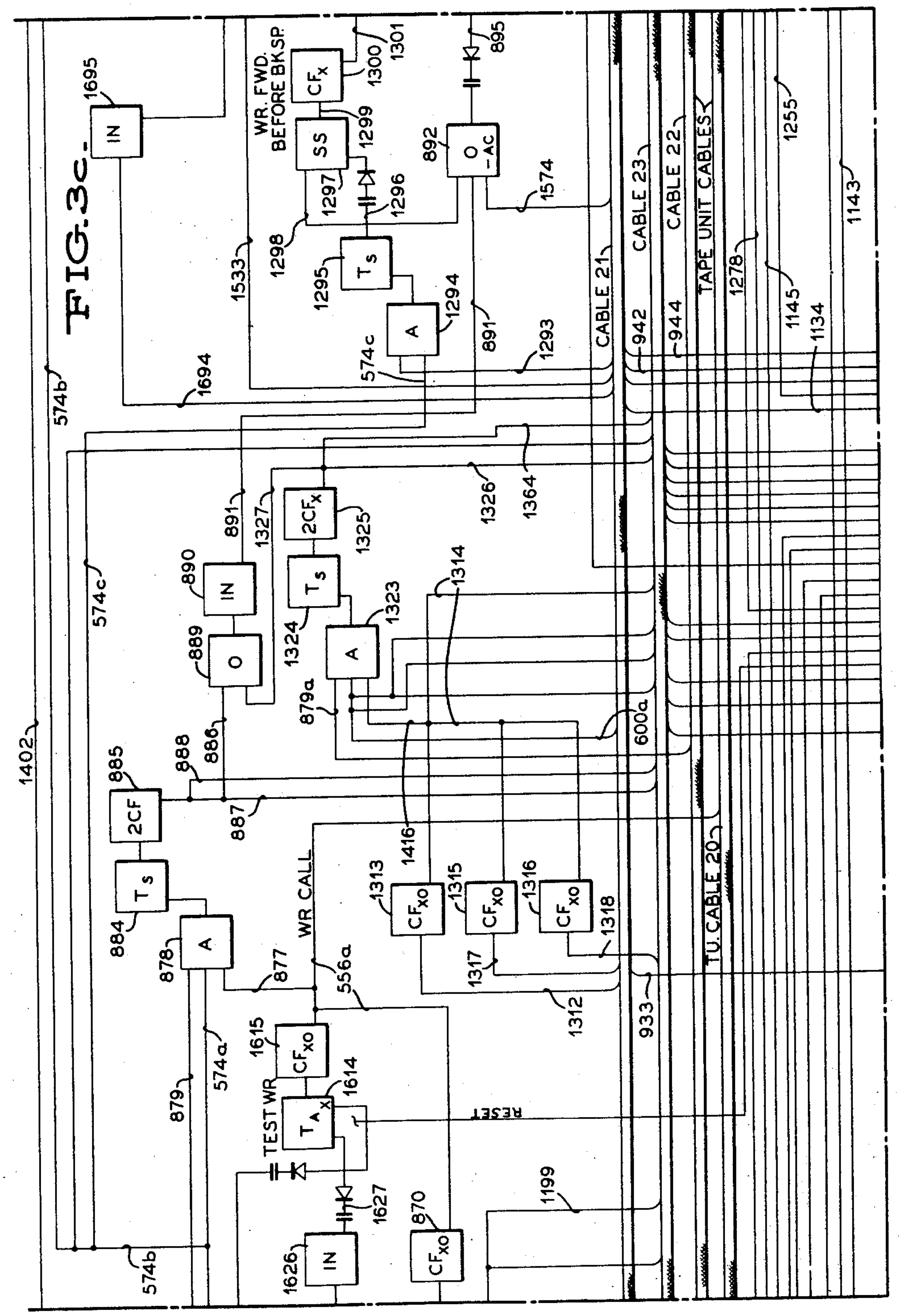
Figure 3D:
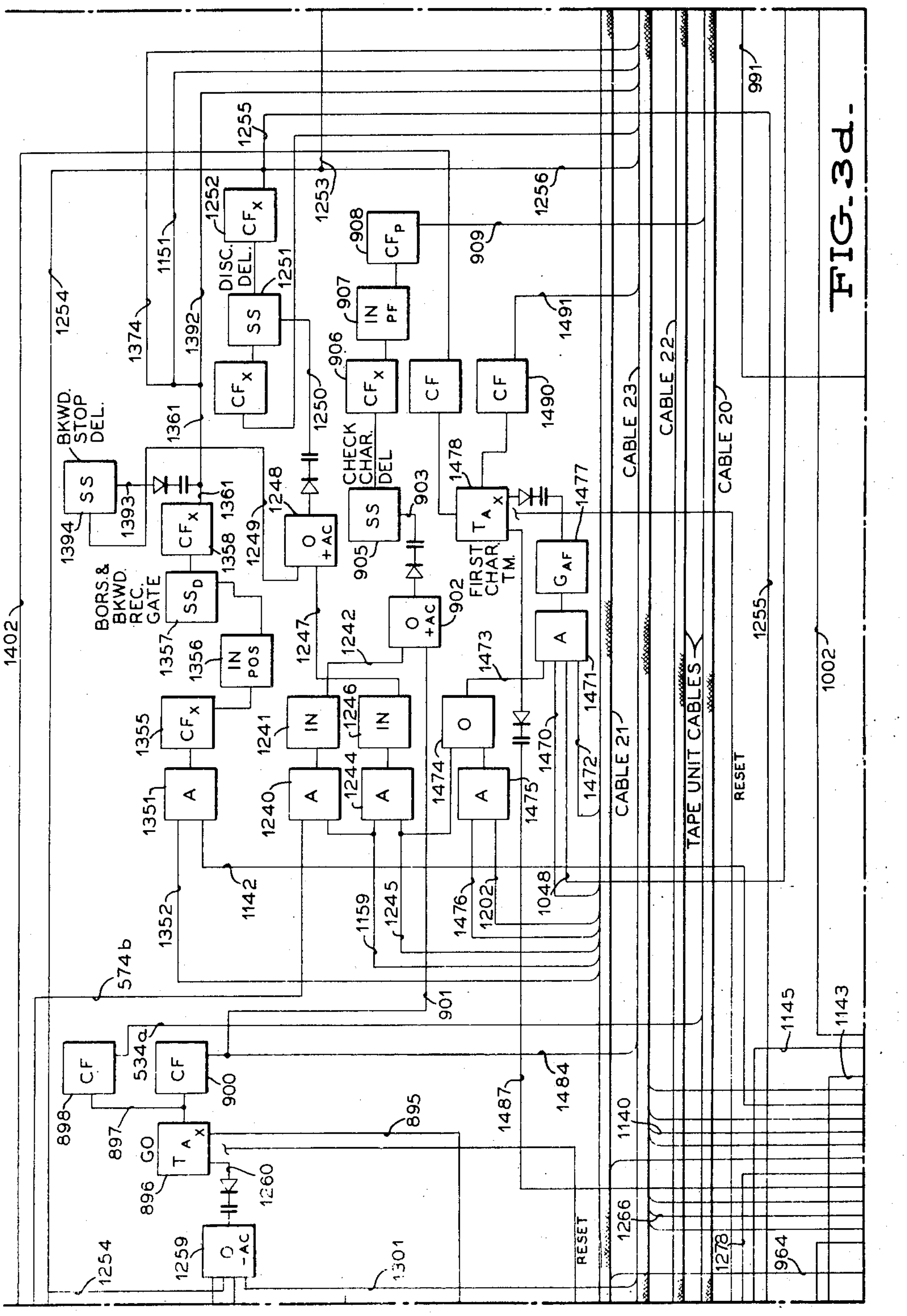
Figure 3A:
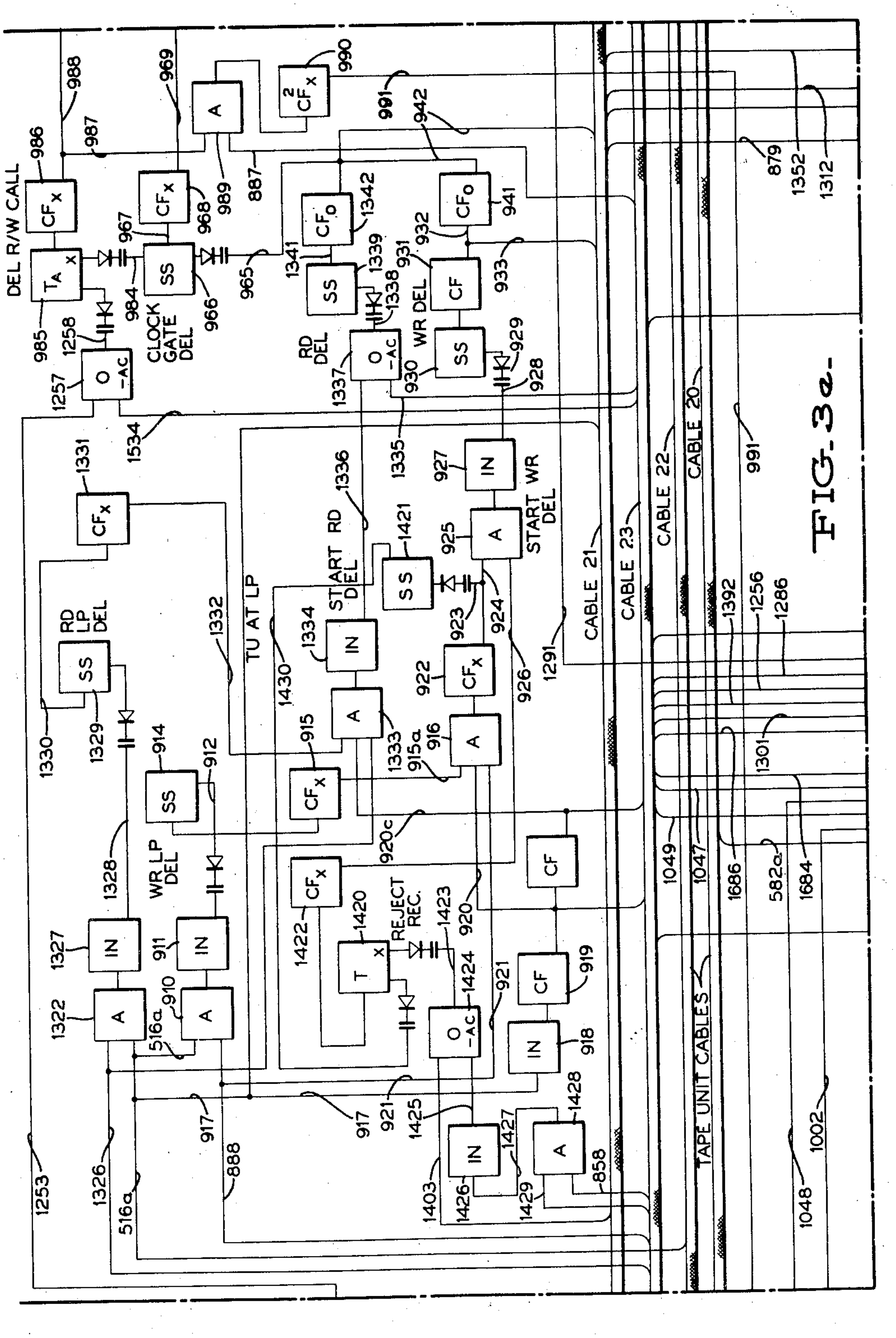
Figure 3F:
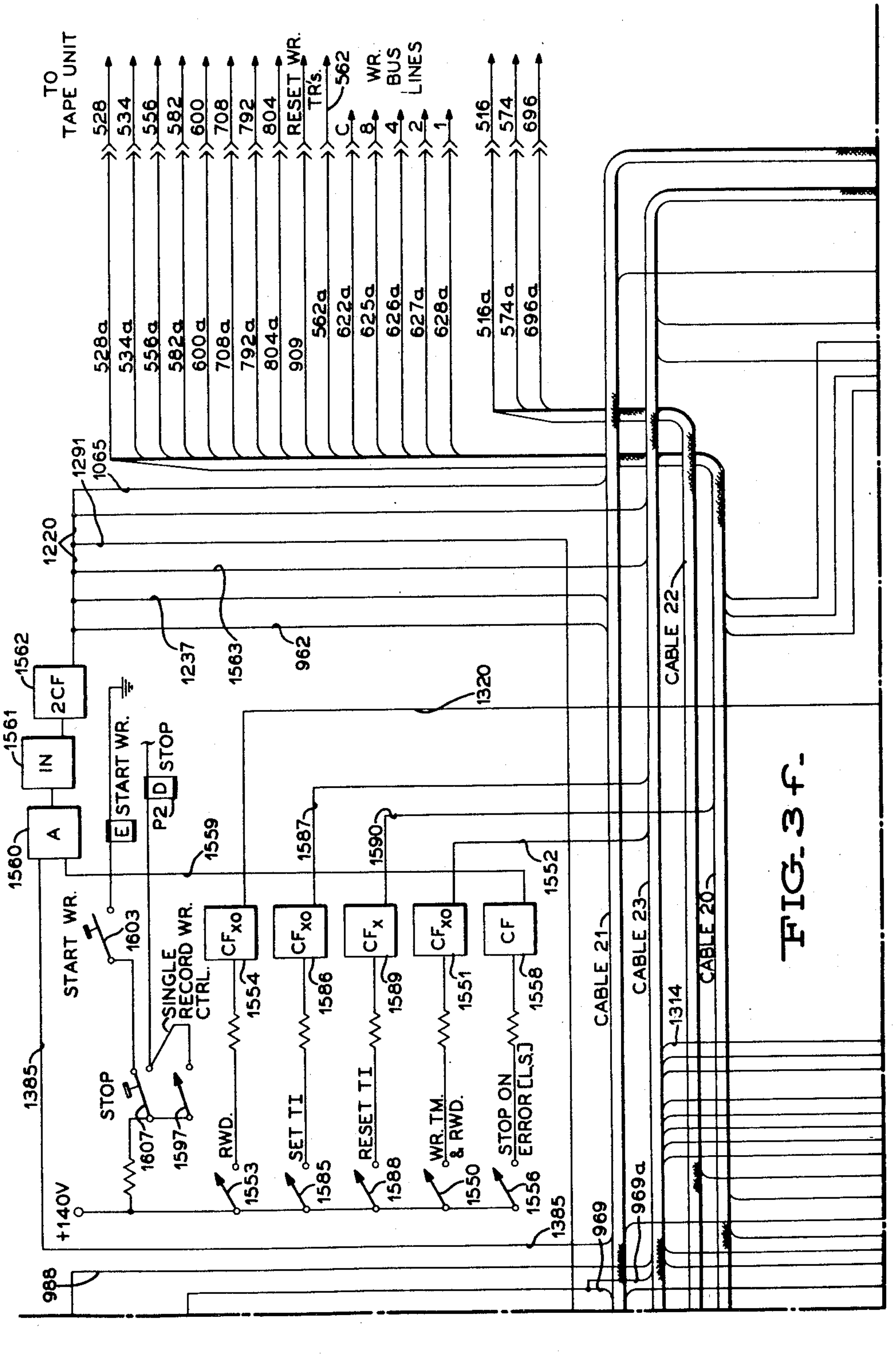
Figure 3G:
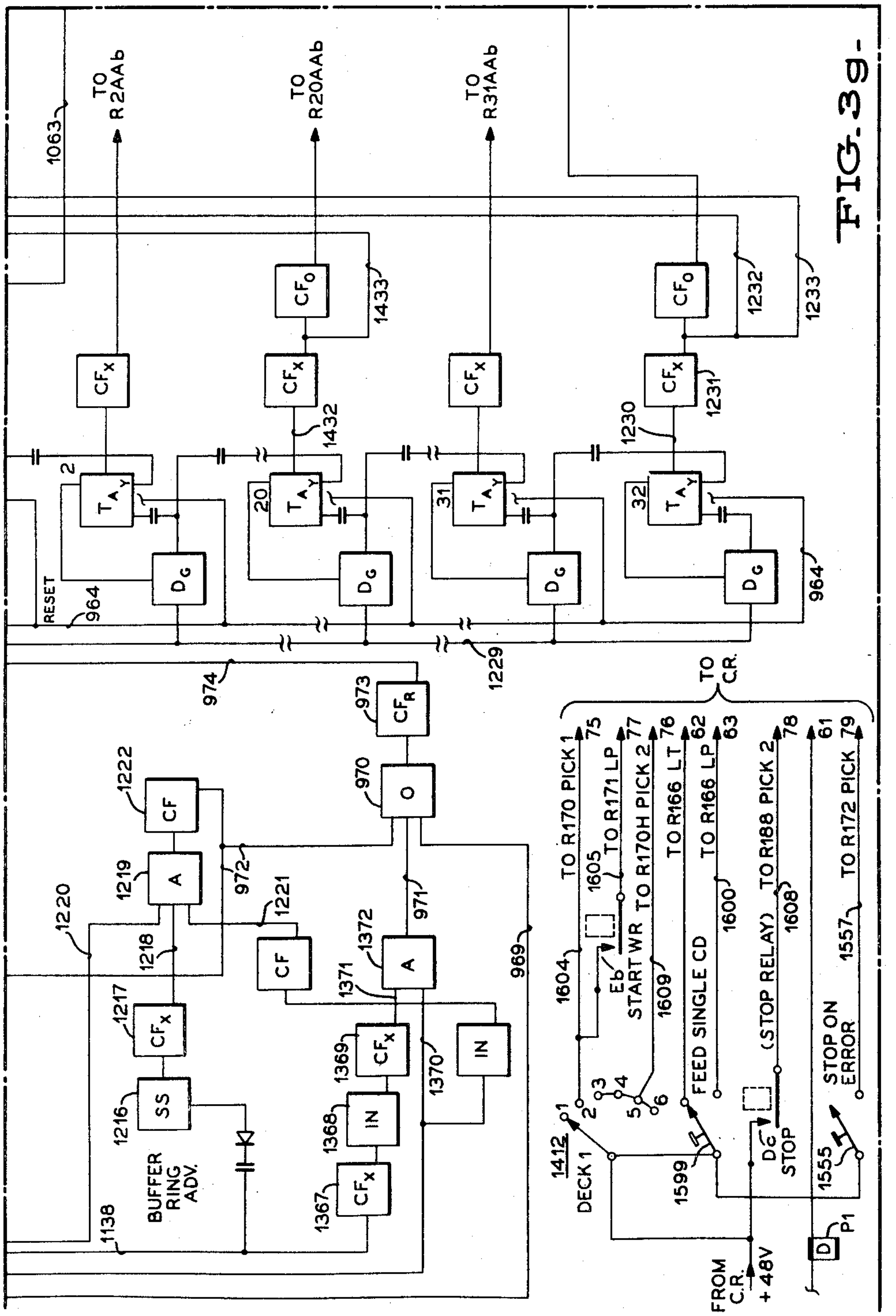
Figure 3H:
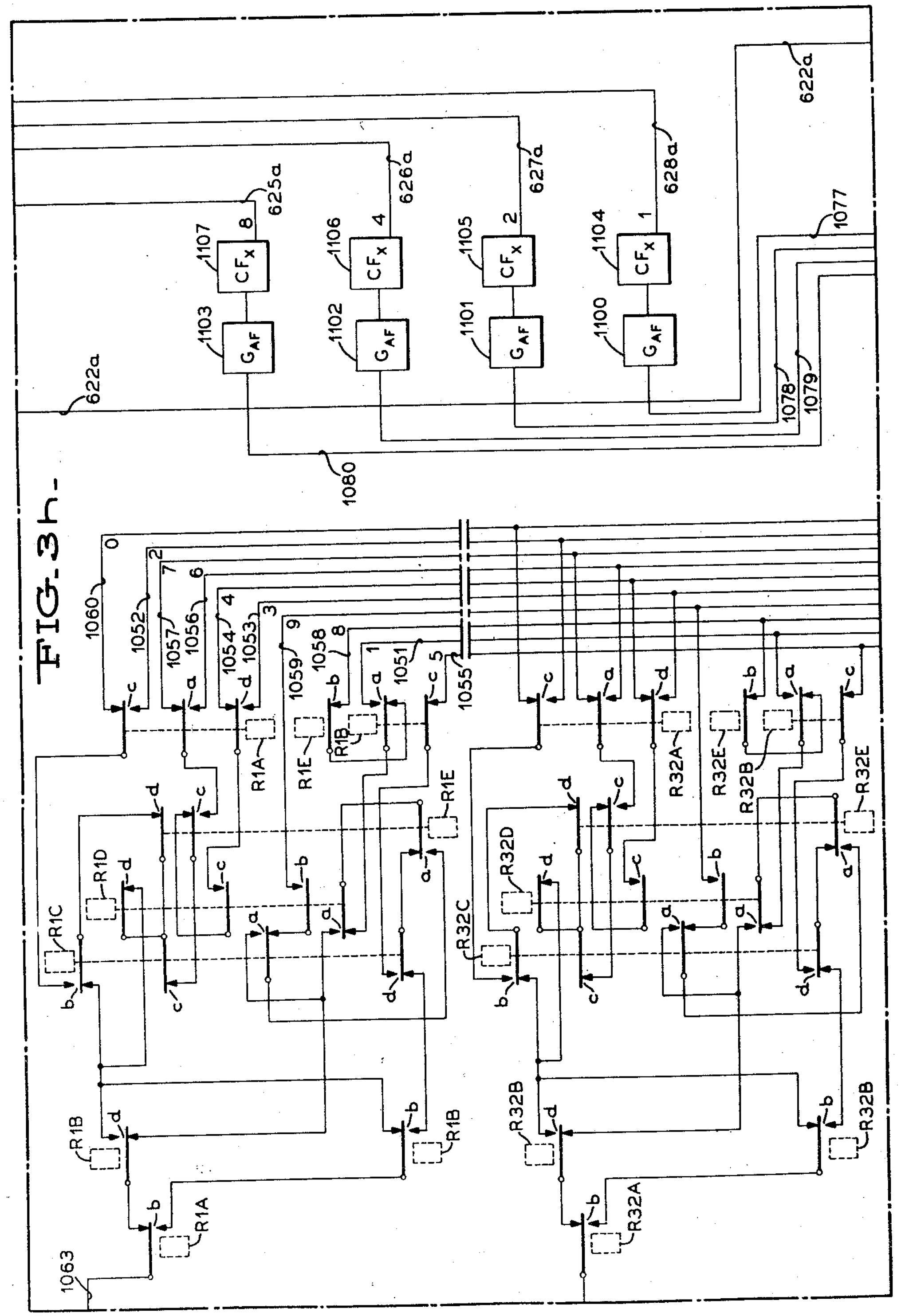
Figure 3I:
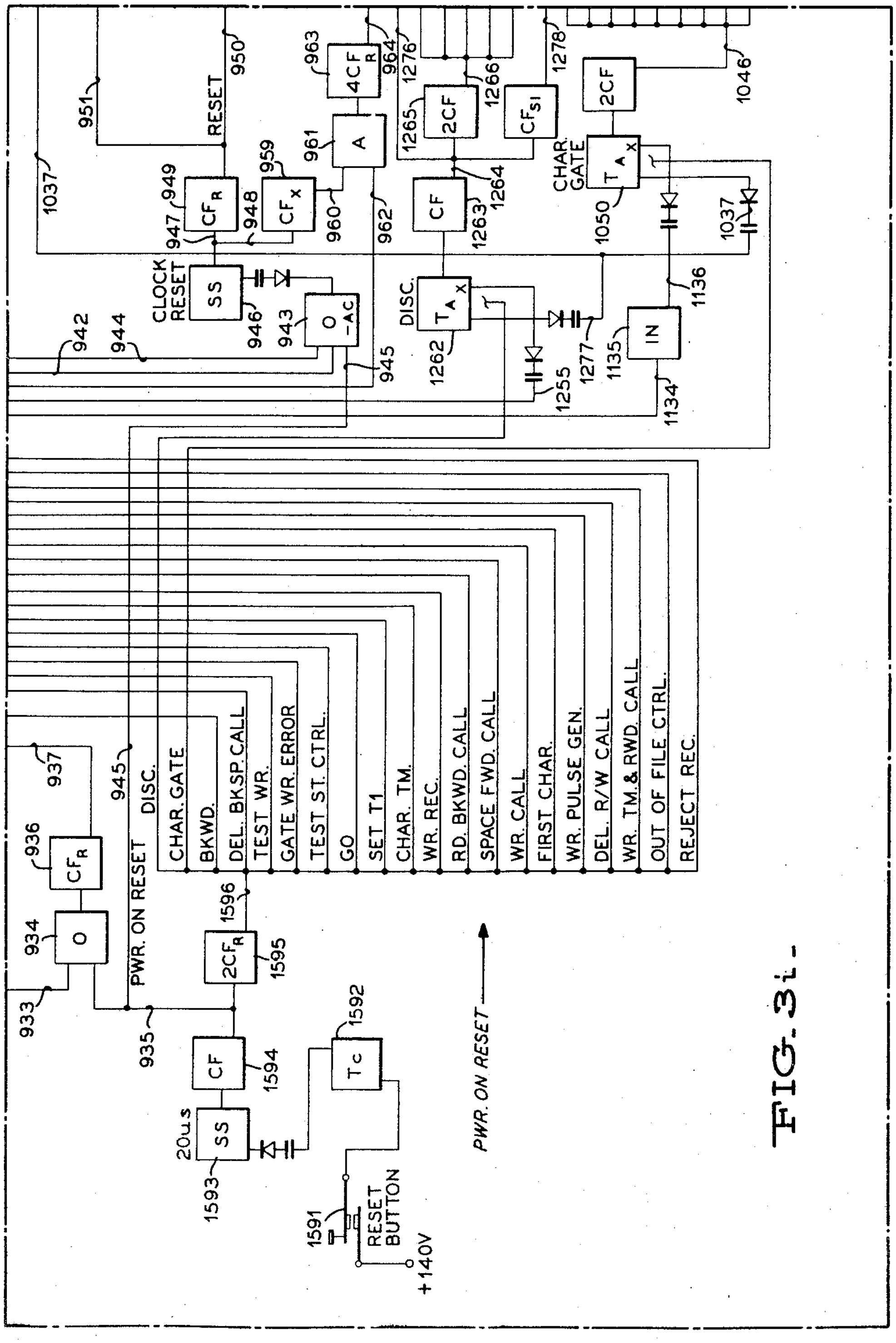
Figure 3J:
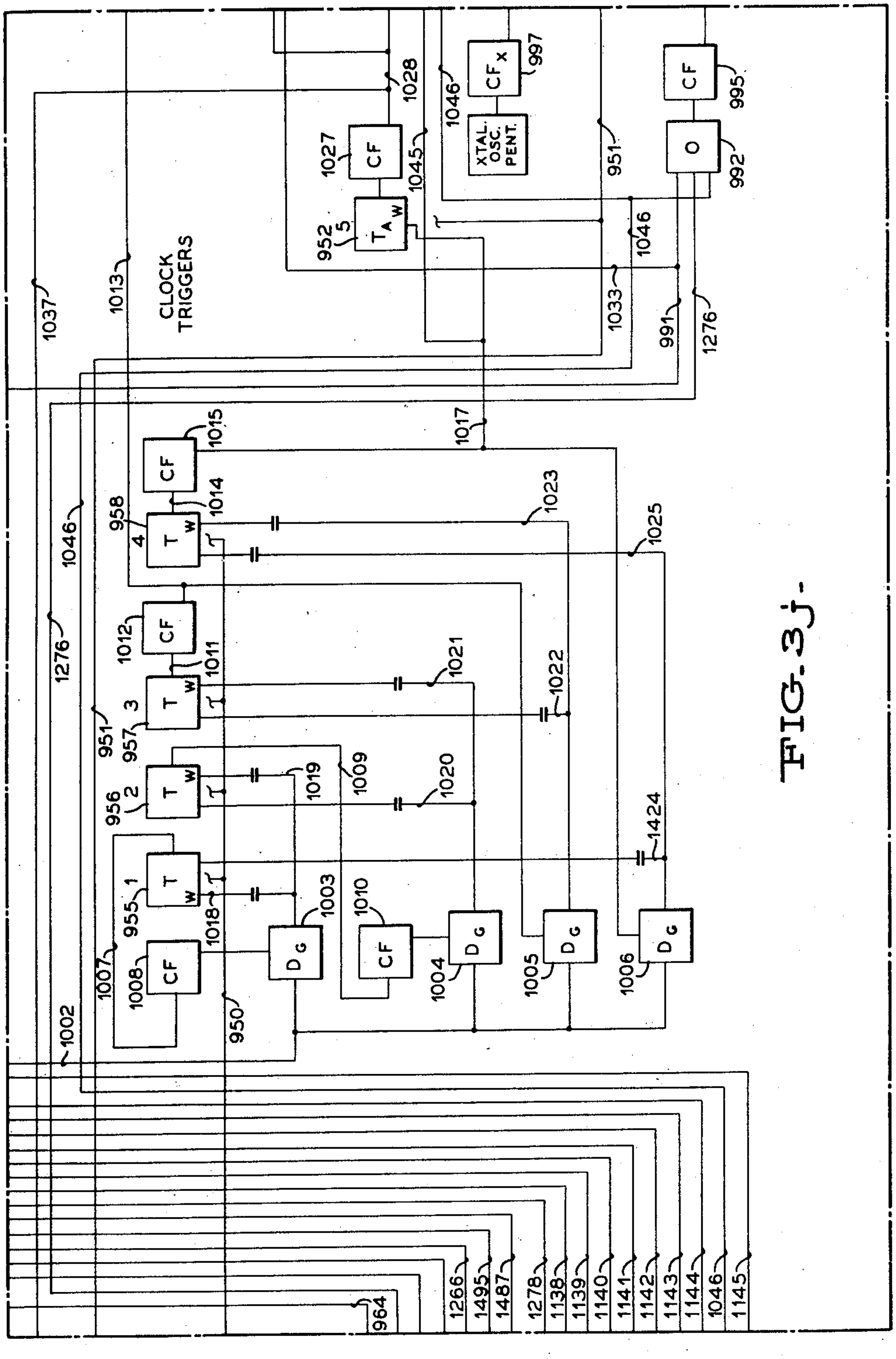
Figure 3K:
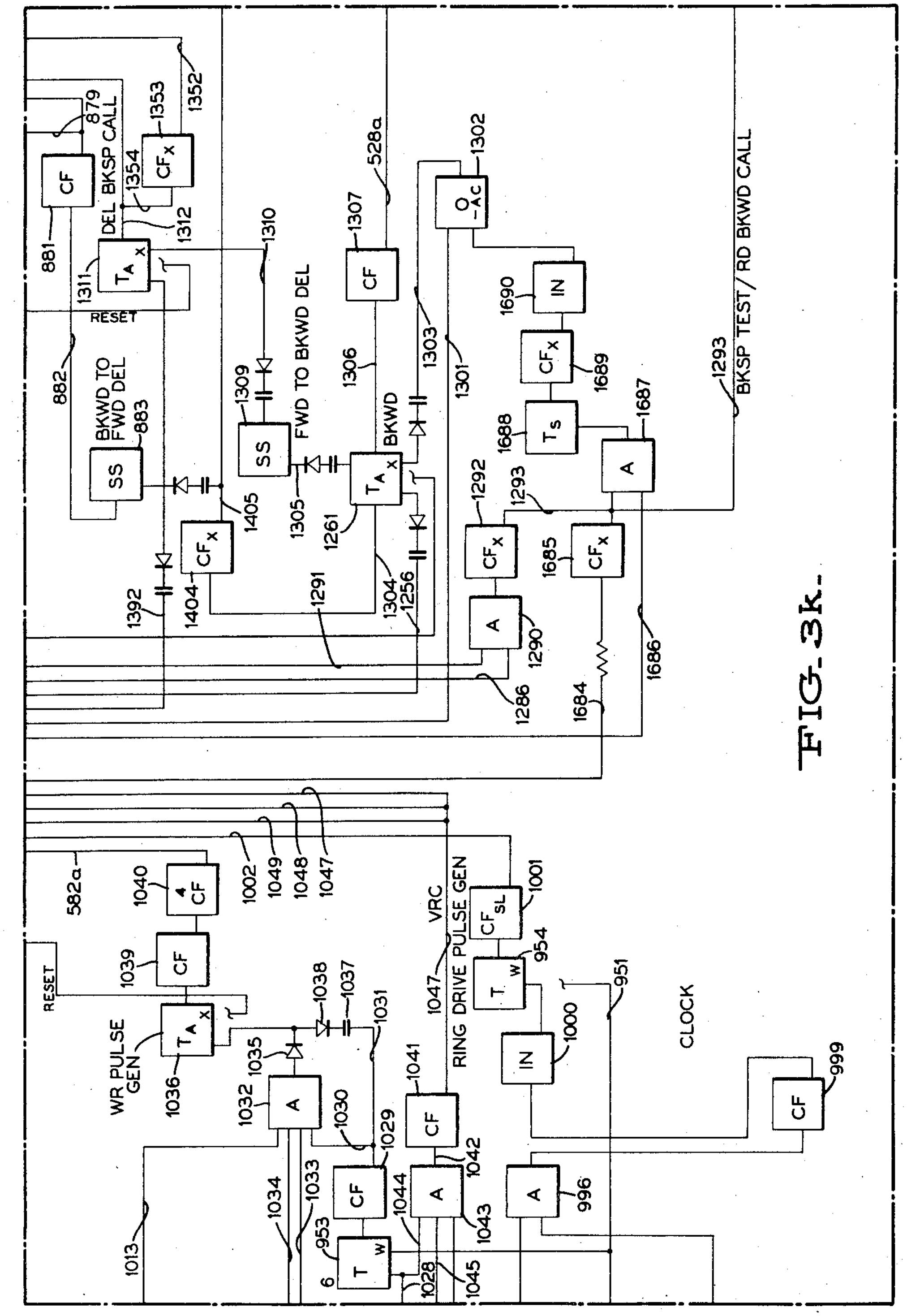
Figure 3M:
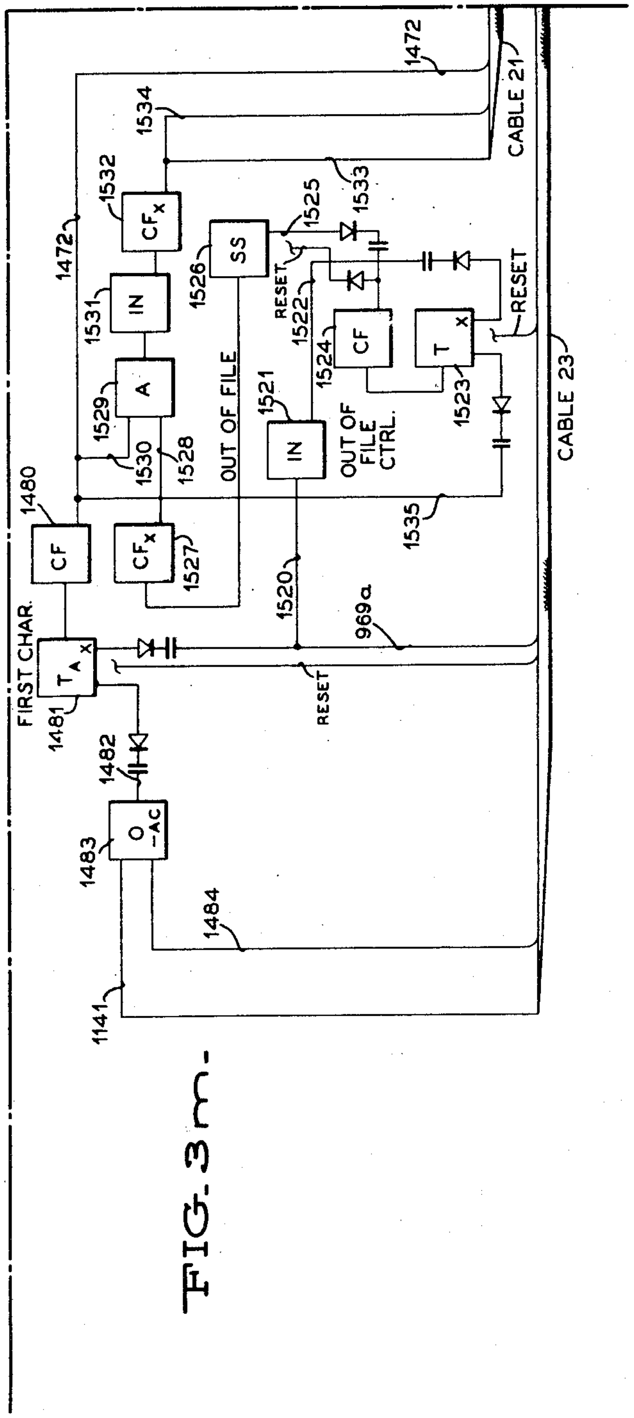
Figure 3:
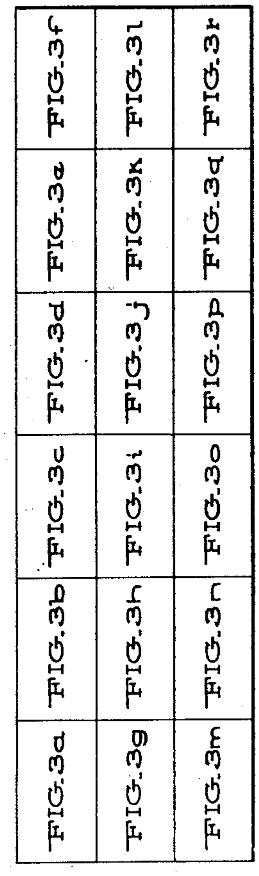
Figure 3N:
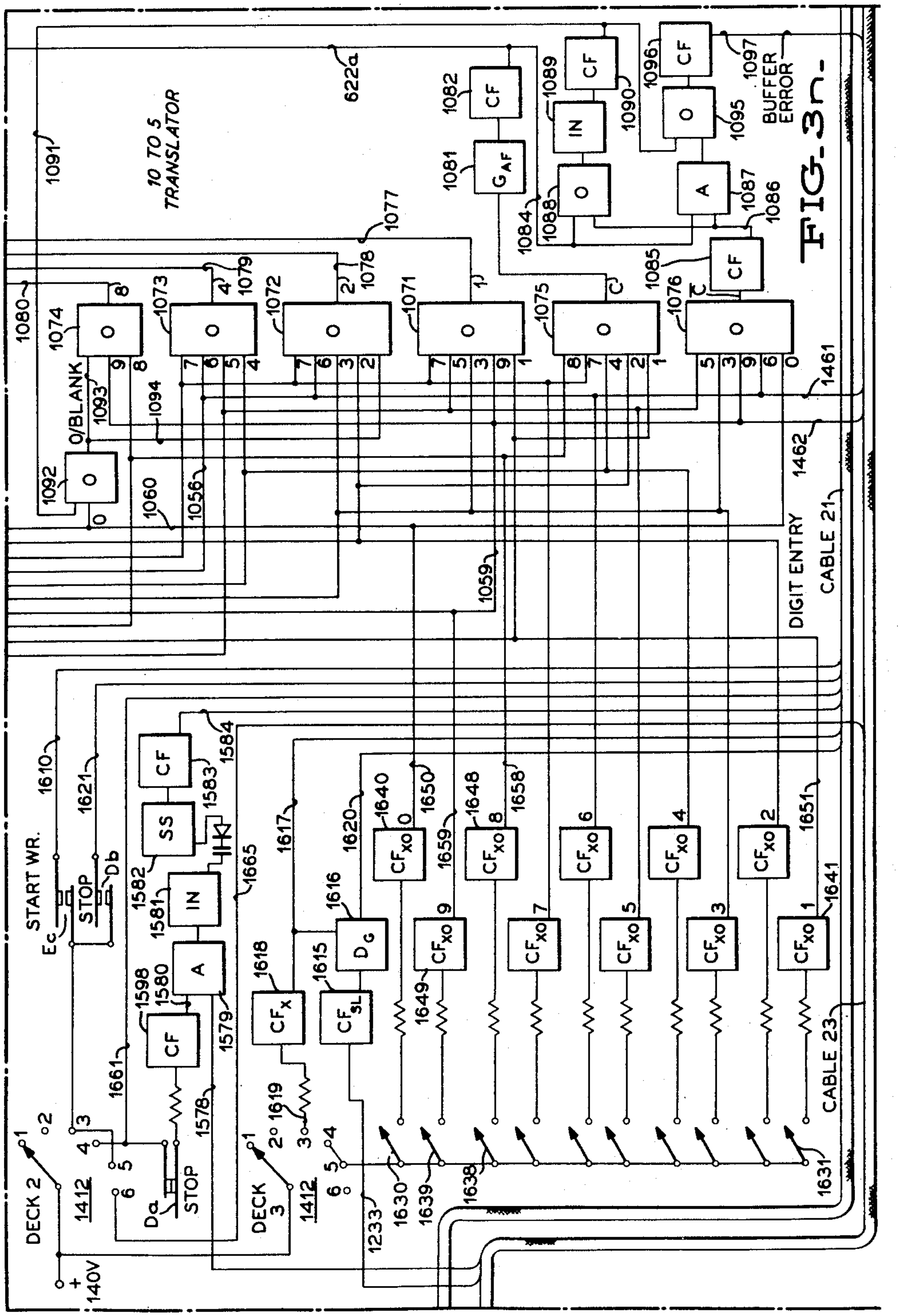
Figure 3P:
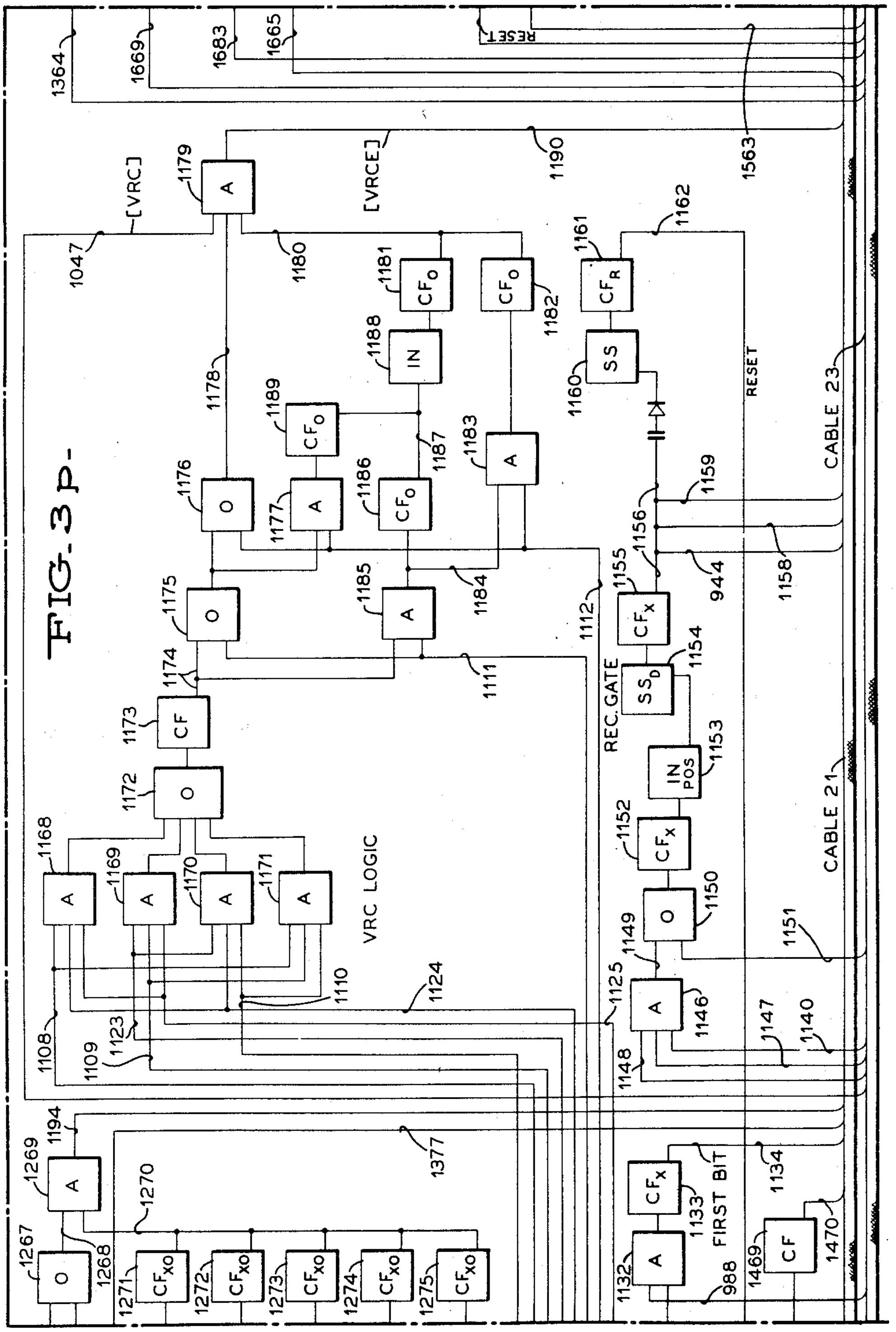
Figure 3Q:
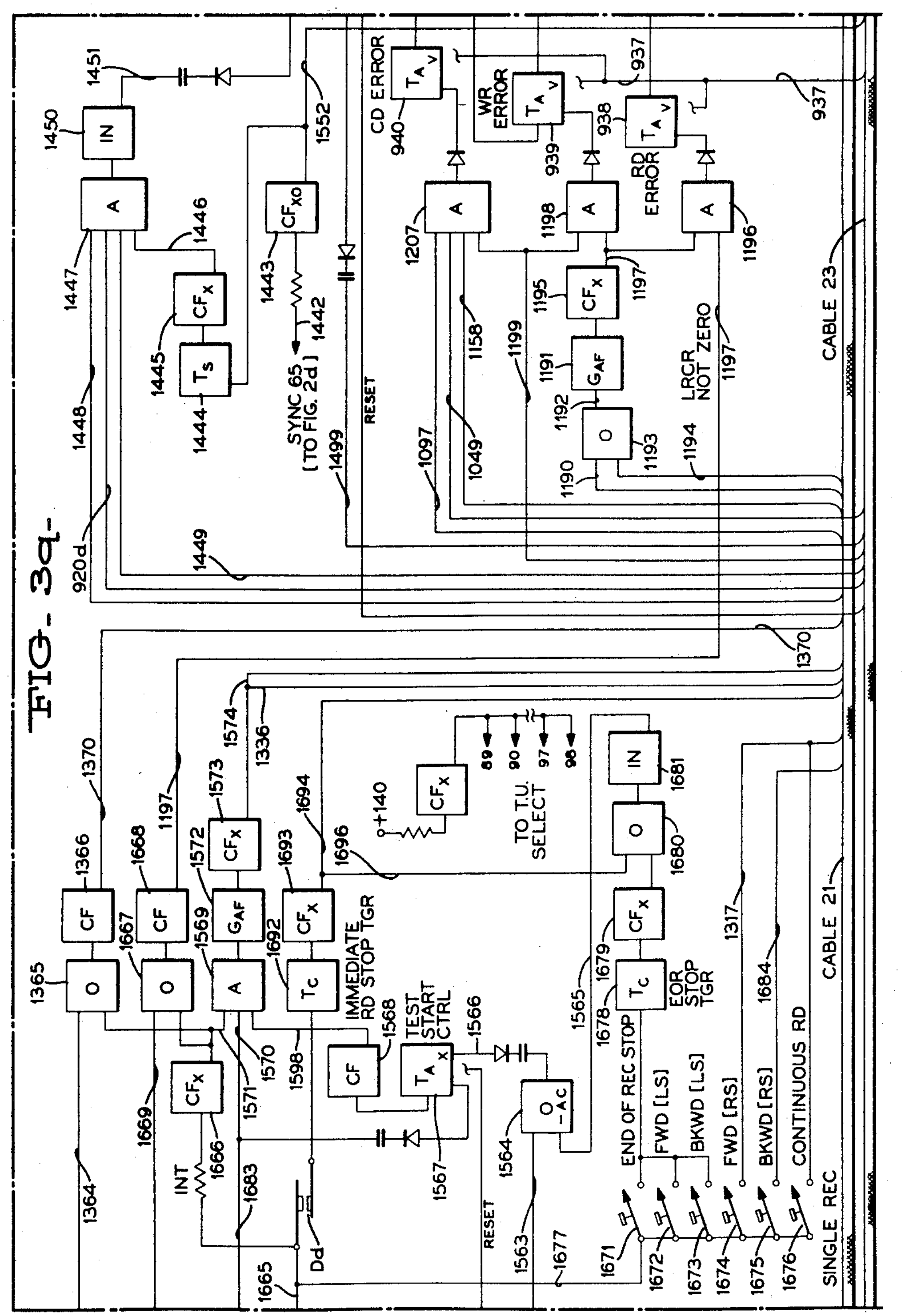
Figure 3R:
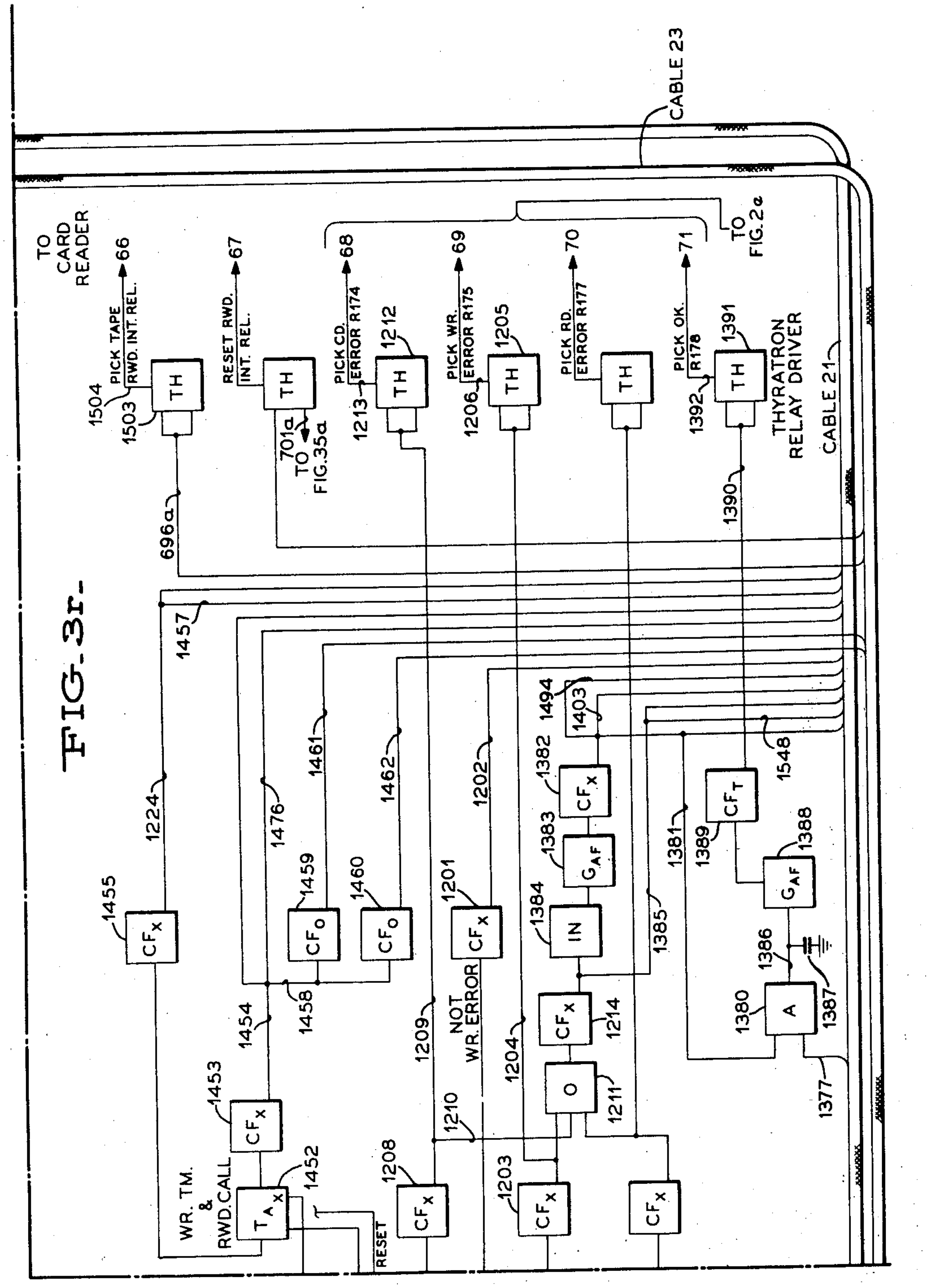

It may be further mentioned that the circuits of the synchronizer, shown in FIGS. 3*a* through 3*r*, are devoid of detailed component circuitry and connections to the necessary voltage sources, which details can be readily supplied by those skilled in the art. The absence of these details enables emphasis to be placed solely upon the logic of the circuitry.

Before describing the detailed operation of the synchronizer and the manner in which it programs the functions of the card reader and the tape unit, it might be appropriate at this point to briefly describe what is entailed in the first program step and what electronic components and logic circuitry are employed.

When the start key on the card reader is depressed, appropriate start circuits are completed to prepare the card reader for operation and also to provide the synchronizer and the tape unit with appropriate controls, thereafter start signals being provided automatically. After the appropriate start circuits have been established, the tape unit is instructed to prepare for the first program step, namely, write record, in which step the data stored in the buffer unit will be extracted serially and then written on tape. In this operation, various electronic triggers will be turned on. These include a WRITE RECORD trigger, a WRITE CALL trigger and a GATE WRITE ERROR trigger. The write call trigger places the tape unit in write status following which appropriate logic circuitry enables the tape unit GO signal to energize the tape unit driving instrumentalities to cause a forward advancement of the tape.

Meanwhile, other circuits of a preparatory nature prepare other electronic components for the ensuing write record operation. In this preparatory operation, the WRITE triggers and the ERROR triggers are reset. In addition, associated electronic timing means constituting the CLOCK, the 32-position buffer ring, and the READ registers are also reset.

The clock for all practical purposes issues write pulses to the R/W heads for the writing of the bits on the tape, the data for which is extracted from the buffer unit along ten decimal lines.

At the outset of the tape unit operations, the latter will write a series of thirty-two zeros by virtue of the fact that the buffer unit contains a zero setting in each position thereof. Thereafter, however, as each card passes through the card reader and the data therefrom read into the buffer, the latter will provide data information to the tape unit for writing on tape. It will be recalled that this data passes from the ten decimal output lines into a translator from which binary outputs are derived along five output lines which are called write bus lines. When appropriate combinations of the latter are energized, they serve to gate the write pulses generated by the clock to cause appropriate bit representations to be written on the tape. During the writing of the bits, write echo pulses are also generated, in the manner earlier set forth, and directed to the read registers and appropriate logic circuits to effect a vertical redundancy check, and also to the LRCR register and appropriate logic circuits to effect a check of the thirty-two positions of the data written on tape as a whole.

Should a card error or a write error be detected during this first program step, an appropriate error signal will be directed to the card reader to cause the operations earlier explained to be effected in the card reader.

After the thirty-second character has been extracted from the buffer and written on tape, appropriate disconnect circuits are set up to reset, among other things, all necessary electronic apparatus and circuitry to prepare the tape unit for the second program step, namely, READ BACKWARD. Before the latter step is initiated, appropriate means are also set up to prepare the tape unit to write the check character should the need arise. Before describing in general the operations of the second program step, it is believed that a detailed description for the first program step is now in order.

PROGRAM 1, WRITE FORWARD (WR FWD)

Upon depression of the card reader start key, a positive signal is transmitted along the (INIT WR LP DEL) line 850, in FIG. 3*a*, to and through a cathode follower 852. From the latter, the positive signal is applied to one input of an AND circuit 853. The latter also has a second input to which the line 516 is connected. Energization of the latter, as earlier explained, is effected as a result of the tape unit being at load point. The output from the AND circuit 853 passes through an OR circuit 854, a pulse shaper 855 and through cathode follower 856. The OR circuit 854 has another input connected to a START PGM/TEST line 851*a*, the latter supplying the SYNC with a start signal issued by the card reader in a manner to be later described. From the cathode follower 856, the up level is transmitted to a branch line 858, to be later explained, and also to a line 857 which passes through a capacitor and a diode to the input of a ten microsecond SS859. The latter is flipped to provide an output ten microseconds long. This output is then fed through cathode follower 860, OR circuit 861, capacitor and a diode 862 and finally to the write record (WR REC) trigger 863. When the output of the SS859 falls, the trigger 863 is turned on. The OR circuit 861 has two other input lines which are energized in a manner to be later explained.

Returning to the trigger 863, when the latter is triggered, a down level is accordingly passed through cathode follower 864, along a not write record (NOT WR REC) line 865, through a capacitor, a diode, in FIG. 3*b*, to a write call (WR CALL) trigger 868 whereby the latter is turned on. The trigger 868 accordingly provides an up level which eventually finds its way to the tape unit to set the latter to write status (SET WR STATUS). This up level is fed along wire 869, through cathode follower 870, in FIG. 3*c*, along a line 556*a* through cable 20. From the latter, the line 556*a* (FIG. 3*f*) emerges and connects to the SET WR STATUS line 556, shown in FIG. 35*b* of the tape unit. Energization of the line 556 causes, in the manner earlier described, R/W electronic components to be set up in preparation for the tape writing operation.

Simultaneously, a down level is transmitted along an output line 872 extending from the cathode follower 864, in FIG. 3*a*. From the latter, the negative pulse passes through an OR circuit 873, in FIG. 3*b*, through a line 874, including a capacitor and a diode to a gate write error trigger 876 thereby turning the latter ON and providing an up level through a cathode follower 1200 to a GATE WR ERROR line 1199.

Returning to the write call line 556*a*, in FIG. 3*c*, a positive pulse is also transmitted along a branch line 877 connected between the line 556*a* and one of the three inputs of an AND circuit 878, the remaining two inputs being connected to lines 879 and 574*a*, respectively.

The line 574*a* passes through the cable 22 and finally connects to the line 574, in FIG. 3*f*, the select ready and write line, which line when energized indicates that the tape unit is in write status. The line 879, in FIG. 3*c*, traces back through the cable 21, through cathode follower 881, in FIG. 3*k*, wire 882 connected to the output, now up, of a BKWD TO FWD DEL SS883, now OFF.

With lines 879, 574*a* and 877 energized in an up sense, the AND circuit 878, in FIG. 3*c*, accordingly provides a positive output which is passed through a pulse shaper 884 and a pair of cathode followers referenced as 885. The output from the latter passes through three branch lines 886, 887 and 888. Along the line 886, the up level passes through an OR circuit 889, an inverter 890 which accordingly supplies a down level along wire 891, through an OR circuit 892 which also has two other input lines to be later described. From the OR circuit 892, the negative pulse passes through a capacitor, a diode, along wire 895 to the input of a GO trigger 896, in FIG. 3*d*. The latter is turned on and provides the tape unit moving coil 200 with a signal. The moving coil, when energized, causes the tape to be advanced in the tape unit. This GO signal extends from the output of the GO trigger and passes through line 897, cathode follower 898, along line 534*a* through cable 20 (FIG. 3*f*), and finally to the GO line 534, in FIG. 35*b*, of the tape unit.

Returning to the GO trigger, in FIG. 3*d*, the output therefrom is also passed through cathode follower 900, wire 901, OR circuit 902, line 903, to the input of a sixty microsecond SS 905 called the check character delay (CHECK CHAR DEL). The latter is flipped for a period of sixty microseconds, the SS providing a positive pulse which is passed through cathode follower 906. When the output of SS 905 fails, a 2 μs. pulse is formed by the $IN_{PF}$ 907 which passes through cathode follower 908, through a line 909 to the write triggers shown in FIG. 36 of the tape unit to accordingly reset the write triggers.

When the tape unit is at load point and is otherwise ready for operations, the line 516, in FIG. 3*f*, provides an up level which is fed through line 516*a*, cable 22 into one input of an AND circuit 910, in FIG. 3*e*. A second input to the latter is made by way of the line 888. When both inputs are up, the AND circuit 910 provides an up level output pulse which is fed through an inverter 911. The latter accordingly provides a down level which is passed through a line 912, which includes a capacitor and a diode, to the input of a 40 millisecond (ms.) SS 914 called write load point delay (WR LP DEL). The latter is flipped for an interval of 40 ms., providing a down level for 40 ms. which is passed through cathode follower 915, through line 915*a* to one input of an AND circuit 916. During the 40 ms. delay, the tape feeding instrumentalities are operative to advance the tape. When this occurs, the tape unit is no longer at load point. Accordingly, the tape unit at load point (TU AT LP) signal becomes a down level. The tape unit at load point line 516*a*, in FIG. 3*e*, now negative, provides a down level along a branch line 917 to an inverter 918. The latter accordingly provides an up level called the tape unit not at load point (TU NOT AT LP), which signal passes through a cathode follower 919, through line 920 to an input of the AND circuit 916. At the same time, an up level is passed through the line 888 in FIG. 3*e*, through branch line 921, to a third input of the AND circuit 916. Thus, with all three inputs up, the AND circuit 916 accordingly provides an up level output which is passed into cathode follower 922. From the latter, the output is fed to branch circuits 923 and 924. An explanation of the operations controlled by the line 923 will be made at a more appropriate time. The up level signal applied to the line 924 passes through one input of AND circuit 925. The latter has a second input fed by a line 926, which at this time is up. Under this condition, the AND circuit 925 provides an up level output. The latter is fed into an inverter 927 which provides a down level output on a line 928. The negative pulse is passed through a capacitor 929 to the input of a 10 ms. SS 930 called write delay (WR DEL). The latter is flipped to provide a 10 ms. output which is fed through cathode follower 931 to branch lines 932 and 933. When the output of SS 930 falls, resetting of the clock is initiated in a manner to be described. The line 933 conveys the 10 ms. output of SS 930 to one input of an OR circuit 934 which also has another line 935 connected to a second input thereof. This line 935 will be explained at a later time. The signal on the line 933 passes through cable 21, OR circuit 934, in FIG. 3*i*, through cathode follower 936, through line 937, through cable 23 to FIG. 3*q*, to the reset inputs of the read error RD ERROR trigger 938, write error WR ERROR trigger 939 and card error CD ERROR trigger 940 whereby these triggers are reset.

Returning to the SS 930, in FIG. 3*e*, after the completion of the 10 ms. interval, the device 930 provides a down level which passes through the cathode follower 931, through the line 932, cathode follower 941, line 942, through cable 21 to one input of an OR circuit 943, in FIG. 3*i*, having two other input lines, namely, 944 and 945 which will be described eventually. The negative transition is passed through the OR circuit 943, then through a diode, a capacitor, in series therewith, to the input of a 10 microsecond (μs.) SS 946 called the CLOCK RESET. The latter supplies a 10 μs. output to branch lines 947 and 948, the former initiates the resetting of clock triggers 1 through 6 and a ring drive pulse generator, while the latter resets the buffer ring triggers.

The manner in which the clock triggers and the ring drive pulse generator are reset is as follows. The positive pulse on line 947, in FIG. 3*i*, passes through cathode follower 949, through lines 950 and 951. The latter applies the positive pulse to reset clock trigger 5, 952, in FIG. 3*j*; clock trigger 6, FIG. 3*k*, 953; and the ring drive pulse generator 954. The line 950, FIGS. 3*i* and 3*j*, passes the positive pulse to clock trigger 1, 955; trigger 2, 956; trigger 3, 957; and trigger 4, 958.

Simultaneously, the positive pulse passes through the line 948 in FIG. 3*i*, through cathode follower 959, through line 960, to one input of an AND circuit 961 also having a second input connected to a line 962 which is up at this time. Accordingly, the AND circuit 961 provides a positive output pulse which passes through cathode followers 963 to a line 964, through cable 21. The latter passes the positive pulse to the reset inputs of the thirty-two trigger positions of the buffer ring, in FIG. 3*g*, actually buffer trigger positions 1, 2, 20, 31 and 32 are only shown.

Next to follow is an explanation of the manner in which the read register triggers are reset. The negative transition on the line 942, in FIG. 3*e*, is passed through a branch line 965, through a capacitor to the input of a 20 μs. SS 966 called the CLOCK GATE DEL. The latter is flipped to provide an output through a line 967, through cathode follower 968 to branch lines 969 and 969*a*, in FIG. 3*f*. The line 969 conveys the output pulse through cable 21 to an input of an OR circuit 970 having two other input lines 971 and 972. The pulse on the line 969 passes through the OR circuit 970, in FIG. 3*g*, through a cathode follower 973, through a line 974, cable 23, to the reset inputs of the five read register triggers, shown in FIG. 3*o*, of which only one trigger 975*a* is shown enclosed in the rectangular block 975, while the remaining read registers are diagrammatically shown as blocks 976, 977, 978 and 979. These read registers 975 through 979 are employed to receive the bit pulse 1, 2, 4, 8 and *c*, respectively.

*The clock*

The clock is comprised of a crystal oscillator pentode, FIG. 3*j*, providing a sine wave with a 2.1 μs. period, the ring drive pulse generator trigger 954, and the six clock ring triggers. Operation of the clock is initiated in the following manner. Twenty μs. after flipping the CLOCK GATE DEL 966, in FIG. 3*e*, the latter provides a pulse through a line 984, including a capacitor and a diode, to the input of a delay read/write call trigger (DEL R/W CALL) 985. The latter is turned on to provide an output which passes through cathode follower 986 to branch lines 987 and 988. The line 988 is employed to turn on a first character gate trigger in a manner to be explained. The line 987 provides a path for conveying the up level to one input of an AND circuit 989 which also has a second input connected to the INIT WR DEL line 887. The latter, it will be recalled, was energized in an up sense. Thus, with both lines 987 and 887 energized in an up sense, the AND circuit 989 accordingly provides an up level output which passes through cathode followers 990, through a write clock gate line (WR CLOCK GATE) 991, to one input of an OR circuit 992, in FIG. 3*j*, having two other inputs connected to lines 1276 and 1046, the function of which will be later explained. The up level passes through the OR circuit 992, through cathode follower 995 to one input of an AND circuit 996, in FIG. 3*k*, which also has a second input connected to a cathode follower 997 in turn connected to the output of the crystal oscillator pentode 998. The output of the AND circuit 996 is passed through a cathode follower 999 to the input of an inverter 1000. The output of the latter is fed into the input of the RING DRIVE PULSE GEN trigger 954. The latter is flipped each time its input is pulsed. The output of the device 954 passes through a cathode follower 1001, through a clock ring drive line 1002 to which four branch lines are connected to feed four diode gates, namely, 1003, 1004, 1005 and 1006, in FIG. 3*j*. The diode gate, as earlier explained, is responsive to a coincidence of the set and drive lines to provide a negative output pulse. The connections between the four diode gates and the appropriate clock ring triggers 1 through 4 are such as to cause the latter to be sequentially operated. The ring triggers 5 and 6, in conjunction with appropriate logic circuitry to be explained, provide for the generation of a vertical redundant check sample pulse and the operation of a write pulse generator trigger 1026.

Before explaining the operation of the ring triggers, it will be recalled that the ring triggers 2 through 6 were reset to an OFF status and trigger 1 was reset to an ON status. Accordingly, at the start of the operation of the ring triggers, ring trigger 1 exhibits an up level output while the remaining triggers exhibit down level outputs. The output of ring trigger 1 is connected through a line 1007, FIG. 3*j*, in turn connected to a cathode follower 1008, the output of which is connected to a second or set input of the diode gate 1003. Ring trigger 2 has its output connected to a line 1009 in turn connected to a cathode follower 1010 which is connected to a second or set input of the diode gate 1004. Ring trigger 3 has its output connected to a line 1011 in turn connected to a cathode follower 1012 which is connected to a second or set input of the diode gate 1005 and also to a branch circuit 1013, the function of which will be explained. Ring trigger 4 has its output connection to a line 1014 in turn connected to a cathode follower 1015 which is connected to a second or set input of the diode gate 1006 and also to a branch line 1017, the function of which will be explained.

Now when pulses are applied along the line 1002, the negative shift portions thereof are sequentially passed through the diode gates 1003 through 1006 so as to cause the ring triggers 1 through 4 to be flipped in succession. The first negative shift passes through the diode gate 1003 to the ring triggers 1 and 2 by way of lines 1018 and 1019, respectively, causing ring trigger 1 to flip off and ring trigger 2 to flip on. On the second negative shift on the line 1002, the diode gate 1004 is effective to pass through a negative shift to lines 1020 and 1021, respectively, to cause the ring trigger 2 to flip off and ring trigger 3 to flip on. On the third negative shift on the line 1002, the diode gate 1005 is effective to permit the negative shift to pass through along lines 1022 and 1023 to cause ring trigger 3 to flip off and ring trigger 4 to flip on. On the fourth negative shift on the line 1002, the diode gate 1006 is effective to permit the negative shift to pass through and along lines 1024 and 1025 to cause ring trigger 4 to flip off and ring trigger 1 to flip on. This action of the ring triggers 1 through 4 is thus repeated in the above manner as long as pulses are applied to the line 1002.

An explanation of the manner of operating the write pulse generator trigger 1036, FIG. 3*k*, to provide write pulses for the tape unit now follows. As a preliminary, however, it will be necessary to first explain the operation of the ring trigger 5, 952, FIG. 3*j*, and the ring trigger 6, 953, in FIG. 3*k*. The output of the ring trigger 4, as mentioned, passes along the line 1017 to the input of the ring trigger 5. The latter is turned on when ring trigger 4 is turned off and passes its output, now up, through cathode follower 1027, through a line 1028 to the input of the ring trigger 6, 953. The latter is turned on when ring trigger 5 is turned off. The output passes through a cathode follower 1029 to branch lines 1030 and 1031. The line 1030 connects to one input of an AND circuit 1032 having three other inputs connected to appropriate ones of three lines 1033, 1034 and the line 1013. When these inputs to the AND circuit 1032 are up, the output therefrom is also up and is fed by way of a diode 1035 to the input of the WR PULSE GEN trigger 1036. The latter is turned on and maintains this ON status until a negative transition is applied to the same input of the write pulse generator trigger by way of the line 1031 which has, in series therewith, a capacitor 1037 and a diode 1038. The output of the write pulse generator 1036 is passed through cathode followers 1039 and 1040 to a write pulse line 582*a* which, by way of cable 20, passes into the tape unit where it connects to the write pulse line 582.

*Vertical Redundancy Check (VRC)*

Now to be discussed in part is the generation of the vertical redundancy check sample pulse (VRC). This VRC pulse is available at the output of a cathode follower 1041, FIG. 3*k*, and it may be traced back through the latter, through a line 1042 which is connected to the output of an AND circuit 1043 having three inputs connected to lines 1044, 1045 and 1046. The line 1044 connects to the line 1028 which reflects the output of the ring trigger 5, the line 1045 connects to the line 1017 which reflects the output of the ring trigger 4, while the line 1046 is indirectly connected to the output of a character gate trigger 1050 in a manner to be explained. When the inputs to the AND circuit 1043 are positive, the output therefrom, after pasing through the cathode follower 1041, becomes the VRC pulse which is passed through three lines 1047, 1048 and 1049, the function of each line will be later explained.

In the order of operation, the generation of the VRC pulse follows the writing of a character on tape. Accordingly, before tracing the complete origin of the circuits leading to the AND circuit 1043, whose output controls the VRC pulse line 1047, it will be necessary to outline and discuss the operations relating to the writing of a character on tape. It will be recalled that at the beginning of operations, the buffer unit is devoid of any record data. Accordingly, a series of zeros will be read out of the buffer and written on tape, the zero character being written as a combination of binary 8 and binary 2 bits. It will be further recalled that the outputs of the buffer comprise ten output lines. These in turn are connected to a 10-to-5 translator whose five output lines represent the binary values 1, 2, 4, 8 and a "*c*" bit pulse. The latter are connected to the tape unit where they are gated with write pulses to operate appropriate R/W triggers. The latter in turn cause energization of appropriate R/W heads to cause the writing of character bits on the moving tape. At the time of writing the character bits, appropriate echo pulses are generated and directed back to the synchronizer where they are connected to the five read registers. The outputs from the latter are fed into logic circuits from which a pulse is issued upon the occurrence of the first bit written on tape. This first bit signal pulse eventuates in the generation of the VRC signal which is to be used to check the writing signals directed to the R/W heads. The following is concerned with a detailed description of the preceding outline, accordingly, the buffer storage will now be described.

*Buffer readout to tape unit*

As earlier mentioned under the card reader, each of the thirty-two positions of the buffer comprises five relays. In accordance with a prescribed code, two out of five relays are picked up to represent the digit values 0 through 9. The contact points of some of these buffer relays are located in FIG. 3*h* of the synchronizer. As seen in FIG. 3*h*, there are shown only the contact points for the relays R1A through R1E, representing buffer storage position 1, and the relay points of relays R32A through R32E, representing position 32. These relay contact points are arranged in a network having outputs connected to the ten decimal lines 1051 through 1060 representing digit values 1 through 9 and 0. The input to each such network is effected along an appropriate single input line. The thirty-two input positions of the buffer are energized serially by a 32-position ring, to be explained, to scan the relay contact networks.

An exemplary input circuit path to and through position 1 of the buffer relay network extends from the output of the buffer ring trigger 1, FIG. 3*a*, to a line 1061, cathode follower 1062 to line 1063. Assuming now that a zero is stored in the buffer unit position 1, the circuit path then extends from line 1063, FIG. 3*h*, through R1A*b* n/c contact points, R1B*d* n/o contact points, R1D*d* n/c contact points, R1E*d* n/c contact points, R1C*b* n/o contact points, R1A*c* n/c contact points, to the output zero line 1060. For any other digit value 1 through 9 stored in position 1, or for that matter any other position of the buffer, an appropriate one of the output lines 1051 through 1059 will be energized.

These output lines 1051 through 1059 are fed into the 10-to-5 translator shown in FIG. 3*n*. Here the translator includes OR circuits 1071 through 1076.

The connections from the ten decimal lines to the OR circuits 1071 through 1074 are such as to energize appropriate combinations of the four binary output lines 1077 through 1080 to produce binary outputs. Connections to the OR circuit 1075 are made from the decimal lines representing decimal values 1, 2, 4, 7 and 8 to provide a "*c*" bit signal when any of these decimal values are energized. The output from the OR circuit 1075 passes through a grounded grid amplifier 1081, through cathode follower 1082 to the "*c*" bit line **622*a* and also to a branch line 1084**.

Connections to the OR circuit 1076 are made from the decimal lines representing values 0, 3, 5, 6 and 9. The output from the OR circuit 1076 is known as a "no-*c*" ($\bar{c}$) signal line and passes through cathode follower 1085 to a line 1086 feeding one input of an AND circuit 1087 having its other input connected to the branch line 1084. The $\bar{c}$ line 1086 also connects to one input of an OR circuit 1088 which also has a second input connected to the line 1084. The output from the latter OR circuit passes through an inverter 1089, through cathode follower 1090 to a line 1091 which feeds into one input of an OR circuit 1092 also having a second input connected to the decimal line 1060. The output from the OR circuit 1092 passes through a branch line 1093 connected to an input of the OR circuit 1074, and to a branch line 1094 connected to an input of the OR circuit 1072. When none of the decimal output lines are energized, the $\bar{c}$ signal line 1086 inverts into an up level signal on the line 1091 to cause a binary 8 bit and a binary 2 bit to be directed along the lines 1078 and 1080 to the tape unit for the writing of the zero character on the tape.

A buffer error line 1097 is energized to an up level as a result of the previous condition. This line is traceable through a cathode follower 1096, back through an OR circuit 1095 having an input connection to the output of the AND circuit 1087 and another input connection to the line 1091.

In the event of an invalid output where signals are present simultaneously on both the *c* and $\bar{c}$ lines, the buffer error line 1097 is energized in an up sense by virtue of the following. Beginning with the *c* line, the up level signal thereon passes through grounded grid amplifier 1081, cathode follower 1082, line 1084 to energize an appropriate input of the AND circuit 1087. At the same time, the second input of this AND circuit is also energized in an up sense by virtue of the signal passing through the $\bar{c}$ line, cathode follower 1085, line 1086 feeding the other input to the AND circuit 1087. Accordingly, the latter provides an output which is energized in an up sense, which output passes through OR circuit 1095, cathode follower 1096 to the buffer error line 1097. Under this condition, the line 1091 is maintained at a down level thus preventing the energization of the binary lines 1080 and 1078, thereby preventing the issuance of the binary 8 and binary 2 signals, representing zero, to the tape unit.

In the event of a valid combination, either the *c* line or the $\bar{c}$ line is energized in an up sense. When the *c* line is up, the appropriate input to the AND circuit 1087 is down. The latter accordingly provides a down level output which is reflected on an appropriate input of the OR circuit 1095. At the same time, an appropriate input to the OR circuit 1088 is also up. The output of the latter is accordingly up and is inverted after passing through inverter 1089 and a cathode follower 1090. The down output from the latter accordingly brings down the appropriate input to the OR circuit 1095. The down output passes through cathode follower 1096 to the buffer error line 1097. In this instance, the line 1091 is ineffective to cause binary 8 and binary 2, representing zero, to be passed to the tape unit.

When the $\bar{c}$ line is energized in an up sense, the buffer error line 1097 is down and the line 1091 is again ineffective to pass a zero to the tape unit.

The buffer line, when energized in an up sense, provides an indication to the effect that none of the digit lines 0 through 9 are energized, thus indicating that a blank column was sensed in the check record passing through the card reader. In addition, the indication is also provided when more or less than two of the five relays per buffer position are energized. Still further, the indication is also provided should both a *c* and a $\bar{c}$ be generated as described. The operation resulting from the energization of the buffer error line 1097 will be taken up later at a more appropriate time.

Now follows an explanation of the writing of the 8 and 2 bits on tape. The lines 1077 through 1080 are each connected to an appropriate one of four grounded grid amplifiers 1100 through 1103 in FIG. 3*h*. Outputs from the latter pass through an associated one of four cathode followers 1104 through 1107 whose outputs are connected each to one of four lines **625*a* through 628*a*** representing the 1, 2, 4, 8 binary bit signal lines. These lines, including the "*c*" bit lines **622*a*, are known as the tape unit write bus lines (TU WR BUS) and pass through cable 20**, FIG. 3*f*, feeding into the tape unit, which bus lines connect to the WR BUS lines 622, 625 through 628, in FIG. 36. Here in FIG. 36, the coincidence of positive pulses on the lines 586 and 625 cause energization of the appropriate R/W head located in the box 665 to cause the 8 binary bit to be written on tape. Simultaneously, a coincidence of positive pulses on the lines 627 and 586 cause energization of the appropriate R/W head located in the box 667 to cause the 2 binary bit to be written on tape. While these bits are being written, appropriate write echo signals are generated in the manner set forth. The echo signal for the 8 bit is fed through the line 641, while that for the 2 bit is fed through the line 643. These lines, along with the remaining write echo transmitting lines, are fed into the read registers 975 through 979, in FIG. 3*o*. In the example at hand, transmission of the 8 and 2 write echo pulses cause the read registers 978 and 976 to flip their associated read register triggers. In case of any other digit value 1 through 9, appropriate combination of the read register triggers will be flipped.

An exemplary circuit path for energizing say the read register trigger 975a under the control of a write echo bit one pulse is traceable through the WR ECHO BUS line 644, FIG 36, which passes into FIG. 3*o* of the synchronizer where it joins with a line 644a connected to an input of an AND circuit 1064 whose second input is connected to a not stop on error and error branch line 1065 in turn connected to the line 1220, in FIG. 3*f*, which line is now up. The output of the latter feeds through a line 981 connected to one input of an OR circuit 982 having a second input connected to a line 983, the latter being energized by a read pulse to be explained later on under program 2. The output of the OR circuit 982 passes through a line 982a connected to an input of the read register trigger 975a to turn the latter on.

Each read register is provided with the following output lines: Read register 1 (975), 1108, 1113, 1118, and 1123; read register 2 (976), 1109, 1114, 1119, and 1124; read register 4 (977), 1110, 1115, 1120, and 1125; read register 8 (978), 1111, 1116, and 1121; read register C (979), 1112, 1117, 1122 and 1126.

The outputs 1118 through 1122 are connected to an OR circuit 1130 whose output line 1131 is connected to one input of an AND circuit 1132, in FIG. 3*p*, having a second input connected to the DEL R/W CALL line 988 which was previously energized in an up sense. Now when any one of the input lines is up as a result of an associated read register trigger being flipped, the OR circuit 1130 accordingly provides an up level output which in turn is passed through AND circuit 1132. The latter issues an up level output which passes through cathode follower 1133 to a line 1134 called the FIRST BIT pulse line. The latter is connected to an inverter 1135, in FIG. 3*i*, whose output is connected by means of line 1136 to the input of the character gate trigger 1050.

*Character gate*

The latter is turned ON and remains in this status for approximately 33.6μs. until turned OFF by means of a clock 5 impulse passing through the line 1037. The output from the trigger 1050, as earlier mentioned, is known as the CHARACTER GATE line 1046 and passes through a cathode follower and into a plurality of branch lines 1138 through 1145, in FIG. 3*j*. The line 1140 passes through cable 23 to one input of an AND circuit 1146, in FIG. 3*p*, having two other inputs connected to lines 1147 and 1148, both of which are now up. As a result, the AND circuit 1146 provides an up level output which passes through a line 1149 connected to one input of an OR circuit 1150. The latter has a second input connected to a line 1151, the function of which will be described later on. The OR circuit 1150 provides an up level output through a cathode follower 1152 to the input of an $IN_{POS}$ 1153. The latter provides an input to the 200 μs. $SS_D$ 1154, called the record gate (REC GATE), causing the latter to be flipped. The output of the record gate device passes through a cathode follower 1155 to an output line 1156 to which are also connected three branch lines 1158, 1159 and the line 944. The output through the line 1156 flips a 10 μs. SS 1160 whose output passes through a cathode follower 1161 to a reset line 1162 connected to each one of the five LRCR triggers 1163 through 1167, shown in FIG. 3*o*. The character gate device 1050 is flipped every 67.2 μs. for each character written. The output of this character gate device, as described above, re-times the record gate device 1154 every 67.2 μs. Since the latter has a time duration of 200 μs., this gate will be flipped for the time required to write the entire card record of thirty-two characters plus an additional 200 μs. When the character gate device is flipped on, it in turn flips the single shot vibrator 1160 and accordingly provides a reset pulse along the line 1162 to reset all the LRCR triggers to prepare the latter for a longitudinal redundancy checking operation.

During the last 4.2 μs. of each character gate, the VRC signal is generated along the line 1047, in the manner earlier described. This VRC signal is fed into a vertical redundancy check logic circuit into which are fed the outputs of the read registers.

*VRC logic circuit*

This logic circuit is shown in FIG. 3*p* and it includes AND circuits 1168 through 1171, each having one output and three inputs. The latter are connected to read register output lines 1108, 1109 and 1110 through which lines up level outputs, representing the binary values 1, 2 and 4, are applied to the AND circuits 1168 through 1171. In addition, the latter are also connected to lines 1123, 1124 and 1125 to which are applied down level signals representing binary values $\bar{1}$, $\bar{2}$ and $\bar{4}$. The outputs from the AND circuits 1168 through 1171 are fed through an OR circuit 1172, through a cathode follower 1173 to an output line 1174 connected to one input of an OR circuit 1175 having a second input connected to the line 1111 on which the binary 8 up level output passes.

The output of the OR circuit 1175 is fed to an OR circuit 1176 also having a second input connected to the line 1112, and also to an AND circuit 1177 having a second input connected to said line 1112, the latter reflecting the up level output of the "C" read register.

The output of the OR circuit 1176 is fed to a line 1178 applied to one input of an AND circuit 1179 having second and third input connections, respectively, to the VRC line 1047 and a line 1180. The latter is applied to the outputs of cathode followers 1181 and 1182. The input of the latter is applied to the output of an AND circuit 1183 having of its inputs connected to the line 1112 and the other of its inputs connected to a line 1184 which extends to the output of the AND circuit 1185 and also to the input of a cathode follower 1186. The output of the latter feeds a line 1187 connected to an inverter 1188 whose output is fed into the cathode follower 1181. The output of the AND circuit 1177 is fed through a cathode follower 1189 and then applied to the line 1187.

The function of the above VRC logic circuit is to provide an up level signal on the output of the AND circuit 1179 in the event there develops an invalid combination of binary bit signals during the writing of characters on the tape. In the event such an error develops, the output of the AND circuit 1179 is applied to the VRCE line 1190 which turns on the write error trigger 939 in the following manner.

*Write error trigger*

The line 1190 passes through cable 21 to an OR circuit 1193, the latter having another input connected to an LRCR NOT ZERO line 1194, to be explained, through the OR circuit to a grounded grid amplifier 1191, in FIG. 3*q*. The grounded grid amplifier 1191 passes its output through a cathode follower 1195 to the input of an AND circuit 1196 having a second input connected to a gate read error line 1197. The VRCE signal passes through the cathode follower 1195 to one input of an AND circuit 1198 having a second input connection to the gate write error line 1199, now up. Under the conditions described, the AND circuit 1198 provides an up level signal to the input of the write error, WR ERROR, trigger 939, turning the latter on. Accordingly, a down level output signal passes through a cathode follower 1201, in FIG. 3*r*, to a line 1202, to be explained. At the same time, an up level signal is passed from trigger 939, through a cathode follower 1203 to a line 1204. The latter is applied to both grids of a thyratron TH1205 which fires to produce a path from its plate to a line 1206. This line in turn passes through SYNC connection 69 and into the card reader (FIG. 2*e*) where, under control of cam contacts CR56, the relay R175 is energized. When the latter is energized, its associated contact points R175*c*, shown in FIG. 2*g*, are transferred to provide the write error socket 821 with a write error signal.

*Card error trigger*

When the error originates with the buffer, the buffer error line 1097, in FIG. 3*n*, becomes energized in the manner previously described. This line 1097 is connected to an AND circuit 1207, in FIG. 3*q*, having three other inputs connected each to one of the following lines: the VRC line 1049, the record gate branch line 1158, and the gate write error line 1199, all of which are up at this time. Accordingly, the AND circuit 1207 provides an up level output which is applied to the input of the card error, CD ERROR, trigger 940 causing the latter to be turned on. The up level output from the latter passes through a cathode follower 1208, in FIG. 3*r*, to branch lines 1209 and 1210, the latter being applied to an OR circuit 1211. The line 1209 passes the up level card error signal to both grids of a thyratron 1212 causing the latter to fire, thus completing a path through its plate circuit to a line 1213 in turn connected to the sync connection 68. The path extends to the card reader, FIG. 2*e*, where it energizes the card error relay R174. The latter causes its **R174*b*** contacts, FIG. 2*g*, to transfer thereby providing the card error socket 820 with an appropriate error signal.

*Operations following the writing of the thirty-second character*

For each character written on tape, the character gate trigger 1050, in FIG. 3*i*, is turned ON and OFF. The character gate provides an output to line 1138 which is applied to a buffer ring advance SS 1216, in FIG. 3*g*, causing the latter to be turned ON each time the character gate trigger is turned off. In turn, circuits are set up to reset any of the read registers which might have been turned on during the previous writing operation. Any read registers which were turned OFF cause associated LRCR register triggers to be turned ON. A buffer ring advance signal is generated which advances the buffer ring to its second position, whereupon the data is extracted from the second position of the buffer, and in the manner described, written on tape. The above operations are repeated for each of the thirty-two characters written on tape. Following the writing of the thirty-second character, the output from the thirty-second ring position of the buffer ring resets the WR CALL trigger causing the WR CALL line to drop. This in turn causes the INIT WR DEL line to drop followed by the dropping of the WR CLOCK line, the latter turning off the CLOCK. The record gate line falls 200 μs. after the fall of the last character gate to cause resetting of the CLOCK, the buffer ring to position 1, and any WR triggers which might have been ON after the writing of the thirty-second character. The turning off of a WR trigger in the event the latter was on at the conclusion of the writing of the thirty-second character, causes an appropriate check bit to be written on the tape. In addition, the fall of the record gate line provides for turning OFF the DEL R/W CALL trigger, the GO trigger and the turning ON of the DISC trigger which in turn re-starts the clock. The LRCR registers are examined for error status. When the disconnect (DISC) trigger is turned OFF, the CLOCK in turn is also turned OFF. The fall of the DISC line turns OFF the WR REC trigger to terminate the first program step and turns ON the read backward call (RD BKWD CALL) trigger to initiate the second program step which calls for moving the tape in a backward direction to read the data written thereon. Now to be described in detail are the operations set forth in the outline in the preceding paragraph.

Turning off the character gate trigger 1050, in FIG. 3*i*, is effected by means of the CLOCK ring trigger 5 which provides a negative transition on the line 1037 to the input of said trigger 1050. The latter causes the character gate line 1046 to drop. This negative drop is passed through the branch line 1138, in FIG. 3*j*, to the input of the BUFFER RING ADV. SS 1216, in FIG. 3*g*, having a time duration of 10 μs. The latter is turned on and passes its output through a cathode follower 1217 to a line 1218 connected to the input of an AND circuit 1219 having two other inputs connected to lines 1220 and 1221, both of which are now up. Consequently, an up level output pulse is passed through a cathode follower 1222 to the line 972 which connects to one input of the OR circuit 970 and also to an input of an AND circuit 1223, in FIG. 3*a*. As earlier described, an up level output from the OR circuit 970, in FIG. 3*g*, eventuates in the resetting of the read registers. The AND circuit 1223, FIG. 3*a*, also has connected thereto two other input lines 1224 and 1225, both of which are now up. Accordingly, an up level pulse passes through the AND circuit 1223, through a grounded grid amplifier 1226, through cathode followers 1227 and 1228 to a buffer ring advance line 1229. This line is connected, in the manner shown, to a plurality of diode gates, FIGS. 3*a* and 3*g*, each associated with one of the buffer ring triggers, position 1 through position 32. Each time the line 1229 rises and falls, the buffer ring advances, scanning of the appropriate buffer position being effected by the output from the associated buffer ring trigger which is on.

For each data character written on tape, the above sequence of operation is repeated and is effected within a matter of 67.4 μs. After the writing of the thirty-second character, an output from the thirty-second position of the buffer ring trigger, FIG. 3*g*, is passed through a line 1230, through a cathode follower 1231 to branch lines 1232 and 1233. The line 1232 passes to an input of an OR circuit 1234, FIG. 3*b*, having three other inputs connected to lines 1235, 1236 and 1237. The output through the OR circuit 1234 passes through a line 1238 to an input of the WR CALL trigger 868, turning the latter OFF when the buffer ring trigger 32 is turned off, thus causing the WR CALL line 869 to drop. Consequently, in the manner set forth, the INIT WR DEL lines 888 and 887, FIG. 3*c*, and the WR CLOCK GATE line 991, FIG. 3*e*, drop, the latter turning off the CLOCK.

Then 200 μs. after the fall of the character gate 1050, the record gate line 1156, FIG. 3*p*, drops to provide an output which passes through the clock reset line 944 to the CLOCK RESET single shot vibrator 946, in FIG. 3*i*, and as a result, the clock reset lines 950 and 951 are energized to reset the clock triggers, while the buffer ring triggers are reset by way of the buffer reset line 964.

Resetting the write triggers is effected upon the fall of the record gate line 1159, FIG. 3*p*, by the fact that the latter had been providing an up level to the input of an AND circuit 1240, FIG. 3*d*, which also has a second input connected to a line **574*b* which branches off from the TU WR STATUS line 574*a* now up. Accordingly, the output of the AND circuit 1240 which had been up, falls when line 1159 falls. This transition is applied to the input of inverter 1241 which therefore provides a positive transition through a line 1242, through the OR circuit 902, and eventually to the reset line 909**, FIG. 3*d*, in the manner described, to reset the write triggers, in FIG. 36. Resetting any one or combination of the write triggers from ON to OFF status, at this time, causes appropriate R/W heads to write a check character on the tape for the purpose of making the bit count even on each tape track.

DISC DEL SS 1251, FIG. 3*d*, is also turned on upon the fall of the record gate line 1159 by virtue of the fact that the latter applies a down shift to an input of an AND circuit 1244, FIG. 3*d*, which has a second input connected to a line 1245, now up. As a result, the AND circuit 1244 provides a down level output to an inverter 1246 which supplies an up level output through line 1247, through an OR circuit 1248, having a second input line 1249, which will be explained, to a line 1250 connected to the input of the DISC DEL SS 1251 having a time duration of 150 μs. The latter provides a 150 μs. output through a cathode follower 1252 to branch lines 1253 through 1256. The line 1253 transmits the output through an OR circuit 1257, in FIG. 3*e*, through a line 1258 to an input of the DEL R/W trigger 985 thereby resetting the latter at the end of the 150 μs. DISC DEL.

The GO trigger 896, in FIG. 3*d*, is turned OFF by way of the branch line 1254, extending from the DISC DEL cathode follower 1252, an OR circuit 1259, and a line 1260 to the input of the GO trigger 896.

The output pulse is also applied by way of line 1256 to an input of a backward, BKWD, trigger 1261, in FIG. 3*k*, causing the latter to be reset, if it had been on.

In addition, the disconnect, DISC, trigger 1262, FIG. 3*i*, is turned ON by way of the line 1255.

*Check character*

In the event a check character is written, the character gate 1050, FIG. 3*i*, is turned on, in the manner described, to energize the line 1046. The latter passes an up level signal through the OR circuit 992, FIG. 3*j*, to initiate the operations of the clock, and at the same time, the up level signal passes through the AND circuit 1043, FIG. 3*k*, to provide a VRC pulse on the line 1047. The writing of the check character provides appropriate echo signals to operate the read registers, in the manner previously explained. The outputs of the read registers are tested for vertical redundancy by means of the VRC pulse on the line 1047.

When the read registers in question are reset, they provide pulses to flip appropriate ones of the LRCR registers, in FIG. 3*o*. At the end of the reset, all the LRCR registers 1163 through 1167 should be at an OFF status. This OFF status is tested by means of an up level pulse passing from the output of the DISC trigger 1262, FIG. 3*i*, through a cathode follower 1263, a DISC line 1264, a cathode follower 1265, a DISC line 1266, FIGS. 3*j* and 3*d*, cable 23, an OR circuit 1267, FIG. 3*p*, line 1268, an AND circuit 1269 having a second input connection to a line 1270 connected to the outputs of five cathode followers 1271 through 1275. Each of the latter has its input connected to an output of an associated LRCR trigger.

Should any of the latter be on at this time, the LRCR line 1194, FIGS. 3*p* and 3*q*, will thus provide an up level signal which eventuates in the turning on of the WR ERROR trigger 939, FIG. 3*q*, in the manner described, to cause a write error signal to be sent by way of the lines 1204 and 1206, FIG. 3*r*, to the card reader. On the other hand, the presence of an OFF status in all of the LRCR triggers prevents energization of the line 1204 in an up sense to thus provide for appropriate operations in the card reader and the tape unit machine.

Energization of the DISC line 1264, FIG. 3*i*, brought about previously by the flipping on of the DISC trigger 1262, provides an up level on a branch line 1276, extending from the DISC line 1264, to an input of the OR circuit 992, FIG. 3*j*, to initiate the operations of the clock, following which operation the clock trigger 5 provides a pulse through the line 1037, through a line 1277 to an input of the DISC trigger 1262 turning the latter off and causing the DISC line 1264 to drop. The clock is thus stopped 33.6 μs. after starting by the branch line 1276 dropping. The output of the WR REC trigger 863 passes through a cathode follower 1283, through a line 1284 to an input of the diode gate 1279. A DISC branch line 1278, FIG. 3*i*, provides a negative transition through a diode gate 1279, FIG. 3*a*, through a line 1280, through a line 1281 to an input of the WR REC trigger 863 turning the latter off, thus ending program 1, WRITE REC. At the same time, the negative transition passes through the line 1280 and into an input of a read backward call, RD BKWD CALL, trigger 1282 to initiate the second program step. The output of the RD BKWD CALL trigger 1282 passes through a cathode follower 1285, to a RD BKWD CALL line 1286 connected to an input of a second diode gate 1287 forming a part of the ring, the latter being effective at the end of the second program to turn off the RD BKWD CALL trigger 1282 and to initiate the third program step in a manner to be later explained.

The timings of various electronic components are shown in FIGS. 40*a*, 40*b* and 40*c*. Based upon a record of forty characters, a complete program operation of the three steps is effected in approximately 61.938 ms. of which 13.116 ms. are required for program 1, WRITE RECORD; 27.789 ms. for program 2, READ BACKWARD; and 21.003 ms. for program 3, SPACE FORWARD.

PROGRAM 2, READ BACKWARD (RD BKWD)

Now to be described are the program 2 operations concerned with moving the tape in a backward direction and also reading the previously written data for the purpose of checking its accuracy. When the RD BKWD CALL trigger 1282 was energized, in FIG. 3*a*, an up level signal was transmitted along the line 1286, FIG. 3*b*, through cable 23, to an input of an AND circuit 1290, FIG. 3*k*, also having a second input connection to a NOT STOP ON ERROR and ERROR line 1291. Accordingly, the AND circuit 1290 provides an up level output which passes through a cathode follower 1292 to a BKSP TEST/RD BKWD CALL line 1293 connected through cable 21 to an input of an AND circuit 1294, FIG. 3*c*, also having a second input connected to a TU IN WR STATUS line **574*c*, now up. The up level signal passes through the AND circuit 1294 to an input of a shaping trigger 1295 energizing the latter. The output of the shaping trigger 1295 passes through a line 1296 to an input of a WR FWD BEFORE BKSP SS 1297 having a time duration of 3 ms. This SS 1297 has output lines 1298 and 1299. The line 1298 passes the negative transition through the OR circuit 892 to turn on the GO trigger 896**, in FIG. 3*d*, the latter issuing an appropriate signal through the line 901 to reset the write triggers in the manner described under program 1.

It will be recalled that during the latter portions of program 1, the GO trigger was turned off, in which status the GO trigger remains until turned on. This OFF status is maintained for an interval of about 33.6 μs., which interval does not provide sufficient time for the tape unit to arrest the forward feeding of the tape. Consequently, the turning on of the GO trigger 896, as just mentioned, instructs the tape unit to continue the forward advance of the tape for 3 ms. longer. During this 3 ms. interval, the write triggers are maintained in reset status. Accordingly, the five channels of the tape, now advancing in a forward direction, will be magnetized in the same direction by their appropriate R/W heads. This in effect provides an erasing action to insure that a "clean" tape is presented to the R/W heads on a subsequent writing operation. The advancement of the tape for this 3 ms. interval provides sufficient delay in bringing the tape unit to full operational speed before the previously written data on the tape is presented to the R/W heads for reading during the backward movement of the tape.

Upon the termination of the 3 ms. interval, the SS 1297, FIG. 3*c*, turns OFF. Accordingly, a negative transition passes through the line 1299, through a cathode follower 1300 to a WR FWD BEFORE BKSP line 1301, FIG. 3*d*, which has one connection leading to an input of the OR circuit 1259 whose output line 1260 turns off the GO trigger 896, thus initiating the stopping of the tape. At the same time, the negative transition passes through the line 1301, through cable 23, an OR circuit 1302, FIG. 3*k*, to a line 1303 connected to an input of the BKWD trigger 1261 to turn the latter on. This trigger 1261 has three output lines 1304, 1305 and 1306. The latter is connected to a cathode follower 1307 having its output connected to a line **528*a*** which passes into the tape unit where, in FIG. 35*b*, it joins with the BKWD line 528, the latter, in the manner previously explained, causing energization of the backward control magnet **196*a***.

The turning on of the BKWD trigger 1261, FIG. 3*k*, also provides a pulse through the line 1305 to turn on a FWD TO BKWD DEL SS 1309 having a time duration of 15 ms. The latter provides the time necessary to brake the tape unit feeding mechanism and at the same time enables the tape reversing apparatus to transfer. Upon the termination of the 15 ms. time interval, the SS 1309 turns off providing a pulse through a line 1310 to turn on a DEL BKSP CALL trigger 1311 which provides an output on a DEL BKSP CALL line 1312 which eventually sets the tape unit to READ STATUS in the following manner.

Returning to the line 1312, the latter is connected through cable 21 to a cathode follower 1313, in FIG. 3*c*, whose output is connected to a line 1314. Also connected to this line 1314 are outputs connected from cathode followers 1315 and 1316, the former having its input connected to a TEST RD line 1317 and the latter having its input connected to a SPACE FWD CALL line 1318. The combination of these three cathode followers 1313, 1315 and 1316 behaves as an OR circuit. The line 1314 connects through cable 23 to an input of an OR circuit 1319, in FIG. 31, having a second input connected to a rewind, RWD, line 1320. The output of the OR circuit 1319 passes through a cathode follower 1321 to a SET RD STATUS line 562*a*, FIG. 3*f*, which passes into the tape unit where it joins with the line 562. In the manner earlier described, this line 562 resets the R/W trigger 560, in FIG. 35*b* of the tape unit, to READ STATUS. Accordingly, the tape unit provides a signal which is applied on the SEL READY and READ line 600 which passes back to the synchronizer where it joins with the line 600*a*, FIGS. 3*f* and 3*c*. The latter is connected to an input of an AND circuit 1323, FIG. 3*c*, also having input connections, respectively, to the lines 1416, 1314 and a NOT BKWD TO FWD DEL line 879*a*. The output of the AND circuit 1323 is fed into a trigger 1324 whose output passes through cathode followers 1325 to an INIT RD DEL line 1326. The latter feeds a branch line 1327 which connects to the OR circuit 889. The output of the latter eventually, in the manner described, turns on the GO trigger 896, FIG. 3*d*, to initiate the backward movement of the tape in the tape unit.

The reading of the written data on tape is delayed for about 4 ms., the time required for the tape to attain maximum speed. Accordingly, a RD DEL SS 1339, FIG. 3*e*, is turned on by means of a line 1338 connected between the input of the SS 1339 and the output of an OR circuit 1337 whose inputs are connected to lines 1335 and 1336, the latter being connected to the output of an inverter 1334. The input to the inverter 1334 is connected to the output of an AND circuit 1333 having three inputs connected respectively to the INIT RD DEL line 1326, now up, a TU NOT AT LP line 920*c*, now up, and an RD LP DEL line 1332 also up. The line 1332 is traceable through a cathode follower 1331, a line 1330 connected to the output, now up, of a RD LP DEL SS 1329. The input of the latter is connected to a line 1328 in turn connected to the output of an inverter 1327 whose input is connected to the output of an AND circuit 1322 having its input connected to the INIT RD DEL line 1326, now up, and the TU AT LP line 516*a*, now down.

The turning off of the SS 1339 after the termination of the 4 ms. interval terminates the up level output pulse which eventuates in the resetting of the clock triggers and the buffer ring triggers in the following manner. The output of the SS 1339, FIG. 3*e*, is fed by way of a line 1341 through a cathode follower 1342 to the line 942 which, when it falls, in the manner described under program 1, flips the clock reset SS 946, FIG. 3*i*, to cause the resetting of the clock triggers. At the same time, the output of the clock reset SS 946 passes through the AND circuit 961, since the line 962 is up, to energize the buffer ring reset line 964 to cause reset of the buffer ring, FIG. 3*g*, to position 1.

The termination of the pulse on the line 942 also causes, by way of the line 965, in FIG. 3*e*, the flipping of the CLOCK GATE DEL SS 966 to cause a circuit path, previously explained, to be completed which eventuates in the resetting of the READ REG triggers. When the SS 966 goes off after the termination of a 20 $\mu$s. interval, the DEL R/W CALL trigger 985 is turned on by way of the line 984.

Approximately 10 ms. after the initial movement of the tape in its backward direction, the last written character will be encountered by the R/W heads in the tape unit. As each character bit traverses its associated R/W head, appropriate signals are generated and transmitted to the synchronizer where they are amplified, mixed, clipped and shaped. The read pulses from the tape unit representing respectively the C, 8, 4, 2, 1 bits are transmitted by way of the READ SYNC BUS lines 654, 657 through 660, which lines are connected to associated lines 654*a*, 657*a* through 660*a*, in FIG. 3*o*, of the synchronizer.

An exemplary circuit path whereby a signal representing a bit 1 pulse, read by the R/W head, is traceable beginning with the line 660, in FIG. 36 of the tape unit, then to the line 660*a*, in FIG. 3*o* of the synchronizer, through an inverter 1343, a phase splitter 1344, a cathode follower mixer 1234, a ground grid amplifier 1349, an inverter 1350, output line 983, through the OR circuit 982, through the line 982*a* to the RD REG trigger 975*a*, turning the latter on. It may be recalled that, at the beginning of the program 1, the tape initially started to load point (LP) and under this condition the written data comprises a series of thirty-two zeros. Accordingly, RD REG 8 and 2 will be energized at this time during program 2. However, if it is to be assumed that significant data was extracted from the buffer and written on tape during the program 1, appropriate read registers RD REG would now be energized. In any event, after the appropriate RD REG triggers are energized, the first one turning on provides the so-called first bit pulse which is applied to the line 1134, in FIG. 3*p*, in the manner described under program 1, to turn on the CHAR GATE trigger 1050, in FIG. 3*i*. The latter, in turning on, initiates operation of the clock and 33.6 $\mu$s. thereafter the clock trigger 5 output goes down which passes negative transition on the line 1037 to turn off the CHAR GATE trigger 1050, the latter turning off the clock.

Next to follow is the turning on of a beginning of record search and backward record gate, BORS & BKWD REC GATE, SS 1957, in FIG. 3*d*, which will set up the circuitry for effecting a vertical redundancy check of each character read and a longitudinal redundancy check as the final check on the complete record of thirty-two characters, and a possible check character, read from the tape. The SS 1357 is turned on beginning with an AND circuit 1351, FIG. 3*d*, whose input is connected to the CHAR GATE line 1142, now up, and a DEL BKSP CALL line 1352 which traces through cable 21, a cathode follower 1353, FIG. 3*k*, having its input connected to a line 1354 branching from the line 1312, now up. Consequently, an up level output is issued from the AND circuit 1351, FIG. 3*d*, and passes through a cathode follower 1355 to the input of an inverter 1356. The latter pulls over the input of the SS 1357 which has a time duration of 500 $\mu$s. Since a character gate is generated every 67 $\mu$s., the SS 1357 will be held flipped for the time required to read the thirty-two characters, and a possible check character, plus an additional 500 $\mu$s.

The output of the SS 1357 is passed through a cathode follower 1358, through a line 1361 to which is connected the branch line 1151. The latter, as earlier explained, feeds the OR circuit 1150, FIG. 3*p*, the output of which turns on the REC GATE SS 1154. Accordingly, the REC GATE line 1156 will be up for 200 $\mu$s., the time duration of the latter, after the fall of the BORS & BKWD REC GATE SS 1357, FIG. 3*d*, or 700 $\mu$s. after the last character gate.

During each character gate, when clock triggers 5 and 4, FIG. 3*j*, are up, a VRC sample pulse is generated and transmitted on the line 1047, FIGS 3*k* and 3*p*, to test the READ REG outputs for vertical redundancy. Any redundant error detected during this test will be reflected, in the manner described, upon the VRCE line 1190, FIG. 3*p*.

Each time the character gate 1050, FIG. 3*i*, falls during program 2, the READ REG reset line 974, FIG. 3*o*, is energized to reset the READ REG. Energizing the line 974 is caused by a path traceable back to the cathode follower 973, in FIG. 3*g*, OR circuit 970, line 971 to the output of an AND circuit 1372 having input connections to lines 1371 and 1370, which lines are now up. The input line 1371 traces back through a cathode follower 1369, a pulse forming inverter 1368, cathode follower 1367, branch line 1138, cable 21 to the CHAR GATE line 1046, in FIG. 3*i*. The input line 1370 traces back through cable 21, a cathode follower 1366, in FIG. 3*q*, OR circuit 1365, branch line 1364, cable 23 to the INIT RD DEL line 1326, in FIG. 3*c*. The above vertical redundancy test is repeated for each character read. Each time the READ REG, FIG. 3*o*, reset from ON to OFF status, the appropriate LRCR registers are flipped accordingly when the last character (the first character written) has been read, the status of the LRCR registers should be OFF to indicate that this record reading operation was properly executed. On the other hand, an ON status of any one or combination of the LRCR registers is indicative of a read error. In any event, should the LRCR register indicate an error at this time, an appropriate signal would be generated and applied to the line 1194, FIG. 3*p*. The means for initiating this signal during program 2 is as follows.

Tracing back through the line 1194 the path passes through the AND circuit 1269, input line 1268, OR circuit 1267, in FIG. 3*o*, having an input connection to a line 1377 in turn connected to a cathode follower 1376 whose input is connected to an output of a RD LRCR SAMPLE SS 1375 having a time duration of 30 μs. The input to the latter is fed by a branch line 1374 passing through cable 23 to the line 1361, in FIG. 3*d*. Thus, when the latter falls 500 μs. after reading the last character (the first written character in program 1), the SS 1375 is flipped on to provide the RD LRCR sample pulse to the line 1377.

Operations in the card reader, predicated upon the presence or absence of an error, will now be explained. The line 1377, FIGS. 3*o*, 3*p* and 3*r*, is connected to an AND circuit 1380, FIG. 3*r*, having a second input connected to a line 1381 joined to the output of a cathode follower 1382 whose input connects to the output of a grounded grid amplifier 1383. The latter has its input connected to an output of an inverter 1384 whose input connects to a R/W/CD error line 1385. The latter connects to the output of a cathode follower 1214 whose input is fed by the output of the OR circuit 1211. The presence of either a CD, WR or RD error is reflected as an up level signal on the output of this OR circuit 1211 and also on the line 1385, while the line 1381 under this condition manifests a down level signal.

Assuming that an error exists, the line 1381 is therefore down while the RD LRCR line 1377 is up. Accordingly, the output of the AND circuit 1380 is down. This down level is applied to a line 1386 having a connection to ground by way of a 39 μμf. capacitor 1387, and also to the input of a grounded grid amplifier 1388 whose output is fed through the cathode follower 1389 to a SYNC OK & RDY line 1390, now down because of the assumed error condition mentioned above. The line 1390 feeds both grids of a gas thyratron 1391 whose output is fed into a line 1392 passing through sync connection 71 to an OK relay R178 disposed in the card reader. The latter is wired to cam contacts CR57 and CR58 to the line L4. Energization of this relay R178 is effected upon the absence of an error in the tape unit. The presence of an error, on the other hand, results in the failure to energize this relay R178. The latter, when energized, provides the tape unit with an appropriate signal to initiate the SPACE FORWARD program step during which the previously written record on the tape is spaced past the R/W heads.

Returning now to the BORS & BKWD REC GATE line 1361, in FIG. 3*d*, the latter, when it drops, also resets, by way of a branch line 1392, the DEL BKSP CALL trigger 1311, in FIG. 3*k*. Resetting the latter causes the INIT RD DEL 1326 line, in FIGS. 3*e* and 3*c*, to drop. Two hundred μs. thereafter the fall of the line 1361, FIG. 3*d*, also causes, in the manner described, the fall of the REC GATE line 1156, in FIG. 3*p*. The latter causes the turning off of the SS 1160 which provides for resetting the clock triggers and the buffer ring triggers.

The fall of the line 1361, FIG. 3*d*, also turns on, by way of a branch line 1393, a BKWD STOP DEL SS 1394 having a time duration of 3 ms. When the latter turns off after an interval of 3 ms., the DISC DEL SS 1251, in FIG. 3*d*, is turned on by way of a path including line 1249, in FIG. 3*d*, OR circuit 1248 and the line 1250. When the SS 1251 turns off 150 μs. later, the BKWD trigger 1261, FIG. 3*k*, is turned off by way of the DISC DEL branch line 1256. When this takes place, the BKWD line 528*a*, in FIGS. 3*k* and 3*f*, passes a down level signal through the BKWD line 528 in the tape unit to de-energize the backward control magnet 196*a* and energize the forward magnet 196*b*.

The fall of the DISC DEL line 1255 also turns off the GO trigger 896, in FIG. 3*d*, by way of the line 1254, OR circuit 1259 and the line 1260, thus stopping the tape.

The fall of the DISC DEL line also turns off the DEL R/W CALL trigger 985, in FIG. 3*e*, by way of the branch line 1253, OR circuit 1257 and the line 1258. At the same time, by means of the branch line 1255, the DISC trigger 1262, in FIG. 3*i*, is turned on. The latter, in turning on, energizes the DISC lines 1266 and 1264, in FIG. 3*i*, which eventuates in the turning on of the clock, FIG. 3*r*, by way of the line 1276, FIG. 3*j*. Immediately thereafter, when the clock trigger 5 is turned on and then off (33.6 μs. later), the DISC trigger 1262, FIG. 3*i*, is turned off by way of the lines 1277 and 1037 and, as a consequence, the DISC trigger 1262, in turning off, also turns off the clock.

In addition, the fall of the DISC line 1264 turns off the RD BKWD CALL trigger 1282, in FIG. 3*a*. The circuit whereby this is effected follows through a path including the line 1278, in FIG. 3*i*, through a diode gate 1287, FIG. 3*a*, and from the output of the latter through a line 1395 to the input of the trigger 1282.

In the absence of any error at this time, the signal on the DISC line 1278 also turns on the SPACE FWD CALL trigger 1396, in FIG. 3*b*, to initiate program 3. This circuit is under control of a diode gate 1397, FIG. 3*a*, which, if operative at this time, permits the negative transition on the line 1278 to pass through the diode gate 1397, through a line 1398 to the input of the trigger 1396, turning the latter on. The diode gate 1397, to be operative at this time, must have an up level on the input connected to a line 1399 which traces back to the input of an AND circuit 1400, the latter having three inputs connected to lines 1401, 1402 and 1403. In order for the AND circuit to provide the up level output to the diode gate 1397, in FIG. 3*a*, it is necessary that the three input lines be up. In the case of lines 1401 and 1402, these are up at this time. As for the line 1403, this may or may not be up depending upon the absence or presence of an error. On the assumption that no error exists at this time, the line 1403 is therefore up. Consequently, diode gate 1397 is rendered operative to permit turning on of the SPACE FWD CALL trigger 1396, in FIG. 3*b*, to initiate program 3, i.e., to cause the tape unit to skip over the previously written record data on the tape.

Before proceeding with an explanation of program 3 it might be well to observe from the clock sequence chart, in FIG. 41, the relationship between the VRC sample pulse (applied to the line 1047 for effecting a vertical redundancy check) and the duration of the character gate. This relationship provides for maximum skew which might result in the writing of the character bits on the tape and also during the reading of these bits on a subsequent program.

PROGRAM 3, SPACE FORWARD (SPACE FWD)

In the preparation of the tape unit for program 3 it will be recalled that when the BKWD trigger 1261, FIG. 3*k*, was turned off during program 2, the NOT BKWD line 1304 came up. The latter caused the turning on of the BKWD TO FWD DEL SS 883 for 15 ms. in order to provide sufficient time for the tape unit to brake the tape to a stop and the reverse mechanism to transfer. The path for the turning on of the SS 883, FIG. 3*k*, *is* through the line 1304, a cathode follower 1404, a NOT BKWD line 1405 to the input of the SS 883. Turning the latter on causes the line 882 to drop to apply a down level signal through the cathode follower 881 to the line 879 and the NOT BKWD TO FWD DEL line 1324.

When the SS 83 turns off following the termination of its 15 ms. interval, the circuits are set up to turn on the GO trigger 896 and also to maintain the tape unit in READ status (it will be recalled that the tape unit was placed in READ status in the preceding program 2) in the following manner. The SPACE FWD CALL trigger 1396, in FIG. 3*b*, now on, provides an up level output through a cathode follower 1406, a SPACE FWD CALL line 1407 to the input of an AND circuit 1408 also having a second input connected to a card reader ready (RDY) line 1409. The latter traces back through a cathode follower 1410, in FIG. 3*a*, a line 1411, DECK 4 switch 1412, a line 1413, SYNC connector 72 to card reader cam contact CR12, through relay R178*e* n/o contacts to the line L1.

The output of the AND circuit 1408, FIG. 3*b*, is fed through a grounded grid amplifier 1414 to the line 1318. The circuit then extends through cable 23, the cathode follower 1316, in FIG. 3*c*, line 1314 and through a branch line 1416, to an input of the AND circuit 1323. The output from the latter eventually passes on to the INIT RD DEL line 1326. Through the line 1326 the signal passes through the line 1327 and eventually, in the manner described, to turn on the GO trigger 896, in FIG. 3*d*. Accordingly, the output from the latter is impressed on the line 901 which causes the turning on of the CHECK CHAR DEL SS 905, in FIG. 3*d*. When the latter turns off, the reset line 909, FIGS. 3*d* and 3*f*, is energized to reset the WR triggers in the tape unit. Furthermore, the GO line, by way of the line 534*a*, in FIG. 3*d*, provides for the energization of the circuits, earlier explained, which will cause the appropriate tape unit feeding instrumentalities to move the tape in a forward direction.

Before reading operations can be initiated in this program 3, a delay of 4 ms. is interposed in order for the tape unit to attain its required operating speed. This delay is brought about as follows. The AND circuit 1333, in FIG. 3*e*, is now operative to pass an up level output which eventuates in the turning on of the RD DEL SS 1339, in FIG. 3*e*. Upon the termination of this 4 ms. interval, the output from the RD DEL SS 1339 drops and provides a negative transition on the START REC CLOCK RESET line 942 to effect the following operations.

The CLOCK RESET SS 946, in FIG. 3*i*, is turned on to energize the output lines 950, 951 and 964, the latter initiating the reset of the buffer ring, and the lines 950 and 951 imitating the reset of the CLOCK triggers.

The CLOCK GATE DEL SS line 966, in FIG. 3*e*, is turned on by way of the branch line 965 extending from the line 942. The SS 966 in turning on provides a signal on the line 969, FIG. 3*f*, which eventually passes through cable 21 to FIG. 3*g* and on to the reset line 974 to cause resetting of the READ REGS, in FIG. 3*o*.

The turning off of the SS 966, in FIG. 3*e*, provides a signal on the line 984 to turn on the DEL R/W CALL trigger 985. Accordingly, the output line 988 is energized to condition one of the two inputs of the AND circuit 1132, in FIG. 3*p*, the other input of which is fed by the line 1131 (FIG. 3*o*) which, as earlier explained, provides a signal upon the flipping of the first READ REG upon the reading of the first written character on the tape, as the latter moves forwardly during program 3.

The reading of this first character takes place approximately 10 ms. after the GO trigger 986 was turned on. The reading was effected by the R/W heads each of which furnished an appropriate read echo signal which is directed to the SYNC to an appropriate one of the READ REGS. The first READ REG trigger in turning on provides a signal through the OR circuit 1130, FIG. 3*o*, to energize the second input to the AND circuit 1132, the first input being energized by the line 988. Accordingly, the output from the AND circuit 1132, FIG. 3*p*, provides the first bit signal on the line 1134. In turn the signal is passed on to turn on the CHAR GATE trigger 1050, in FIG. 3*i*. In consequence thereof, the CHAR GATE line 1046 comes up to turn on the CLOCK. Immediately thereafter (33.6 μs. later) CLOCK trigger 5 provides a signal on the line 1037 to turn off the CHAR GATE 1050. The latter, in turning off, turns the CLOCK off.

As a further consequence, the REC GATE SS 1154, in FIG. 3*p*, is turned ON and remains in the ON status until 200 μs. after the fall of the last character gate during program 3. When the REC GATE line 1156 comes up, a signal is passed along the reset line 1162 to reset the LRCR triggers, in FIG. 3*o*.

The operations of the CHAR GATE is the same as that described under program 1, in that each time the CHAR GATE line falls, a signal is directed to reset the READ REGS. The outputs from the latter in turn are directed to the LRCR REGS; however, since the card reader has previously signaled an OK condition for the record previously written on tape, the vertical and longitudinal redundancy checks are disregarded during this program 3 step.

Reading of each character continues until the last written character is encountered and read and 200 μs. thereafter the REC GATE SS 1154, in FIG. 3*p*, turns off to impress a negative drop on the REC GATE line 1159 to cause the DISC DEL SS 1251, in FIG. 3*d*, to turn on. The latter maintains an ON status for 150 μs. whereupon the SS 1251 turns off to supply an appropriate signal on the DISC DEL lines, one of which, line 1253, provides for the reset of the DEL R/W trigger 985, in FIG. 3*e*, and another one, line 1254, provides for the reset of the GO trigger 896, in FIG. 3*d*. The latter causes the appropriate means in the tape unit to effect braking the tape to a stop. Another DISC DEL line 1255, FIG. 3*d*, causes the DISC trigger 1262, FIG. 3*i*, to turn on, providing an output which eventuates in turning on the CLOCK. Immediately thereafter 33.6 μs. later) when CLOCK trigger 5 is turned off, a signal is issued by the latter to turn off the DISC trigger, the latter turning off the CLOCK.

Upon the fall of the DISC line 1278, FIG. 3*i*, the SPACE FWD CALL trigger 1396, FIG. 3*b*, is turned off by way of a path which includes a diode gate 1416, FIG. 3*a*, and a line 1417. The set input to the diode gate 1416 is connected to a line 1418, in turn connected to cathode follower 1406 whose output is up at the time the DISC signal passes through the diode gate 1416.

When the trigger 1396, FIG. 3*b*, is turned off, a down level signal is passed through the line 1407 to the AND circuit 1408. The output of the latter accordingly drops and thus impresses a down level signal on the line 1318. This down level signal eventually is reflected upon the INIT RD DEL line 1326, FIGS. 3*c* and 3*e*. Turning the SPACE FWD CALL trigger 1396, FIG. 3*b*, off, in the manner described, terminates program 3 thus placing the SYNC in condition to prepare to write the next record on tape as the associated record card check passes through the card reader.

Prior to the initiation of a writing operation following a program in which an error occurs, or in which an error did not occur but for some reason the card reader did not provide the synchronizer with an OK signal, there is imposed a 3 ms. delay in the operation of the WR DEL circuits. This delay provides for a spacing somewhat greater than the normal spacing separating recorded areas written under normal operations, i.e., without error. The effect of the additional spacing is that it avoids the feeding of a previously written record on the tape beneath the R/W station during a space backward operation in which instance the previously written record would be partly effaced. This feature is especially desirable under circumstances where a series of recurring errors develop as a result of an imperfection on the tape, which imperfection can be passed over by an uninterrupted series of consecutive programs in which the forward movements of the tape exceed the backward movements of the tape after which the next record can then be written on the valid portion of the tape.

The circuits employed to effect the 3 ms. delay, described above, include a REJECT REC trigger 1420, FIG. 3*e*, and an SS 1421 having a time duration of 3 ms. The trigger 1320 has its output connected through a cathode follower 1422 to the line 926 feeding one of the two inputs of the AND circuit 916, the other input being fed by the line 924. The input for turning on the trigger 1420 is fed by a line 1423 connected to an output of an OR circuit 1424. The latter has two input connections, one of which connects to a NOT R/W/CD line 1403, and the other input is connected to a line 1425 which is fed from the output of an inverter 1426 whose input is connected to a line 1427 in turn connected to the output of an AND circuit 1428. The latter has input connections fed by SPACE FWD CALL branch line 1429 and the branch line 858, also FIG. 3*a* (the latter serves to transmit the start signal from the card reader).

A second input to the REJECT REC trigger 1420, FIG. 3*e*, for turning the latter off is under control of a line 1430 connected to the output of the SS 1421, the latter having its input connected to the line 923. In operation, the SS 1421 is turned on each time a positive signal is issued by the AND circuit 916 to initiate operations of the WR DEL SS 930, FIG. 3*e*, during a program 1 operation.

Now if an error is detected during the operation of the tape unit and the card reader, the NOT R/W/CD ERROR line 1403, FIG. 3*r*, will reflect a negative drop which is impressed upon the trigger 1420, FIG. 3*e*, to turn the latter on. Accordingly, the trigger issues a down level signal on the line 926 feeding the AND circuit 925 thereby preventing the latter from issuing an effective signal to the WR DEL SS 930. At the same time, during program 1, when the AND circuit 916 issues an up level signal on the line 924, the SS 1421 is turned on by way of lines 923. Three ms. later, when the SS 1421 is turned off, the line 1430, FIG. 3*e*, provides a signal to turn off the trigger 1420 causing the latter to issue an up level signal on the line 926. The latter, in conjunction with an up level signal on the line 924, enables the AND circuit 925 to issue an effective signal to turn on the WR DEL SS 930, the latter operation reflecting the 3 ms. delay.

The above 3 ms. delay is also effected in the event operations fail to manifest any of the three types of errors but the card reader fails to deliver to the SYNC a timely start signal on the line 858, FIG. 3*a*. In this event, the SPACE FWD CALL line 1429, FIGS. 3*b* and 3*e*, is up at a time when the line 858 comes up owing to the absence of the card reader start signal and therefore the execution of program 3 step. Accordingly, the AND circuit 1428, FIG. 3*e*, provides an up level signal on the line 1427 which signal becomes a down level signal after passing through the inverter 1426 and is passed on through line 1425, OR circuit 1424, line 1423 to the input of the trigger 1420, turning the latter on. The trigger 1420 thus causes the line 926, FIG. 3*e*, to drop to render the AND circuit 925 ineffective. The circuit operations that follow are the same as described above for initiating the 3 ms. delay in the operation of the WR DEL SS 930. This delay of 3 ms. provides for an additional tape movement of approximately .225 inch.

Operations of the tape unit during total taking cycles of the card reader are much the same as that described previously except that the tape writing operations are confined to writing nineteen data characters instead of thirty-two characters, the exact number of nineteen total characters is by no means to be construed as a limitation but merely as an illustrative example of the fact that the total number of characters written during a tape total writing operation may be different from the number written during the record writing operations previously described.

In the example at hand, after nineteenth character is written, the writing operation is caused to be terminated under the control of buffer ring position 20, FIG. 3*g*. The latter, by means to be described, causes the WR CALL trigger 868, FIG. 3*b*, to be turned off. Following the termination of program 1, program 2, READ BACKWARD and program 3, SPACE FORWARD are effected in the manner previously described.

The circuits involved in the tape total writing operation are as follows. The output from the buffer ring position 20, FIG. 3*g*, is fed along a line 1432, a line 1433 to the input of an AND circuit 1434, FIG. 3*b*, having a second input connection to a line 1435 passing through a cathode follower 1436 to a TOTAL CYCLE line 1437 passing through SYNC connector 80 to the card reader where the circuit follows through R292*b* n/o contact points to the line L1. (In the card reader the parent relay R292P, shown in FIG. 2*c*, is under control of R247*d* n/o contact points, the latter in turn being controlled by its parent relay R247 shown in FIG. 2*d*, the energization of which is by means of a path extending through the relay R247P, card lever relay R107*h* n/o contact points, card relay lever R102*g* n/c contact points, card lever relay R98*i* n/c contact points, 9 master card control relay R265*f* n/o contact points, cam contacts CR40 to the line L1. A hold circuit is provided for the relay R294*h*, in FIG. 2*s*, which circuit passes through R292*a* n/o contact points, cam contacts CR10, CR35 to the line L1. A hold circuit for the relay R247*h*, in FIG. 2*c*, is under control of cam contacts CR11.)

The relay R292*b* contact points are thus closed during total taking cycles of the card reader to provide an up level signal to the AND circuit 1434, in FIG. 3*b*. The latter signal, along with an up level signal from buffer ring position 20 along the line 1433, enablest the AND circuit 1434 to issue an up level signal to the inverter 1438. The latter provides a down level signal through a cathode follower 1439 to the line 1235 which feeds the OR circuit 1234 to the line 1238 to turn off the WR CALL trigger 868. The writing of the total data on tape, see FIGS. 1 and 15, includes twelve positions of accumulator totals, five positions of batch number data and two positions of transaction code.

Now, if the TI point on the tape is encountered during card reading operations and tape writing operations, the card reader is instructed to stop after which a choice of operations may be exercised by the operator to either continue feeding of cards through the card reader accompanied by tape writing operations, or to call for a total operation in which the card reader will print various totals and associated identification while the tape unit undergoes a tape total writing operation. If the choice is to continue feeding of cards, it will be necessary to first depress the card reader RESTORE KEY in order to release various card feeding interlocks set up by the TI point circuits. Thereafter cards may be fed through the card reader upon the depression of the card reader START KEY. When the last card passing through the card reader is a 9M master card, the card reader is signaled to effect total printing operations while the tape unit is instructed to write a tape total after which the machines stop. Upon depressing the TAPE MARK key and the REWIND key, the card reader will pass through a series of non-print cycles while the tape unit is instructed to write a TM character including a check character which will be written on tape and, following a read backward operation, a rewind operation will be initiated to rewind the tape on the file reel.

On the other hand, if the last card was not a 9M card, the card reader is instructed to print totals and the tape unit to write the tape totals upon depression of the TAPE MARK key and the REWIND key, after which the TM character including a check character is written and, if valid, a rewind operation is instituted.

The TM character is comprised of bits 1—2—4—8. The check character is comprised of the same number of bits. The writing of the TM character and its check character takes place during a program 1 after which program 2 is initiated to read the tape backward for checking the TM character and its check character. If the verification proves to be valid, the normal program 3 step is disregarded, instead, appropriate rewind (RWD) means are set into operation to instruct the tape unit to effect a rewind operation.

The circuits involved in the above TM operations for initiating a WR REC, program 1 operation is as follows. A signal, generated in FIG. 2*d* of the card reader upon the depression of the TM key and the REWIND key, is transmitted by way of SYNC connector 65, a line 1442, FIG. 3*q*, through a cathode follower 1443, a shaping trigger 1444, cathode follower 1445, a line 1446 to an input of an AND circuit 1447 having a plurality of inputs connected respectively to a NOT RWD line 1448, and a NOT SET TI line 1449 and the NOT AT LP line **920*d*. When all of these input lines to the AND circuit 1447 are up, the latter issues an up level signal to an inverter 1450 whose output passes through a line 1451 connected to the input of a WR TM & RWD CALL trigger 1452**, in FIG. 3*r*. The latter accordingly provides an output through a cathode follower 1453 to the line 1454. An output also passes through a cathode follower 1455 to the line 1224 and a branch line 1457, the latter being connected to the input of the OR circuit 861, in FIG. 3*a*. Thus, the down level or negative transition on the line 1457 is passed through the OR circuit 861 to turn on the WR REC trigger 863 to initiate program 1 operations.

Next to be energized are the WR BUS lines 1077 through 1080, representing the 1—2—4—8 bit signal lines. When the WR TM and RWD CALL trigger 1452, FIG. 3*r*, is turned on, the line 1454 provides an up level through a branch line 1458, through cathode followers 1459 and 1460. The cathode follower 1459 passes its its output through a line 1461, cable 23, to the six decimal line 1056, FIG. 3*n*. The output of the cathode follower 1459 is passed through a line 1462, cable 23, connected to the nine decimal 1059, FIG. 3*n*. The decimal line 1056 energizes binary lines representing bits 2 and 4, while the line 1059 energizes the binary lines representing bits 1 and 8. When these binary lines are energized, and the CLOCK is in operation during program 1, binary bit values of 1—2—4—8 are written on tape to represent the TM character.

During this operation, the buffer ring advance line 1229, FIGS. 3*a* and 3*g*, is held down by virtue of the fact that a down level signal is impressed on the line 1224 which feeds one of the inputs to the AND circuit 1223 in FIG. 3*a*. In this manner, the buffer ring is precluded from advancing.

Upon the writing of the TM character, READ REGS 975 through 978, FIG. 3*o*, are energized in the manner previously described. The outputs from the latter are fed by way of branch lines 1464 through 1467 to appropriate inputs of an AND circuit 1468 having still a fifth input connected to the NOT C line 1126 reflecting the output of the READ REG 979. The line 1126 is up at this time; hence, the AND circuit 1468 issues an up level signal which is fed through a cathode follower 1469, in FIG. 3*p*, to a line 1470 connected through cable 21 to an input of an AND circuit 1471, FIG. 3*d*, having three other inputs connected to the VRC line 1048, a FIRST CHAR GATE line 1472 and a line 1473 connected to the output of an OR circuit 1474. The latter has an input joined to the NOT BKWD line 1245. A second input to the OR circuit 1474 is fed by the output of an AND circuit 1475 having two inputs, one of which is joined to the NOT WR ERROR line 1202, now up; the other input is connected by way of a branch line 1476 to the WR TM & RWD CALL line 1454, in FIG. 3*r*, now up. Accordingly, the AND circuit 1475, FIG. 3*d*, is effective to issue an up level to render the line 1473 up. Since lines 1470, and 1472 are also up, the AND circuit 1471, FIG. 3*d*, will issue an up level pulse when line 1048, VRC line, is pulsed. This pulse is passed through a grounded grid amplifier 1477 to the input of a FIRST CHAR TM trigger 1478 to turn the latter ON on the fall of the VRC pulse. Before continuing the description with respect to this trigger, it might be well to explain the energization of the line 1472, FIG. 3*d*, previously mentioned as being up. The latter is joined to one of the inputs of the AND circuit 1471. This line 1472 traces back through cable 21, a cathode follower 1480, FIG. 3*m*, to the output of a FIRST CHAR trigger 1481 having an input joined to the line **969*a* whereby the trigger is turned on. The trigger 1481 has a second input connected to a line 1482 which feeds to the output of an OR circuit 1483 having two inputs, one being connected to the CHAR GATE branch line 1141 and the other being connected to the GO line 1484 branching off from the GO line 901**, in FIG. 3*d*.

The fall of the CHAR GATE line 1145, FIGS. 3*i* and 3*j*, provides a negative transition which is reflected at the output of an AND circuit 1485, in FIG. 3*b*, cathode follower 1486 to the line 1236, through the OR circuit 1234, line 1238 to turn off the WR CALL trigger 868. The latter action eventuates in the dropping of the INIT WR DEL line 887, FIG. 3*c*, which causes the CLOCK to stop thereby precluding the writing of any further TM characters.

When the REC GATE SS 1154, FIG. 3*p*, falls 200 μs. following the fall of the CHAR GATE, the line 909, FIG. 3*d* and 3*f*, is effective to turn off the four write triggers in the tape unit, which triggers were previously turned on during the writing of the TM character. As a result, the writing of the check character follows in which bits 1—2—4—8 are again written. As the program proceeds, the DISC line 1266, FIG. 3*j*, falls to provide a negative transition on a branch line 1487 to turn off the FIRST CHAR TM trigger 1478, in FIG. 3*d*. The fall of the DISC line 1266 also impresses a signal through the DISC line 1278, FIG. 3*a*, for turning on the RD BKWD CALL trigger 1282, in FIG. 3*a*, to initiate program 2, in which program the TM character written on tape will be verified.

In the normal course of program 2, READ BKWD operation, the WR RWD BEFORE BKSP DEL SS 1297, FIG. 3*c*, is flipped on to provide a 3 ms. signal through the line 1301, cable 23, OR circuit 1302, FIG. 3*k*, and the line 1303 to turn on the BKWD trigger 1261 at the termination of the 3 ms. The latter provides along the BKWD line **528*a***, FIGS. 3*k* and 3*r*, an appropriate signal to instruct the tape unit to move the tape in a backward direction for reading the TM character.

The WR TM & RWD CALL trigger 1452, FIG. 3*r*, being on at this time, enables the line 1476 to pass an up level signal to the AND circuit 1475. The reading of the TM check character without error provides an up level signal on the NOT WR ERROR line 1202 which is passed on to the AND circuit 1475 in FIG. 3*d*. Accordingly, the latter issues an up level signal through the OR circuit 1474, line 1473, AND circuit 1471, grounded grid amplifier 1477 to turn on the FIRST CHAR TM trigger 1478 at the end of the VRC pulse on line 1048.

Upon the reading of the TM character, following the reading of the TM check character, there is provided a normal end of record signal which eventuates in the turning on of the tape indicator (TI) trigger 688 in the tape unit in the following manner. An up level signal is issued by the trigger 1478, FIG. 3*d*, through a cathode follower 1490, a line 1491, cable 23, to an input of an AND circuit 1492, FIG. 31, having three other inputs connected to the following lines, now up: a TU IN RD STATUS line 1493 branching off of the line 600*a*, a branch line 1494 connected to the NOT R/W/CD ERROR line 1403, and a branch line 1495 connected to the DISC line 1266. The AND circuit 1492 accordingly issues an up level pulse to an inverter 1496 whose output is applied to a line 1497 which turns on a SET TI trigger 1498.

The latter issues an up level signal through a cathode follower 1500 to a line 708*a*, FIGS. 3*f* and 35*a*, which passes into the tape unit where it connects to the TURN ON TI line 708, FIG. 35*a*, which, in the manner described, causes the trigger 688 to turn on. Accordingly, the tape unit impresses a positive signal on the SEL & TI ON line 696, FIG. 35*a*, which comes back to the SYNC to connect with the line 696*a*, FIG. 3*f*. The latter has a connection to one input of an AND circuit 1501, FIG. 31, whose second input traces back through a cathode follower 1502 to the output, now up, of the SET TI trigger 1498. The line 696*a* also feeds both grids of a thyratron 1503, FIG. 3*r*, whose output is connected to a line 1504, SYNC connector 66 to the card reader where the circuit passes through a tape indicator rewind control relay R167, through relay R303*b* n/c contacts to the line L4. (The contacts of the relay R167 are distributed throughout the card reader circuits as follows. R167*a* conditions the start relay R117, shown in FIG. 2*a*; relay R167*d*, FIG. 2*b*, controls the card lifter magnet CFM1; R167*b*, shown in FIG. 2*a*, controls the circuit to the rewind light; R167*c* controls the tape total stop relay R252LT and the TI interlock relay 303.)

The drop of the DISC line 1264, FIGS. 3*i* and 3*j*, also provides a negative transition on the DISC line 1278 which signal fails to turn on program 3, SPACE FWD trigger 1396, in FIG. 3*b*, because of the inability of the negative transition to pass through the diode gate 1397, in FIG. 3*a*. The latter is inoperative by virtue of the presence of a down level on the line 1399 connected between the diode gate and the output of the AND circuit 1400 whose input is connected to the NOT FIRST CHAR TM line 1402, now down. The RD BKWD CALL trigger 1282, FIG. 3*a*, is turned off, however, since the diode gate 1287 is operative to apply a negative transition to this trigger. In going off, the trigger 1282 issues a negative transition on the line 1286 and a branch line 1499 to turn off the WR TM & RWD CALL trigger 1452, in FIG. 3*r*.

A rewind operation is initiated as follows. The up level output from trigger 1498, FIG. 31, in conjunction with an up level signal on the line 696*a* renders the AND circuit 1501, FIG. 31, operative to impress an up level signal on a line 1505, a cathode follower 1506, a line 1507 connected to an input of an AND circuit 1508 having two other inputs connected one to the TU IN RD STATUS line 1493, now up, and the other to the TU NOT AT LP line 920*d*, now up. The AND circuit 1508 thus passes an up level signal through a cathode follower 1509, a START RWD line 792*a*, FIG. 3*f*, which passes into the tape unit where it joins with the START RWD line 792, FIG. 35*b*, to initiate the rewind operation. Thereupon, the tape unit SEL & REWIND line 804, FIG. 35*a*, issues a signal which is passed into the SYNC through line 804*a*, FIG. 3*f*, shaping trigger 1510, in FIG. 31, cathode follower 1511, inverter 1512, cathode follower 1513 to the line 1448, a branch line 1514 to the SET TI trigger 1498, turning the latter off.

In the event that an error is detected during program 2 as the TM character is being read, the tape unit does not receive rewind instructions but rather comes to a halt. In order to initiate further tape unit operations, the TM key and the REWIND key on the card reader must be simultaneously depressed, whereupon the appropriate circuits will be energized to cause the TM character and its check character to be written during a program 1 operation and checked on a subsequent program 2 operation, in the manner described.

During program 2, upon the detection of an error, the NOT R/W/CD ERROR line 1494, FIG. 3*r*, is impressed with a down level signal thereby rendering the AND circuit 1492, FIG. 31, inoperative. This in turn precludes the turning of the SET TI trigger 1498, in FIG. 31. Accordingly, line 708*a* is rendered down to prevent initiation of the rewind operation.

The AND circuit 1447, FIG. 3*q*, issues an up level signal, in the manner described, to again initiate writing of the TM character followed by the writing of the check character and, in the absence of an error, a rewind operation will be instituted.

In the card reader, the signal directed to the SYNC upon depression of the TAPE MARK key and REWIND key is as follows. Referring to FIG. 1*d*, the path extends through the line L1, thermal relay TH*d* n/o contacts, TAPE MARK key contacts, TAPE REWIND key contacts, relay 302*b* n/o contact points and relay R298*d* n/o contact points, in parallel therewith, relay R304*a* n/c contacts, relay R301*b* n/c contacts, SYNC connector 65, FIG. 2*d*, to the line 1442, FIG. 3*q*, and from this point on the circuit path continues in the manner previously described.

*Out of file control*

This circuit is provided to stop operations of the tape unit when the latter fails to read or write, as the case may be, during either a read or a write operation.

The circuit operations concerned with this function are as follows. The turning on of the CLOCK GATE DEL SS 966, in response to either a read or a write operation, provides a positive signal on the branch CLOCK GATE line 969*a*, which signal is passed on through a branch line 1520, FIG. 3*m*, through an inverter 1521, the latter issuing a negative transition through a line 1522 to turn on an OUT OF FILE trigger 1523. The latter provides a negative transition which is passed through a cathode follower 1524, through a line 1525 to turn on an OUT OF FILE SS 1526 having a time duration of 100 ms. The latter accordingly provides a down level output signal through a cathode follower 1527 to a line 1528 connected to an input of an AND circuit 1529 having a second input connected to a line 1530 joined to the output of the cathode follower 1480. Twenty μs. following the turning on of the CLOCK GATE DEL SS 966, the latter is turned off and accordingly provides a negative transition on the line 969*a*. This signal is employed to turn on the FIRST CHAR trigger 1481, in FIG. 3*m*. The latter issues an up level signal through the cathode follower 1480, through the line 1530 to the second input of the AND circuit 1529. The latter accordingly issues a down level signal which passes into an inverter 1531. The output, now up, of the latter passes through a cathode follower 1532 to an OUT OF FILE STOP line 1533 and a branch line 1534. The latter passes through the OR circuit 1257, FIG. 3*e*, to the line 1258 connected to the DEL R/W CALL trigger 985. The line 1533 passes through the OR circuit 1259, FIG. 3*d*, the line 1260 to the GO trigger 896. Under the conditions described above, the lines 1533 and 1534 are up and therefore are incapable of turning off the GO trigger 896 and the DEL R/W CALL trigger 985.

Upon the termination of the 100 ms. time interval of the SS 1526, in FIG. 3*m*, the latter turns off and issues an up level signal to the AND circuit 1529. Now if the second input to the AND circuit 1529 is rendered up, an up level signal is issued by the AND circuit and reflected as a negative transition on the lines 1533 and 1534 to turn off the GO trigger and the DEL R/W CALL trigger to stop the tape unit. The above condition develops as a result of the up level signal issued by the AND circuit 1529. This condition arises as a result of a writing or reading failure in the tape unit, which failure is reflected as a negative transition on the lines 1533 and 1534 to stop operations of the tape unit. This failure of the tape unit is further reflected as an absence of signals on the CHAR GATE line 1141 which results in the failure to turn off the CHAR GATE trigger 1481. The circuit path of the line 1141 extends through the OR circuit 1443, through the line 1482 to the FIRST CHAR trigger 1481. The up level from the latter is applied to the second input of the AND circuit 1529 by way of the line 1530.

On the other hand, when the tape unit responds correctly to either a reading or a writing operation, the CHAR GATE line 1141, FIG. 3*j*, issues a signal each time a character is written or read. This signal turns off the FIRST CHAR trigger 1481, FIG. 3*m*, and thereby applies a down level signal to the second input of the AND circuit 1529. The down level output from the latter is reflected as no change in the signal on the lines 1533 and 1534 which are then ineffective to turn off the GO trigger and the R/W CALL trigger.

When the GO trigger is turned off by way of the line 1533 as a result of a failure in either a read or write operation, the tape unit is stopped. The GO line accordingly drops to provide a negative transition on the line 1484, FIG. 3*m*, which signal passes through the OR circuit 1483, through the line 1482 to turn off the FIRST CHAR trigger 1481. Accordingly, a negative transition signal is passed through the cathode follower 1480, through a line 1535 to turn off the OUT OF FILE trigger 1523. The latter issues an up level signal through the cathode follower 1524, the line 1525 to reset the OUT OF FILE SS 1526. These circuits are now in condition to again test the tape for another interval of 100 ms.

TEST CONTROL CIRCUITS

The following concerns an explanation of the test control switches and the various functions controlled by each:

(1) WR TM & RWD
(2) RWD
(3) STOP ON ERROR
(4) SET TI
(5) RESET TI
(6) RESET
(7) SINGLE RECORD WRITE CONTROL
(8) SINGLE CARD FEED
(9) TEST SELECTION SWITCH
Position 1. NORMAL MACHINE OPERATION
Position 2. SINGLE CARD RECORD REPEAT
Position 3. SINGLE CARD CONTINUOUS WRITE
Position 4. MANUAL RECORD REPEAT
Position 5. MANUAL WRITE
Position 6. TEST READ (1) Depressing of the WR TM & RWD push button 1550, FIG. 3*f*, provides an up level signal through a cathode follower 1551, through line 1552 connected to the input of a shaping trigger 1444, through line 1446, to the input of the AND circuit 1447, the other three inputs of which have been previously explained, through the AND circuit 1447, inverter 1450, line 1451 to trigger 1452, in FIG. 3*q*, the latter causing a TM and RWD operation.

(2) Depressing the RWD push button 1553, in FIG. 3*f*, provides a positive signal through a cathode follower 1554 to the line 1320. The latter passes into the AND circuit 1508, in FIG. 31, and, if all of its remaining inputs are positive, the tape unit is instructed to effect a rewind operation.

(3) The STOP ON ERROR switch is a double pole switch having a right section 1555, shown in FIG. 3*g*, and a left section 1556, shown in FIG. 3*f*. When the switch 1556 is closed, an up level is applied through a cathode follower 1558, through a line 1559 connected to one input of AND circuit 1560 whose other input is connected to line 1385 which reflects an up level whenever either a write, read or card error occurs. Under condition of any error, the output of the AND circiut is up and inverts after passing through inverter 1561. This inverted output then passes to the line 1220 by way of cathode follower 1562. From the latter line there extends a plurality of branch lines which control appropriate circuits to stop the machine to maintain conditions of the machine at the time the error arose.

(4) Depressing the SET TI push button 1582, FIG. 3*f*, provides an up level signal through a cathode follower 1586, line 1587 connected to the line 708*a*, FIG. 3*f*, to turn on the TI trigger 688, FIG. 35*a*, in the tape unit.

(5) Depressing the RESET TI push button 1588, FIG. 3*f*, provides an up level signal through cathode follower 1589, line 1590, which passes into the tape unit to reset the tape indicator.

(6) Depressing the RESET push button 1591, FIG. 3*i*, provides a reset signal to all of the triggers except the RD REG triggers and LRCR triggers. This reset signal passes through a shaping trigger 1592, in FIG. 3*i*, SS 1593, cathode followers 1594 and 1595 to a reset line 1596 from which appropriate branch lines extend to all of the triggers mentioned.

(7) The SINGLE RECORD WR CTRL switch 1597, FIG. 3*f*, energizes a D relay. The latter has a Da contact point interposed in a circuit path extending from position 4 of DECK 2 switch 1412, FIG. 3*n*, to a cathode follower 1598 and the line 1580. Thus, when DECK 2 of switch 1412 is set to position 4, only one record will be written for each depression of the START WR key 1603.

(8) The SINGLE CARD FEED push button 1599, FIG. 3*g*, when in normal position, provides a positive signal on a line which passes through SYNC connector 62 to energize relay R166LT, in FIG. 2*t* of the card reader. When the push button 1599, FIG. 3*g*, is depressed, it provides a signal to energize relay R166LP, shown in FIG. 2*c* in the card reader, in the following manner. The signal passes through line 1600, SYNC connector 63 into FIG. 2*a* of the card reader, through R118*e* contacts, R170*b* contacts, R166*b* contacts, R269*c* contacts, R262*c* contacts, R302*c* contacts, R167*a* contacts, R417*b* contacts, R252*b* contacts to energize the start relay R117LP. Accordingly, relay R166LP will be energized by means of a path extending through R166LP, shown in FIG. 2*c*, R170*c* n/o contacts, R117*d* contacts, R123*c* contacts, and cam contacts CR7. The R170*c* contacts are now closed by virtue of the fact that the TEST SELECTION switch 1412, DECK 1, FIG. 3*g*, is now set to position 2.

(9) The TEST SELECTION switch 1412, mentioned above, is a four DECK six-position switch, shown in FIGS. 3*a*, 3*n* and 3*g*, to which a variety of test circuits are connected and selectively called into operation. The various test operations controlled through the six positions of this switch and the various push buttons described above will now be explained.

*Position 1.*—When set to position 1, the operation of the card reader, synchronizer, and tape unit are normal. The OK signal from the card reader passes through SYNC connection 72, FIG. 2*t*, the line 1413, in FIG. 3*a*, position 1 of DECK 4 of the switch, the line 1411, cathode follower 1410, line 1409, etc., in the manner described.

*Position 2.*—This position is used in combination with the SINGLE CARD FEED push button 1599, FIG. 3*g*, to permit record data to be written under control of the program ring. In this operation, a single card is fed through the card reader to enter the data from the record into the buffer from which it is extracted and written on tape. The record data remains in the buffer until another card is fed through the card reader. Through position 2 of DECK 1, FIG. 3*g*, a positive signal passes on to a line 1604, through SYNC connector 75 to the card reader where the signal energizes relay R170*p* and R168*h*. Energization of relay R170 prevents operation of the program ring. When the START WR push button 1603, FIG. 3*f*, is depressed, a START WR relay E is energized. Accordingly, an associated contact E*b*, FIG. 3*g*, closes to provide a positive signal on a line 1605, through SYNC connector 77 and into the card reader to energize relay R171LP. The closure of an associated R171 contact point energizes the START PGM line 851, FIG. 3*a*, which initiates the program to write a record on tape in the manner described. The operation will repeat itself until stopped upon the depression of a stop push button 1607, FIG. 3*f*, which energizes a STOP relay D pickup coil P2. Closure of contacts D*c*, FIG. 3*g*, provides a positive signal on a line 1608 which passes through SYNC connector 78 and into the card reader to energize relay R118P2, which relay stops the card reader and prevents the issuance of any further signals on the line 851, in FIG. 3*a*.

*Position 3.*—This position is used in conjunction with the SINGLE CARD FEED switch 1599, FIG. 3*g*, to permit repetitive scanning of the buffer storage to enable a series of writing operations to be effected with no gap between the written records since, in this operation, the BKWD program is inoperative. This operation is called SINGLE CARD CONTINUOUS WRITE and involves the following circuits. Through the DECK 1 position 3, in FIG. 3*g*, a positive signal is applied along a line 1609, through SYNC connector 76 and into the card reader to energize relay R170H pick 2 coil. Upon depression of the START WR push button 1603, in FIG. 3*f*, relay E is energized. Accordingly, contacts E*c*, FIG. 3*n*, close to provide a positive signal by way of DECK 3 position 3, contacts E*c*, START TEST WR line 1610 to turn on a key trigger 1611, in FIG. 3*b*. The latter issues an output on a line 1612 connected to the OR circuit 873 to turn on, by way of line 874, the GATE WR ERROR trigger 876. At the same time, a branch line 1613, FIG. 3*b*, conveys the signal to turn on a TEST WR trigger 1614, in FIG. 3*c*. The latter accordingly provides a signal through a cathode follower 1615 to a line connected to the SET WR STATUS line **556*a***, FIG. 3*f*, which passes into the tape unit where it connects with the line 556, FIG. 35*b*, to set the tape unit to WR STATUS. At the same time, the signal passes through the line 877, FIG. 3*c*, to the AND circuit 878. The lines 879 and **574*a*, both of which are connected to the AND circuit 878, are now up to enable the AND circuit to energize the INIT WR DEL line 888** to cause the tape unit to initiate a writing operation.

The buffer ring is changed from an open to a closed ring by virtue of the following. The branch line 1233, FIG. 3*g*, is connected from the output of the ring trigger position 32 to a cathode follower 1615, FIG. 3*n*, to the input of a diode gate 1616 having a second input connected to the output of a cathode follower 1618. The input to the latter is connected to a line 1619 which is joined to position 3 of DECK 3. The output of the diode gate 1616 is passed on to a line 1620 connected to the input of the buffer ring trigger position 1, in FIG. 3*a*. Thus, when the buffer ring trigger, position 32, is turned off, position 1 trigger is turned on to cause the ring to repeat its operations. The line 1617, FIG. 3*n*, is also connected to the OR 1601, FIG. 3*a*, in turn connected to a cathode follower 1602 whose output is connected to the AND circuit 1223. The output from the latter is reflected on the buffer ring advance line 1229. Operations are terminated upon depressing the STOP push button 1607, in FIG. 3*f*, the latter causing the STOP relay D to be energized. The closure of contacts D*b*, FIG. 3*n*, provides a positive signal on a STOP TEST WR line 1621 which turns off the key trigger 1611, in FIG. 3*b*. The latter provides a signal through a line 1623, cathode follower 1624 to an input of an AND circuit 1625 whose second input is connected to the CHAR GATE branch line 1143. The output of the AND circuit 1625 passes through an inverter 1626, FIG. 3*c*, to a line 1627 which turns off the TEST WR trigger 1614, the latter action causing the INIT WR DEL line 888, FIG. 3*c*, to drop and terminate operations upon the writing of the check character.

*Position 4.*—This position, in conjunction with any one of a plurality of digit entry switches 1630 through 1639, FIG. 3*n*, are used to write a thirty-two character record on tape. The latter switches are connected through appropriate ones of the cathode followers 1640 through 1649 in turn connected to ten decimal branch lines 1650 through 1659, the latter being connected to the OR circuits 1071 through 1076 in the manner shown in FIG. 3*n*.

The closure of a particular digit entry switch causes energization of the appropriation ones of the binary lines 1077 through 1080 and the "C" bit line **622*a***. In turn, the appropriate write heads in the tape unit are energized to cause writing of the particular binary bits thirty-two times for a particular record. During this operation, the check character will not be written since the bits will be written an even number of times.

The operation of the program ring is initiated by means of the following circuits. A positive signal is applied by way of DECK 2 position 4, in FIG. 3*n*, a START PGM TEST in line 1661, in FIG. 3*a*, through START WR contacts E*a*, closed in response to the depression of the START WR push button 1603 (in FIG. 3*f*), through a cathode follower 1662, FIG. 3*a*, to the line **851*a*. The signal on the latter line is eventually reflected on the line 857**, FIG. 3*a*, to initiate the program. In this operation, the programs 1, 2 and 3 are effected in the manner explained, program 3 being controlled by the following circuits. The up level signal is applied by way of a line 1663, in FIG. 3*a*, through position 4 of DECK 4, line 1411, cathode follower 1410 to the card reader RDY line 1409. The latter eventually energizes the SPACE FWD CALL & CR RDY line 1318, FIG. 3*b*, to effect program 3.

The END PGM line 1578, FIG. 3*b*, is energized to turn on the SS 1582, in FIG. 3*n*, the latter having a time duration of 60 ms., which time interval is equivalent to the time interval between successive writing operations of the tape unit. At the termination of the 60 ms. period, when the SS 1582 is turned off, the PGM REPEAT line 1584 drops to turn on the WR REC trigger 863, FIG. 3*a*, to again initiate the program.

This operation is terminated upon depressing the STOP push button 1607, FIG. 3*f*, which causes the STOP D relay to be energized. The latter causes the D*a*, FIG. 3*n*, contacts to de-energize the PGM REPEAT line 1584.

*Position 5.*—This position of the switch, in combination with any one of the digit entry switches 1630 through 1639, FIG. 3*n*, institutes a manual write operation. The operations of starting and stopping are the same as described under SINGLE CAR CONTINUOUS WR, position 3 setting of the test selector switch.

*Position 6.*—This position is used for a test read operation of a single record on tape while the latter is moved either forwardly or backwardly, or to read continuously while the tape is moving forwardly. Provision is made for an immediate read stop as well as for stopping at the end of a continuous read forward operation. In addition, the reading of a TM character will cause an automatic rewind operation. In connection with the test read circuits there are provided a plurality of SINGLE REC switches 1671 through 1676, FIG. 3*q*, each having a connection to a line 1677 connected to a line 1665 wired to position 6 of DECK 2, in FIG. 3*n*.

The circuit operations are as follows. The RD REG RESET GATE line 1370 and the GATE RD ERROR line 1197 are energized by means of a path extending through DECK 2, position 6, FIG. 3*n*, line 1665, a cathode follower 1666, FIG. 3*q*, to a plurality of branch lines, one of which passes through the OR circuit 1365, FIG. 3*q*, to energize the line 1370, while another passes through an OR circuit 1667, a cathode follower 1668 to the line 1197. (The OR circuit 1667 has a second input connected to a branch line 1669 in turn connected to the BKSP TEST/RD BKWD CALL line 1293, in FIG. 31.)

When the FWD push buttons 1672 and 1674, FIG. 3*q*, are depressed, an up level signal is issued along a path through the switch 1672 to turn on an end of record (EOR) shaping trigger 1678. The latter provides an output through a cathode follower 1679, an OR circuit 1680, an inverter 1681, the line 1565, OR circuit 1564, through the line 1566 to turn on the TEST START CTRL trigger 1567. Through the switch 1674 a signal is applied to the TEST RD line 1317 which eventually initiates a read program by energizing the lines 1314, 1326, 1416 and others in the manner described. Only one record is read owing to the fact that since the line 1598 is down, the AND circuit 1569, FIG. 3*q*, is incapable of energizing the TEST START line 1574. The fall of the DISC branch line 1683 causes the TEST START CTRL trigger 1567 to turn off.

When the BKWD push buttons 1673 and 1675 are depressed, the circuit operations just described are again initiated. In addition, a BKSP TEST line 1684 is energized and passes a signal through a cathode follower 1685, FIG. 3*k*, to the BKSP TEST/RD BKWD CALL line 1293. The latter, in conjunction with a TU IN RD STATUS branch line 1686, connected to the line **600*a*, renders an AND circuit 1687**, FIG. 3*k*, operative to issue an up level signal through a shaping trigger 1688, a cathode follower 1689, an inverter 1690, through the OR circuit 1302, line 1303 to turn on the BKWD trigger 1261 to instruct the tape unit to move tape in a backward direction.

The BKWD trigger 1261, in going on, provides an appropriate signal to turn on the FWD TO BKWD DEL SS 1305. Following its time duration of 15 ms., the DEL BKSP CALL trigger 1311 is turned on. The line 1312 accordingly provides an up level signal to the lines 1314, 1416 and 1326, in the manner described, to effect a read operation.

When the CONTINUOUS READ push button 1676, FIG. 3*q*, is depressed, the TEST RD line 1317 is again energized to initiate a read program. At the end of the read operation, the TEST START line 1574 is energized by way of the AND circuit 1569, FIG. 3*q*, at a time when the DISC line 1683 is pulsed. When the signal on the latter line falls, the TEST START line 1574 also falls to turn on the GO trigger 896, in FIG. 3*d*. At the same time, the RD DEL SS 1339, FIG. 3*e*, is turned on by way of the branch line 1336 to cause another record to be read, subsequent records being read by operations performed in the manner just described.

During the course of a continuous read operation, depressing the EOR push button 1671, FIG. 3*q*, causes the EOR STOP trigger 1678 to turn on. The latter, in the manner described, turns on the TEST START CTRL trigger 1567, in FIG. 3*q*. The down level output from the latter is applied to the line 1598 to render the AND circuit 1569 inoperative when the DISC line 1683 is pulsed, thus maintaining the TEST START line 1574 at a down level to thereby prevent initiation of a read operation.

When the STOP push button 1607, FIG. 3*f*, is depressed, the D relay is again energized. Accordingly, a D*d* contact closes to apply a positive signal. Beginning with position 6, DECK 2, the signal passes through the line 1665, contact D*d*, in FIG. 3*q*, an IMMEDIATE RD STOP trigger 1692, a cathode follower 1693 to an IMMEDIATE RD STOP line 1694, inverter 1695, in FIG. 3*c*, through the OR circuit 1259, in FIG. 3*d*, the line 1260 to turn off the GO trigger 896.

The TEST START CTRL trigger 1567, FIG. 3*q*, is turned on by way of a path extending through a branch line 1696, the OR circuit 1680 and eventually to the trigger 1567, in the manner described. The outcome of this operation is that the AND circuit 1569, FIG. 3*q*, is rendered ineffective to energize the TEST START line 1574 at a time when the DISC line 1683 is pulsed.

It is to be understood that this invention may be expressed in a variety of ways, for example, while the record data is being recorded on the tape, the checking means, i.e., the validity determining means, or the parity checking, may be delayed in its operation to check the record data until after recording the latter, or to check while the data is being recorded. In other arrangements, the checking of the data during and after recording on tape may be eliminated; instead, other mathematical processing functions, such as computation, data comprising, etc., may be performed while each record data is being recorded on the tape and while the latter is being moved backwardly to space over the last recorded record data and then to await instructions, which depend upon the control set up in accordance with the results derived from these processing functions, to either efface the data last recorded or to space forwardly over the last recorded record data to the next area on the tape before recording the next record, or other set of data, thereon. Moreover, in the record marking operations of the reader, the marking means may contain several marking devices which may be selectively controlled each by an appropriate one of the card, read and write error signals, each such marking device providing a mark different in color or size or shape to the record passing thereunder.

While there have been shown and described and pointed out the fundamental novel features of the invention as applied to a preferred embodiment, it will be understood that various ommissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination: first and second data storage means, including individual entry and readout means therefor, and reset means associated with each of said storage means; the first storage means containing a plurality of networks, each containing settable elements selectively arranged into combinatorial patterns, in response to each entry, to represent digit values 0–9, each network connected to an associated individual entry and readout means and each network resettable to a non-zero setting in response to an operation of the associated reset means; the second storage means containing digit-representing settable elements equal in number to said plurality of networks, each connected to an associated individual entry and readout means and each element resettable to a zero setting in response to an operation of the associated reset means; individual common connections connecting in common the corresponding readout means of said storage means to combine the readouts; and readout timing means for issuing sequentially timed signals, said means controlled by the readout means to issue a single timed signal for corresponding elements and networks whose settings are in agreement and plural timed signals for corresponding elements and networks whose settings are not in agreement.

2. In combination: first and second data storage means, including individual entry and readout means therefor, and reset means associated with each of said storage means; the first storage means containing a plurality of networks, each containing settable elements selectively arranged into combinatorial patterns, in response to each entry, to represent digit values 0–9, each network connected to an associated individual entry and readout means and each network resettable to a non-zero setting in response to an operation of the associated reset means; the second storage means containing digit-representing settable elements equal in number to said plurality of networks, each connected to an associated individual entry and readout means and each element resettable to a zero setting in response to an operation of the associated reset means; individual common connections connecting in common the corresponding readout means of said storage means to combine the readouts; readout timing means for issuing sequentially timed signals, said means controlled by the readout means to issue a single timed signal for corresponding elements and networks whose settings are in agreement and plural timed signals for corresponding elements and networks whose settings are not in agreement; and a normally closed switch interposed in each of the common connections and means responsive to the first data entry in each of a series of entries to both storage means to open each switch to provide independent readouts.

3. The combination as in claim 1 further characterized in that said first storage means comprises a relay network and a readout network, said network including five relays arranged to be energized on a 2-out-of-5 basis in response to the entry of a digit value, the readout network including relay contacts associated with said relays, and that said readout timing means is connected to the readout network, the readout network including a single output line which provides an impulse corresponding to the digit value stored when two out of five relays are energized, and more than one impulse when more or less than two relays are energized, and no impulse when no relays are energized.

4. The combination as in claim 3 further characterized in that the elements of said second storage means are comprised of accumulator elements.

5. In combination: first and second multiorder position counters each having individual entry means, and each counter capable of advancing one unit for each unit entered to produce a count; first counter readout means adapted to read out the count in the first counter; second counter readout means adapted to read out a value greater than the count in the second counter; individual connecting means connecting corresponding readouts in parallel; normally closed switches interposed in said connecting means; carry means between adjacent order positions of each counter; and means responsive to a carry in the first counter to open up the normally closed switches to prevent the parallel readout of the count.

6. The combination of claim 5 further characterized in that said second counter readout means is displaced by one unit in relation to the setting in its associated counter to thereby read out a value greater by one than the count in the said associated counter, and means for resetting said first and second counters to one and zero respectively.

7. In combination: first and second multi-ordered counters each multi-ordered counter having individual entry means to its respective units order, each capable of advancing one unit for each unit entered to produce a count; means associated with said first multi-ordered counter for resetting the units order counter to one and the remaining orders to zero; means for resetting the second multi-ordered counter to zero; first multi-ordered readout means adapted to read out the count in the first multi-ordered counter; second readout means for all ordered counters of the second multi-ordered counter, except for the units order, being oriented to read out signals representing the exact value settings in the corresponding ordered counters of the second multi-ordered counter; the units order readout means of the second multi-ordered counter being displaced one unit in relation to the setting in the associated units order counter; means associated with each order connecting the readouts in parallel; normally closed switches interposed in the last-named means; carry means between adjacent orders of said multi-ordered counters; and means responsive to a units order carry in the first counter to open up the normally closed switches to prevent the parallel readout of signals representing the count.

8. A record to tape recorder for recording on successive areas of a tape amount data derived from a succession of records comprising: a cyclically operable record machine having a common path along which are arranged in cyclically spaced relationship a record sensing station including record data amount sensing means and a serial numbering printing station; a record receiving pocket; cyclically operable feeding means for feeding the records in succession along the path to the pocket; a serial numbering device including means for setting the device to register one; means operatively connecting the numbering device to the serial numbering printing device; cyclically operable record printing means in the printing station and responsive to the presence of each card therein to effect printing of the serial number thereon; means for consecutively advancing the setting in the serial number device by one for each record passing through the printing station; cyclically operable data storage means; means responsive to the sensed amount data for entering the latter into the storage means; serial numbering readout means operable on each record feed cycle to read out the serial number data from the serial numbering device; means responsive to the read out serial number data to enter the latter into the storage means, the first amount entered into storage being accompanied by serial number one and each succeeding amount entered thereafter being accompanied by a serial number increased by one over the previous number; cyclically operable means for reading out the stored amount and serial number; a tape recorder including recording means responsive to the readout amount and serial number data to record the same on the tape, each amount and its accompanying serial number being recorded on an area of the tape; and means for spacing the tape an area at a time after each recording operation.

9. A record to tape recorder for recording on successive areas of a tape amount data derived from a succession of records comprising a cyclically operable record machine having a common path along which are arranged in cyclically spaced relationship a record sensing station including a record data amount sensing means; a serial numbering printing station and a record distributing station; a pair of record receiving pockets including an appropriate record path to each pocket extending from the distributing station, cyclically operable distributing control means for selecting an appropriate path and pocket; cyclically operable feeding means for feeding the records in succession along the common path and an appropriate path to an appropriate pocket; a serial numbering device including means for setting the device to initially register one; means operatively connecting the numbering device to the serial numbering printing device; cyclically operable record serial numbering printing means in the printing station and responsive to the presence of each card therein to effect printing of the serial number thereon;

means for consecutively advancing the setting in the serial number device by one for each record passing through the serial numbering printing station, cyclically operable data storage means; means responsive to the sensed amount data for entering the latter into the storage means; serial numbering readout means operable on each record feed cycle to read out the serial number data from the serial numbering device; means responsive to the read out serial number data to enter the latter into the storage means, the first amount entered into storage being accompanied by serial number one and each succeeding amount entered thereafter being accompanied by a serial number increased by one over the previous number; cyclically operable means for reading out the stored amount and serial number; a tape recorder including recording means responsive to the readout amount and serial number data to record the same on the tape, each amount and its accompanying serial number being recorded on an area of the tape; tape data sensing means for sensing the recorded record data immediately after recording; validity determining means operable on each recording operation to determine the validity of the data while recording the latter on an area of the tape and while sensing the same recorded area and providing either a valid or an invalid signal according to the determination made; data effacing means responsive to each invalid signal to erase the recorded amount and serial number data record determined to be invalid; tape feeding means for spacing the tape an area at a time after each valid recording operation; and means responsive to the valid and invalid signals to render the distributing control means accordingly operative to select the record passing through the distributing station to one or another of the pockets depending upon the character of the signal, the serialized records passing to one pocket corresponding to validly serialized records recorded on the tape, while the serialized records in the other pocket corresponding to the records recorded but erased from the tape.

10. A cyclically controlled distribution and recording machine through which are fed batches of records, each record containing data designations pertaining to amount, and a batch header record preceding each batch of records, and each header record containing data designations pertaining to an individual batch number and a control designation comprising: a sensing station including groups of sensing means adapted to sense the records for the amount, and batch number designations and the control designation; cyclically operating feeding means for feeding the records singly and in succession through said sensing station; a plurality of record receiving pockets including one to receive invalid records and another to receive valid records; distribution means disposed between said sensing station and the pockets including an appropriate number of record paths through which the records are passed to the pockets; selecting means for said distribution means to control the latter to select a path to said pockets on each record feed cycle; amount storage means having entry means operable on each record sensing cycle to enter into storage the amount designations sensed from each record; storage exit means operable on each record cycle to read out the stored amount designations; a cyclically operable accumulator; entry control means therefor operable on each sensing cycle to enter the amounts read out from the storage exit means; validity determining means for determining the validity of the amount data designations sensed from each record, one determination being made on each record sensing cycle, and providing an error signal in response to each invalid determination; means responsive to each error signal to render the accumulator entry control means effective to prevent entry of the storage exit amounts in the cycles in which the error signals arise; means responsive to the absence of the error signals to render the accumulator entry control means effective to enable entry of the storage exit amounts in cycles in which error signals are absent; other means responsive to each error signal to render the selecting means effective to cause the distributing means to select a path to said one of the receiving pockets for receiving records in cycles in which the errors arise; still other means responsive in cycles in which errors are absent to render the selecting means effective to cause the distributing means to select a different path to said another pocket for receiving valid records; means for effecting a total taking operation; individual means for printing totals and associated batch numbers during the total taking operations; total taking control means responsive upon the sensing of the control designations in the batch header card passing through the sensing station to render operative said means for effecting total taking operations, the batch header associated with a following batch controlling the total taking operations for the preceding batch; accumulator total readout means operable to read out the total during a total taking operation; means operable on a total taking operation to render the total printing means responsive to the total readout; first and second batch number storage means each having individual associated entry and exit means; reset means operative under control of the batch header control designations for resetting the first batch number storage means; first entry means responsive to enter into the first batch number storage means the batch number sensed from the batch header; connections between the first exit means and the second entry means including a first switch operable during total taking operations to enter into the second batch number storage the batch number read out from the first batch number storage; connections between the second exit means and the batch number printing means including a second switch operable during total taking operations to print the batch number read out from the second batch number storage means; means effective during total taking operations to operate the second and first switches in the order named, the operation of the second switch causing the printing of a previous batch number and the operation of the first switch causing the entry of the succeeding batch number; means for supportign a register sheet to receive printing impressions of the totals and associated batch numbers and means operative during each total taking operation to effect the printing of the accumulated totals and batch numbers for each batch.

11. A cyclically controlled distribution machine through which data bearing records are fed comprising: a sensing station for sensing the records for data; record feeding means for feeding the records through said sensing station, including means for interrupting the feeding of the records; at least three record receiving pockets, one adapted to receive invalid records, a second and third to receive valid records; distributing means disposed between said sensing station and the three pockets including appropriate record paths through which the records are passed to the pockets; distribution selecting means for controlling the distribution means to select a record path in each record cycle of operation; a serial numbering record printing station including a cyclically operable serial numbering counter, cooperating printing members each bearing the numeric digits 0 through 9, and printing means adapted to print impressions of serial numbers upon each record passing through the printing station; means for initially adjusting the serial numbering counter to respresent one so that the latter value is printed on the first record passing through the printing station; means for consecutively advancing said counter one unit for each succeeding record passing through the printing station; validity determining means providing an error signal in response to each record data determined to be invalid; means responsive to each error signal to render the selecting means operable to select the record path for the records bearing invalid data; pocket progression means normally operable in cycles in which valid determinations arise to control the selecting means to select a second path to direct valid records to the second pocket when both the second and third pockets are initially in an empty status, and to control the selecting means to select a third path to direct valid records to the third pocket upon the second pocket reaching capacity; means effective whenever either the second or the third pocket reaches capacity to operate the pocket progression means to cause the selecting means to select the path to the empty one of these two pockets; means operable in the event said last named pocket is filled to operate the record feeding interrupting means to stop the feeding of the records through the machine; a second counter; means for initially adjusting said counter to represent one so that the latter value agrees with the initial value of one setting in the said serial numbering counter; means for consecutively advancing said second counter one unit for each succeeding record passing through said printing station; means for comparing the serial number settings in both counters; means responsive to a disagreement in the serial numbers in both counters to provide a serial number error signal; a pocket for receiving records in cycles in which serial number errors arise; an appropriate record path for said pocket; and means responsive to the serial number error signals to control the selecting means to cause the distribution means to direct the record in question to its appropriate pocket.

References Cited in the file of this patent

UNITED STATES PATENTS

| | | |
|---|---|---|
| 2,000,214 | Campbell | May 7, 1935 |
| 2,168,763 | Daly | Aug. 8, 1939 |
| 2,615,569 | Lake | Oct. 28, 1952 |
| 2,624,273 | Wheeler | Jan. 6, 1953 |
| 2,700,755 | Burkhart | Jan. 25, 1955 |
| 2,702,380 | Brustman | Feb. 15, 1955 |
| 2,719,959 | Hobbs | Oct. 4, 1955 |
| 2,745,493 | Furman | May 15, 1956 |
| 2,850,234 | Bartelt | Sept. 2, 1958 |

OTHER REFERENCES

Electronic Statistical Machine, Type 101, Preliminary Manual of Information, copyright 1949, IBM Corporation Form 22-5502-0, pages 34-35 relied on.